US012717603B2

(12) United States Patent
Sondag et al.

(10) Patent No.: US 12,717,603 B2
(45) Date of Patent: Aug. 25, 2026

(54) APPARATUS AND METHOD FOR MANAGING DEPRECATED INSTRUCTION SET ARCHITECTURE (ISA) FEATURES

(71) Applicant: Intel Corporation, Santa Clara, CA (US)

(72) Inventors: Tyler Sondag, Beaverton, OR (US); Andreas Kleen, Portland, OR (US); David Sheffield, Portland, OR (US); Xiang Zou, Santa Clara, CA (US); Terry Parks, Austin, TX (US); Jason Brandt, Austin, TX (US); Ittai Anati, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 17/958,336

(22) Filed: Oct. 1, 2022

(65) Prior Publication Data

US 2024/0143361 A1 May 2, 2024

(51) Int. Cl.
*G06F 9/38* (2018.01)
*G06F 9/30* (2018.01)
*G06F 9/455* (2018.01)

(52) U.S. Cl.
CPC ........ *G06F 9/45558* (2013.01); *G06F 9/3016* (2013.01); *G06F 9/3802* (2013.01); *G06F 2009/45591* (2013.01)

(58) Field of Classification Search
None
See application file for complete search history.

(56) References Cited

U.S. PATENT DOCUMENTS

2004/0255094 A1* 12/2004 Seal ........................ G06F 9/342 712/E9.035
2005/0114628 A1* 5/2005 Kahn ................. G06F 9/30185 712/E9.023

(Continued)

OTHER PUBLICATIONS

Agesen, "Software and Hardware Techniques for x86 Virtulization", 2009, VMware, Inc. (Year: 2009).*

*Primary Examiner* — Hyun Nam
(74) *Attorney, Agent, or Firm* — NICHOLSON DE VOS WEBSTER & ELLIOTT LLP

(57) ABSTRACT

An apparatus and method for implementing a new virtualized execution environment while supporting instructions and operations of a legacy virtualized execution environment. For example, one embodiment of a processor comprises: instruction processing circuitry to process instructions in accordance with a microarchitecture, the instruction processing circuitry comprising: instruction fetch circuitry to fetch the instructions; a decoder to decode the instructions; and execution circuitry to execute the instructions based on the microarchitecture; wherein the microarchitecture including hardware support for a virtual execution environment including a virtual machine monitor (VMM) and a first type of virtual machine, wherein both the VMM and the first type of virtual machine are implemented by instructions directly supported by the microarchitecture; and wherein the VMM is to support a second type of virtual machine, the second type of virtual machine including legacy instructions not fully supported by the microarchitecture, the VMM comprising a plurality of emulators, each emulator configured to emulate execution of a different type of the legacy instructions.

48 Claims, 53 Drawing Sheets

400

(56) References Cited

U.S. PATENT DOCUMENTS

| | | | | |
|---|---|---|---|---|
| 2005/0283586 | A1* | 12/2005 | Mondal | G06F 9/45558 712/1 |
| 2006/0069534 | A1* | 3/2006 | Kinney | G06F 9/45533 703/1 |
| 2009/0100250 | A1* | 4/2009 | Chen | G06F 9/45554 718/1 |
| 2009/0187902 | A1* | 7/2009 | Serebrin | G06F 9/45537 718/1 |
| 2009/0276607 | A1* | 11/2009 | Bonola | G06F 9/3802 712/209 |
| 2021/0109757 | A1* | 4/2021 | Price | G06F 9/45558 |
| 2022/0197678 | A1* | 6/2022 | Poornachandran | G06F 9/30145 |
| 2022/0283813 | A1 | 9/2022 | Neiger et al. | |
| 2022/0308867 | A1* | 9/2022 | Sondag | G06F 9/3861 |

* cited by examiner

700

| cycle | 0 | 1 | 2 | 3 | 4 | 5 | 6 | 7 | 8 | 9 | 10 |
|---|---|---|---|---|---|---|---|---|---|---|---|
| zero-level hit | **rs2** | **rs3** | **rs4/zld1** | **rs5/zld2** | **zld3** | **zld4** | **rs1** | **rs2** | | | |
| | rs dispatch | rc + dispatch xbar | AGU L0 mem | L0 Hit | iclb setup wr iclb credit return | RC | *iclb_credit receipt* | dispatch | | | |
| zero level miss, not min | **rs2** | **rs3** | **rs4** | **rs5/flr1** | **flr2** | **flr3** | **rs1** | **rs2** | | | |
| | rs dispatch | rc + dispatch xbar | dispatch xbar / AGU | | iclb setup wr iclb credit return | RC | *iclb_credit receipt* | dispatch agu | | | |
| zero level miss, min slice | **rs2** | **rs3** | **rs4** | **flr1** | **fld2** | **fld3** | **fld4** | **fld5** | **fld6** | **rs1** | **rs2** |
| | rs dispatch | rc + dispatch xbar | dispatch xbar + AGU | agu xbar + bypass | L1 tag read | L1 tag match | writeback | rc + iclb credit return | RC | *iclb_credi t receipt* | dispatch |
| iclb_avail count | | | | | decrement | | | increment | updated | | |

*Fig. 7*

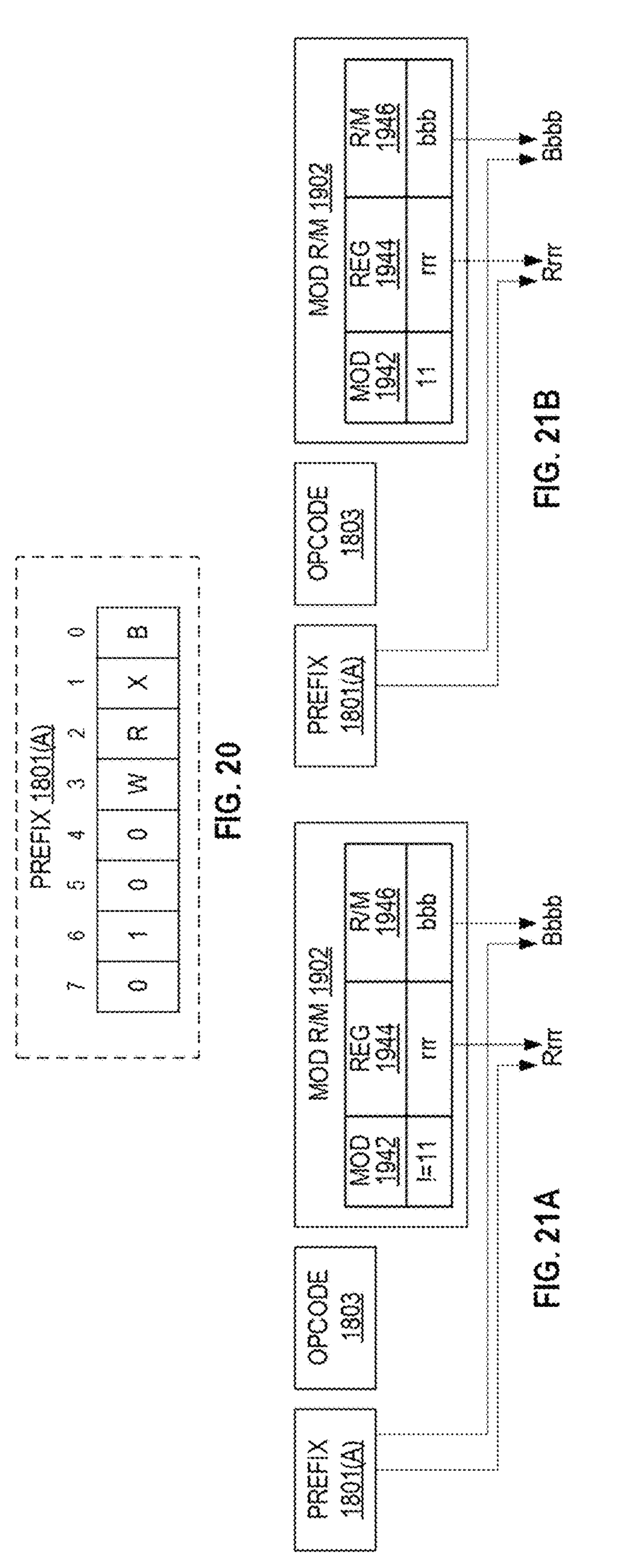
PREFIX 1801(A)
7 6 5 4 3 2 1 0
0 1 0 0 W R X B
FIG. 20
PREFIX 1801(A)
OPCODE 1803
MOD R/M 1902
MOD 1942
REG 1944
R/M 1946
!=11
rrr
bbb
Rrrr
Bbbb
FIG. 21A
PREFIX 1801(A)
OPCODE 1803
MOD R/M 1902
MOD 1942
REG 1944
R/M 1946
11
rrr
bbb
Rrrr
Bbbb
FIG. 21B
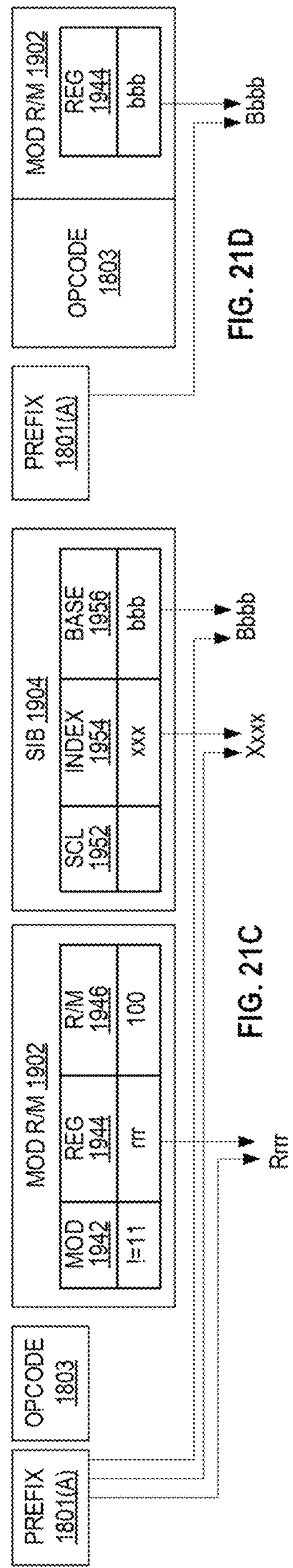
PREFIX 1801(A)
OPCODE 1803
MOD R/M 1902
MOD 1942
REG 1944
R/M 1946
!=11
rrr
100
SIB 1904
SCL 1952
INDEX 1954
BASE 1956
xxx
bbb
Rrrr
Xxxx
Bbbb
FIG. 21C
PREFIX 1801(A)
OPCODE 1803
MOD R/M 1902
REG 1944
bbb
Bbbb
FIG. 21D

CR3_LOAD_4LPGTBL 3120

| **Bit Position(s)** | **Contents** |
|---|---|
| 2:0 | Ignored |
| 3 (PWT) | Page-level write-through; indirectly determines the memory type used to access the PML4 table during linear-address translation |
| 4 (PCD) | Page-level cache disable; indirectly determines the memory type used to access the PML4 table during linear-address translation |
| 11:5 | Ignored |
| M-1:12 | Physical address of the 4-KByte aligned PML4 table used for linear-address translation |
| 63:M | Reserved (must be 0) |

*Fig. 32A*

CR3_LOAD_5LPGTBL 3121

| **Bit Position(s)** | **Contents** |
|---|---|
| 2:0 | Ignored |
| 3 (PWT) | Page-level write-through; indirectly determines the memory type used to access the PML5 table during linear-address translation |
| 4 (PCD) | Page-level cache disable; indirectly determines the memory type used to access the PML5 table during linear-address translation |
| 11:5 | Ignored |
| M-1:12 | Physical address of the 4-KByte aligned PML5 table used for linear-address translation |
| 63:M | Reserved (must be 0) |

*Fig. 32B*

| VMCS **3812** | |
|---|---|
| Guest State Area **4001** | CPU state loaded from here on VM entry and saved here on VM exit |
| Host State Area **4002** | CPU state loaded from here on VM exit |
| VM Execution Control Fields **4003** | Controls what instructions/events cause VM exit |
| VM Exit Control Fields **4004** | Control behavior on VM exit |
| VM Entry Control Fields **4005** | Control behavior on VM entry |
| VM Exit Info Fields **4006** | CPU saves information on VM exit |

FIG. 40

Guest State Area 4001

| Prior Implementations | | New Implementations | |
|---|---|---|---|
| *Width* | *Field* | *Field* | *Details* |
| 8 X 18B | For each of CS, SS, DS, ES, FS, GS, LDTR, TR:<br>Selector (2B) + Base (8B) + Limit (4B) +Access Rights (4B) | Deprecated except for: FS Base, GS Base | Segmentation removal |
| 2 X 12B | For each of GDTR, IDTR:<br>Base (8B) + Limit (4B) | Deprecated | |
| 4B | IA32_SYSENTER_CS | Deprecated | Fast Return and Event Delivery (FRED) performs necessary functions |
| 8B | IA32_SYSENTER_ESP | Deprecated | |
| 8B | IA32_SYSENTER_EIP | Deprecated | |
| 8B | IA32_EFER | | EFER VMCS field retained but no flexible/valid EFER bits |
| 4B | SMBASE | SMBASE | |
| 8B | IA32_INTERRUPT_SSP_TABLE_ADDR | Deprecated | No IST in new implementations |

FIG. 41A

Guest State Area 4001

| Prior Implementations | | New Implementations | |
|---|---|---|---|
| *Width* | *Field* | *Field* | *Details* |
| 4B | **Activity State:**<br>• Active<br>• HLT<br>• Shutdown<br>• WFS | **Activity State:**<br>• Active<br>• HLT<br>• Shutdown | WFS Activity State Deprecated in new implementations. |
| 4B | **Interruptibility State:**<br>• Blocking by STI<br>• Blocking by MOV SS<br>• Blocking by SMI<br>• Blocking by NMI<br>• Enclave Interruption | **Interruptibility State:**<br>• Blocking by SMI<br>• Blocking by NMI<br>• Enclave Interruption | No SS in new implementations so MOV SS blocking not required. |
| 4B | VMX Pre-emption timer value | Deprecated | APIC timer replaces VMX preemption timer |
| 4X8B | 4 Page Directory Pointer Table Entries (PDPTE) | Deprecated | No PAE paging support for Guest or Host in Royal64 |
| 8b | | IA32_COMPAT_SELECTOR | Added for segment emulation |
| 8b | | IA32_MODE | SU/U64/U32 |

FIG. 41B

Host State Area 4002

| Prior Implementations | | New Implementations | |
|---|---|---|---|
| *Width* | *Field* | *Field* | *Details* |
| 8B | CR0 control bits | Some bits have fixed values | Some bits have fixed values |
| 8B | CR4 control bits | Some bits have fixed values | Some bits have fixed values |
| 7 X 2B | For each of CS, SS, DS, ES, FS, GS, TR: Selector (2B) | Deprecated | |
| 5 X 8B | For each of FS, GS, TR, GDTR, IDTR: Base (8B) | FS/GS base fields | TR, GDTR, IDTR Deprecated in new implementations |
| 4B | IA32_SYSENTER_CS | Deprecated | Fast Return and Event Delivery (FRED) performs necessary functions |
| 8B | IA32_SYSENTER_ESP | Deprecated | |
| 8B | IA32_SYSENTER_EIP | Deprecated | |
| 8B | IA32_EFER | | EFER VMCS field retained but no flexible/valid EFER bits |
| 8B | IA32_INTERRUPT_SSP_TABLE | Deprecated | No IST in new implementations |
| 8B | n/a | IA32_COMPAT_SELECTOR | Added to new implementations for segment emulation |

FIG. 42

VM Execution Control Fields 4003

| Prior Implementations | | New Implementations | |
|---|---|---|---|
| *Width* | *Field* | *Field* | *Details* |
| 4B | Pin based Controls | | |
| | Activate VMX preemption timer | Rsvd 0 | Replaced preemption timer |
| 4B | Secondary proc.-based execution controls | | |
| | Descriptor Table exiting | Rsvd 0 | All related instructions removed: LGDT, LIDT, LLDT, LTR, SGDT, SIDT, SLDT, STR |
| | Unrestricted guest | Rsvd 0 | Unrestricted guest not supported. |
| 8B | Executive VMCS pointer (STM usage) | Deprecated | |

FIG. 43A

VM Execution Control Fields 4003

| Prior Implementations | | New Implementations | |
|---|---|---|---|
| *Width* | *Field* | *Width* | *Field* |
| | | 8B | PA of 4 KB page containing two 2KB MSR bitmaps:<br>1) Read bitmap for low MSRs (00000000-00003FFFh)<br>2) Read bitmap for high MSRs (C0000000-C0003FFFh) |
| 8B | PA of 4 contiguous pages containing MSR bitmaps:<br>1) Read bitmap for low MSRs (00000000-00001FFFh)<br>2) Read bitmap for high MSRs (C0000000-C0001FFFh)<br>3) Write bitmap for low MSRs (00000000-00001FFFh)<br>4) Write bitmap for high MSRs (C0000000-C0001FFFh) | 8B | PA of 4 KB page containing two 2KB MSR bitmaps:<br>1) Write bitmap for low MSRs (00000000-00003FFFh)<br>2) Write bitmap for high MSRs (C0000000-C0003FFFh) |

FIG. 43B

VM Execution Control Fields 4003

| **Prior Implementations** | | **New Implementations** | | |
|---|---|---|---|---|
| *Width* | *Field* | *Width* | *Field* | *Details* |
| | | 8B | Processor-based execution controls | New exit controls that are required for legacy guest support. |
| | | | INTn exiting | Bundled into exit sequence |
| | | | SYSCALL exiting | |
| | | | CLI exiting | May need for guest usage of PVI |
| | | | STI exiting | |
| | | | POPF exiting | CPL0/3 differences, no 32-bit CPL0 on some new implementations |
| | | | PUSHF exiting | "fixed" values may not match guest values |

FIG. 43C

VM Exit Control Fields 4004

| Prior Implementations | | New Implementations | |
|---|---|---|---|
| *Width* | *Field* | *Field* | *Details* |
| 4B | **VM-exit controls:** | | |
| | Host address space size (HASS): determine if CPU goes to 64b mode after VM exit | Deprecated | Always go to CPL0/superuser mode in Host (acts as if set to 1) |
| | Save VMX pre-emption timer | Rsvd 0 | See preemption timer. |

FIG. 44

VM Entry Control Fields 4005

| Prior Implementations | | New Implementations | |
|---|---|---|---|
| *Width* | *Field* | *Field* | *Details* |
| 4B | **VM-entry controls:** | | |
| | IA32e mode guest: determine if CPU goes to IA-32e mode after VM entry | Reserved 0, acts as if 1 | Always go to mode indicated by IA32_MODE in Guest state area |
| | Entry to SMM | Reserved 0 | |
| 12B | **VM-entry event injection controls**: | | |
| | (4B) VM-entry interrupt info. field<br>• 7:0 Vector<br>• 10:8 Interruption Type<br>• 11: Deliver error code<br>• 31: Valid | 11: Deliver Error code is ignored and FRED event delivery always pushes error code | Legacy guest doesn't need this since events must be emulated |

FIG. 45

<table>
<tr><th>New VMexits</th><th>Reason</th><th>Needs new execution control</th></tr>
<tr><td>IRET</td><td>Segmentation removal</td><td>No, catch #UD</td></tr>
<tr><td>PUSH seg (FS/GS for Intel64)</td><td>Segmentation removal</td><td>No, catch #UD</td></tr>
<tr><td>POP seg (FS/GS for Intel64)</td><td>Segmentation removal</td><td>No, catch #UD</td></tr>
<tr><td>MOV to/from seg</td><td>Segmentation removal</td><td>No, catch #UD</td></tr>
<tr><td>L*S (SS, FS, GS for Intel64)</td><td>Segmentation removal</td><td>No, catch #UD</td></tr>
<tr><td>SWAPGS</td><td>Segmentation removal</td><td>No, catch #UD</td></tr>
<tr><td>VERR/VERW</td><td>Segmentation removal</td><td>No, catch #UD</td></tr>
<tr><td>ARPL</td><td>Segmentation removal</td><td>No, catch #UD</td></tr>
<tr><td>LAR</td><td>Segmentation removal</td><td>No, catch #UD</td></tr>
<tr><td>LSL</td><td>Segmentation removal</td><td>No, catch #UD</td></tr>
<tr><td>INT n</td><td>Segmentation removal / FRED</td><td>Yes. INTn is not covered by exception bitmap</td></tr>
<tr><td>SYS(RET|ENTER|EXIT)</td><td>Segmentation removal / FRED</td><td>No, catch #UD</td></tr>
<tr><td>SYSCALL</td><td>Segmentation removal / FRED</td><td>Yes</td></tr>
<tr><td>STI</td><td>Emulate IF shadowing</td><td>Yes</td></tr>
<tr><td>CLI</td><td>Semantic differences Ring0/3</td><td>Yes</td></tr>
<tr><td>POPF</td><td>Semantic differences Ring0/3</td><td>Yes</td></tr>
<tr><td>PUSHF</td><td>Fixed RFLAGS values</td><td>Yes</td></tr>
<tr><td>Far (call|jump|ret)</td><td>Segmentation removal</td><td>No, catch #UD/#GP</td></tr>
</table>

FIG. 46

| Existing control | Required value | Reason |
| --- | --- | --- |
| EXCEPTION_BITMAP (VMCS) | all 1s | FRED (covers exceptions, PFs, INT1, INT3, etc.) |
| External-interrupt exiting | 1 | FRED |
| NMI exiting | 1 | FRED |
| CR0 mask | all 1s for reserved fields | Fixed CR0 (CLTS, SMSW, LMSW, MOV to CR0) |
| CR4 mask | all 1s for reserved fields | Fixed CR4 bits |
| Unconditional I/O exiting | 1 | IN/OUT, IOPL changes |
| Unrestricted guest | 0 | No 16b mode |

FIG. 47

APPARATUS AND METHOD FOR MANAGING DEPRECATED INSTRUCTION SET ARCHITECTURE (ISA) FEATURES

BACKGROUND

Field of the Invention

The embodiments of the invention relate generally to the field of computer processors. More particularly, the embodiments relate to an apparatus and method for managing deprecated ISA features.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

FIG. 7 illustrates a timing diagram for incomplete load buffer (ICLB) credit returns according to examples of the disclosure.

FIG. 20 illustrates examples of a first prefix.

FIGS. 21A-D illustrate examples of how the R, X, and B fields of the first prefix in FIG. 20 are used.

FIG. 32A-B illustrate bit fields within CR3 control registers in accordance with some implementations;

FIG. 40 illustrates an implementation of a virtual machine control structure (VMCS);

FIGS. 41A-B illustrate an implementation of a VMCS guest state area;

FIG. 42 illustrates an implementation of a VMCS host state area;

FIGS. 43A-C illustrate an implementation of VMCS VM execution control fields;

FIG. 44 illustrates an implementation of VMCS VM exit control fields;

FIG. 45 illustrates an implementation of VMCS VM entry control fields;

FIG. 46 illustrates an implementation of operations associated with new VM exits;

FIG. 47 illustrates required values for various control fields including control registers and VMCS fields.

DETAILED DESCRIPTION

Figure 1:
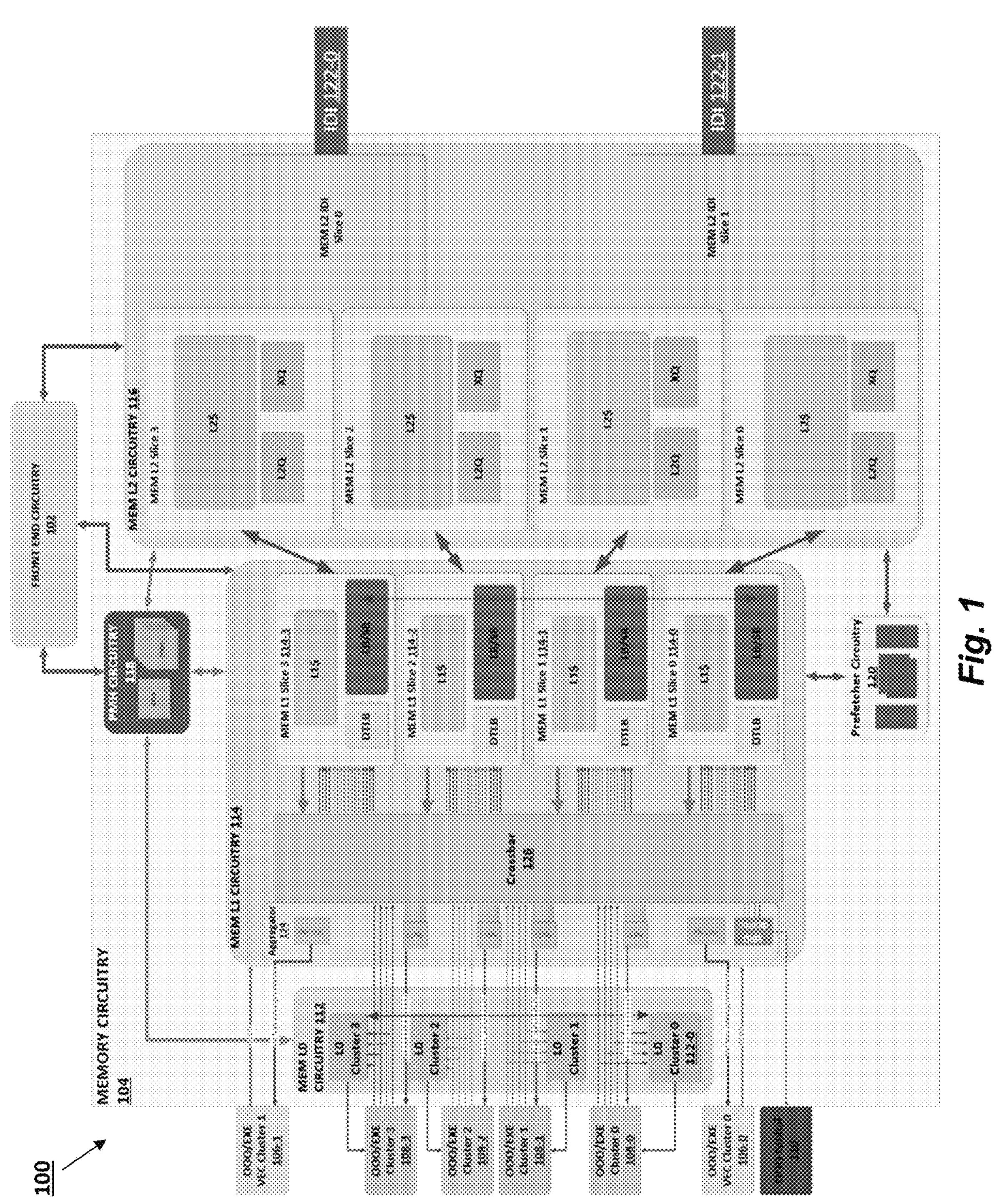
FIG. 1 illustrates a block diagram of a hardware processor (e.g., core) comprising a set of clusters of execution circuits coupled to memory circuitry that includes a level (e.g., L1) of memory circuitry that is sliced according to address values according to examples of the disclosure.

The present disclosure relates to methods, apparatus, systems, and non-transitory computer-readable storage media for managing a memory of a hardware processor core.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM), for example, accessible according to a Peripheral Component Interconnect Express (PCIe) standard.

In certain examples, a hardware processor core includes memory circuitry (e.g., as an "execution circuitry" of the core). In certain examples, the memory circuitry processes memory requests and page translation requests from front end circuitry (e.g., including fetch circuitry for fetching instructions from memory, decoder circuitry for decoding instructions, and delivering them to scheduling/execution circuitry). In certain examples, memory circuitry processes load operations (e.g., load micro-operations (μops)) and store operations (e.g., store micro-operations (μops)), returning the results, and/or final status (e.g., complete or incomplete (e.g., fault)) to the out-of-order (OOO) circuitry for subsequent instructions and/or instruction retire. In certain examples, memory circuitry receives off core (e.g., uncore) snoops and ensures that correct coherence actions are taken in the core. In certain examples, memory circuitry is sub-divided into multiple sections (e.g., parcels). In certain examples, memory circuitry is sub-divided into five distinct sections (e.g., parcels): L0 memory circuitry (e.g., zeroth level), L1 memory circuitry (e.g., first level), L2 memory circuitry (e.g., second level), page miss handler (PMH) circuitry, and prefetcher circuitry.

Data may be stored in a processor's cache (e.g., of any level, such as, but not limited to, L3, L2, L1, etc.), system memory (e.g., separate from a processor), or combinations thereof. In certain examples, memory is shared by multiple cores. In certain examples, a cache line is a section (e.g., a sector) of memory (e.g., a cache) that is managed as a unit for coherence purposes. In certain examples, a cache line is referenced by an (e.g., virtual) address, e.g., a program address that the memory maps to a physical address. A virtual address may be a linear address. Mapping may occur during a process referred to as translation. In certain examples, a linear address is formed by adding (e.g., concatenating) a segment address (e.g., referred to by a segment selector) to the virtual address (e.g., virtual offset).

To effectively manage complexity, in certain examples the memory circuitry (e.g., cache) is divided internally into clusters in some sections, and into slices in other sections. In certain examples, clusters divide the instruction stream into (e.g., medium-sized) groups of contiguous instructions called "strands", and then one or more strands may be executing on a cluster at a time. In certain examples, clusters are most effective when executing work that is adjacent in program order to other work. In certain examples, the memory circuitry in the L0 memory circuitry (e.g., level 0) is clustered.

In certain examples, slices divide the memory instruction stream based upon the (e.g., linear) addresses the instructions access. In certain examples, slices create an inherent proof that certain memory instructions can mostly ignore other instructions, and therefore reduce ordering and correctness checks, when different memory instructions have been assigned to different slices. In certain examples, slices are most effective when the memory address pattern is relatively balanced across cache lines. In certain examples, the memory circuitry in (e.g., only) the L1 memory circuitry (e.g., first level) and/or the L2 memory circuitry (e.g., second level) memory circuitry (e.g., zeroth level) are both sliced.

In certain examples, to transition between the cluster domain and the slice domain, memory operations traverse a crossbar (e.g., a crossbar switch).

FIG. 1 illustrates a block diagram of a hardware processor (e.g., core) 100 comprising a set of clusters of execution circuits coupled to memory circuitry that includes a level (e.g., L1) of memory circuitry that is sliced according to address values according to examples of the disclosure. In certain examples, processor core 100 is a core of a system disclosed herein, e.g., in FIGS. 13 through 24. In certain examples, processor core 100 couples to a system memory, e.g., memory 1332 in FIG. 13.

Depicted processor (e.g., core) 100 includes front end circuitry 102 (e.g., including fetch circuitry for fetching instructions from memory, decoder circuitry for decoding instructions, and delivering them to scheduling/execution circuitry). Depicted processor (e.g., core) 100 includes out-of-order (OOO) (e.g., out of program order) and execution clusters, e.g., a vector out-of-order (OOO) (e.g., out of program order) and execution clusters 106-0 to 106-1 (although two vectors clusters are shown, a single, none, or any plurality of vector clusters may be utilized in certain examples), and (e.g., scalar) out-of-order (OOO) (e.g., out of program order) and execution clusters 108-0, 108-1, 108-2, and 108-3 (although four scalar clusters are shown, a single, none, or any plurality of scalar clusters may be utilized in certain examples). In certain examples, the hardware processor (e.g., core) 100 includes OOO global circuitry 110, e.g., to maintain global ordering in an out-of-order superscalar processor core. In certain examples, the OOO global circuitry 110 includes circuitry to maintain global ordering in a processor core that utilizes multiple clusters to execute multiple strands.

Depicted processor (e.g., core) 100 includes memory circuitry 104, e.g., as a multiple level cache. In certain examples, the memory circuitry 104 includes a coupling to additional (e.g., system) memory, for example, in-die interface (IDI) 122-0 and/or in-die interface (IDI) 121-1.

In certain examples, the memory circuitry 104 includes five distinct sections (e.g., parcels): L0 memory circuitry (e.g., L0 MEM) 112, L1 memory circuitry (e.g., L1 MEM) 114, L2 memory circuitry (e.g., L2 MEM) 116, page miss handler (PMH) circuitry 18, and prefetcher circuitry 120.

L0 MEM

Figure 2:
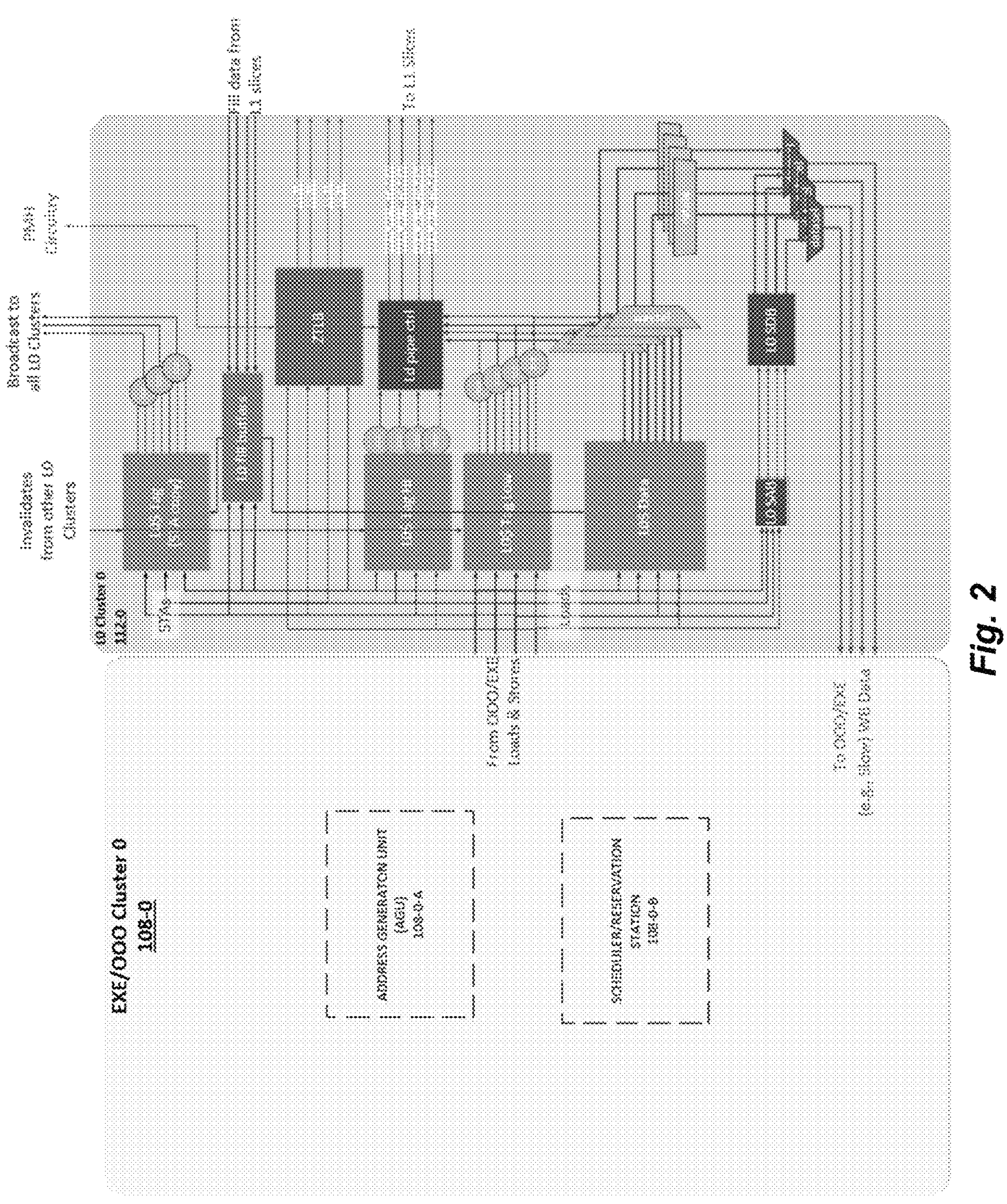
FIG. 2 illustrates a more detailed block diagram of an execution cluster coupled to a cluster of a level (e.g., L0) of memory circuitry according to examples of the disclosure.

FIG. 2 illustrates a more detailed block diagram of an execution cluster 108-0 coupled to a Level 0 (L0) cluster 112-0 comprising L0 memory circuitry according to examples of the disclosure. The depicted cluster 108-0 includes an address generation unit 108-0-A to generate memory addresses and a scheduler/reservation station 108-0-B for scheduling memory access operations to be serviced by one or more of the levels of memory described herein (e.g., L0 memory, L1 memory, L2 memory, etc).

Referring to FIGS. 1 and 2, in certain examples, the L0 MEM 112 is the smallest, fastest unit of memory in memory circuitry 104 (e.g., in core 100) and attempts to service loads in a certain number of threshold cycles (e.g., about 3). In certain examples, L0 MEM 112 attempts to satisfy a portion of loads (e.g., about 40%) that meet the most common cases. In certain examples, L0 MEM 112 has two key benefits that it provides: first, it provides a large fraction of loads with low latency, and second, it provides bandwidth resilience for the larger L1 MEM 114 that is sliced by address. Without the L0 MEM 112, load operations mapped to the same cache line (and therefore the same L1 MEM 114 slice) would be limited by the comparatively narrow bandwidth of an L1 MEM slice. In some embodiments, the L0 MEM 112 alleviates bandwidth to the L1 MEM by maintaining a cache of the most frequently used addresses and servicing the hot-line loads.

In certain examples, L0 MEM 112 is divided into clusters. For example, with one cluster of L0 MEM 112 attached to one OOO cluster, e.g., cluster 112-0 of L0 MEM 112 attached to OOO cluster 108-0, etc. In certain examples, L0 MEM 112 operates in parallel with L1 MEM 114, e.g., such that L0 MEM 112 will attempt to service a load in parallel with the load being transmitted to L1 MEM 114 over the crossbar 126. In certain examples, if L0 MEM 112 is successful in completing a load, it will send an "10_complete" signal to L1 MEM 114, which will prevent loads from being dispatched in L1 or cancel them in-flight.

In certain examples, L0 MEM 112 will have a lower hit rate compared to L1 MEM 114, and thus, to avoid spurious wakeups, an L0 hit predictor may be used in OOO to determine when to generate a wakeup signal to the reservation station (RS) to schedule the dependents in L0 timing.

In certain examples, each cluster of L0 MEM 112 contains its own:

- Zero-Level Cache (ZLC) (e.g., L0 cache (L0$) tag array and L0$ data array. In certain examples, the L0$ tag array may be subdivided into L0$ tag low array and L0$ tag high array to reduce access latency): Small set-associative cache that features a low access latency, e.g., where the ZLC is virtually indexed and virtually tagged.
- L0 Store Address Buffer (L0SAB): Subset of the full store address buffer. In certain examples, this contains only the portion of fields of stores needed for store to load forwarding, and only the stores within the attached OOO cluster.
- L0 Store Data Buffer (L0SDB): Subset of the full store data buffer. In certain examples, this contains store data only for the bottom (e.g., 64) bits of each store, and only the stores within the attached OOO cluster.
- Zero-Level TLB (ZTLB): Small fully-associative TLB used to prove that a linear address maps to cacheable memory and is therefore legal for completion in L0 MEM, and provide a physical address translation. (Either from ZLC or Store-to-Load forwarding).
- Zero-Level Fill Buffers (LOFB): one buffer per L1 slice.
- L0 Mini-Memory Order Buffer (MOB): Small store-to-load forwarding scheduler, with a plurality of (e.g., 4) entries per load pipeline (e.g., "pipe"). In certain examples, some parts also live in OOO, but L0 MEM is responsible for entry allocation, data read, and write-back. In certain examples, the mini-MOB also has the Stale Data Watchdog (SDW) which disables mini-MOB allocation if deallocated SDB entries cause too many loads to nuke.

In certain examples, each cluster of L0 MEM 112 also includes some pieces physically located in OOO, but logically owned by MEM:

Memory Disambiguation (MD) Predictor: CEIP (e.g., a hashed effective instruction pointer)-indexed structure to predict whether a load may bypass unknown store addresses (e.g., "STAs") without generating a clear.

L0 Load Hit Predictor (L0LHP): CEIP-indexed structure to predict whether a load will hit the L0 (either ZLC or L0SAB). In certain examples, this will wake up the load's dependents if it predicts hit.

L0 Mini-MOB: OOO is responsible for wakeup and scheduling.

In certain examples, each cluster of L0 MEM 112 has its own set of pipelines:

L0 Load Pipeline: In certain examples, this is the only load pipeline in L0 MEM. In certain examples, this is responsible for receiving load dispatch and AGU payloads, looking up the Zero Level Cache, checking the L0SAB for address overlap, and potentially forwarding data.

L0 Mini-MOB Pipeline: Handles loads that schedule out of the mini-MOB. In certain examples, this is responsible for reading data from a known store data buffer (SDB) entry and writing back.

L0 Store Address Pipeline: Pipeline to receive store address payloads, update L0SAB, and invalidate L0 cache entries and fill buffers that match store address.

L0 Store Data Pipeline: Pipeline to receive store data payloads and update L0SDB.

ZLC Fill Pipeline: Receives data from the L1 MEM and fills it into the ZLC.

TABLE 1

Example L0 MEM Parameters per L0 MEM Cluster

| Name | Size |
|---|---|
| L0 MEM Clusters | 4 clusters |
| ZLC size | 8 KB |
| ZLC organization | 16 sets, 8 ways, 64 bytes per line |
| ZTLB size | 32 entries |
| SB entries | 144 entries |
| SB entries per strand | 36 entries per strand |
| FB entries | 4 entries |

TABLE 2

Example L0 MEM Pipelines per L0 MEM Cluster

| Name | Abbreviation | Pipes | Summary |
|---|---|---|---|
| L0 Load Pipe | zld | 4 | Executes loads in L0 |
| L0 Mini-MOB Pipe | zmb | 4 | Executes loads blocked on STDs in L0 |
| L0 STA Pipe | zst | 3 | Receives STAs in L0, invalidates ZLC cache lines |
| L0 STD Pipe | zsd | 3 | Receives STDs in L0 |
| ZLC Fill Pipe | zfl | 1 | Fills ZLC with cache lines |

L1 MEM

Figure 3:
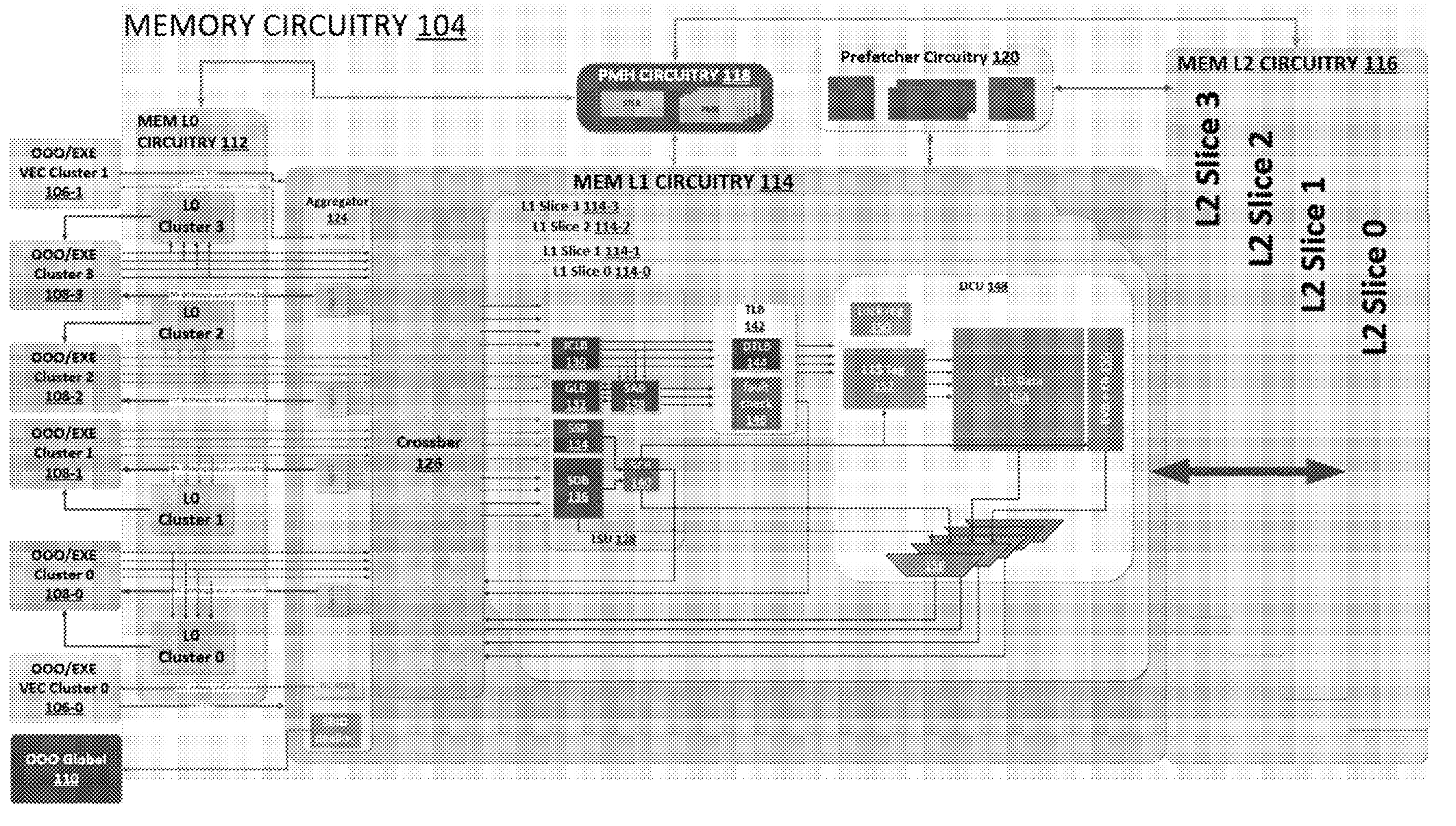
FIG. 3 illustrates a more detailed block diagram of the level (e.g., L1) of memory circuitry that is sliced according to address values according to examples of the disclosure.

FIG. 3 illustrates a more detailed block diagram of the level (e.g., L1) 114 of memory circuitry that is sliced according to address values according to examples of the disclosure. In certain examples, a load pipeline includes the components shown in load store unit 128.

Figure 4:
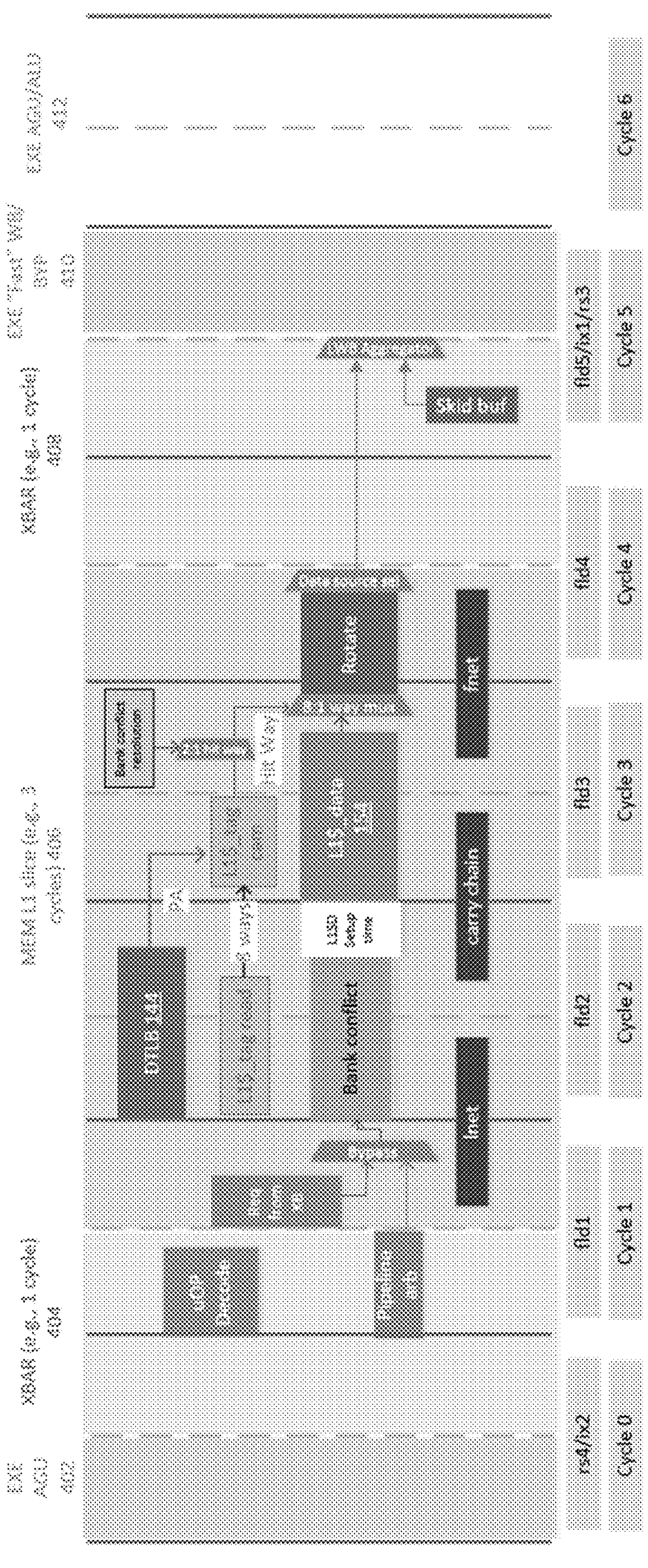
FIG. 4 illustrates a six cycle load-to-use timing path for a hit in a data cache of the level (e.g., L1) of memory circuitry that is sliced according to address values according to examples of the disclosure.

Referring to FIGS. 1 and 2, in certain examples, the L1 MEM is a L1 unit of memory in memory circuitry 104 (e.g., in core 100) with (e.g., larger than L0's) caches, (e.g., larger than L0's) buffers, and supports all loads and stores (e.g., in a moderate latency). In certain examples, the L1 MEM 114 has interfaces with the out-of-order circuitry (OOO) (e.g., OOO 502 in FIG. 5), the execution circuitry (EXE) (e.g., EXE 504 in FIG. 5) (e.g., cumulatively OOO/EXE clusters), and the front end (FE) circuitry 102. In certain examples, the OOO and EXE interfaces are used to synchronize processing around loads and stores, while the FE interface is used to detect potential self-modifying code (SMC) cases. In certain examples, loads that complete out of L1 MEM 114 will have a relatively short (e.g., six as shown in FIG. 4) cycle load-to-use latency, e.g., assuming the most favorable and fastest alignments.

In order to provide scalable performance, the L1 MEM 114 is sliced by address. In certain examples, a given cache line of memory may only exist in a single slice of L1 MEM. This provides significant scope reduction of memory ordering checks. In certain examples, there are a plurality (e.g., shown as 4 slices, although other numbers of slices may be utilized) of L1 MEM 114, where each slice contains a different range of address values compared to the other slices. In certain examples, after a load or store has passed address generation (e.g., by AGU as shown in FIG. 2), the appropriate L1 slice for that memory operation is determined by looking at the (e.g., linear) address bits of the load or store. In the case of line splits, multiple L1 MEM slices may be needed to produce the final load or store result. In certain examples, a given (e.g., single) cache line of memory will only exist in a single slice of memory, e.g., and a load or a store can be split such that there is access to some byte(s) in a first cache line and then the rest of the byte(s) in the subsequent cache line (e.g., to logically form the single cache line). In certain examples, a split happens when a load or store starts too close to the end of the line (e.g., for a request for 8 bytes starting from the last byte of one cache line, which splits as one (the last) byte from the one cache line and the (first) seven bytes of the next cache line).

In certain examples, each OOO/EXE cluster can produce at most a first threshold (e.g., 4) loads or at most a second threshold (e.g., 3) stores per cycle (e.g., loads or stores within respective data cache unit in each slice, e.g., with data cache unit 148 shown for L1 slice 0 114-0), or a combination of the two up to a total of a third threshold (e.g., 4) of memory operations (e.g., pops). Ideally, the addresses of these memory operations (e.g., pops) are distributed evenly across the (e.g., 4) slices. However, in the worst scenario in one example, each slice can receive 16 loads or 12 store addresses and 12 store data. In certain examples, the L1 mem slices guarantee they will sink all requests that they receive from OOO/EXE. In certain examples, the L1 mem slices will buffer these memory operations (e.g., pops) in the load and store buffers and in each cycle select up to the first threshold (e.g., 4) loads and the second threshold (e.g., 3) store addresses to be executed. In certain examples, L1 MEM has separate pipelines for loads and stores and each slice may write back to EXE/OOO up to the first threshold (e.g., 4) loads and the second threshold (e.g., 3) store addresses.

The MEM L1 circuitry 114 includes crossbar 126 as a set of couplings (e.g., wires) which connect all OOO/EXE clusters to all L1 MEM slices.

In certain examples, the OOO circuitry is organized into a plurality of (e.g., 4) clusters which feed memory operations (e.g., pops) to the (e.g., same number of) L1 MEM slices. However, in certain examples, the cluster is address agnostic and does not know ahead of time to which slice it should send the memory operation (e.g., pop). As such, in certain examples, the OOO (e.g., of an OOO/EXE cluster) broadcasts the memory operations (e.g., pops) (e.g., via a DispatchAGU indication) to all slices, and a certain number of cycles later the EXE (e.g., of an OOO/EXE cluster) broadcasts the address it computed. In certain examples, each slice will check the (e.g., linear) address (e.g., a proper subset of the bits, e.g., bits in bit positions [7:6]) and determine whether the memory operation (e.g., pop) belongs to the slice. In certain examples, if bit positions [7:6] of the (e.g., linear) address are 0b00 (e.g., in binary format), the memory operation will be sent to slice 0, while if bit positions [7:6] of the (e.g., linear) address are 0b11, the memory operation will be sent to slice 3.

In certain examples, the crossbar 126 of the L1 MEM circuitry 114 is responsible for transmitting load memory operations (e.g., load pops), store address memory operations (e.g., store address pops), and store data memory operations (e.g., store data pops) from OOO and EXE clusters into L1 MEM slices. In certain examples, while loads and stores have specific target slices based on their address, the information is broadcast to all slices, and each slice makes its own decisions on what data to catch and process.

In certain examples, the crossbar 126 of the L1 MEM circuitry 114 is responsible for transmitting results from L1 MEM slices back to OOO and EXE clusters. In certain examples, this is a broadcast of results back to clusters and the aggregator 124 (e.g., corresponding aggregator circuitry for each OOO/EXE cluster) make decisions on what data to collect.

In certain examples, each L1 memory slice can send responses to any OOO/EXE cluster, e.g., and the responses are sent back over the crossbar 126 to all clusters. In certain examples, one EXE/OOO cluster cannot sink (e.g., service) the combined responses from all slices, so certain MEM L1 circuitry 114 uses an L1 aggregator 124 (e.g., aggregation manager) described herein.

In certain examples, the L1 MEM aggregator 124 is a sub-component of L1 MEM 114 that deals outside of the sliced memory domain. In certain examples, there are per-cluster portions of the aggregator (e.g., to achieve per-cluster aggregation), and global portions of the aggregator. In certain examples, the L1 aggregator 124 is responsible for coordinating the L1 slices and their communication with other components, e.g., circuitry. In certain examples, this coordination can happen at a cluster level (for example, combining and reducing L1 slices' writeback responses to each OOO/EXE cluster), at a global level (e.g., OOO global 110) (for example deallocation (dealloc) of store buffers identification values (SBIDs) or memory ordering nuke (MONuke management), or internal to MEM L1 circuitry 114 for inter-slice coordination.

In certain examples, the aggregator 124 includes a clustered aggregator and/or a global aggregator. In certain examples, a clustered aggregator includes a load write back (LWB) aggregator to coordinate wakeups and writebacks from slices to the appropriate cluster and/or a store write back aggregator that coordinates writebacks from the store address operations (e.g., "STAs") in slices to the appropriate cluster. In certain examples, the global aggregator includes a SBID deallocation aggregator (e.g., "SBID dealloc") to coordinate deallocation of store buffers from slices back to OOO.

In certain examples, a store is split into multiple operations (e.g., pops), for example, a store address ("STA") operation (e.g., pop) for the address of data that is to be stored and a store data ("STD") operation (e.g., pop) for the data that is to be stored at that address.

In certain examples, each slice of L1 MEM contains its own:

Incomplete Load Buffer (ICLB) (e.g., ICLB 130 for L1 Slice 0 114-0)—Holds loads that have been executed by AGU and are logically part of this slice, but have not yet completed.

Global Load Buffer (GLB) (e.g., GLB 131 for L1 Slice 0 114-0)—Tracking for all loads in the out-of-order window. In certain examples, only entries for loads that are logically part of this slice will be filled out in detail (e.g., fully filled out) (e.g., filled out with a full physical address, store forwarding information, and memory predictor training information) and/or loads that are logically part of other slices will capture a single bit to indicate the load is out-of-slice.

Store Address Buffer (SAB) (e.g., SAB 138 for L1 Slice 0 114-0)—Tracking for the address component of all stores in the out-of-order window. In certain examples, only entries for stores that are logically part of this slice will be filled out in detail and/or stores outside of this slice will be marked as out of slice for control purposes.

Store Data Buffer (SDB) (e.g., SDB 136 for L1 Slice 0 114-0)—Data storage for all stores in the out-of-order window. In certain examples, an STD operation (e.g., pop) may not know which slice the address will reside in, so the SDB will be populated for all stores whether or not the address eventually resides within this slice. In certain examples, SDB entries are mapped 1:1 against SAB entries.

Senior Store Buffer (SSB) (e.g., SSB 134 for L1 Slice 0 114-0)—Data storage for the portion of a store that is used in the store coalescing pipeline. In certain examples, this is primarily the physical address and size of a store.

Store Coalescing Buffer (SCB) (e.g., SCB 140 for L1 Slice 0 114-0)—A cache-line aligned buffer in the logical path between a retired store and the data case unit (DCU) and/or fill buffer (FB) that potentially combines multiple stores into a single entry.

Data-side Translation Lookaside Buffer (e.g., DTLB 144 in translation lookaside buffer TLB 142 for L1 Slice 0 114-0)—Contains linear to physical mappings to translate loads and STAs that will execute within this slice. In certain examples, the DTLB is subdivided into buffers per page size.

Data Cache Unit (DCU) (e.g., DCU 147 for L1 Slice 0 114-0)—Storage and tracking for the L1 data cache within this slice, e.g., which contains a plurality of storage (e.g., 64 KB) of cache organized as a plurality of (e.g., 128) sets, a plurality of (e.g., 8) ways, where each cache line is multiple (e.g., 64) bytes.

Fill Buffers (FB) (e.g., FB 156 for L1 Slice 0 114-0)—Structure to services DCU misses for both loads and senior stores. In certain examples, these misses will be sent as requests to additional memory, e.g., L2 MEM 116.

Global Ordering Buffer (GOB)—Structure to globally order stores in fill buffers across all slices of L1 MEM. In certain examples, there is copy of the GOB in every L1 MEM slice.

Eviction Buffers (EVB) (e.g., EVB 156 for L1 Slice 0 114-0)—Structure to hold evicted modified cache lines from the DCU and manage sending eviction requests to the L2 and respond to writepull requests from the L2. In certain examples, one entry will be reserved for snoops.

Split Registers (SR)—in certain examples, these are not physically located in the slice, but the control logic is within a slice and the registers are logically associated with the low-half slice of a split load.

Self-Modifying Code Inspection Reduction Filter (SMIRF)—Filter to prove which STA memory operations (e.g., pops) may safely skip sending an SMC snoop check to the FE and reduce the number of SMC checks that are sent.

Global Store Scheduler (GSS)—Tracks store ordering across slices and guarantees correct store ordering at dispatch on the store write pipeline In certain examples, each slice of L1 MEM has its own set of pipelines:

Load Receipt Pipeline—Receives load dispatch and AGU payloads from OOO & EXE and writes the payload into an ICLB entry.

ICLB Scheduling Pipeline—Chooses oldest ready load on a load port from the ICLB and tries to schedule it into the load pipeline.

Load Pipeline—The main load pipeline in L1 MEM to execute a load and write back its results.

Store Address Receipt Pipeline—Receives store address operation (e.g., pop) payloads and writes them into the store address buffer.

SAB Scheduling Pipeline—Chooses oldest ready STA on a STA port from the SAB and tries to schedule it into the store address pipeline.

Store Data Pipeline—Receives store data payload and writes it into the store data buffer.

Store Address Pipeline—The main store address pipeline in L1 MEM to execute a STA operation (e.g., pop) and writeback complete to the OOO.

Store Coalescing Pipeline—Takes retired stores from the store buffer and coalesces them into the SCB in preparation for writing to memory.

Store Write Pipeline—Takes SCB entries and writes them into the data cache or a fill buffer.

DCU Fill Pipeline—Takes data from a fill buffer and fills it into the DCU, and moves modified data from the DCU into the eviction buffer.

In certain examples, loads are assigned a global identification (GLB ID) at allocation, which will have the side-effect of port binding the load to a specific AGU port, load port, and writeback port. In certain examples, loads hold an ICLB credit at allocation, and the exact ICLB entry is allocated after dispatch. In certain examples, after AGU, the load will cross the L1 MEM crossbar and arrive at a specific L1 MEM slice based on the linear address. In certain examples, once in L1 MEM, the load will arbitrate for a load pipe, which it will eventually win. In certain examples, the load pipeline (e.g., LSU) will be responsible for page translation, L1 data cache lookup, and resolving memory ordering against stores. In certain examples, the load will schedule down a load pipeline one or more times, until the load eventually binds to data and writes back the data to EXE and complete to the ROB. In certain examples, complete loads prepare the GLB to prove memory ordering correctness and will generate a machine clear event if they are found to be in violation. In certain examples, when the load writes back to the OOO, the ICLB entry will be deallocated. When the load is retired, the GLB entry will be deallocated.

In certain examples, stores are assigned a stored buffer identification (SB ID) at allocation, which is an exact pointer to an entry in the SAB, SDB, and SSB, e.g., the three logical components of the store buffer. In certain examples, the SB ID assignment has a side-effect of port binding the STA operation (e.g., pop) and STD operation (e.g., pop) to specific AGU and STD ports. In certain examples, stores have two component pops, a store address (STA) pop and a store data (STD) pop. In certain examples, the STA and the STD will schedule independently, and may arrive in L1 MEM in any order. In certain examples, while an STA is assigned to a specific L1 MEM slice based on linear address, the STD may arrive before an STA is known and therefore will be written into all slices of L1 MEM. In certain examples, when STAs arrive in L1 MEM, the STAs will be written into the SAB. In certain examples, when STDs arrive in MEM, the STDs will be written into the SDB. STAs will arbitrate for and eventually win the STA pipeline. In certain examples, the STA pipeline will be responsible for page translation, resolving memory ordering against loads, and sending the FE a packet to check for SMC violations. In certain examples, the store will hold its SAB, SDB, and SSB entries after retirement.

In certain examples, after retirement, stores in a slice will be moved from the SAB, SDB, and SSB into the store coalescing buffer (SCB) following age-order within a slice. In certain examples, when a store is moved into the SCB, it will deallocate the SAB, SDB, and SSB entries and eventually return the SBID to OOO for use in younger stores. In certain examples, L1 MEM slices will coordinate SBID return so that buffer entries are returned in order, despite different slices going out-of-order to move stores into the SCB. In certain examples, stores may merge into existing SCB entries following specific rules to make them (e.g., x86) Total Store Ordering compliant. In certain examples, the oldest SCB entries in the machine, across all MEM slices, will be scheduled to a Store Write pipeline to attempt to write the L1 data cache or a Fill Buffer.

TABLE 3

Example L1 MEM Parameters per L1 MEM Slice

| Name | Size |
|---|---|
| L1 MEM Slices | 4 slices |
| DCU size | 64 KB |
| DCU organization | 128 sets, 8 ways, 64 bytes per line |
| Small DTLB entries | 256 entries |
| Small DTLB organization | 64 sets, 4 ways |
| Large DTLB entries | 64 entries |
| Large DTLB organization | 16 sets, 4 ways |
| XLarge DTLB entries | 16 entries |
| XLarge DTLB organization | 1 sets, 16 ways |
| GLB entries | 1024 entries |
| ICLB entries | 144 entries |
| SB entries | 576 entries |
| SCB entries | 10 entries |
| FB entries | 16 entries |
| EVB entries | 8 entries |
| SR entries | 4 registers |

TABLE 4

Example L1 MEM Pipelines per L1 MEM Slice

| Name | Abbreviation | Pipes | Summary |
|---|---|---|---|
| Load Receipt Pipe | flr | 16 | Receives all loads after dispatch & AGU |
| ICLB Scheduling Pipe | fls | 4 | Schedules loads out of ICLB into load pipe |
| Load Pipe | fld | 4 | Executes loads in L1 MEM |
| STA Receipt Pipe | fsr | 12 | Receives all STAs after dispatch & AGU |
| SAB Scheduling Pipe | fss | 3 | Schedules STAs out of SAB into STA pipe |
| STA Pipe | fst | 3 | Executes STA μops in L1 MEM |
| STD Pipe | fsd | 12 | Receives all STDs after dispatch & execute |
| Store Coalescing Pipe | fsc | 1 | Merges senior stores into SCB entries |
| Store Write Pipe | fsw | 1 | Writes SCB entries to memory |
| DCU Fill Pipe | ffl | 1 | Fills lines into the DCU |

L2 MEM

In certain examples, memory circuitry 104 includes another level of memory, e.g., MEM L2 circuitry 116. In certain examples, the L2 MEM 116 provides two main services to the core: first, it provides access to the (e.g., larger than L1) (e.g., 16M) L2 cache, and second, it serves as the interface to the rest of the system, e.g., the System-on-Chip (SoC). As such, in certain examples, the L2 MEM 114 has interfaces with the Front End (FE) circuitry 102, L1 MEM 114, PMH circuitry 118, prefetcher circuitry 120, and other SoC components, e.g., via IDI.

In certain examples, in order to provide access to the L2 cache, the L2 MEM 116 is tasked with accepting requests from the FE circuitry 102, L1 MEM 114, PMH circuitry 118, and prefetcher circuitry 120. In certain examples, core 100 is a high performance core that requires high amounts of bandwidth to the L2 cache memory. In certain examples, to provide that bandwidth the L2 cache memory of the L2 MEM is partitioned into multiple (e.g., 4) L2 slices.

In certain examples, each L2 slice has its own:

Direct Request Interface (DRI)—L1 MEM request interface, each L2 MEM slice can take requests directly from its corresponding L1 MEM slice.

Shared Request Interface (SRI)—Shared interface that combines requests from the FE, PMH, and Prefetcher.

Second level queue (SLQ) unit—Which holds and schedules requests to the SL and IDI pipelines.

SL pipeline control unit—Which encapsulates the SL pipeline.

IDI (Intra-Die Interconnect) Control unit—which encapsulates the IDI pipeline. Runs in parallel to the L2 pipeline.

L2 Cache Portion (L2$)—A (e.g., 4M) piece of the L2 cache.

XQ unit—Which holds and schedules L2 miss requests to the SoC.

VQ unit—Which holds and schedules L2 cache eviction requests and snoop data to the SoC In certain examples, the L2 slices are designed to be physical address isolated (e.g., a physical address can be found in one and only one slice) and operate in parallel. In this way the L2 MEM can process up to the number of slices (e.g., 4) L2 cache requests in parallel.

In certain examples, to serve as the interface to the SoC, the L2 MEM 116 is also tasked with sending out core requests that missed the core caches to the SoC and accepting data and state for those requests from the SoC. In certain examples, the L2 MEM 116 is to accept and process all requests from the SoC, e.g., including, but not limited to, snoop requests, bus lock handling requests, and interrupt requests. In certain examples, core 100 uses high amounts of memory bandwidth from the SoC, e.g., and to provide it, the IDI portion of L2 MEM is partitioned into multiple (e.g., 2) IDI slices.

In certain examples, each IDI slice contains its own:

SnpQ (Snoop Queue) unit—Which holds, schedules, and process SoC snoop requests.

IDI (Intra-Die Interconnect) unit—Which schedules and converts XQ requests/signals into SoC requests/signals and vice versa.

FIL (Fabric Interface Logic) unit—Which contains the logic that the core provides to the SoC when the core is in a powered down state.

In certain examples, as with the L2 slices, the IDI slices are designed to be address isolated and operate in parallel. In this way the IDI slices can process up to the number of IDI slices (e.g., 2) L2 cache miss requests at the same time.

In certain examples, L2 MEM is responsible for the processing, sending, and receiving of interrupts, e.g., by an Advanced Programmable Interrupt Controller (APIC). In certain examples, where interrupts are not dependent on a physical address, the APIC is a single non-sliced unit.

TABLE 5

Example L2 MEM Parameters per L2 MEM Slice

| Name | Size |
|---|---|
| L2 MEM Slices | 4 slices |
| L2 MEM IDI Slices | 2 slices |
| L2$ size | 4 MB |
| L2$ organization | 8192 sets, 8 ways, 64 bytes per line |
| SLQ entries | 12 entries |
| XQ entries | 44 entries |
| VQ entries | 18 entries |
| SnpQ entries per IDI slice | 24 entries per IDI slice |

TABLE 6

Example Second Level (SL) MEM Pipelines per L2 MEM Slice

| Name | Abbreviation | Pipes | Summary |
|---|---|---|---|
| SL Pipe | SGP | 1 | Processes all L2$ transactions |
| IDI Pipe | SID | 1 | Creates IDI transactions, runs parallel to L2 pipe |

Page Miss Handler (PMH)

In certain examples, page walker(s) are in a non-sliced L1 MEM circuitry, and all loads as part of the page walk would therefore go to the L1 MEM circuitry. However, with L1 addresses being sliced, missing a TLB entry in some location (e.g., some load in L1, something in L0, some prefetch, or some instruction cache (I$) request) would generate a page walk with loads that could go to any slice. Certain examples herein solve this by building a separate page miss handler (PMH), allocate translation request buffers (TRBs), and send the page walk requests someplace global (e.g., outside of the L1/L2 slices). In certain examples, a "global page walk" is thus performed because of the address slicing.

In certain examples, the memory circuitry 104 includes page miss handler (PMH) circuitry 118 to service page translation misses on behalf of the first level TLBs, translating linear addresses into physical addresses, and producing TLB entries to fill the first level TLBs. In certain examples, the PHM circuitry 118 includes a second-level TLB queue (STLBQ) (e.g., as shown in FIG. 10) to receive requests, a (e.g., large) second-level TLB, a pipelined page walker state machine capable of handling multiple requests in flight, page walk caches, virtualization page walk caches, etc.

In certain examples, the PMH circuitry 118 will provide translation services for the front end circuitry 102 as well as the L1 MEM Slices, L0 MEM Clusters, and/or the prefetcher circuitry 120. In certain examples, each L1 MEM slice, L0 MEM cluster, prefetcher circuitry and the FE circuitry may send address translation requests to the PMH circuitry.

Figure 10:
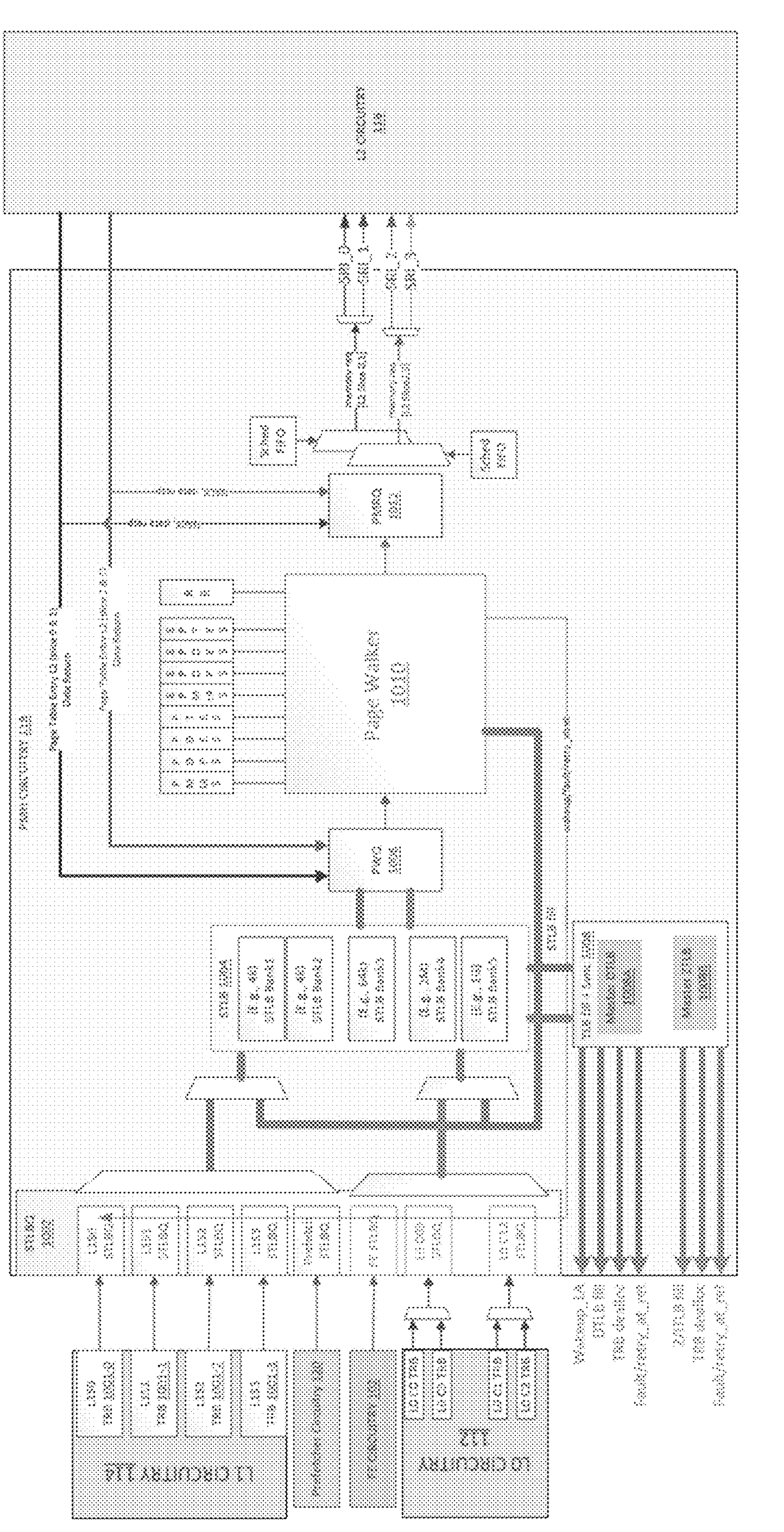
FIG. 10 illustrates a more detailed block diagram of page miss handler (PMH) circuitry according to examples of the disclosure.

In certain examples, the L1 MEM slices, L0 MEM slices, and the prefetcher circuitry 120 will collect requests locally into a Translation Request Buffer (TRB) (e.g., as shown in FIG. 10) before sending the requests to the PMH circuitry 118. In certain examples, the PMH circuitry 118 will receive these requests into the STLBQ, a request holding structure positioned before the STLB pipeline in the PMH.

In certain examples, the STLBQ will arbitrate ready requests into two STLB pipelines, e.g., where the requests will check a (e.g., large) second-level TLB (STLB) for translation, and either hit or miss. In certain examples, STLB hits will fill into the first level TLBs (e.g., DTLB, ZTLB, and/or ITLB).

In certain examples, STLB misses will arbitrate for a free page walker that will perform page walks. In certain examples, once a page walker is allocated, the STLBQ entry is put to sleep and does not arbitrate for the STLB pipeline until the walk completes. In certain examples, page walks will first check, in parallel, a set of page walk caches (PXEs) to find the deepest matching level of the page table. In certain examples, the page walkers will resume the walk from this deepest matching state. In certain examples, when a page walk is successfully complete, the page walker will write the translation into the STLB (and corresponding requester first level TLB) and wake up STLBQ entries that were sleeping as a result of matching the ongoing PWQ entry. In certain examples, the entry that allocated the PWQ entry will get deallocated after first level TLB fill without having to go down the STLB pipeline again.

In certain examples, the STLBQ entries will arbitrate again for STLB pipeline, and if they hit in STLB, then the STLB will fill the first level TLBs.

In certain examples, in order to keep the DTLBs in sync with each other (e.g., and the ZTLBs in sync with each other), the PMH circuitry 118 will also hold a primary copy of the DTLB and ZTLB, e.g., which will be checked for duplicates before sending fills to the L1 slices, prefetcher circuitry, or L0 clusters.

In certain examples, the PMH circuitry is responsible for choosing replacement ways in the first level MEM TLBs (e.g., DTLB and ZTLB, but not ITLB). In certain examples, to accomplish this, the L0 TLBs and L1 TLBs will send the PMH circuitry sampled least recently used (LRU) update packets, providing a partial view of which TLB entries are actively being used by the L1s and the L0s. In certain examples, the PMH will update the L1 (or L0) LRU array based on these samples, and then choose a victim way based on this local view of TLB LRU.

Prefetcher Circuitry

In certain examples, the prefetcher circuitry 120 is the home to all of the different L1 (e.g., L1 data (L1D)) and L2 hardware prefetchers. In certain examples, the L1D and L2 caches send prefetch training events to the prefetcher circuitry, and the prefetcher circuitry in turn sends prefetch requests to the caches. In certain examples, prefetches serve to fill cache lines into the cache ahead of a predicted demand so that the demand access observes less latency.

In certain examples, each level of cache the has its own set of prefetchers.

In certain examples, in addition to the prefetching algorithms themselves, the prefetcher circuitry is home to one or more prefetch filters. In certain examples, for each prefetch training event, each of the prefetching algorithms may generate several prefetches. It is possible, and in many instances likely, that there is significant overlap between the cache lines each prefetcher wants to prefetch. In certain examples, the prefetch filters serve to reduce the number of redundant prefetches that are sent to the caches, saving cache lookup bandwidth and power.

Turning back to the L1 MEM, certain examples herein include address isolated L1 cache and memory pipelines.

Loads

In certain examples, each load is assigned a unique identifier (LBID) and a store "color" (e.g., SBID) at allocation time in OOO Circuitry. In certain examples, the LBID is an entry in the Global Load Buffer (GLB) and it is allocated in program order. In certain examples, the store color is the SBID of the youngest store that is older than the load and is used in MEM Circuitry for determining the range of stores in the store buffers that the load has to order against. In certain examples, memory pops wait in the MEM RS in OOO cluster until their data operands are ready, after which the MEM RS dispatches the loads (and STAs) out of order to the address generation unit (AGU) in EXE as well as to MEM Circuitry. In certain examples, the dispatched load (e.g., without linear address) travels over the MEM crossbar (e.g., over a slower connection) while the address is being generated in AGU. In certain examples, after the linear address is generated in AGU, the packet is sent over the crossbar towards L1 slices (e.g., over a faster connection) and thus reaches the slices soon after the load payload. In certain examples, the dispatched load payload reaches L1 slices (e.g., approximately half a cycle) before the generated linear address, with enough time for it to be decoded just in time to use with the linear address. In certain examples, once the address for the load arrives, each slice checks if the address belongs to the slice's address range by checking certain bits (e.g., bits [7:6]). In certain examples, if the load belongs to the slice, the slice tries to immediately send the load down the L1 mem pipeline if there are no other existing transactions that require the pipe, and writes the load information in the ICLB and GLB. In certain examples, the load looks up DTLB to obtain a physical address translation and in parallel looks up the L1 cache tag. In certain examples, the load uses MEM L1 pipeline to retrieve data either from the L1 cache, from an older store, or from higher levels of the memory hierarchy (L2 slice) if the data is not present in the L1 slice. In certain examples, this may take multiple trips through the MEM L1 pipeline. In certain examples, once the load has data (or the load detects a fault), it writes back the data to EXE Circuitry and notifies OOO of its completion status, deallocating the ICLB. In certain examples, the load remains in the GLB such that memory ordering checks can be performed on it until it retires in OOO.

In certain examples, each OOO Cluster can dispatch up to a threshold (e.g., 4) memory pops from the MEM RS towards a threshold (e.g., 4) EXE AGUs. In certain examples, the memory pops are bound to the AGU port based on (e.g., the last 2 bits of) the LBID (loads) or SBID (stores). In certain examples, an L1 slice can receive a threshold (e.g., 4) loads from each of the threshold (e.g., 4) OOO clusters per cycle (e.g., for a total of 16 loads). In certain examples, MEM guarantees that it will sink all loads that it receives from OOO by providing sufficient storage (GLB), write ports, and a crediting mechanism for ICLB. In certain examples, each L1 MEM slice has a plurality of (e.g., 4) pipes dedicated for loads, separate from STA pipes. In certain examples, to simplify scheduling, the loads are bound to a specific mem pipeline based on (e.g., the two least significant bits (LSB) of the LBID)). In certain examples, each load pipeline has its own scheduler that will select the oldest ready load only from the subset of loads that arrived on the AGU port with the same number. For example, where L1 mem pipeline 0 will only select between the loads that arrived on AGU port 0 from any cluster. In certain examples, each of the pipes will have a dedicated port for reading the DTLB and L1 cache tag, and for comparing their address against store buffers; two load pipes will share a port for reading data from the L1 cache, e.g., where all pipes will share a port for reading data from one of the L2 Store Data Buffer (SDB) partitions.

LBID Partitioning, Holes

In certain examples, each load is assigned a unique identifier by OOO at allocation time (LBID), which also indicates the age of the loads with respect to each other. The format of the LBID is as follows:

LBID[11:0]={wrap[0], strand_id[1:0], cluster_id[1:0], entry_id[4:0], port_id[1:0]}

In certain examples, the load buffer ID space is segmented per cluster (e.g., 4) and strand (e.g., 4 per cluster), e.g., into a total of 16 partitions. In certain examples, a fixed subset of the LBID ranges is used for a cluster/strand as seen in Table 7.

TABLE 7

| LBIDs Space Segmentation | | | |
|---|---|---|---|
| | strand0 | strand1 | strand2 |
| cluster0 | 0 | 512 | 1024 |
| | 127 | 639 | 1151 |
| cluster1 | 128 | 640 | 1152 |
| | 255 | 767 | 1279 |
| cluster2 | 256 | 768 | 1280 |
| | 383 | 895 | 1407 |
| cluster3 | 384 | 896 | 1407 |
| | 511 | 1023 | 1534 |

In certain examples, the LBID space is continuous except in the case when an OOO strand runs out of certain resources (e.g., SBIDs or ROBIDs) and OOO performs a cluster switch. In certain examples, when a cluster switch is performed, the LBIDs between last used LBID and the end of the LBID range for that strand are not allocated, e.g., where this creates "holes" in the LBID space. For example, if the last allocated load in Cluster 0 Strand 0 had a LBID of 100, LBIDs [101:127] will not be used. Instead, the next allocated LBID will be 128 and will come from Cluster 1 Strand 0.

In certain examples, internally in L1 mem slices, the loads will be tracked into two structures: the Global Load Buffer (GLB) and the Incomplete Load Buffer (ICLB). In certain examples, the GLB is a relatively large buffer (e.g., 1024 entries) that holds all loads in flight from allocation time until the load retires from the machine. In certain examples, the full GLB is replicated in each slice, but only the loads whose address ends up landing in that slice mark their entries as valid. In certain examples, the full storage is needed because in the worst case, all (e.g., 1024) in flight loads may end up in the same slice. In certain examples, the ICLB (e.g., 144 entries) holds a subset of the loads from GLB, and it only holds the loads until their data is written back to EXE/OOO instead of until retirement. In certain examples, ICLB hold loads from dispatch (instead of claim) until writeback.

In certain examples, each cluster can send up to a threshold (e.g., 4) loads, e.g., but they can only be sent on the port identified by the two LSB of the LBID (e.g., port_id[1:0]). In certain examples, each L1 MEM slice can receive a threshold number of (e.g., at most 16 total) loads per cycle. In order to reduce the large number of write ports, in certain examples, the ICLB and GLB are organized into the threshold number of (e.g., 16) partitions such that there is at most one write per partition even in the worst case. In certain examples, any load is direct mapped into a particular GLB partition and entry based on LBID, as seen in Table 8.

In certain examples, the partition is selected by the following bits of the LBID: {cluster_id[1:0], port_id[1:0]}.

In certain examples, the entry within the partition is selected using the remaining bits of the LBID: {strand_id [1:0],entry_id[4:0]}.

For example, where LBID 1152 (12'b0 01 00 10000 00) will always come from Cluster 2'b01 on AGU port 2'b00, and it will go in the 4th (4'b01 00) partition of GLB, in entry 64 (7'b00 10000).

Tables 8.1-8.4 show LBIDs assigned to GLB partitions (note, numbers may traverse multiple lines in these tables).

TABLE 8.1

| GLB partition entry | C0P0 (Partition 0) | C0P1 (Partition 1) | C0P2 (Partition 2) | C0P3 (Partition 3) |
|---|---|---|---|---|
| e0 | 0 | 1 | 2 | 3 |
| e1 | 4 | 5 | 6 | 7 |
| . . . | . . . | . . . | . . . | . . . |
| e29 | 116 | 117 | 118 | 119 |
| e30 | 120 | 121 | 122 | 123 |
| e31 | 124 | 125 | 126 | 127 |
| e32 | 512 | 513 | 514 | 515 |
| | 516 | | | |
| . . . | . . . | . . . | . . . | . . . |
| e61 | | | | 631 |
| e62 | 632 | 633 | 634 | 635 |
| e63 | 636 | 637 | 638 | 639 |
| e64 | 1024 | 1025 | 1026 | 1027 |
| e65 | 1028 | | | |
| . . . | . . . | . . . | . . . | . . . |
| e93 | | | | 1143 |
| e94 | 1144 | 1145 | 1146 | 1147 |
| e95 | 1148 | 1149 | 1150 | 1151 |

TABLE 8.2

| GLB partition entry | C1P0 (Partition 4) | C1P1 (Partition 5) | C1P2 (Partition 6) | C1P3 (Partition 7) |
|---|---|---|---|---|
| e0 | 128 | 129 | 130 | 131 |
| e1 | 132 | | | |
| . . . | . . . | . . . | . . . | . . . |
| e29 | | | | |
| e30 | 247 | 248 | 249 | 250 |
| e31 | 251 | 253 | 254 | 255 |
| e32 | 640 | 641 | 642 | 643 |
| | 644 | | | |
| . . . | . . . | . . . | . . . | . . . |
| e61 | | | | 759 |
| e62 | 760 | 761 | 762 | 763 |
| e63 | 764 | 765 | 766 | 767 |
| e64 | 1152 | 1153 | 1154 | 1155 |
| e65 | 1156 | | | |
| . . . | . . . | . . . | . . . | . . . |
| e93 | | | | 1271 |
| e94 | 1272 | 1273 | 1274 | 1275 |
| e95 | 1276 | 1277 | 1278 | 1279 |

TABLE 8.3

| GLB partition entry | C2 P0 (Partition 8) | C2 P1 (Partition 9) | C2 P2 (Partition 10) | C2P3 (Partition 11) |
|---|---|---|---|---|
| e0 | 256 | 257 | 258 | 259 |
| e1 | 260 | | | |
| . . . | . . . | . . . | . . . | . . . |
| e29 | | | | |
| e30 | 376 | 377 | 378 | 379 |
| e31 | 380 | 381 | 382 | 383 |
| e32 | 768 | 769 | 770 | 771 |
| | 772 | | | |
| . . . | . . . | . . . | . . . | . . . |
| e61 | | | | 887 |
| e62 | 888 | 889 | 890 | 891 |
| e63 | 892 | 893 | 894 | 895 |
| e64 | 1280 | 1281 | 1282 | 1283 |
| e65 | 1284 | | | |
| . . . | . . . | . . . | . . . | . . . |
| e93 | | | | 1399 |
| e94 | 1400 | 1401 | 1402 | 1403 |
| e95 | 1404 | 1405 | 1406 | 1407 |

TABLE 8.4

| GLB partition entry | C3P0 (Partition 12) | C3P1 (Partition 13) | C3P2 (Partition 14) | C3P3 (Partition 15) |
|---|---|---|---|---|
| e0 | 384 | 361 | 362 | 363 |
| e1 | 364 | | | |
| . . . | . . . | . . . | . . . | . . . |
| e29 | | | | |
| e30 | 504 | 505 | 506 | 507 |
| e31 | 508 | 509 | 510 | 511 |
| e32 | 896 | 897 | 898 | 899 |
| | 900 | | | |
| . . . | . . . | . . . | . . . | . . . |
| e61 | | | | 1015 |
| e62 | 1016 | 1017 | 1018 | 1019 |
| e63 | 1020 | 1021 | 1022 | 1023 |
| e64 | 1408 | 1409 | 1410 | 1411 |
| e65 | 1412 | | | |
| . . . | . . . | . . . | . . . | . . . |
| e93 | | | | 1527 |
| e94 | 1528 | 1529 | 1530 | 1531 |
| e95 | 1532 | 1533 | 1534 | 1535 |

In certain examples, the ICLB structure is smaller and cannot hold all loads in flight. As such, in certain examples the loads cannot be direct mapped to a specific entry of ICLB, e.g., instead, loads are only direct mapped to one of the (e.g., 16) partitions, and can go into any of the (e.g., 9) entries of that partition. In certain examples, the mapping of loads to ICLB partitions is done the same way as for GLB: {cluster_id[1:0], port_id[1:0]}.

TABLE 9

Example LBIDs Assignment to ICLB Partitions

| ICLB partition | AGU Port 0 | | | | AGU Port 1 | | | | AGU Port 2 | | | | AGU Port 3 | | | |
|---|---|---|---|---|---|---|---|---|---|---|---|---|---|---|---|---|
| entry | C0 | C1 | C2 | C3 | C0 | C1 | C2 | C3 | C0 | C1 | C2 | C3 | C0 | C1 | C2 | C3 |
| e0 | 16 | 640 | 380 | 504 | | | | | | | | | | | | |
| e1 | 4 | 128 | | 1412 | | | | | | | | | | | | |
| e2 | 120 | 1152 | | | | | | | | | | | | | | |
| e3 | | 1156 | | | | | | | | | | | | | | |
| e4 | | | | | | | | | | | | | | | | |
| e5 | | | | | | | | | | | | | | | | |
| e6 | | | | | | | | | | | | | | | | |
| e7 | | | | | | | | | | | | | | | | |

Port Binding

In certain examples, L1 load pipeline access binding rules include one or more of:

- Loads are bound to MEM L1 pipeline based on the port they arrived on, and will send wakeup and writeback to OOO/EXE on the same port number as the one it got dispatched on. E.g., LBID 0 will be received on port 0, will use mem load pipeline 0, will send wakeup to OOO on port 0 and writeback data to EXE on port 0. The port information is also contained in the (e.g., two LSB of the) LBID.
- PMH stuffed loads (e.g., loads that PMH generates to read page table entries) will be bound to load pipeline 0 to provide timing relief especially in the fill buffer allocation logic.
- Prefetch requests will be bound based on the LBID of the load that spawned them (prefetch requests will either come with a two bit port identifier or on separate ports).
- Fills do not go down the load pipe, but they do arbitrate for one of the two L1 cache data array read ports if an eviction is necessary. Evictions are not bound to a particular read port, instead using a round robin mechanism to alternate between the two ports In certain examples, while L1$ tag array is static and will have enough read ports to satisfy all potential requesters in the same cycle, the L1$ data array is limited to a certain number (e.g., two) read ports. In certain examples, there are a plurality (e.g., 4) load pipelines that may be trying to read the data cache on a lesser number of (e.g., two) ports. To simplify bank conflict detection and resolution, in certain examples load pipes 0 and 1 will be bound to L1$ data array read port 0 and load pipes 2 and 3 will be bound to L1$ data array read port 1.

Load Pipeline Arbitration

In certain examples, there are a plurality of (e.g., 4) load pipes in each L1 Slice. In certain examples, loads are bound to an internal L1 MEM slice pipeline by LBID.

In certain examples, for each load pipe, there is arbitration to select between a number of agents that can make requests.

Example requests shown in an example priority order are:

L1 cache fills/evicts highest priority*

Stuffed Loads from the PMH

L0 cache fills

Loads from the ICLB scheduling pipeline

Loads from the Load Receipt Skid

Loads from the Load Receipt Bypass

Prefetches lowest priority

*E.g., but if an L0 cache fill loses arbitration to the L1 cache fill/evict a threshold (e.g., two) times in a row, a bubble will be injected into the L1 fill pipeline such that the L0 cache fill is guaranteed to win its third attempt.

In certain examples, cache fills do not technically occupy the load pipe, but because they may take up one of the (e.g., two) data cache read ports if they need to evict data out of the cache, they block the (e.g., two) load pipes that are bound to that data cache read port. In certain examples, the fill pipeline is longer than the load pipeline, so the fill request arbitrating against the loads is based on the (e.g., fl4) fill pipeline stage. In certain examples, by that stage (e.g., fl4), it is already known if the fill needs to do an eviction so it will only arbitrate against the load pipes if there is an eviction, e.g., not on every fill.

In certain examples, the L0 cache fills have higher priority than all demand loads. In certain examples, to avoid constantly blocking the same set of load pipes, the L0 fills will block alternating sets of load pipes (e.g., either 0/1 or 2/3) based on the L0 fill register index (e.g., where fill registers are granted the fill pipeline in numerical order). In certain examples, each fill takes approximately a threshold number of (e.g., 4_cycles, and the set of load pipes is only fully blocked (e.g., integer+vector) for a lessor number (e.g., one) cycle, e.g., where this results in a single load pipeline set only being fully blocked for 1 cycle out of approximately 8 cycles (e.g., the time it takes for two L0 fills to go down the pipe).

In certain examples, PMH stuffed loads are sent to L2 circuitry instead of L1 to retrieve data, so they will not arbitrate for L1 load pipes Load Cache Hit In certain examples, loads that hit in the DCU (e.g., cache or fill buffer) or can forward from an older store have a load-to-use of a plurality of (e.g., 6) cycles as shown in FIG. 4. In certain examples, this is the tightest timing path in MEM and one of the main floorplan limiters. In certain examples, the path starts with address generation (AGU) in one EXE cluster, address travelling across crossbar to the L1 mem slice, obtaining data from L1 mem slice, then back over crossbar to the requesting EXE cluster where it will be used in the fast L0 bypass. In certain examples, due to the clustered nature of EXE/OOO versus the sliced nature of L1 MEM, signals have to travel a significant distance over a crossbar in both directions (e.g., from cluster to slice and from slice to cluster).

FIG. 4 illustrates a six cycle load-to-use timing path for a hit in a data cache of the level (e.g., L1) of memory circuitry that is sliced according to address values according to examples of the disclosure. In certain examples, in order for a load to hit in the cache or forward data from a store, it is to have a physical address also hit DTLB. In certain examples, DTLB is looked up in parallel with DCU tag. In certain examples, all ways of a DTLB set are read and all ways of a DCU cache tag set are read in FLD2. In certain examples, DTLB hit/miss is computed and at the beginning of next cycle (FLD3). In certain examples, before knowing whether there was a tag hit, a set (e.g., including all ways) of the DCU data cache is read. In certain examples (e.g., in parallel) in case of a DTLB hit, the physical address (PA) read from DTLB is compared against the physical address stored in each way of the tag in order to compute DCU cache hit way. In certain examples, the cache hit way is used to select the correct way of DCU data which is provided to the load. In certain examples, in case of a DTLB miss, the physical address in the load pipeline is inaccurate and a cache miss is forced. In certain examples, the load is not allowed to complete in this pass and is forced to go to ICLB and reschedule into the load pipes from ICLB.

Load Cache Miss

In certain examples, loads that miss the L1 cache will allocate a fill buffer (FB) and in time will go through round robin selection to arbitrate for the L2MEM request interface. In certain examples, if there are no eviction buffers and no fill buffers that need to arbitrate for the interface at this time, then load miss can be sent through the bypass path directly to L2 and allocate a fill buffer in parallel. In certain examples, if there are no fill buffers free to allocate, and the bypass path is available, then the load miss can be issued to the L2 MEM as a "without home" prefetch if it meets the requirements below.

In certain examples, load misses that hit in the L2 MEM can expect GO information back on the L2GO lane and data to be returned afterward. In certain examples, loads that also miss in L2 MEM will go to the fabric, e.g., GO information will be returned on the IDI GO lane, and may come before or after the return of data.

Without Home Prefetch Prerequisites: eligible load type (is to be cacheable writeback (WB), write protected (WP), or write through (WT)), not a lock, cannot allocate a fill buffer, no other request with higher priority (e.g., bypass wins arbitration), all other requirements for fill buffer (FB) allocation are met (e.g., other than having a free FB), and/or pop is not filtered out.

Load Miss to Bypass Path

TABLE 10

| Load and Bypass Bus Request Alignment | | | | |
|---|---|---|---|---|
| fld2 | fld3 | fld4 | fld5 | fld6 |
| dcu_tag_read<br>dcu_state_read<br>dcu_lru_read | dcu_tag_match(miss) | | | |
| | fb_cam<br>evb_cam<br>fb_spec_alloc | | | |
| | | fb_allocate<br>fbid_binding | | |
| | | | fb_valid(in_use = 1) | |
| | fbr1(byp)<br>calc_fb_ready_vec<br>arb_fb_evb_byp<br>calc_withouthome_pf | fbr2(byp) | | |
| | | send_req | | |

Load Wake-Up

In certain examples, on requests to L2 MEM, if the request is a hit in the L2 MEM cache the L2 will send a wake up message with the data (e.g., 5 cycles) before the data itself is returned. In certain examples, the L2 MEM only knows the fill buffer ID of the request so that is what will be used to map to the ICLB entry.

In certain examples, the L2 MEM read pipeline does not issue the data warn to L1 MEM if the request was a miss. In certain examples, on the external fabric, the GO response and the cache line data may be returned in any order. In certain examples, wake up messages to the ICLB will be generated by both an early data warning and the GO rsp+cacheline data.

In certain examples, load misses will wake up the ICLB when the required data is available. In certain examples, the wake up message is the fill buffer ID which is compared against the sleeping ICLB entries. In certain examples, the L2 MEM provides a data warning packet with the FBID of the request to allow for aligning the wake up pipeline as diagramed below, so that data is available in the fill buffer the cycle before it is required by the load.

TABLE 11

| CoarseAlign__wake__coarse__align | | | | | | | | | | |
|---|---|---|---|---|---|---|---|---|---|---|
| sgp4 | sgp5 | sgp6 | sgp7 | sgp8 | sgp9 | sgp10 | | | | |
| data__warn (L2 − L1 ifc) | RC data__warn | staged__data__warn | | | | data__return (L2 − L1 ifc) | | | | |
| | | fls1 iclb__wakeup | fls2 entry__select | fls3 RC | fls4 iclb__arb for load pipe | | | | | |
| | | iclb__entry__ready | read__iclb | | | | | | | |
| | | | | | fld1 | fld2 | fld3 | fld4 | fld5 | fld6 |

In certain examples, this data warning from the L2 mem is only provided on the case of a hit in the l2 cache. In certain examples, the warning is not provided on L2 miss as the request needs to be handled by the IDI coherent fabric and will not guarantee that GO and data are available at the same time. In certain examples, in the case that load needs to be filled by data from the fabric, the fill buffer will be responsible for waking up the load. In certain examples, this will occur once (e.g., when all data chunks are received and/or the GO information has been received). For example:

send_wake=(fb.chunk_val==fb.chunk_req) & fb.fGO

In certain examples, as responses are received from L2 mem the fill buffer will be updated and then the calculation to send the wake will be made. In certain examples, fill buffers can send multiple wakeups (e.g., predictively and/or speculatively). In certain examples, a fill buffer sends a wakeup (1) when the requested chunk arrives, or (2) when all chunks arrive.

Store to Load Forwarding

In certain examples, memory circuitry will implement store to load forwarding, where older stores can supply data to younger loads before the stores have become senior or committed their data to memory. In certain examples, in order to accomplish this, OOO dispatches a load with a store color which is the last SBID allocated by OOO before allocating the load. In certain examples, the load is to perform a dependency check against all older stores including the store color.

In certain examples, a load that depends on an older store could get data forwarded to it if all conditions for store to load forwarding are met, or it will get blocked on some store's SBID with one of the store forwarding blocking codes.

In certain examples, a load can forward data from pre-retirement stores by reading Store Data Buffer or post-retirement (e.g., senior) stores by reading the Store coalescing buffer (SCB). In certain examples, a load can also pick up the store data via fill buffer forwarding path if a matching store has already written/merged the data into the fill buffer.

Load DTLB Miss

In certain examples, all pops that arrive on load ports and have an address look up the DTLB and get a physical address and translation attributes (e.g., such as memtype) and check whether they have the correct permissions to access that memory location.

In certain examples, general pops received on load pipes are loads that have a linear address which needs to be translated into a physical address. In certain examples, some pops that arrive on load ports do not inherently have a linear or physical address (e.g., the address is in a different address domain, e.g., the "port" domain) (e.g., PORTIN) and will bypass the DTLB. In certain examples, pops may already have a physical address (e.g., load or store physicals, or pops with physeg_supovr attribute) but still is to go to DTLB to receive a memtype and to check whether they are allowed to access that memory location.

In certain examples, loads look up DTLB in FLD2 and if they hit DTLB a translation is provided. In certain examples, the translation maps a linear address to a physical address and provides attributes of that page, such as memtype and permissions. In certain examples, the physical address is used to determine a DCU cache hit/miss, while the memory type is used to determine what type of access (e.g., uncacheable) that load will perform. In certain examples, there are also fault checks performed on the load given the page attributes read from DTLB (e.g., if the load is from user space but the page is marked as accessible only by supervisor pops), and the load may be forced to complete mem without sending load_good or load_data. In certain examples, instead, it will update some fault register information, send wb_val and fault_valid to OOO, and deallocate the ICLB entry.

In certain examples, in a given cycle, there can be up to a plurality of (e.g., 4) DTLB lookups, one from each of the load pipes (e.g., and a plurality of (e.g., 3) lookups from STA pipes). As such, DTLBs have a total of 7 lookups in certain examples. In certain examples, the DTLB can further natively support multiple page sizes, e.g., four page sizes: 4 KB pages, 64 KB pages, 2M pages, and 1G pages. In certain examples, for simplicity, there are individual DTLB arrays for each of the page sizes. In certain examples, all (e.g., four) DTLB arrays are looked up in parallel. In certain examples (e.g., due to page promotions/demotions and lazy TLB shootdowns), it is possible that a lookup can hit in more than one of the DTLBs, e.g., where any one of those hits is allowed. In certain examples, for consistency, the smallest page size hit is selected.

DTLB Miss to PMH Request

In certain examples, loads that miss DTLB need to send a request to PMH circuitry to ask for a translation. In certain examples, the loads will be forced to recycle and have to schedule out of ICLB. In certain examples, they will either be put to sleep in ICLB (e.g., if they send a request to PMH circuitry), or will be eligible to recycle out of ICLB immediately (e.g., if they have not been able to send a translation request to PMH circuitry). In certain examples, PMH will respond to every translation request. In certain examples, successful translation responses will be filled in DTLB and the load replayed. In certain examples, there is no path for a load to successfully complete in MEM L1 without a DTLB hit. In certain examples, there is no concept of "use_once" for address translations. In certain examples, all translations are to be obtained from DTLB.

In certain examples, there can be up to a plurality of (e.g., 7) DLTB misses per cycle in each L1 MEM slice, e.g., but only one translation request made per cycle per slice towards PMH circuitry.

In certain examples, all DTLB misses (load or store) are funneled to a Translation Request Buffer (TRB) which will then make a (e.g., at most one) translation request per cycle to PMH. In certain examples, there are a plurality of (e.g., 8) TRB entries per L1 MEM slice, and one TRB can be allocated per cycle. In certain examples, the DTLB misses will arbitrate for a chance to allocate a TRB entry as follows:

In certain examples, the oldest (e.g., LBID based) of the up to a number (e.g., 4) load DTLB misses will be selected and compare its linear address (LA) against all TRB entries.

In certain examples, the oldest (e.g., SBID based) of the up to a number (e.g., 3) STA DTLB misses will be selected and compare its linear address (LA) against all TRB entries.

In certain examples, the losing loads will be forced to recycle through ICLB with block_code=NONE (e.g., will not be put to sleep).

In certain examples, if a DTLB miss matches the LA of an existing TRB, it will not try to allocate a new one. In certain examples, if neither of the winning requests from both load pipes and STA pipes match an existing TRB, one of them will be allowed to allocate a new TRB entry, and the selection between load and store pipes will be done in a round robin fashion. In certain examples, if either the load or the STA is retired (e.g., at_ret), round robin is overruled and the at_ret pop wins TRB allocation.

In certain examples, if the winning load DTLB miss matches an existing TRB entry, the load will be put to sleep in ICLB with block_code MATCH_TRB and block_id=TRB_EID (e.g., the TRB entry that had the same LA as the load). In certain examples, all linear address compares against the TRB will be done at the smallest page granularity LA (e.g., [47:12]). In certain examples, if the winning load DTLB miss allocates a new TRB entry, the load will be put to sleep in ICLB with block_code HAS_TRB and block_id=TRB_EID (e.g., the TRB entry that was allocated). This distinction in block codes (HAS_TRB vs MATCH_TRB) is important in the case of faults in certain examples.

In certain examples, if the TRB is full, then all loads that missed DTLB are put to sleep in ICLB with block_code=TRB_FULL (not just the winning load), e.g., they will be woken up on any TRB deallocation.

TRB→PMH Requests

In certain examples (e.g., every cycle), one TRB (e.g., as shown in FIG. 10) entry which has not sent a translation to the PMH circuitry 118 is chosen, and it sends a translation request to the PMH. In certain examples, the translation request includes TRB_EID, linear address to smallest page granularity (e.g., LA[47:12]), and/or a number of attributes related to the pop that allocated the TRB (e.g., whether it needs read (loads) or write (stores) permissions, whether the pop was physical, whether the pop was user or supervisor code, etc.). In certain examples, every TRB_EID request is guaranteed to receive a response from PMH, and, in certain examples, that can be one of the following three mutually exclusive options:

- successful page translation
- retry the translation request when the pop that allocated TRB is not speculative (atret)
- fault (only if the TRB was allocated by an atret pop) In certain examples, another option is to have an assist as well.

In certain examples, PMH circuitry has a corresponding structure per requesting agent (e.g., per L1 slice) called STLBQ (e.g., as shown in FIG. 10), e.g., which is the same size as the slice's TRB and all TRB entries are direct mapped to the STLBQ entries. In certain examples, PMH circuitry is guaranteed to sink all translation requests coming from an L1 slice. In certain examples, PMH circuitry will explicitly deallocate each in-use TRB when the corresponding translation request is completed and STLBQ entry is deallocated, e.g., no crediting or backpressure mechanism is needed.

In certain examples, once a TRB sends a translation request to PMH circuitry, it will set the request sent ("req_sent") bit which will prevent it from sending the request again. In certain examples, each TRB will send one and only one translation request to PMH during normal operation, e.g., where one TRB can be allocated per cycle, and one PMH request can be sent per cycle, there should not be more than one TRB ready to send a request to PMH. In certain examples however, there are some cases where the TRB→PMH translation request interface can be taken over by other events, so TRB translation requests are not guaranteed to always win access to that interface (one example is fault information from unrelated faulting pops that need to send information to update the fault registers which reside in PMH circuitry.)

In certain examples, since the PMH circuitry is physically placed outside of the L1 MEM slices, there will be a wire delay of a certain number of (e.g., 4) cycles for the translation request to reach PMH from the farthest L1 slice (and vice versa for a PMH response to reach the farthest slice). In certain examples (e.g., optionally) (e.g., for validation simplicity), in order to maintain synchronization between the DTLBs, this delay will be maintained constant regardless of whether the communication happens between the closest or farthest slice, e.g., where the slices that are closer to PMH circuitry will add flops to match the delay of the farthest slice.

DTLB Miss Request Format

In certain examples, each slice of L1 MEM will have this interface to the PMH circuitry, e.g., where this is used when there is a DTLB miss and the STLB/PMH is needed to perform Page Translation. In certain examples, only one request can be sent per cycle per slice.

In certain examples, DTLB misses in L1 MEM are collected in a Translation Request Buffer (TRB), and sent to the PMH circuitry. In certain examples, the PMH circuitry maintains guaranteed storage for the translation requests in the STLBQ, therefore PMH is guaranteed to sink any translation requests sent to the PMH. In certain examples, there is 1:1 mapping between TRB entry ID and STLBQ entry ID for each slice.

TABLE 12

Fields of the DTLB Miss -> PMH Request Packet

| Name | Size | Description |
|---|---|---|
| valid | 1-bit | Valid bit indicates whether there is a packet in the interface in the current cycle. |
| trb_eid | 3-bits | Entry ID of the TRB/STLBQ allocated for this request |
| lin_addr | 36-bits | Linear Address bits to the smallest page boundary |
| is_physical | 1-bit | μops like Load. Phys will set this to true |
| is_at_ret | 1-bit | Set to true when the requesting load/STA is the oldest in the machine |
| needs_write | 1-bit | This is true for stores or pops with LWSI semantics |
| is_user | 1-bit | Requesting instruction is in user mode |
| physeg_supovr | 1-bit | Seg overrides, e.g., for SMAP checks or C6/CoreSRAM accesses |
| other_seg_ovr | 1-bit | Spare, Seg overrides |
| guest_phys | 1-bit | EPT/VMX |
| special_la | 3-bits | For TLB invalidation encoding |
| pppe_physeg | 1-bit | Portable Parallel Programming Environment (PPPe) |
| spare | 10-bits | For *T features like CET/shadow stack and/or some ucode μops, e.g., tickle_tran_epc, d-only misses, etc. |
| tlb_inv | 1-bit | This is not a true DTLB miss but a TLB invalidation, e.g., overloading lin_addr with information on hit way somehow encoded in lin_addr (e.g., at least a way per DTLB page size) |

PMH Successful Translation Response

In certain examples, once PMH receives a translation request from an L1 slice, it stores it in the STLBQ entry corresponding to the TRB_EID that it received with the request. In certain examples, the requests will be serviced either from a larger STLB (e.g., second level TLB), or if they miss in the STLB then they will acquire a page walker and perform the full address translation page walk. In certain examples, in order to minimize the DTLB miss penalty, speculative wakeups are sent to slices, optimistically assuming that there will be a hit in STLB. In certain examples, this includes wakeup+LA, DTLB fill, and then TRB deallocation.

Load Recycle, Block and Wakeup Conditions

In certain examples, load pipes pops may not always complete on first pass through the MEM pipeline. In certain examples, there are several conditions that can block a pop and put it to sleep in ICLB or force it to recycle through the pipeline.

In certain examples, in some blocking cases, a block ID field in ICLB is set to identify the buffer ID of the resource that the load is waiting on. Certain processors divide up the store forwarding address overlap problem into three pieces: (1) loosenet: address overlap looking at bits 11:0, (2) finenet: exact address match looking at (e.g., linear or physical) bits MAX:12, and (3) enhanced loosenet: physical bits (e.g., 15:12), in some cases, used to skip loosenet matches.

TABLE 13

| Foundation 1 Load Block Codes, Wake-up Conditions | | | | | |
|---|---|---|---|---|---|
| Blocking/ recycle condition | Description | Block code | Block ID | Wake-up condition | Detection Pipestage |
| loosenet unknown store | Load hit an older STA with unknown address and is not MD allowed | STA_UNKNOWN | SBID | When an incoming STA's SBID matches the SBID load is sleeping on | fld2 |
| Pav unknown Store | Load had a loosenet hit but store doesn't have a physical address translation | STA_PHYS_UNKNOWN | SBID | When the STA in the pipeline gets its TLB translation up to 3 STAs in a cycle | fld3 |
| Bank conflicts | Bank conflicts and load had a tag hit and was not blocked on a fb or store | NONE | N/A | Recycle from ICLB right away | fld4 |
| Tag or FB miss | Load missed the DL1$ and allocated a FB or matched a Fill buffer that is not bound to data yet load was not blocked by a store | FB_SQUASH | FBID + ChunkID | Fill buffer gets a non-speculative GO or Fill buffer gets data back/data_chunk (in case of IDI hit) | fld3/fld4 |
| Fill buffer full | Loads wants to speculatively reserve FB but FB is full | FB_FULL | N/A | Full buffer entry available/dealloc | fld3/fld4 |
| FB allocation failure | Loads wants to speculatively reserve FB but suffered FB allocation port conflicts | NONE | N/A | Recycle from ICLB right away | fld3/fld4 |
| Store forward fail | STA match but can't forward due to partial overlap, store split or other disqualifying conditions | STORE_DEALLOC | SBID | When the store writes to SCB | fld4 |
| SCB forward fail | SCB match, but cannot forward due to disqualifying conditions like partial overlap, store split or other disqualifying conditions | SCB_DEALLOC | SCBID | When SCB deallocates after writing to cache or Fill Buffer | fld4 |
| SDB data miss | Valid store forwarding but SDB data missing | SDB_NOT_READY | SBID | When matching SDB data shows up | fld4 |
| Finenet miss | Loosenet/carry chain identified a matching store but enhanced loosenet or finenet check missed | NONE | N/A | Recycle from ICLB right away with updated store color from loosenet/ carrychain results | fld4 |

TABLE 13-continued

| Foundation 1 Load Block Codes, Wake-up Conditions | | | | | |
|---|---|---|---|---|---|
| Blocking/ recycle condition | Description | Block code | Block ID | Wake-up condition | Detection Pipestage |
| SDB port miss | Load has a valid loosenet carry chain results and wants to read a SDB partition, but loses arbitration to other load pipes for the 1 SDB partition read port | NONE | N/A | Recycle from ICLB right away with updated store color from loosenet/ carrychain results | fld3 |

In certain examples, a pop sleeps on only one block code at a time. In certain examples, a pop could reissue once that blocking condition is resolved and then sleep on some other blocking condition as encountered. In case of multiple blocking conditions, the block codes need to be prioritized.

Example list of checks is in Table 14 below.

TABLE 14

| Cross Pipeline Recycle Conditions | | |
|---|---|---|
| Recycle condition | Description | Pipe stage |
| fld1_mat_fst1_in_pipe | load in fld1 has a loosenet match (e.g., address bits 15:0) to STA in fst1 stage - re-cycle right away from ICLB | fld3 |
| fld1_mat_fst2_in_pipe | load in fld1 has a loosenet match to STA in fst2 stage- re-cycle right away from ICLB | fld3 |
| fld1_mat_fst3_in_pipe | load in fld1 has a loosenet match to STA in fst3 stage- re-cycle right away from ICLB | fld3 |
| fld4_mat_fst1_in_pipe | load in fld4 has a loosenet match to STA in fst1 stage- re-cycle right away from ICLB | fld4 |
| fld5_mat_fst1_in_pipe | load in fld5 has a loosenet match to STA in fst1 stage- re-cycle right away from ICLB | fld5 |
| fld4_mat_stw_fb_spec_alloc | Load will do a partial address check (e.g., CAM) against store uop doing speculative fb allocation. A cam match will prevent load from allocating a fill buffer to avoid duplicate FB allocations. Load will recycle in the absence of any other blocking condition | fld4 |
| fld4_mat_stw_fb_bind | Load will do a partial address check (e.g., CAM) against store uop doing fb_bind. A cam match will prevent load from allocating a fill buffer to avoid duplicate FB allocations. Load will recycle in the absence of any other blocking condition | fld4 |
| fld4_mat_stw_fb_alloc | Load will do a partial address check (e.g., CAM) against store uop doing fb allocation. A cam match will prevent load from allocating a fill buffer to avoid duplicate FB allocations. Load will recycle in the absence of any other blocking condition. | fld4 |
| load vs SDB pipe | loads in fld6 do a SBID check (e.g., CAM) against fsd2/3 pipeline stages and recycle to avoid missing a SDB wakeup and data arrival | fld6 |

Table 15 below lists additional blocking and recycling conditions.

TABLE 15

| Additional Block Codes | | | | |
|---|---|---|---|---|
| Recycle condition | Block code | Block ID | Description | Wake-up condition |
| Retry at ret | NEEDS ATRET | N/A | uop needs to execute when it is at retirement (oldest in ROB). Certain opcodes always need to be at ret. For speculative pops some actions in pipeline can force them retry at ret (ex, reporting fault) | Check the ICLB entry sleeping on this block code, every cycle against the oldest ROBID packet sent by OOO to determine when this load is at ret |
| Split register full | SPLIT REG_FULL | N/A | uop is a split but no split registers available in this slice | Split register dealloc, at ret split register reservation |
| Split high wait | SPLIT_WAIT | N/A | Split high scheduling is blocked until split low schedules | split low scheduling interface valid packet |
| Split fault check | SPILT FLT_CHK | SR_eid | split high fault information needed by split low | split high completion interface valid packet |
| DTLB miss | DTLB_MISS | N/A | DTLB was a miss, request sent to STLB, wait for final block code based on STLB arbitration and hit | Load hits in STLB (code changed to NONE), or Load got a PMH(HAS_PMH), or Load matched a PMH (PMH_WAIT), or all PMH were busy (PMH_BUSY) |
| STLB arbitration lost | NONE | N/A | DTLB miss sent to STLB but request lost arbitration to get STLB Pipe, try again immediately to get STLB access | STLB pipeline is open right now needs work in foundation 2 |
| Wait for STLB response | STLB_WAIT | N/A | DTLB miss sent to STLB and request won access to STLB pipe | Hit in STLB , translation written back to DTLB |
| STLB miss, needs PMH | PMH_BUSY | N/A | DTLB , STLB were miss, needs a page walk but all page walkers are busy | When any PMH finishes a walk |
| waiting on PMH | PMH_WAIT | PMH ID | DTLB , STLB were miss, a page walker is walking the page that this load wants | When matching PMH finishes it walk |
| has PMH | HAS_PMH | PMH ID | DTLB, STLB were miss, walk in progress for this load's translation and walk was started by this load (any page faults on this walk should be reported by this load) | When PMH finishes it walk |
| lock is in progress | LOCK_BLK | N/A | Block because of a lock is in progress | When the lock is done |
| generic_block | GEN_BLK | FBID | Load matched a Fill buffer that was snooped out or load hit a write combining buffer that is not evicted , or load hits a store fill buffer with partial overlap | When FBID gets a GO or FBID gets deallocated |

The table below lists the blocking codes in an example priority order.

TABLE 16

| Block Code Priority<br>Priority of block codes/conditions |
|---|
| NEEDS_ATRET |
| Split reg block codes |
| DTLB/STLB block codes |
| PMH block codes |
| STA_UNKNOWN |
| STA_PHYS_UNKNOWN |
| STORE_DEALLOC |
| SDB_NOT_READY |
| SCB_DEALLOC |
| FB_FULL |
| FB_ALLOC_FAIL |
| FB_SQUASH |

Uncacheable Loads

In certain examples, uncacheable (UC) loads access memory locations that cannot be cached in L1 or L2 (or L3, if present). In certain examples, strong ordering requirements mean that all reads and writes is to appear and be executed without any reordering on the system bus, which implies that older stores and loads is to be globally observed (e.g., GOed) before the load is observed. In certain examples, uncacheable loads is to also be guaranteed to be seen at least once and only once on the system bus, meaning that MEM is to guarantee that it will send a read request to IDI (e.g., load cannot be serviced internally in L1 or L2) and that once an uncacheable request was sent to IDI, L1/L2 will not send the same request again. In certain examples, there are some exceptions under which UC load can be executed more than once.

In certain examples, uncacheable loads are not serviced from L0 clusters, and are always sent to L1 MEM for processing. In certain examples, this is accomplished by not filling translations that map to UC space into ZTLB. In certain examples, since only loads that hit ZTLB are allowed to complete from L0, uncacheable loads always miss L0 and are sent to 1.

In certain examples, at a high level in L1, loads are detected as uncacheable (UC) once they hit DTLB and are put to sleep in ICLB until they are at retirement. In certain examples, when they are the next pop to retire and OOO has guaranteed that no other MEM-external faults can be encountered, the load is scheduled into the MEM L1 pipeline and once it meets certain conditions, it allocates a fill buffer to make an uncacheable read request to L2. In certain examples, the load is not allowed to obtain data from the L1 cache or store buffers (e.g., SDB or SCB) or fill buffers allocated by a different load, even if data exists there. In certain examples, once the data is returned by L2 into the fill buffer, the load goes down the pipeline again, reads the data from the fill buffer only if GO has been received as well, and the fill buffer is deallocated after the load reads it, without filling the data in the L1 cache.

UC Load Scheduling

In certain examples, a load is scheduled into L1 load pipeline and looks up DTLB. If the load hits DTLB and the page memory type (memtype) is UC, the load has to behave as Strongly Ordered (SO). In certain examples, the load is not allowed to complete in this pass, and it is blocked in ICLB with block_code "NEEDS_ATRET". Note that some pops may have UC semantics that are determined from popcode rather than DTLB (e.g., PORTIN), and those pops will also be blocked in ICLB with block_code "NEEDS_ATRET" and behave like UC loads from then on in certain examples.

In certain examples (e.g., every cycle), loads blocked with "NEEDS_ATRET" will check their reorder buffer ID (ROBID) against the next to retire re-order buffer ID (ROBID) (oo_oldest_robid). In certain examples, if the ROBIDs match, the load's block code will be reset to "NONE", and the load will be eligible for scheduling into the MEM L1 load pipes. In certain examples, to guarantee that the load is truly not speculative and will not be cancelled due to non-MEM faults, the load also needs to check the oo_good2mem indication from OOO when the load is in FLD2 pipeline stage. In certain examples, this signal indicates that all non-MEM problems have been resolved and the load is safe for non-speculative execution. In certain examples, this signal arrives some time after the oldest_robid indication from OOO, so the load can be woken up early and only check the good2mem signal a number of cycles later when the load is already in the main load pipeline. In certain examples, if the load does not see good2mem set when it is in FLD2, the load will be recycled with block code "NONE". In certain examples, good2mem will be generated in less than 5 cycles (e.g., about 3), in which case the load will be able to take advantage of the early wakeup and intercept good2mem in time in the FLD pipeline.

Alternatively, if the delay between oldest_robid movement and good2mem movement is usually larger than the ICLB scheduling pipeline length, the block code could be reset to "NONE" only after both load_robid matches oldest_robid and good2mem is set, e.g., to avoid penalty of recycling the load if it barely just misses good2mem.

UC Load in L1 Load Pipe

In certain examples, once the UC load is in the MEM pipelines, it will allocate a new FB and it will not be allowed to get its data from cache, store buffers (e.g., SDB or SCB), or fill buffers allocated by a different pop. In certain examples, in order for the load to be able to allocate a FB, the following conditions will have to be met:

1. Load is next pop to retire and has good2mem
   - If load is not next to retire, block with "NEEDS_ATRET"
   - If good2mem not set, recycle load (block code="NONE")
   - This condition guarantees that older loads have been observed as well as (e.g., partially) preventing loads from being re-executed
2. Senior (post-retirement) stores are drained from SSB (load's store_color matches sbid_dealloc)
   - If condition not met, load blocked in ICLB with "STORE_DEALLOC" block_code and the store_color block_id
   - Condition 1, 2 & 3 guarantee that all older stores are seen on the system bus before the UC load
   - Note that SAB/SSB does not have to be entirely empty. There can be valid stores in SAB/SSB, but they cannot be older than the load. By definition, since the load is at retirement, it means that all senior stores in SSB are older than the UC load, and any store in SSB that is not post-retirement is younger than the UC load
3. Senior stores are drained from SCB
   - If condition not met, load blocked in ICLB with "SCB_DEALLOC" block_code and the youngest SCBID as block_id
   - Condition 1, 2 & 3 guarantee that all older stores are seen on the system bus before the UC load
   - Note that all stores in SCB are by definition older than the at-ret UC load. As such the SCB really needs to be empty 4. GOB empty and WC counter is zero
   If condition not met, recycle load (block code="NONE")
   Trigger wakeup when gob_empty_mnnnh & ~gob_empty_mnn1h AND (wc_counter==0)
5. Does not match an existing fill buffer
   If condition not met, load blocked in ICLB with "GEN_BLK" and the FBID of the matched fill buffer
   In certain examples, special care is to be taken to make sure that if waking up UC load on GO but FB still exists second time around (e.g. because have not had a chance to fill it in cache yet), if put the load to sleep again on GEN_BLK, to not miss the FB deallocation. In certain examples, cross pipeline checks are performed or the load is recycled instead of blocked if it hits FB with GO. In certain examples, the FB will be written in cache soon, so the load does not recycle more than one or twice.

In certain examples, once the UC load advances down the pipeline and meets all the above conditions, it will allocate a fill buffer, e.g., regardless of whether it would have hit the cache or not. In certain examples, the cache tag and data read enable will be suppressed to avoid burning power.

In certain examples, the UC load will allocate the Fill Buffer (FB) entry (e.g., permanently) dedicated for at-ret loads (e.g., FBID 0). In certain examples, on FB allocation, the following FB entry bits receive special handling:

1. at_ret: bit set to 1 if allocated or hit by an at ret load (this will protect the fill buffer from snoops and guarantee forward progress).
   UC loads set this bit at FB allocation time. In certain examples, UC loads are not allowed to promote an already existing FB entry to at_ret if they match it. In certain examples, UC loads are to wait until the FB is deallocated and can only set at_ret for FBs that they allocate themselves.
   Cacheable loads set this bit at allocation time if they were at-ret+good2mem and allocated the fill buffer
   Cacheable loads that are at-ret+good2mem which hit an existing cacheable FB entry can mark the at_ret bit in that FB entry
2. use_once: bit set to 1 by UC load at FB allocation to indicate that this FB can only forward data to an at-ret load
   In certain examples, an at-ret load can only use the data in this FB if BOTH use_once AND at_ret are set
   In certain examples, non at-ret loads cannot use the data in this FB at all
   This bit will also be set by snoops if they hit a FB, even if the fill buffer was not allocated by a UC load or at-ret load
   This is to prevent cacheable FBs to be read by non at-ret loads after a snoop hit
3. rep_en: bit set to 0 by strongly ordered load to indicate that this fill buffer should not be filled into the cache
   Also reset by snoops if they hit a FB regardless of whether it was marked at_ret or not
4. data_read: bit will be 0 when FB is allocated, and set to 1 when any allowed load reads it
   the load will still have to follow the forwarding requirements: e.g., only an at-ret load can read a use_once FB entry and set data_read to 1
   In certain examples, this bit is not strictly needed for UC loads but will guarantee correct functionality no matter how long it will take a use_once fill buffer to be deallocated. In certain examples, the memory circuitry is to guarantee FB deallocation after being read by an at-ret load before a different load has a chance to become at-ret.

In certain examples, successful FB allocation puts the load to sleep in ICLB with block_code "FB_SQUASH" and the corresponding FBID for block_id.

In certain examples, when the FB makes a request to L2, it will have DATA_READ_UC req_type and it will also set the self_snoop bit on the interface. In certain examples, the self_snoop bit for UC loads is not necessary, as L2 treats all uncacheable requests (from L1, PMH, FE, Pref) as implicitly needing self_snoop. In certain examples, the self_snoop bit exists on the interface for a different reason (e.g., RFOs that hit cache in S state) and for consistency L1→L2 UC read/write requests will also set it.

In certain examples, FB data arrival will wake-up the entries matching the FBID in ICLB. In certain examples, the UC Load will always win Load pipeline arbitration as well as FB Read arbitration since it is the oldest. In certain examples, hence, the UC Load will go down the Load pipeline and read the FBID data if both data and GO have been received. In certain examples, this FBID shall be available for read early FLD3 after the arbitration logic. In certain examples, the late FLD3 FB CAM result shall be used to validate that the Load is reading the correct FBID. In certain examples, the UC load will be allowed to read the FB only once both data and GO have been received, and the load will be recycled (block_code="NONE") if data is present but GO has not been received. In certain examples, if this proves to recycle the load too many times, if the UC load finds data but not GO, it can be put to sleep in ICLB on block_code="GEN_BLK" and woken up when GO received. In certain examples, once the UC load reads the FB it will set data_read bit.

In certain examples, since only at retirement ("at ret") loads are allowed to read data from fill buffers marked as use_once, and there can only be one at ret load at a given time in MEM across slices, only the UC load that allocated the fill buffer can read that entry. In certain examples, thus, there is no need to store iclb_id field in the FB to guarantee that only the correct load reads the fill buffer. Similarly, we don't need iclb_id field for fill buffers hit by snoop which have been allocated or matched by an at-ret load since there is only one at-ret load in the machine. In certain examples, an at-ret load (whether cacheable or uncacheable) is only allowed to use a FB with use_once bit set if the FB.at_ret bit is also set.

In certain examples, if a younger load comes down the pipeline and matches the FB entry with use_once bit set, it will sleep on this FBID. In certain examples, however, because this load is not at ret it can never forward data from this FB entry. In certain examples, whenever it is woken up by FB data arrival, the load will go down the pipeline and find unable to forward data from FB if the FB is still around (e.g., the at-ret/UC load hasn't deallocated it yet) and hence recycle again to allocate a new FB.

Fill Buffer Deallocation

In certain examples, the fill buffer entry deallocation is augmented: if use_once bit is set, the FB should be deallocated only if data_read is set or at_ret is not set (e.g., use_once & (data_read OR (e.g., |) ~at_ret)). In certain examples, the fill buffer entry will not arbitrate for the fill pipeline or be filled into the cache because rep_en=0. In certain examples, fill buffer deallocation calculation is on a per entry basis, and multiple FBs should be able to be deallocated in the same cycle. In certain examples, however, in order to not rely on this property and retirement pipeline lengths, data_read bit will be used to protect the fill buffer entry from being read by two consecutive but different at-ret loads.

UC Load Flow

In certain examples, after UC request is sent by L1, but before the UC load receives data, L1 will receive a snoop which will be used to invalidate cache entries and mark all younger loads to the same address that completed out of order as MOCleared. In certain examples, fill buffer entries that are marked as at_ret will be protected from the snoop, so the load's fill buffer will still persist.

FB Properties

In certain examples, there can only be one valid, not ready for deallocation (dealloc_ready) fill buffer marked as at_ret at a given time. In certain examples, there can be more than one FB entry with use_once bit set. In certain examples, consecutive snoops may have hit different fill buffers and the fill buffers haven't been deallocated quite yet. In certain examples, enable repeat ("rep_en") and use once ("use_once") should be mutually exclusive—that is, a fill buffer marked as use_once should not be filled into the cache; and a fill buffer marked as needing to fill in the cache should not be also marked use_once. In certain examples, use_once and rep_en should not both be 0 for a valid fill buffer.

The following table shows examples of legal combinations of the use_once, rep_en, and at_ret bits in valid fill buffers allocated by a load.

TABLE 17

| Combinations | | | |
|---|---|---|---|
| use_once | rep_en | at_ret | Description |
| 0 | 0 | 0 | Illegal combination for FB allocated by load. Rep_en can only be reset by snoop or by a strong ordered load allocation (in which case use_once bit should also be set) |
| 0 | 0 | 1 | Illegal combination for FB allocated by load. If rep_en 0 then snoop is to have hit the cache, but then it should have also set use_once. Or if UC load allocated this FB, then use_once should have been set from the beginning |
| 0 | 1 | 0 | Normal WB load that is not at ret, and the FB was not hit by snoop. Fill in the cache, FB allowed to forward |
| 0 | 1 | 1 | At ret WB load allocated this FB but it hasn't been hit by snoop. Fill in the cache, allowed to forward |
| 1 | 0 | 0 | Regular FB (not at ret/UC) was hit by snoop. While the FB is not protected from being deallocated, this is one way to indicate to any load that they cannot use the data in case they happen to hit the FB before it has a chance to be deallocated. Regular loads cannot use the data because they are not at_ret, and UC/at_ret loads cannot use the data because they need FB to have both use_once and at_ret |
| 1 | 0 | 1 | Regular UC load or at ret load hit by snoop. FB should only be deallocated when read by at_ret load. Should not be written in the cache |
| 1 | 1 | 0 | Illegal combination. Usually use_once and rep_en are mutually exclusive. If FB was allocated by UC load, then rep_en should have been cleared at allocation and at_ret should have been set. If FB was allocated by cacheable load but hit by snoop, the use_once bit would be set but rep_en should be reset by snoop |
| 1 | 1 | 1 | Illegal combination. Usually use_once and rep_en are mutually exclusive. If FB was allocated by UC load, then rep_en should have been cleared at allocation. If FB was allocated by cacheable load but hit by snoop, the use_once bit should be set but rep_en cleared |

Stores

In certain examples, in a given cycle, each OOO/EXE cluster can issue a first threshold (e.g., 3) STAs and a second threshold (e.g., 3) STDs, which are broadcasted to all L1 MEM slices. In certain examples, each L1 Mem slice is to accept all of a plurality of (e.g., 12) STAs and a plurality of (e.g., 12) STDs.

Port Binding

In certain examples, DispatchSTA packet and the associated ExecuteAGU packet come from the same port. In certain examples, DispatchSTD packet and the associated ExecuteSTD packet come from the same port. In certain examples, each STA pipeline is bound to the corresponding store's AGU port, e.g., store sent from AGU port0 goes to STA pipe0, etc. In certain examples, each L1 slice has a same number of (e.g., 3) STA pipes as OOO/EXE cluster can send stores over the number of (e.g., 3) ports.

Example Life of a Store

In certain examples, the STAs are received and saved in the Store Address Buffer (SAB) structure. In certain examples, along the path of writing the SAB, linear address (e.g., bit [7:6] of the linear address) of the incoming store is compared with the SliceID of the receiving slice, and the result is stored in SAB.inslice. In certain examples, this attribute is broadly used within L1 Mem Slice, e.g., wherever the store needs to be recognized either as in slice or out of slice.

In certain examples, the STDs are received and saved in the SDB (Store Data Buffer) structure.

In certain examples, the STAs received could arbitrate for its binding STA pipeline right away if there are no older STAs from the SAB or SAB skid stage. In certain examples, the winning STA will flow down the pipeline and gets address translated and update SAB and SSB (Senior Store Buffer). It could be blocked and ended up re-running the STA pipeline multiple times.

In certain examples, once OOO notifies Mem that a store/stores are retired, MEM slices move the store retirement pointer over the SSB structure and move forward to the senior store pipelines. In certain examples, a store stays in SAB/SDB/SSB until it's selected and succeeds in writing into SCB (Store Coalescing Buffer), e.g., this is when the SB (Store Buffer) entry could be deallocated. In certain examples, a store/store-group stays in SCB until it is selected and succeeds in writing into L1D$ or FB, e.g., this is when the SCB entry is deallocated.

SBID Partitioning and Holes

In certain examples, the SBID is constructed as follows: SBID={1b Wrap, 2b StrandID, 2b ClusterID, 4b EntryID, 2b PortID}

SBID Holes:

- MOD4 Holes: In certain examples, since there are only 3 store AGU ports, allocation to SB will skip IDs of which modulo4 equals to 3. E.g., where valid allocation IDs are 0, 1, 2, (skip3), 4, 5, 6, (skip7), . . . etc.
- PowerOf2 Holes: In certain examples, the bank size of SB is 48.0 (576/12) and this is not a power of 2, therefore IDs at the end of each bank are also invalid. In another word, in each bank, if the lower 4 bit of the entry index equals 14, or 15, it is a PowerOf2 hole.
- ClusterSwitch Holes: While the above holes are design holes and are static, in certain examples, the ClusterSwitch holes are dynamic and are notified to MEM box as OOO switch clusters. In certain examples, the ClusterSwitch holes are always at the end of bank and connect to the PowerOf2 holes.

In certain examples, the last SBID in a strand/cluster marks the End of Strand.

SBID Logical View is shown in Table 18 below.

TABLE 18

| SBID Logical View | | | | |
|---|---|---|---|---|
| | Cluster0 | Cluster1 | Cluster2 | Cluster3 |
| Strand0 | 0 | 64 | 128 | 192 |
| | 1 | 65 | 129 | 193 |
| | 2 | 66 | 130 | 194 |
| | 3 | 67 | 131 | 195 |
| | 4 | 68 | 132 | 196 |
| | 5 | 69 | 133 | 197 |
| | 6 | 70 | 134 | 198 |
| | 7 | 71 | 135 | 199 |
| | 8 | 72 | 136 | 200 |
| | . . . | . . . | . . . | . . . |
| | 54 | 118 | 182 | 246 |
| | 55 | 119 | 183 | 247 |
| | . . . | . . . | . . . | . . . |
| | 63 | 127 | 191 | 255 |
| Strand1 | 256 | 320 | 384 | 448 |
| | 257 | 321 | 385 | 449 |
| | 258 | 322 | 386 | 450 |
| | 259 | 323 | 387 | 451 |
| | 260 | 324 | 388 | 452 |
| | 261 | 325 | 389 | 453 |
| | 262 | 326 | 390 | 454 |

TABLE 18-continued

| SBID Logical View | | | | |
|---|---|---|---|---|
| | Cluster0 | Cluster1 | Cluster2 | Cluster3 |
| | 263 | 327 | 391 | 455 |
| | 264 | 328 | 392 | 456 |
| | . . . | . . . | . . . | . . . |
| | 310 | 374 | 438 | 502 |
| | 311 | 375 | 439 | 503 |
| | . . . | . . . | . . . | . . . |
| | 319 | 383 | 447 | 511 |
| Strand2 | 512 | 576 | 640 | 704 |
| | 513 | 577 | 641 | 705 |
| | 514 | 578 | 642 | 706 |
| | 515 | 579 | 643 | 707 |
| | 516 | 580 | 644 | 708 |
| | 517 | 581 | 645 | 709 |
| | 518 | 582 | 646 | 710 |
| | 519 | 583 | 647 | 711 |
| | 520 | 584 | 648 | 712 |
| | . . . | . . . | . . . | . . . |
| | 566 | 630 | 694 | 758 |
| | 567 | 631 | 695 | 759 |
| | . . . | . . . | . . . | . . . |
| | 575 | 639 | 703 | 767 |

SBID Physical View

In certain examples, each cycle one L1 slice could receive L2 stores, e.g., one per AGU port per cluster. In certain examples, one slice needs to be able to sink all of a plurality of (e.g., 12) stores because the memory does not know if the store belongs to this slice yet. In certain examples, in order to reduce the number of write ports to the SB structures and eliminate the Powerof2 SBID holes in the SB structure, SB is implemented in 12*4 banks, one per AGU port per cluster per strand.

In certain examples, the entry index within each SB bank={EntryID}.

SBID Deallocation

In certain examples, each slice needs to return the SBIDs from each strand, regardless of whether they were used by valid stores or not (dynamic/static holes). In certain examples, SBID deallocation relies on the store@alloc information provided by the Store Sequence Number (SSN) to return SBIDs as they complete (e.g., when they are moved into the SCB) or as the oo_oldest_sbid pointer moves (e.g., in the case of no valid stores in a strand/cluster).

In certain examples, to keep the implementation simple yet performant, SBID deallocation is broken into three examples (1, 2.1, and 2.2):

1. In certain examples, no stores are allocated in a given strand (or at all). If there are no stores allocated, there are no SSN entries whose SBID can be deallocated; MEM is to still return the SBIDs (which are all dynamic holes) in order to prevent OOO from stalling. When the SSN array is empty (i.e., no SSNs are waiting to write into the SCB) and oo_oldest_sbid-1 !=sbid_dealloc, all SBIDs between the previous sbid_dealloc value and oo_oldest_sbid-1 are returned (e.g., sbid_dealloc is set to oo_oldest_sbid-1).
2. In certain examples, at least one store is allocated that has not yet been written into the SCB (i.e., its SBID has not yet been deallocated). In this case, to avoid waiting to return dynamic holes until the oldest store is ready, MEM will return all SBIDs between sbid_dealloc and [not inclusive] (oldest_ssn_sbid OR oo_oldest_sbid), whichever is older. Choosing the older of oldest_ssn_sbid and oo_oldest_sbid is required to ensure safely returning dynamic holes in the presence of nukes/clears.

1. If oo_oldest_sbid is older than oldest_ssn_sbid, the SBIDs between these two pointers are dynamic holes which lie in the "nukeable" range, and therefore can't be returned at this time. However, every SBID up to an including oo_oldest_sbid-1 is safe to return.
2. If the oldest_ssn_sbid is older than oo_oldest_sbid, all SBIDs up to and including oldest_ssn_sbid-1 are safe to return.

Below are examples of several different cases of SBID deallocation.

Example Notes

1. The table values shown are the "before deallocation" values; the text below each table explains how to calculate the next value for sbid_dealloc.
2. A value of "TRUE" in the "SBID Valid" column indicates that the SSN is allocated but has not yet been moved into the SCB; a value of "FALSE" indicates that the SSN is either not allocated or the entry has already been moved into the SCB.
3. In all of these three examples, the SSB search window (for store coalescing) starts at SSN[3] and goes to SSN[10] (SSB_SEARCH_WINDOW=8).

TABLE 19

No SSNs with Valid SBIDs (no pre-SCB SSNs)-Example #1

| SSN # | SBID | SBID Valid | sbid_dealloc | 00_oldest_sbid |
|---|---|---|---|---|
| 0 | ~~w0s0c0ent0~~ | False | w1s2c3ent54 | w0s0c3ent0 |
| 1 | ~~w0s0c0ent1~~ | False | | |
| 2 | ~~w0s1c0ent0~~ | False | | |
| 3 | ~~w0s1c1ent0~~ | False | | |
| 4 | ~~w0s1c1ent1~~ | False | | |
| 5 | ~~w0s1c1ent2~~ | False | | |
| 6 | ~~w0s1c1ent4~~ | False | | |

In certain examples, the SSB_SEARCH_WINDOW starts at SSN[2]→SSN[9], but no valid stores are found. Since it is guaranteed that there are no in-flight stores older than oo_oldest_sbid, the next value of sbid_dealloc will be set to oo_oldest_sbid-1, which is w0s0c2ent54.

TABLE 20

Two SSNs with Valid SBID-Example #2.1

| SSN # | SBID | SBID Valid | sbid_dealloc | 00_oldest_sbid |
|---|---|---|---|---|
| 0 | ~~w0s0c0ent0~~ | False | w1s2c3ent54 | w0s0c3ent0 |
| 1 | ~~w0s0c0ent1~~ | False | | |
| 2 | w0s1c0ent0 | True | | |
| 3 | w0s1c1ent0 | True | | |
| 4 | ~~w0s1c1ent1~~ | False | | |
| 5 | ~~w0s1c1ent2~~ | False | | |
| 6 | ~~w0s1c1ent4~~ | False | | |

In certain examples, the SSB_SEARCH_WINDOW starts at SSN[2]→SSN[9], and two valid stores are found (SSN[2] and SSN[3]). Since the oldest SSN's associated SBID is younger than oo_oldest_sbid, MEM can't guarantee that the holes between oo_oldest_sbid and the store's SBID can be safely returned due to the possibility of nukes and clears. Therefore, the next value of sbid_dealloc will be w0s0c2ent54, which is the SBID before the one associated with oo_oldest_sbid.

TABLE 21

Two SSNs with Valid SBID-Example #2.2

| SSN # | SBID | SBID Valid | sbid_dealloc | 00_oldest_sbid |
|---|---|---|---|---|
| 0 | ~~w0s0c0ent0~~ | False | w1s2c3ent54 | w0s1c1ent0 |
| 1 | ~~w0s0c0ent1~~ | False | | |
| 2 | w0s1c0ent0 | True | | |
| 3 | w0s1c1ent0 | True | | |
| 4 | ~~w0s1c1ent1~~ | False | | |
| 5 | ~~w0s1c1ent2~~ | False | | |
| 6 | ~~w0s1c1ent4~~ | False | | |

In certain examples, the SSB_SEARCH_WINDOW starts at SSN[2]→SSN[9], and two valid stores are found (SSN[2] and SSN[3]). Since oldest SSN's associated SBID is older than oo_oldest_sbid, all the next value of sbid_dealloc will be w0s0c3ent54, which is the SBID before the one associated with SSN[2].

SBID Hole Mask

In certain examples, each slice keeps a (e.g., 768 bit) vector in which mask[SBID]=1 if the SBID is a design hole or a ClusterSwitch hole. In certain examples, a Cluster Switch packet is received by each slice to update the fields in the table. In certain examples, physically all SB entries all lopped through, and set the mask to 1 if the following condition is true. Note that the design static holes mask are tied to 1 and synthesis should optimize out any logic tracing back to the static holes.

mask[SBID]=1 if (SBID>ClusterSwitch.lastSBID) & SBID<SONS[ClusterSwitch.nextStrand-1]

In certain examples, the SBID hole mask is updated as follows (e.g., where all the SBID that are underlined have the mask set to 1).

TABLE 22

SBID Hole Mask-ClusterSwitch Example

| | Cluster0 | Cluster1 | Cluster2 | Cluster3 |
|---|---|---|---|---|
| Strand0 | 0 | 64 | 128 | 192 |
| | 1 | 65 | 129 | 193 |
| | 2 | 66 | 130 | 194 |
| | 3 | 67 | 131 | 195 |
| | 4 | 68 | 132 | 196 |
| | . . . | 69 | 133 | 197 |
| | 21 | 70 | 134 | 198 |
| | 22 | 71 | 135 | 199 |
| | 23 | 72 | 136 | 200 |
| | . . . | . . . | . . . | . . . |
| | 54 | 118 | 182 | 246 |
| | 55 | 119 | 183 | 247 |
| | . . . | . . . | . . . | . . . |
| | 63 | 127 | 191 | 255 |

In certain examples, this hole mask is only used for store forwarding to load from SB. In certain examples, the (e.g., 768b) mask vector is split into a plurality of (e.g., 12) tables, one for each port/cluster bank.

SSN

Certain memory circuitry herein utilizes a Store Sequence Number (SSN) to solve a potential issue in MEM store when only SBID is used: After a store is written into SCB, MEM releases its SBID and OOO is free to use it again; while this store could get stuck in SCB for a long time, the strand could wrap around twice, and the same SBID shows up again in MEM. In certain examples, MEM cannot distinguish these two stores with the same SBID (e.g., could come from a different slice) for TSO check.

In certain examples, the basic properties of SSN are:

Every store is assigned with an SSN at allocation time;

At nuke/clear, OOO sends a recovery SSN to rewind the MEM SSN to the last good store allocated;

Any real store (no static hole or dynamic hole) gets an SSN

MEM builds SSN to SBID and SBID to SSN mapping tables for conversion in between SSN and SBID since both SBID and SSN exist in MEM;

Store buffers are indexed with SBID

Store dealloc uses SBID

Senior store pipes use SSN

SSN-SBID Mapping Table

In certain examples, the number of entries=Number of real SBIDs (e.g., 576). In certain examples:

for timing reasons, number of entries is set to the closest power of 2 number

Index by SSN

Contains SBID allocated, ={11-1}b

Num of write ports: max number of store allocation (12)

Num of read ports: size of SSB search window (8)+6 (3 STApipeline*2 for early PA compare)

Install entry at store alloc time using OOO store@alloc packet

Note: In certain examples, there is a per entry valid bit for global store pipeline scheduling feature valid is cleared at reset, and when store is written into SCB, and when entry is cleared by nuke/clear valid is set when entry is installed Example 1: SSN 0-7 are assigned;

Example 2: Recovery SSN=3 is received. SSN 4-7 is cleared

Example 3: More stores are allocated. SSN assignment starts from SSN 4. SSN 4-7 are assigned again. This time to different SBIDs as in Example 1.

TABLE 23

SSN-SBID Mapping Table Examples 1-3

| Example 1: SSN-SBID Mapping Table (rewind) | | | Example 2: SSN-SBID Mapping Table (rewind) | | | Example 3: SSN-SBID Mapping Table (after rewind) | | |
|---|---|---|---|---|---|---|---|---|
| index | SBID | valid | index | SBID | valid | index | SBID | valid |
| 0 | 0 | 1 | 0 | 0 | 1 | 0 | 0 | 1 |
| 1 | 1 | 1 | 1 | 1 | 1 | 1 | 1 | 1 |
| 2 | 2 | 1 | 2 | 2 | 1 | 2 | 2 | 1 |
| 3 | 4 | 1 | 3 | 4 | 1 | 3 | 4 | 1 |
| 4 | 5 | 1 | 4 | 5 | 0 | 4 | 5 | 1 |
| 5 | 6 | 1 | 5 | 6 | 0 | 5 | 6 | 1 |
| 6 | 64 | 1 | 6 | 64 | 0 | 6 | 8 | 1 |
| 7 | 65 | 1 | 7 | 65 | 0 | 7 | 9 | 1 |

SBID-SSN Mapping Table

In certain examples, the number of entries=Number of possible SBIDs with static holes. In certain examples:

Index by SBID

Contains SSN allocated, =10b

Num of write ports: max number of store allocation (12)

Num of read ports: num of STA receipts (12)+3 (STApipe, early PA compare)

Install entry at store alloc time using OOO store@alloc packet Corresponding SBID-SSN Mapping table for Example 1-3 above:

TABLE 24

SBID-SSN Mapping Table Examples

| Example 1: SBID-SSN Mapping Table (before rewind) | | | Example 2: SBID-SSN Mapping Table (before rewind) | | | Example 3: SBID-SSN Mapping Table (before rewind) | | |
|---|---|---|---|---|---|---|---|---|
| index | SSN | valid | index | SSN | valid | index | SSN | valid |
| 0 | 0 | 1 | 0 | 0 | 1 | 0 | 0 | 1 |
| 1 | 1 | 1 | 1 | 1 | 1 | 1 | 1 | 1 |
| 2 | 2 | 1 | 2 | 2 | 1 | 2 | 2 | 1 |
| 3 | NA | NA | 3 | NA | NA | 3 | NA | NA |
| 4 | 3 | 1 | 4 | 3 | 1 | 4 | 3 | 1 |
| 5 | 4 | 1 | 5 | 4 | 0 | 5 | 4 | 1 |
| 6 | 5 | 1 | 6 | 5 | 0 | 6 | 5 | 1 |
| . . . | | | . . . | | | 7 | NA | NA |
| 64 | 6 | 1 | 64 | 6 | 0 | 8 | 6 | 1 |
| 65 | 7 | 1 | 65 | 7 | 0 | 9 | 7 | 1 |
| | | | | | | . . . | | |
| | | | | | | 64 | 6 | 0 |
| | | | | | | 65 | 7 | 0 |

Store@Allocation

In certain examples, a Store@Alloc packet reaches MEM crossbar boundary at a certain pipeline step (e.g., RA5) and is used to update the SSN-SBID/SBID-SSN tables after it has been flopped (e.g., by a certain number of (e.g., 3) cycles to cover resistor-capacitor (RC) delay from cross bar boundary to Store), e.g., in a later pipeline step (e.g., RA8). In certain examples, the first possible usage for the store is when the corresponding dispatchAGU (e.g., minimum 3 cycles later) is seen in MEM FL slice and gets into STA pipeline via bypass stage. The SSN mapping tables are used in STA pipeline (e.g., FST2) where early physical address (PA) compare is done. In certain examples, the first possible usage for load in when the corresponding load's (e.g., with store color==the store@alloc in question; load could be allocated in the same cycle as the store) dispatchAGU (e.g., minimum 3 cycles later) is seen in MEM FL slice and gets into load pipeline via bypass stage. In certain examples, the SSN mapping tables are used to recycle the load if needed.

Tables 25.1-25.3 below show StoreAlloc vs STA.

TABLE 25.1

| store @ alloc packet | ra2 | ra3 | ra4 | ra5 (xbar-MEM boundary) |
|---|---|---|---|---|
| store_alloc receipt | valid maybe early ra2 | | valid at end of ra4 | |
| dispatchAGU-STA receipt/stapipe Idpipe | | | ra4/rq0 | rq1 |

TABLE 25.2

| store @ alloc packet | ra6 (reach the other side of xbar) | ra7 (reach SB) | ra8 |
|---|---|---|---|
| store_alloc receipt | | | update SSN tables |
| dispatchAGU-STA receipt/stapipe | rs1 | rs2 | rs3(xbar-MEM boundary) mid cycle |
| Idpipe | | rs2 | rs3(xbar-MEM boundary) mid cycle |

TABLE 25.3

| store @ alloc packet | ra9 | | | |
|---|---|---|---|---|
| store_alloc receipt | SSN valid | | | |
| dispatchAGU-STA receipt/stapipe | rs4 (reach the other side of xbar) | fsr1/ fst1 | fsr2/fst2 early PA compare uses SSN tables | fsr3/ fst3 |
| Idpipe | rs4 (reach the other side of xbar) | fld1 | fld2 load is recycled (blockcode_none) on store | fld3 |

Store (e.g., STA) Pipeline Arbitration

In certain examples, there are a plurality of (e.g., 3) STA pipes in each L1 Slice. In certain examples, STAs are bound to an internal L1 MEM slice pipeline by SBID. In certain examples, for each STA pipe, there is arbitration to select between a number of agents that can make requests. Example requests are shown in an example priority order below:

Stores from the STA Scheduling pipeline
Stores from the STA Receipt skid
Stores from the STA Receipt bypass Pipelines In certain examples, each slice of L1 MEM has its own set of one or more of the following pipelines:

Load Receipt Pipeline—Receives load dispatch and AGU payloads from OOO & EXE and writes the payload into an ICLB entry.

ICLB Scheduling Pipeline—Chooses oldest ready load on a load port from the ICLB and tries to schedule it into the load pipeline.

Load Pipeline—The main load pipeline in L1 MEM to execute a load and write back its results.

Store Address Receipt Pipeline—Receives store address pop payloads and writes them into the store address buffer.

SAB Scheduling Pipeline—Chooses oldest ready STA on a STA port from the SAB and tries to schedule it into the store address pipeline.

Store Data Pipeline—Receives store data payload and writes it into the store data buffer.

Store Address Pipeline—The main store address pipeline in L1 MEM to execute a STA pop and writeback complete to the OOO.

Store Coalescing Pipeline—Takes retired stores from the store buffer and coalesces them into the SCB in preparation for writing to memory.

Store Write Pipeline—Takes SCB entries and writes them into the data cache or a fill buffer.

DCU Fill Pipeline—Takes data from a fill buffer and fills it into the DCU, and moves modified data from the DCU into the eviction buffer.

L1 Interface

Figure 5:
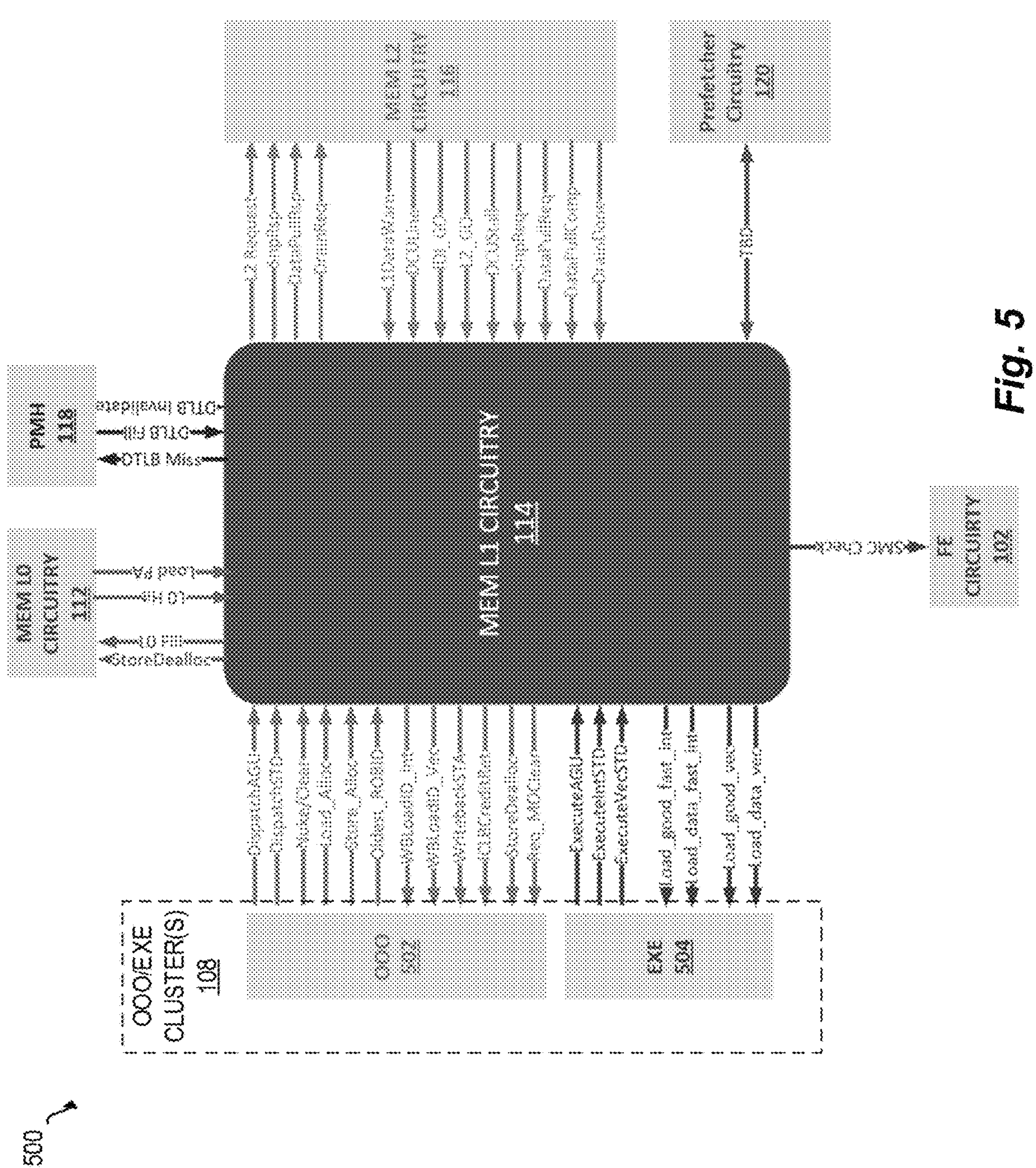
FIG. 5 illustrates interface couplings for the level (e.g., L1) of memory circuitry that is sliced according to address values according to examples of the disclosure.

FIG. 5 illustrates interface 500 couplings for the level (e.g., L1) of memory circuitry 114 that is sliced according to address values according to examples of the disclosure. Depicted interface 500 includes couplings between MEM L1 circuitry 114 and OOO circuitry 502, EXE circuitry 504 (which may cumulatively be an OOO/EXE cluster 108), MEM L0 circuitry 112, PMH circuitry 118, MEM L2 circuitry 116, and prefetcher circuitry 120.

L1 MEM<—>EXE/OOO

ExecuteAGU: In certain examples, EXE 504 communicates the result of the Load or STA pop after Address Generation Unit (AGU) is executed. In certain examples, ExecuteAGU indication (e.g., value) arrives at the MEM L1 114 (e.g., one cycle) after DispatchAGU indication (e.g., value) and MEM L1 114 obtains the LBID or SBID of the pop from the DispatchAGU interface. In certain examples, there are multiple (e.g., 4) Load and multiple (e.g., 3) STA ExecuteAGUs in each of the (e.g., 4) EXE clusters.

ExecuteIntSTD: In certain examples, EXE 504 communicates the result of one STD pop with the corresponding data payload to MEM L1 114. In certain examples, ExecuteSTD indication (e.g., value) arrives at the MEM L1 114 interface (e.g., one cycle) after DispatchSTD indication (e.g., value) and therefore MEM L1 114 knows the SBID of the STD pop. In certain examples, there are a plurality of (e.g., 3) ExecuteSTD interfaces in each of the (e.g., 4) EXE clusters.

ExecuteVecSTD: In certain examples, the vector cluster (e.g., vector cluster 106-0 and/or vector cluster 106-1 in FIG. 1) communicates with the OOO INT/MEM (e.g., OOO 502) cluster for vector STD operations. In certain examples, in order to reduce the indication sent (e.g., and wires) to MEM L1 114, the upper (e.g., 64-bits) goes directly to the L1 interface while the lower half is sent to the INT/MEM cluster to use the INT STD interface. In certain examples, the cluster is found by using the strand ID of the Vec STD. In certain examples, since the VEC and INT clusters have the same number of ports for STDs, they map to the appropriate one. In certain examples, where the pipeline alignment between the INT and VEC clusters is fixed, the SBID or other identifying information does not need to be sent by EXE with the data.

L1 MEM<—>L0 MEM

In certain examples, L1 slices are responsible for filling data in the L0 cache. In certain examples, each L1 slice can have at most one fill to L0 in flight, and the slice will fill all L0 clusters' data caches. In certain examples, an L1 slice will broadcast a cache line to all L0 clusters, e.g., over multiple cycles. In certain examples, each L0 cluster will accumulate cache line chunks into a Fill Buffer entry dedicated to that L1 slice until it receives all the chunks of the cache line, e.g., then write the entire cache line to the L0 cache.

L1 MEM<—>L2 MEM

In certain examples, the L1 MEM (e.g., first level cache (FL)) may send the L2 MEM (e.g., second level cache (SL)) up to a number of (e.g., 4) DCU Miss requests (e.g., per the format in Table 26) per cycle. In certain examples, the request ports are divided (e.g., into 4) based on (e.g., bits [7:6]) of the physical address. In certain examples, in this way each FL slice is paired with a single SL slice, and there is 1 request port per FL and SL slice pair, e.g., there may be up to 1 request issued per cycle per slice. In certain examples, as long as the FL slice is not receiving a stall signal from its paired SL slice, it is free to issue a DCU Miss request that cycle. In certain examples, the FL is to provide data to the SL, such as, but not limited to, DCU evictions, Snoop data, and UC/USWC writes. In certain of these cases, once the SL is ready it will send a data pull request (or datapull_req) to the FL, and the FL is to respond with the data in a data pull response (or datapull_resp) message. In certain examples, the SL will send a data pull complete (or datapull_comp) message to the FL when the data pull has successfully completed.

In certain examples, to prevent FL request from overrunning the SLQ, the SL will send a DCU Stall signal to the FL, e.g., when asserted, the FL may send any valid request on the DCU Miss interface.

In certain examples, DCU (e.g., DCU 148 in L1 Slice 114-0 in FIG. 3) miss requests have a globally observed (GO) line state returned along with the data or with no data, e.g., in the case of write or data-less requests. In certain examples, in the case of the DCU miss request missing the SL (e.g., MEM L2 circuitry 116), the GO comes from the IDI. In certain examples, in the case of the DCU miss request hitting the SL, the GO comes from the SL. In certain examples, to keep two GOs from colliding, each GO source has its own bus to the FL. In certain examples, when there is a miss at the second level cache (e.g., MEM L2 circuitry 116), memory circuitry 104 allocates a transaction queue buffer (XQ) to service the miss and request the cache line from IDI. In certain examples, the L2GO message is for the DCU miss requests that hit the SL or promoted onto a transaction queue (XQ) GP entry with a valid GO already received from IDI. In certain examples, each DCU miss request is to only receive a single GO message. In certain examples, the DCU Stall signals are divided (e.g., into 4) based on (e.g., bits [7:6]) of the physical address. In certain examples, in this way each FL slice is paired with a single SL slice, and there is one DCU Stall signal per FL and SL slice pair.

In certain examples, the SL responds to DCU cache misses with (e.g., whole or (e.g., 16B) partial) cache lines of data. In certain examples, chunk valid bits indicate which (e.g., 16B) chunks are valid in the data return. In certain examples, IDI returns data in larger (e.g., 32B) pieces, and, in order to send the FL data at the earliest possible time, the SL may send the same DCU miss a plurality of (e.g., up to 2) data return messages. In certain examples, if SL does send two data return messages, the chunk valid indications for the messages cannot overlap.

In certain examples, the SL may send FL multiple (e.g., up to 4) DCU Line responses (e.g., according to the format in Table 27) per cycle. In certain examples, the response ports are divided (e.g., into 4) based on (e.g., bits [7:6] of) the physical address. In certain examples, tin this way each FL slice is paired with a single SL slice, and there is 1 response port per FL and SL slice pair. In certain examples, there may be up to 1 response issued per cycle per slice.

TABLE 26

Example Fields of the DCU Miss Request Packet

| Name | Size | Description |
|---|---|---|
| valid | 1-bit | Valid bit indicates whether there is a packet in the interface in the current cycle. |
| req_id | 5-bits | Entry ID of FB/EVB that will be returned with the response, so that the FL can map the response. |
| phys_line | 46-bits | Physical address of line being requested. Full byte address required for UC request. E.g., sub-Cache line [51:5] address required for cacheable requests. |
| req_type | 6-bits | Request type code. E.g., Data_Read, Data_Read_UC, Data_RFO. |
| req_size | 6-bits | The size in bytes of the request (used for uncacheable requests) |
| self_snoop | 1-bit | FL request needs self-snoop (uncacheables or RFOs which found cache entry in shared state) |
| attr_bits | x-bit | Additional attribute bits needed for the SL Req (placeholder) |
| C6_bit | 1-bit | Indicates the request needs to go to the C6 array |

TABLE 27

| Example Fields of the DCU Line Response Packet | | |
|---|---|---|
| Name | Size | Description |
| valid | 1-bit | Valid bit indicates whether there is a packet in the interface in the current cycle. |
| req_id | 5-bits | Entry ID of FB that sent the DCU miss request to the SL. |
| pre_bits | 7-bits | Performance monitoring info sent for requests with no data response, |
| chunk_valids | 4-bits | Indicates if a (e.g., 16B) data chunk is valid. |
| cacheline_bytes | 512-bits | One cache line worth of data. |
| poison | 2-bit | Indicates if the returned data is poisoned or not. |

L1 MEM<—>PMH Circuitry

In certain examples, each slice of L1 MEM has a DTLB miss interface to the PMH circuitry. In certain examples, this is used when there is a DTLB miss and the STLB/PMH is used to perform Page Translation. In certain examples, only one request can be sent per cycle per slice.

In certain examples, DTLB misses in L1 MEM are collected in a Translation Request Buffer (TRB) (see FIG. 10) and sent to the PMH circuitry. In certain examples, the PMH circuitry maintains guaranteed storage for the translation requests in the STLBQ, e.g., where the PMH is guaranteed to sink any translation requests sent to the PMH. In certain examples, there is a 1:1 mapping between the TRB entry ID and STLBQ entry ID for each slice.

In certain examples, the PMH keeps a primary copy of the DTLB in order to keep all of the slice DTLBs synchronized and make centralized victim selection decisions. In certain examples, the PMH circuitry is responsible for checking that there are no duplicates filled in the DTLB. In certain examples, all slice DTLBs (e.g., and prefetcher DTLB) are copies of the Primary DTLB and they are identical to each other.

L1 Aggregator

In certain examples, the ICLB credit return aggregator manages the credit returns from the individual slices, e.g., and produces a single increment count to OOO every cycle. In certain examples, this logic ensures that no slice overruns its ICLB partition, while also retuning credits to OOO as soon as possible in the pipeline. In certain examples, the credits are managed on a per port per cluster basis. In certain examples, the OOO has no concept of MEM's slices with regard to the ICLB credits.

Figure 6:
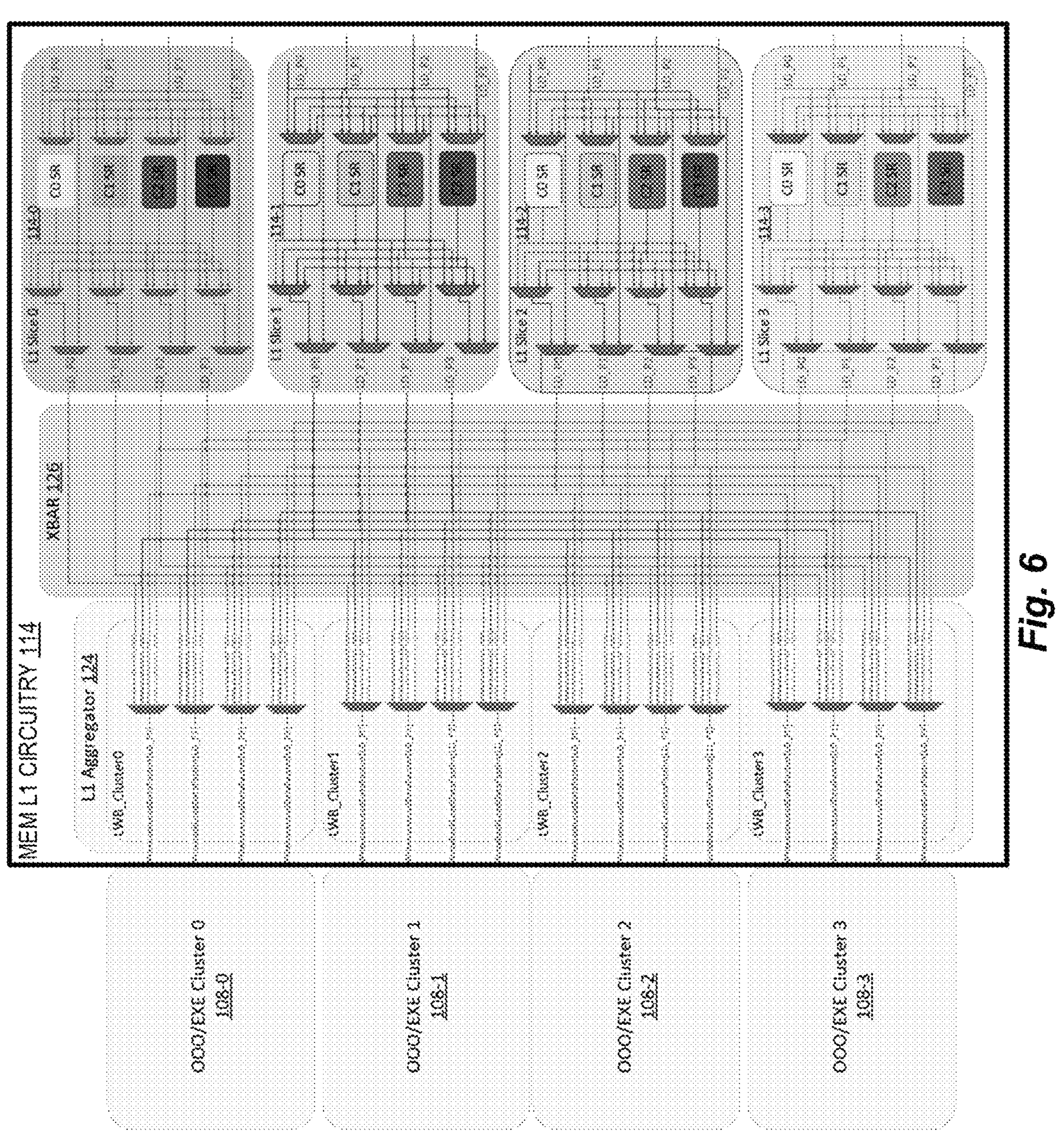
FIG. 6 illustrates a more detailed block diagram of the level (e.g., L1) of memory circuitry that is sliced according to address values and includes an aggregator according to examples of the disclosure.

FIG. 6 illustrates a more detailed block diagram of the level (e.g., L1) of memory circuitry that is sliced according to address values and includes an aggregator 124 according to examples of the disclosure.

FIG. 7 illustrates a timing diagram 700 for incomplete load buffer (ICLB) credit returns according to examples of the disclosure.

Number of Credits

In certain examples, loads consume their ICLB credit at dispatch (e.g., in stage RS2). In certain examples, where OOO does not know which slice a load is destined for at dispatch, the MEM L1 circuitry 114 (e.g., L1 aggregator 124) only maintain a credit pool of a certain number (e.g., 9) credits per cluster per port, e.g., not per slice.

In certain examples, once an individual slice fills up its ICLB partition, that OOO cannot send any more loads to that port, since there is no way to avoid overrun of the full slice after the slice destination is known. In certain examples, there is only ever one full slice in a cluster/port. In certain examples, this leads to the fact that a cluster can never completely fill up all ICLB storage across all slices, e.g., the maximum capacity is achieved by having max-1 entries per slice and then the next load fills up one slice, which stops OOO from sending further loads. In certain examples, the effective number of ICLB entries is 9 entries/slice/port/cluster*4 slices−3=29 per port per cluster.

Credit Return Cycle

In certain examples, a credit can be returned in either of two places in the pipeline depending on the state of the slice's credits:

- at AGU-time: agu_credit_return in AGU (e.g., stage IX2/RS4 in FIG. 7)
- at writeback: wb_credit_return (e.g., stage FLD5 in FIG. 7)

ICLB Crediting Algorithm

In certain examples, if a load maps to a slice with the minimum number of available credits, or the ICLB is empty, then it does not return the credit at AGU (agu_credit_return) and instead this credit is returned at writeback (wb_credit_return, e.g., in fld5). In certain examples, this covers the case where all loads map to one slice and use all the entries.

In certain examples, if a load maps to a non-minimum slice, then return the credit after AGU (agu_credit_return, e.g., in rs6/flr2). In certain examples, this is acceptable because buffer-overrun is protected by the WB-credit held by the minimum slice.

In certain examples, the aggregator prevents the credit return at writeback if more than one slice has the minimum number of available entries. In certain examples, the other slice(s) will inherit the responsibility for that credit. In certain examples, it is possible that a load has already issued an agu_credit_return, and then inherits a second credit to return at writeback due to the composition of the slices. In certain examples, the minimum slice indication is gained by a slice or passed to a slice, e.g., when a slice decrements its avail count and as a result it alone has the minimum count, then it is the minimum slice, or if the minimum slice increments its avail count and no longer has the minimum count, then the minimum slice is passed to the next incremental slice. In certain examples, it will always be true that ooo_cnt+wb_credit+wb_credit_return=entries per slice. In certain examples, both L0 and L1 pipes are aligned and parallel at the AGU stage. In certain examples, the return algorithm is performed at AGU+2, which is aligned for both pipes, or in writeback stage of the L1 pipeline.

In certain examples (e.g., in a given cycle), one MEM slice can receive up to a threshold number of loads (e.g., 16 loads from 4 clusters*4 AGU ports). In certain examples, loads dispatched to MEM are to allocate an entry in the Incomplete Load Buffer (ICLB) to enable redispatch if they failed to complete MEM pipeline on first pass. In certain examples, to simplify allocation and pipeline arbitration, ICLB will be partitioned into multiple (e.g., 16) banks, e.g., by cluster and AGU port. In certain examples, loads will stay in the ICLB until they complete the MEM pipeline. In certain examples, the ICLB is a credited structure. In certain examples, where OOO does not know at dispatch time which slice the load will map to, it can dispatch a load pop only if there is an empty entry for it in the ICLB in all slices. In certain examples, there are total of 144 ICLB entries, e.g., 9 entries per cluster and AGU port. In certain examples, ICLB entry is allocated by Load receipt pipeline and updated/deallocated by main load pipeline. In certain examples, ICLB entries are read by ICLB scheduling pipeline.

Table 28 below shows example fields in an ICLB.

TABLE 28

| ICLB Entry Bits | | | | |
|---|---|---|---|---|
| Sub-type | Signal name | Width | Description | Execution Priority |
| Static bits | | | | |
| | pdst | 11 | μop's PDST | Foundation 1 |
| | robid with wrap | 13 | μop's ROBID | Foundation 1 |
| | glbid with wrap | 12 | μop's GLB ID | Foundation 1 |
| | sbid with wrap | 11 | μop's store color | Foundation 1 |
| | opcode | 10 | mem opcode | Foundation 1 |
| | osize | 3 | access size in bytes | Foundation 1 |
| | is_vector | 1 | Pdst is vector | Foundation 2 |
| | is_lock | 1 | is lock | Foundation 2 |
| | is_physical | | Physical μop | Foundation 2 |
| | is_xlate | 1 | Bypass TLB | Foundation 2 |
| | SmapOv | 1 | SMAP Override (Fault calculation) | Phase 3/IPC |
| | Limit4G | | limiting linear address space to 4Gigabytes. If this bit is set, the MOB will do split address increment on lower 32 bit linear address only. | Foundation 2 |
| | supervisor | 1 | Supervisor access (Fault calculation) | Phase 3/IPC |
| | streaming | | predicate call-Is this a streaming pop (MOVNTA or USWC memtype) | Foundation 2 |
| | split_lo | 1 | decoded to be low half of split operation in FLS pipeline | Foundation 2 |
| | split_hi | | decoded to be high half of split operation in FLS pipeline | Foundation 2 |
| Dynamic bits | | | | |
| | valid | 1 | Entry is Valid | Foundation 1 |
| | pav | | Physical address valid | Foundation 1 |
| | 10_pred_hit | 1 | Load was predicted to be L0 hit. Do not schedule into L1 pipeline until bit is reset (in the case of incorrect prediction) | Foundation 2 |
| | arb_rdy | 1 | Entry is ready to arbitrate | Foundation 1 |
| | BlkCode | 4 | 4 bits of block code (why is the load blocked from completion) | Foundation 1 |
| | blkid | 11 | What is the Load waiting on (STID, fbID, PMHID etc.) | Foundation 1 |
| | esbid | 11 | Enhanced Lnet SBID | Foundation 2 |
| | fb_id | 4 | FB ID allocated by this Load | Foundation 2 |
| | fb_useonce_val | | FB allocated by use_once Load | Foundation 2 |
| | ag_fault | | Load had an AGU fault | Foundation 2 |
| | pg_fault | | Placeholder bit-Load had a Page fault | Phase 3/IPC |
| | trap | 1 | Placeholder bit-Load had a trap | Phase 3/IPC |
| | memtype | 3 | memtype for TLB bypass pops or for implementing a general memtype mechanism | Foundation 2 |
| | LegacyPgSpl | | When speculative Page splits go wrong, revert to at_ret page splits | Foundation 2 |
| | gtran_fin | | PMH walk finished, used by tickle uops in pipeline to track page walk completion for page splits | Foundation 2 |
| | whps | 1 | without home prefetch sent | Foundation 2 |
| | split_lo_dn | 1 | Indication to split_hi that split_lo has completed successfully in the load pipeline. | Foundation 2 |
| | split_fault | | Used by both split lo and split_hi, Indicates that the pair operation has faulted. | Foundation 2 |
| | split_hi_flt_chk | 1 | Indication to split lo that split_hi faults have been checked and split_fault populated. | Foundation 2 |

TABLE 28-continued

ICLB Entry Bits

| Sub-type | Signal name | Width | Description | Execution Priority |
|---|---|---|---|---|
| | sr_alloc | 1 | Indication that a split_lo operation bas allocated an SR from the shared pool. | Foundation 2 |
| | sr_eid[2:0] | 3 | SR entry ID | Foundation 2 |
| | perfmon_bits | 3 | Performance monitoring | Phase4/ Functional |
| MD/MRN/ predictors | | | | |
| | CEIP | 12 | CEIP used for prefetcher and other predictor training | Foundation 2 |
| | Store Set ID | 8 | MAD Store Set ID (don't pass stores with matching ID) | Foundation 2 |
| | md_attributes | 3 | Memory disambiguation attributes (can a load pass unknown store etc.) | Foundation 2 |
| | mrn_attributes | 7 | MRN type NOTMRNABLE, ISMRNABLE. MRNPROBE, MRNCHECK), MRN register ID (4) | Phase 3/IPC |
| Linear address | | | | |
| | addr_pa_tag | 39 | Linear address at allocation, replace with PA, once we have TLB hit (could change in foundation2) | Foundation 1 |
| | addr_la_tag | 44 | Linear tag bits, written at allocation and kept until dealloc (needed for L0 fills) | Foundation 2 |
| | index | 7 | Cache index | Foundation 1 |
| | bank | 4 | bank offset | Foundation 1 |
| | offset | 2 | cache line offset | Foundation 1 |
| | Linear address end | 7 | Linear address end for cache line offset | Foundation 1 |
| | Total Bits | 257 | | |

ICLB Allocation

In certain examples, an ICLB entry is allocated after a new load pop that is received by an L1 MEM slice determines that it belongs to this current slice. In certain examples, loads that were predicted hits in L0 and actually hit in L0 will be written into ICLB and then removed from ICLB (e.g., two cycles later) when the load L0 hit information arrives. In certain examples, up to 16 ICLB entries can be allocated per cycle, one per each bank. In certain examples, each bank only has one write port for the static portion of the ICLB entry. In certain examples, allocation is done by finding first not valid entry within each of the (e.g., 16) ICLB banks. In certain examples, an age matrix is also updated on ICLB allocation.

ICLB Block Code Update

In certain examples, block codes and block code IDs are calculated based on load pipeline events. In certain examples, e.g., by the middle of fld4, it is determined if the load will need to recycle. In certain examples, e.g., in the second half of fld4, the raw recycle/block signals will be prioritized to generate one block code and the correct block ID (wherever applicable). In certain examples, a (e.g., fld5) cycle is allocated to cover any RC delay to travel to ICLB and/or any ICLB update computation that might not fit in second half of fld4.

ICLB Deallocation

In certain examples, there are two sources of ICLB deallocation: load completing its course through L1 MEM, and loads nuked or cleared by OOO. In certain examples, ICLB deallocation is simpler to compute than ICLB updates. In certain examples, any load that is signaling write back valid (e.g., in the middle of fld4) can deallocate its ICLB entry. In certain examples, this can be due to writing back valid data, pop completing load pipeline without returning data (e.g., fences), or load completing with a fault. In certain examples, a plurality of (e.g., up to 4) ICLB entries can be deallocated in a cycle due to loads completing L1 MEM pipeline. In certain examples, a stage (e.g., fld5) has been reserved for any RC delay to ICLB, so deallocation will match ICLB update timing, e.g., hence ICLB entry will have valid=0 in a later stage (e.g., fld6). In certain examples, for ICLB entries deallocated due to nukes and clears, there is no maximum number of entries that can be deallocated. For example, where a nuke will clear all valid ICLB entries.

ICLB Wakeup

In certain examples, loads that are blocked due to memory ordering constraints or resource limitations in the L1 pipeline are put to sleep in the ICLB buffer. In certain examples, these loads will need to be re-issued to complete. In certain examples, these loads will go through the Load ICLB scheduling pipeline to determine when the blocked entries should be woken up and scheduled on the L1 MEM load pipelines. In certain examples, for loads that are sleeping on a block_code, there is a stage (e.g., fls1) in which wakeup events are checked against each entry's block_code and block_id. In certain examples, if the wakeup events match the block_code and block_id matches the wakeup_event_id (for example a load is sleeping on a specific fill buffer, and that fill buffer receives data), the block_code will be updated in the next cycle to NONE.

GLB (Global Load Buffer)

In certain examples, loads are assigned a global load buffer (GLB) (e.g., GLB 132 in FIG. 9) entry at allocate by OOO. In certain examples, the GLB is broken into multiple (e.g., 16) banks (e.g., per cluster per AGU port) such that each bank only has 1 write port for static bits. In certain examples, dynamic bits can be updated either by loads completing in L0 or loads completing in L1, e.g., and thus using two write ports. For example, a load can be going through L1 pipeline (e.g., scheduled from ICLB) and getting a DTLB translation around the same time as a load is going through L0 pipeline and hitting L0 cache and ZTLB, as these two loads can be from the same cluster and same port, the GLB dynamic/address bits is to support two loads updating the same GLB bank in certain examples.

In certain examples, the full GLB is replicated in each slice. In certain examples, only entries that are valid in that slice mark the valid bit asserted. In certain examples, once load dispatch+agu is received by a slice and linear address of the load is known, that slice's GLB entry will be marked valid. In certain examples, the GLB is written one cycle after the ICLB to allow a cycle of RC to reach the location of the GLB.

Split Data Support with Sliced Memory

In certain examples, a cache line is split between two (e.g., adjacent) slices. In certain examples, split operations have two parts: split low half that covers from the starting address to the cache line boundary, and split high half that covers from the next cache line boundary to the end of the operation size.

Figure 8:
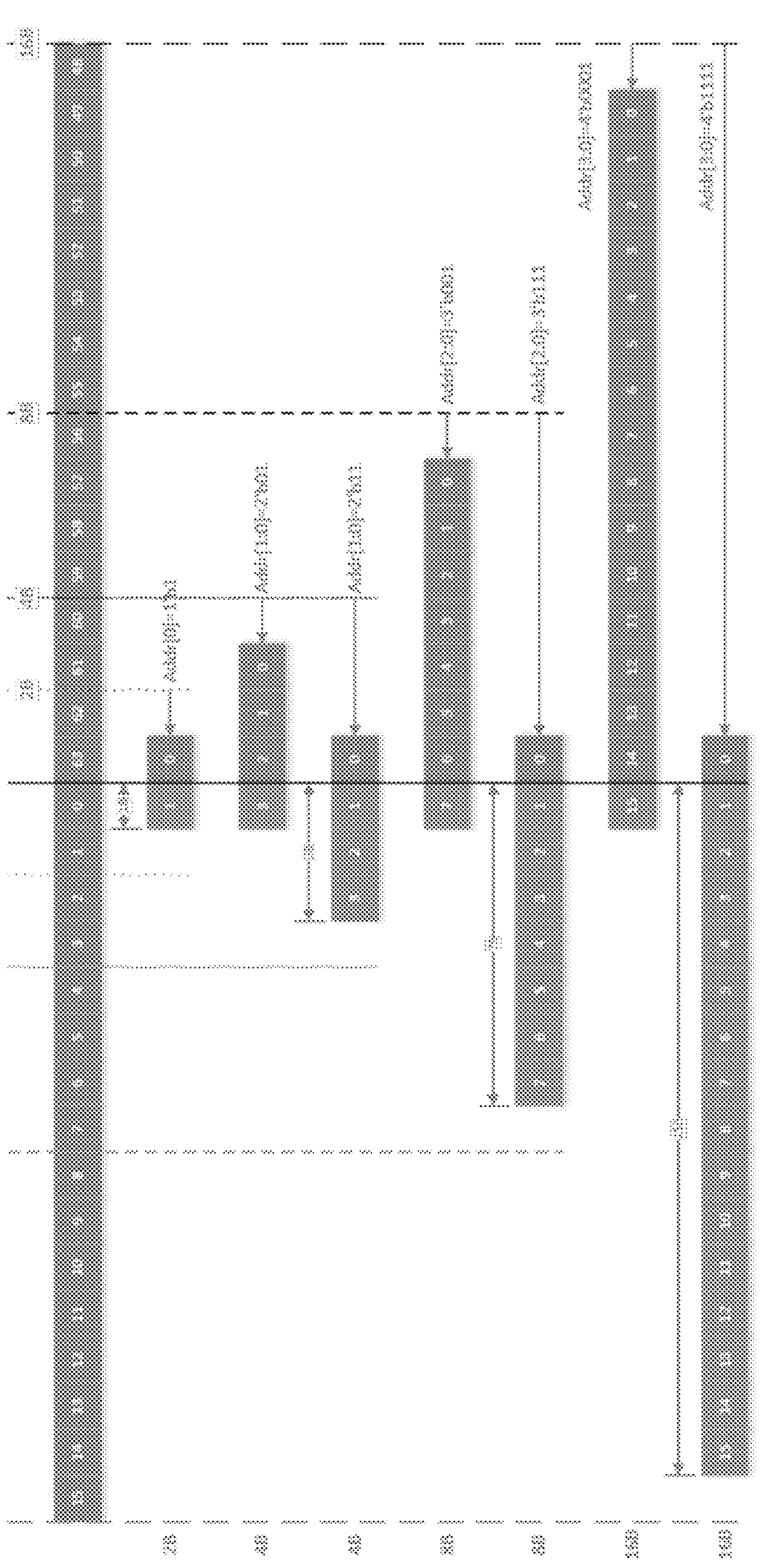
FIG. 8 illustrates alignments for split data according to examples of the disclosure.

FIG. 8 illustrates alignments for split data according to examples of the disclosure. For example, with the "split high" in green on the left of the black line and the split low on the right of the black line in blue.

In certain examples, one or more of the following are imposed on handling operations on a "split" cache line. In certain examples, the high half and low half of the split operation execute on adjacent slices. In certain examples, by their nature, split operations access two consecutive cache lines, and in certain of those, the MEM interleave the slices by low-order cache line address (e.g., [7:6])(, for example, where if the low half executes on slice n, then the high half executes on slice (n+1)% NUM_SLICES. In certain examples, the low half is to appear to occur before (or at same time) as the high half of the split operation. In certain examples, the low half load is to bind to data (and be snoopable) before high half load. In certain examples, low is to receive a page translation before high in general, e.g., to not have a software visible high half before low half. In certain examples, the low half store is to be GO before high half store is GO. In certain examples, low and high are not required to have identical page translations. In certain examples, split_hi cannot write the PA in to the ICLB until split_lo hits in the DTLB.

Loads

Figure 9:
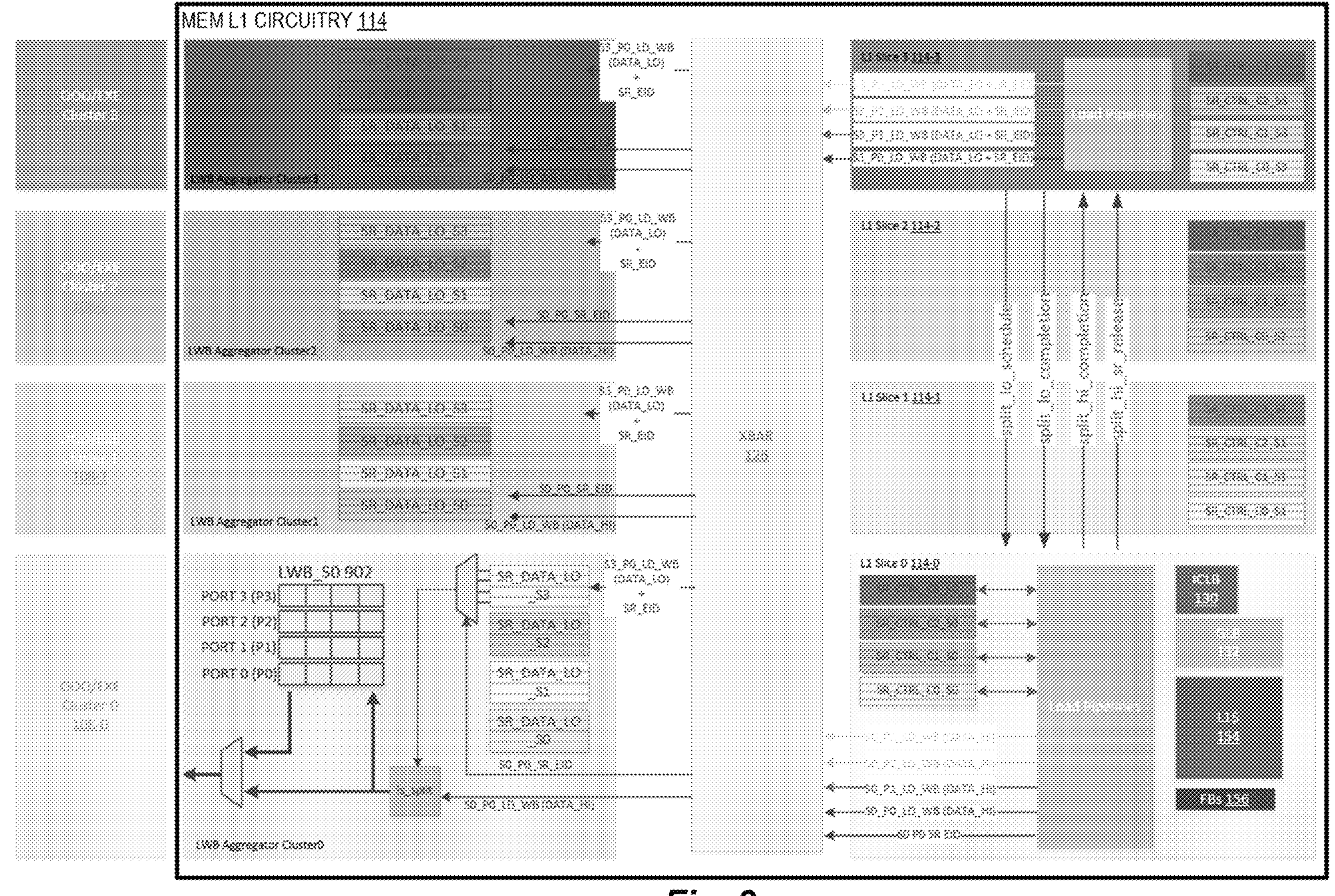
FIG. 9 illustrates load writeback split register (SR) data paths in the level (e.g., L1) of memory circuitry that is sliced according to address values according to examples of the disclosure.

In certain examples, split loads are completed using the Split Register (SR). Examples of split registers are shown in FIGS. 6 and 9. In certain examples, a SR holds a portion of (e.g., the low half) data for use by the other portion (e.g., high half) operation. In certain examples, the low half is scheduled first and populates the correct bytes into the SR, but does not writeback (WB) to execution. In certain examples, the low half communicates to its slice neighbor (e.g., storing the high half of the data) the SR and the scheduling and completion information needed to control the high half. In certain examples, once the high half is allowed to complete (relative to the low half) then it selects the split-low data off of the SR and on to the WB wires back to execution.

In certain examples, if the low half is determined to be uncacheable (UC) memory type, then the MEM circuitry cannot execute the split_lo load until the split-hi fault(s) have been checked. In certain examples, when a split_lo is found to be UC, then it fails in the load pipeline and waits for the split_hi to communicate the fault info. In certain examples, after that point the split_lo can schedule again and either complete or report the fault (through split_hi).

In certain examples:

1. split pops are decoded in 2nd half of FLR1
2. split low schedules from bypass/skid/ICLB
3. split high is blocked from bypass/skid and waits in ICLB
4. split low allocates an SR from the pool per slice per cluster in FLD2
5. split low communicates the SR information to the slice neighbor
6. split low completes the address translation gets the memory type
   a. if UC then suppress load_good and wait in ICLB until at_ret
   b. then schedule again and wait until split_hi faults checked
7. split high schedules from the ICLB
8. split high completes the address translation, gets the memory type, and collects fault information
9. split high communicates the fault condition to slice neighbor and sets the ICLB.[split_hi_flk_chk, split_fault] bits in split_lo
10. split high does not WB and suppresses load_good (since split low did not complete successfully)
11. split high unblocks split_lo and it arbitrates for the load pipe
12. split low schedules from ICLB and reads the split_hi fault bit from the ICLB
13. split low completes in the load pipe
14. split low communicates load pipeline completion information to slice neighbor
15. split high completes in the load pipeline and reports any faults on behalf of split_lo
16. split high communicates load pipeline completion information to slice neighbor
17. split low deallocates the SR Stores In certain examples, the same schedule and completion interfaces for loads is used to handle stores (e.g., faults). In certain examples, both split_lo and split_hi retire at the same time and the store write logic properly orders the split ops for GO or cache write.

In certain examples, if the low half is determined to be UC memory type, the MEM circuitry cannot execute the split_lo store until the split-hi faults have been checked. In certain examples, when a split_lo is found to be UC, then it blocks in the STA pipeline and waits for the split_hi to communicate the fault info. In certain examples, after that point the split_lo can schedule again and either get a translation or report the fault to split_hi.

In certain examples:

1. split pops are decoded in 1st half of FSR1
2. split pops execute STA in each slice
3. split low schedules on the STA pipeline and communicates to slice neighbor 4. split high is allowed to schedule on the STA pipeline after split low schedules
5. split low communicates completion information to slice neighbor
6. split high is allowed to complete only if split low has successfully completed
7. split store is written in to SCB and popped according to the rules below
8. split high and split low order themselves in the swpipeline validate stage
9. split low/high broadcast split-information in broadcast packet
10. every slice determines if slice-neighbor has split and its success
11. split low completes in swpipeline according to the rules below
12. split high cannot complete if slice-neighbor has split low
    a. or if flag isn't set Split Load Support In certain examples, split load operations are executed by specifically controlling the scheduling of the split_lo and split_hi ops relative to each other. In certain examples, a Split Register (SR), which is remote of the slices, is used to hold the split_lo data for the split_hi op to pick up sometime later.

Split Load Dispatch

In certain examples, a split operation has 1 RS dispatch to 2 different MEM slices. In certain examples, each slice uses the ExecuteAGU packet to determine if the load is a split high or low half by examining the "is_split" and linear address (linadr) (e.g., [7:6]) bits. In certain examples, both the split high and split low half use the same port for each MEM slice. In certain examples, each slice detects lo/hi after address generation. In certain examples, the calculation is done in MEM FLR1 after the agu_xbar in the 2nd half of the cycle.

In certain examples:

split_lo=is_split & (linadr[7:6]==slice_id)

split_hi=is_split & (linadr[7:6]==(slice_id[1:0]-2'b1)% NUM_SLICES)

Note this is subtracting from the slice_id, instead of incrementing the linadr. In certain examples, this is done for timing concerns on linadr, and given that slice_id is a constant the calculation should be easy to perform there.

In certain examples, there are restrictions placed on split-loads during dispatch, for example, that split_lo can take the bypass or skid to the load pipe, but split_hi cannot, and/or that both split_hi and split_lo are prevented from issuing the wake-up from the aggregator at load dispatch. In certain examples, split loads use the is_split indication from the ExecuteAGU packet to suppress the wake-up in the aggregator. In certain examples, both split operations are to respond to an AGU cancel event. In certain examples, to prevent the split_hi op from arbitrating for the load pipeline, it is to be written in to the ICLB with a block code of SPLIT_WAIT. In certain examples, the split_hi slice is unaware of when the split_lo op can schedule, so split_hi is to block until it receives the split_lo scheduling message. In certain examples, a term is added to iclb_wakeup_mnnnh to account for iclb_blkcode_mnnnh==SPLIT_WAIT and a valid message on the split_lo scheduling interface.

Split Address and Osize

In certain examples, the split_lo load address is just the address of the load, however the end address needs adjustment to point to the last byte in the cache line. In certain examples, the address of the split_hi operation is to be calculated, and it is the incremented cache line address from split_lo. In certain examples, these addresses are calculated at dispatch in the load receipt pipeline in each slice. In certain examples, the calculation is done in FLR2 and then goes through a 2:1 multiplexer (mux) before the ICLB address write port. In certain examples, the mux is controlled by the split_[hi, lo] indication.

In certain examples, the split_lo operation ends at the cache line boundary by definition, e.g., so the linadr_end field simply needs to be driven to all ones for a split_lo op.

ldr_addr_split_lo_mflr2h[g_pipe][g_cluster].linadr_end=is_split_lo_mflr2h ?'1: ldr_addr_mflr2h[g_pipe][g_cluster].linadr_end In certain examples, the split_hi address needs to be the incremented load address, e.g., where, by definition, split_hi always starts at the cache line boundary.

ldr_addr_split_hi_mflr2h[g_pipe][g_cluster].addr[47:6]= ldr_addr_mflr2h[g_pipe][g_cluster].addr[47:6]+t_max_addr'b1 ldr_addr_split_hi_mflr2h[g_pipe][g_cluster].addr[5:0]='0

In certain examples, the MEM circuitry is also to calculate the linadr_end for split_hi. In certain examples, the split_hi end address is the load address minus one. In certain examples, the split_hi linadr_end for a given Split-lo "osize" are as follows:

| osize | split_hi linadr_end |
|---|---|
| 16B | (split_lo.addr[3:0])-1 |
| 8B | (split_lo.addr[2:0])-1 |
| 4B | (split_lo.addr[1:0])-1 |
| 2B | (split_lo.addr[0])-1 |

Split Load ICLB Credits

In certain examples, where there are two load ops for a single dispatch, the MEM circuitry is to properly handle ICLB credit returns. In certain examples, the min_slice protocol ensures that both split_lo and split_hi have an ICLB entry, however the return policy needs clarification for split handling.

In certain examples:

if both split_lo and split_hi are not the min-slice then return a single credit at dispatch if either split_lo or split_hi are the min-slice then do not return a credit at dispatch only split_hi returns a credit at WB if it is in the min_slice In certain examples, the ICLB credit aggregators are to compute split_hi/split_lo per slice, e.g., where they are remote from the slices.

Split Load Execution

In certain examples, MEM controls the scheduling of split ops to satisfy the requirement that split_lo (e.g., pop) occurs with or before split_hi (e.g., pop). In certain examples, the split_lo op schedules without any extra restrictions in MEM. In certain examples, the split_lo operation (or high, in another example) attempts to allocate an SR at execution, e.g., and (i) if successful it can complete and populate the SR when it's on the input of the WB aggregator, and (ii) if split_lo fails to allocate an SR, then it blocks in the ICLB until an SR is freed. In certain examples, if a split_lo op allocates an SR not at-ret, but is blocked in the load pipeline for other reasons then the SR is returned to the pool of free entries. In certain examples, if the split_lo op is at-ret and is blocked in the load pipeline for other reasons then the ICLB entry retains the SR to ensure forward progress.

SR Management

In certain examples, when a split_lo op fails to allocate an SR then it sets the ICLB.BlkCode to SPLIT_REG_FULL, e.g., to prevent the split_lo op from arbitrating for the load pipeline. In certain examples, when the SR is no longer full, then the blocked split loads have their block code reset to NONE. In certain examples, a term is added to iclb_wakeup_mnnnh to account for iclb_blkcode_mnnnh==SPLIT_REG_FULL and not SR_full condition. In certain examples, if the split_lo allocates an SR and completes then it is deallocated from the ICLB normally. In certain examples, the SR maintains the split data and the SR will not be deallocated until after split_hi completion. In certain examples, the SR pool is per slice and shared among the (e.g., 4) load ports. In certain examples, the (e.g., 4) SRs can be allocated per cycle, e.g., in FLD2. In certain examples, round-robin is used for port priority when less than a threshold of (e.g., 4) SRs are available.

SR AT Retirement (AT_RET)

In certain examples, SR[0] is reserved for at_ret loads to ensure forward progress.

Completion & Writeback

In certain examples, after split_lo is scheduled it sends a wake-up to split_hi in the adjacent slice. In certain examples, the wake-up message contains the SR_eid that split_hi stores in the ICLB. In certain examples, the split_hi op can now schedule and attempt to complete with the SR provided by split_lo. In certain examples, both split_lo and split_hi are to complete like normal, but only split-hi ops will drive the WritebackLoadIDInt packet to OOO.

In certain examples:

- split-lo will not send a wake-up to OOO
- split-lo will suppress load_good to OOO/EXE
- split-lo transmits completion information to split_hi
- split-lo transmits fault information to split-hi in completion message
- split-hi drives the WritebackLoadIDInt packet with fault information In certain examples, the completion information that split_lo sends to split_hi is based on load_good_FLD4 and fault conditions. In certain examples, it is generated in FLD4 (e.g., as in FIG. 4), and travels to the adjacent slice in FLD5 and FLD6, and sets up to write the ICLB.[split_lo_dn, split_fault] bits and the load_split_fault[6:0] register on the FLD7 clock.

In certain examples, split-hi will only successfully complete if split-lo has already successfully completed. In certain examples, the best case timing is that split_lo FLD7 aligns with split_hi FLS3. In certain examples, an SR_eid content addressable memory (CAM) is accessed in FLS3 and FLS2 to capture split_hi in the load schedule pipeline and bypass the split_lo completion information to it. In certain examples, otherwise split_hi reads the ICLB.[split_lo_dn, split_fault] bits at schedule and stages them down to allow split_hi to complete in the load pipeline.

TABLE 29

Split_lo Completion (e.g., done (DN))

| split_lo_dn | split_fault | split_hi behavior | split_hi load_good |
|---|---|---|---|
| 0 | dc | fail/respin | 0 |
| 1 | 0 | can complete | based on split_hi load |
| 1 | 1 | is to report fault | 0 |

In certain examples, the split_hi op is to only write the PA obtained from the DTLB in to the ICLB when {split_lo_dn, split_fault}==2'b10.

In certain examples, the split_hi op should avoid allocating an FB when {split_lo_dn,split_fault} !=2'b10 if possible due to timing. In certain examples, however, if split_hi op has allocated an FB in the FLD pipeline it is to deallocate the FB if {split_lo_dn,split_fault} !=2'b10.

Use-Once (Lazy) Protocol

In certain examples, the use once FB handling is slightly affected by splits. In certain examples, the split_lo FB can deallocate after it has successfully completed and sent a valid completion message to split_hi.

Faults

In certain examples, any of the faults that split_lo discovered are reported to OOO via split_hi at WB. In certain examples, e.g., to save area in the ICLB, each slice keeps only one load_split_fault (e.g., [6:0]) register. In certain examples, the split_lo completion interface drives the write port of this register. In certain examples that use only one register, it can only be populated when the split op is at_ret to ensure that it does not overflow. In certain examples, the load_split_fault (e.g., [6:0]) register is read or bypassed via split_lo completion, and combined as necessary to the me_int_wb_load_fault_info_mfld5h interface in FLD5 of split_hi.

In certain examples, if a split_lo op finds any fault condition in the load pipeline then it is to set the ICLB.BlkCode to AT_RET. In certain examples, MEM can only track one split fault condition at a time, so they are handled when the split op is at retirement to be sure all older ops have cleared all faults.

In certain examples, if split_lo is UC memory type then it cannot execute, and deallocate the ICLB, until split_hi is checked for faults. In certain examples, the split_lo op reads the ICLB.split_hi_flt_chk bit at schedule time and uses that bit to qualify load_good for UC split_lo ops. In certain examples, after split_lo schedules then the other slice will schedule split_hi sometime later. In certain examples, the split_hi op will fail in the load pipeline due to ICLB.split_lo_dn clear.

In certain examples, a split_lo op that finds UC memory type and ICLB.split_hi_flt_chk clear cannot complete in the load pipeline and is to set the ICLB.BlkCode to SPLIT_FLT_CHK. In certain examples, this load waits until the split_hi op communicates its completion message and clears the block code. In certain examples, a term is added to iclb_wakeup_mnnnh to account for iclb_blkcode_mnnnh==SPLIT_FLT_CHK and a valid message on the split_hi completion interface that is tagged with the matching SR_eid.

TABLE 30

Split_lo Uncacheable (UC)

| split_lo UC | split_hi_flt_chk | split_flt | split_lo behavior |
|---|---|---|---|
| 0 | dc | dc | can complete |
| 1 | 0 | dc | block condition |
| 1 | 1 | 0 | can complete and deallocate ICLB |
| 1 | 1 | 1 | complete w/fault and cannot deallocate ICLB |

In certain examples, in the case where a UC split_lo finds ICLB.[split_hi_fik_chk,split_flt] asserted it cannot allocate a FB and is to only report its fault_info[6:0] to split_hi over the split_lo completion interface. In certain examples, there is no bypass from the split_hi completion interface to the load pipeline. Instead split_lo is to wait for split_hi completion message and then it can arbitrate for the load pipeline. In certain examples, the split_hi op may miss the DTLB, or encounter other conditions that cause it to need to re-flow down the FLD pipeline again. In certain examples, in these cases the split_hi op cannot send a valid message on the split-hi-completion interface until these conditions are cleared and only split_lo is preventing the split_hi op from writing back to OOO. In certain examples, the existing block conditions, block ids and wake conditions all work as normal in this case to control the split_hi op in the load pipeline. In certain examples, after the split_hi op receives a translation and can examine the fault conditions, and all other block conditions are cleared, then it can drive a valid packet on the split-hi-completion interface.

In certain examples, even though the split_hi op is to fail in the load-pipe, it communicates its fault_info back to the slice neighbor and sets the ICLB.split_hi_flt_chk bit in split_lo. In certain examples, the split_lo wake logic is also sampling the split_hi completion interface and sets the ICLB.BlkCode to NONE for entries with a block code of SPLIT_FLT_CHK and a matching SR_eid. In certain examples, this allows the split_lo to schedule again down the load pipeline and either execute, and deallocate, or report its fault information to split_hi for later reporting to OOO.

TABLE 32-continued

| Osize and Start Byte | |
|---|---|
| osize | split_hi start byte |
| 4B | {2'b00, 3'd4-split_lo.addr[1:0]} |
| 2B | {3'b000, 2'd2-split_lo.addr[0]} |

In certain examples, after split_hi successfully completes it sends a completion message back to split_lo slice to release the SR to the pool.

Split Register (SR)

In certain examples, the split register control logic lives in the slices. In certain examples, the split register data is located near the WB aggregator in both the integer and vector data paths. In certain examples, the split_lo slice controls the SR on a per cluster per slice basis.

In certain examples, split registers live on the L1 return data path before the integer and vector L1 WB Aggregators. In certain examples, SRs are organized per cluster per slice. In certain examples, the integer SR is a first (e.g., 15B) width and the vector SR is a wider (e.g., 31B) width. In certain examples, SRs are register aligned, and contain a (e.g., 15b/31b) sr_sel_hi vector to indicate which bytes split_lo populated.

TABLE 31

| SPLIT BLOCK CODES | | | | | |
|---|---|---|---|---|---|
| block code | split op | description | wake up | match | block id |
| SPLIT_SR_FULL | split_lo | no available SR | not SR full | all splits | none |
| SPLIT_WAIT | split_hi | wait for split_lo schedule | split_lo schedule intf | lbid cam | none |
| SPLIT_FLT_CHK | split_lo | split_hi faults needed | split_hi completion intf | SR cam | SR_eid |
| AT_RET | either | used for any split fault | oldest_lbid & good2mem | lbid cam | none |

FIG. 9 illustrates load writeback split register (SR) data paths in the level (e.g., L1) of memory circuitry that is sliced according to address values according to examples of the disclosure.

In certain examples, split data is combined on the data path in FLD5 of the split_hi op. In certain examples, the split_hi data is rotated to register alignment like normal and then muxed in with the split_lo data in the SR. In certain examples, the split_lo data is read from the SR_eid and it selected on to the data path according to the sr_sel_hi vector. In certain examples, if the sr_sel_hi bit is set that indicates to select the cache/FB data from split_hi.

In certain examples, the sr_sel_hi vector is set by split_lo based on its osize and address. In certain examples, where split_lo always occupies the low-order bytes after rotation, the MEM circuitry only needs to calculate the starting byte of split_hi, e.g., then set all the bits in the vector from the starting byte in a thermometer code fashion.

TABLE 32

| Osize and Start Byte | |
|---|---|
| osize | split_hi start byte |
| 16B | 16-split_lo.addr[3:0] |
| 8B | {1'b0, 4'd8-split_lo.addr[2:0]} |

SR Allocation

In certain examples, SRs are allocated in the load pipeline (e.g., 4×) in FLD2. In certain examples, each slice maintains a pool of SRs that is shared among all ports. In certain examples, up to a threshold (e.g., 4) SRs are allocated per cycle. In certain examples, if fewer SRs are available then round-robin priority is used to allocate the SRs to the ports. In certain examples, if split_lo cannot allocate an SR, then it blocks until SR dealloc and all blocked split_lo ops respin in the load pipeline.

In certain examples, one SR is reserved for at_ret loads. In certain examples, during arbitration speculative loads are only able to allocate SR[3:1], and at_ret loads always allocate SR[0]. In certain examples, this ensures forward progress without the need for “clobbering” of speculative loads in the SR.

FLD Interaction

In certain examples, allocating the SR in the pipeline allows split_lo to just flow to the WB aggregator like normal. In certain examples, then split_lo writes the SR in FLD5 when it is on the input of the aggregator. In certain examples, each SR entry has a (e.g., 4:1) mux on the write port to support the number of (e.g., 4) load ports that share the SR pool. In certain examples, split_lo writes rotated load data only, and populates the sr_sel_hi vector.

SR Deallocation

In certain examples, in the normal case, SRs are deallocated after split_hi completion to ensure split_lo data is retained long enough to used. In certain examples, this requires that split_hi communicate back to split_lo over the split_hi completion interface. In certain examples, the split_lo slice can also deallocate an SR if the load is blocked in the load pipeline, e.g., valid message in the split_hi completion interface and/or in the FLD pipeline when split_lo is blocked Summary of SR Control In certain examples, there are multiple SRs (e.g., 4) available per cluster per slice per cycle, e.g., where multiple (e.g., 4) deallocate per cycle, allocated by split_lo, find first allocation, and deallocated after split_hi sends completion message to split_lo slice.

Forward Progress

In certain examples, forward progress guarantees, entry [n] can be reserved for thread_n, at_ret load will not return SR to pool if blocked in the load pipeline, and SR[0] is only available to at_ret load.

Split load Interfaces

In certain examples, there are four interfaces that are used to properly control split execution and manage the SR: split-lo schedule, split-lo completion, split-hi completion, and split-hi SR release.

Split-lo Schedule Interface

In certain examples, this interface communicates the SR_eid and split_lo scheduling information to split_hi, e.g., split-lo calculates in FLD2, FLD3 & FLD4 are RC cycles, and FLD5 of split_lo aligns with FLS1 of split_hi in the best case.

TABLE 33

Split_lo Schedule Interface Packet

| Name | Size | Description |
|---|---|---|
| valid | 1-bit | valid packet on interface |
| SR_eid | 3-bits | the SR that split_lo allocated |
| lbid | 12-bits | the LBID of split_lo to cam against the split_hi ICLB |

In certain examples, when a slice receives a valid packet on this interface, the MEM circuitry compares (e.g., CAM) its ICLB to determine the matching load for that packet, e.g., then the SR_eid is stored in that ICLB entry. In certain examples, this interface also sets the ICLB.BlkCode to NONE for the matching split_hi op so that it can arbitrate for the FLS pipeline.

In certain examples, if a split_hi load is prevented from completion due to split_lo failure, then ICLB.BlkCode is set to SPLIT_WAIT. In certain examples, in this case the split_lo will transmit the scheduling message again, which will clear the block code to NONE again.

Split-lo Completion Interface

In certain examples, this interface communicates the split_lo completion information to split_hi. In certain examples, it is systolic with split-lo schedule interface and communicates that the split-hi can send a WB to OO/EXE. In certain examples, it updates ICLB.split_lo_dn and the load_split_fault[6:0] register. And bypasses in to the FLS2 & FLS3 pipeline stages. In certain examples, it uses delayed iclb_cam_hit information from schedule interface, e.g., split_lo uses load_good_mfld4h and fault_info[6:0], FLD5 & FLD6 are RC cycles, and FLD7 of split_lo aligns with FLS3 of split_hi in the best case.

TABLE 34

Split_lo Completion Interface Packet

| Name | Size | Description |
|---|---|---|
| split_lo_complete | 1-bit | indicates that split_lo has successfully completed in the FLD pipeline |
| split_lo_fault_info | 7-bits | split_lo fault_info |

Split-hi Completion Interface

In certain examples, this interface communicates the split_hi fault condition to split_lo. In certain examples, this is only used when split_lo is UC memory type and needs to sample split_hi fault condition before execution and ICLB deallocation. In certain examples, the split_lo ICLB.[split_hi_flt_chk, split_fault] bits are set via this interface. In certain examples, the SR_eid is used to find the correct ICLB entry for split_lo update. In certain examples, when a slice receives a valid packet on this interface, it CAMs the ICLB.SR_eid[2:0] field to determine a match. In certain examples, the raw match vector is qualified with ICLB.valid and ICLB.split_lo to find the exact entry that contains the split_lo.

In certain examples, since both the split-hi and split-lo completion interfaces update the load_split_fault[6:0] register the MEM is to check that they align in the FLD pipeline. In certain examples, although the MEM has the TLB information earlier in the FLD pipe, it stages the information to FLD4 to align with the split-lo timing of the write port, e.g., split_lo collects fault info from TLB access, FLD5 & FLD6 are RC cycles, and FLD7 of split_hi aligns with FLS3 of split_lo in the best case.

TABLE 35

Split-hi Completion Interface Packet

| Name | Size | Description |
|---|---|---|
| valid | 1-bit | valid packet on interface |
| SR_eid | 2-bits | the SR being deallocated |
| split_hi_fault | 1-bit | split_hi has found a fault condition |

Split-hi SR Release Interface

In certain examples, this interface communicates that the split_hi has completed and the SR can be returned to the pool of available entries. In certain examples, this interface is physically part of the split_hi completion interface, e.g., where the SR is located before the WB aggregator and the aggregator hold the assembled split data after split_hi completion.

TABLE 36

Split-hi SR Release Interface Packet

| Name | Size | Description |
|---|---|---|
| SR_release_valid | 1-bit | deallocate the SR(s) specified by SR_eid_vec |
| SR_eid_vec | 4-bits | multi-hot decoded SR_eid vector |

ICLB Fields

Below is a summary of the bits in the ICLB that are specific to split operations.

TABLE 37

| Example ICLB Fields for Split Operations | | |
|---|---|---|
| Name | Size | Write port |
| split_lo | 1-bit | FLS |
| split_hi | 1-bit | FLS |
| split_lo_dn | 1-bit | split_lo completion |
| split_fault | 1-bit | split_lo/split_hi completion |
| split_hi_flt_chk | 1-bit | split_hi completion |
| sr_alloc | 1-bit | split_lo completion |
| sr_eid | 2-bit | split_lo schedule |

Page Miss Handler (PMH) Components

FIG. 10 illustrates a more detailed block diagram of page miss handler (PMH) circuitry 118 according to examples of the disclosure. In certain examples, PMH circuitry 118 translates for a miss on behalf of the first level TLBs (e.g., in L1 MEM 114), e.g., translating linear addresses into physical addresses for the misses and producing TLB entries to fill the first level TLBs for the misses. In certain examples, the PMH includes a second-level TLB queue (STLBQ) 1002 to receive requests, a large second-level TLB 1004, a pipelined page walker 1010 (e.g., state machine) capable of handling multiple requests in flight, page walk caches, virtualization page walk caches, etc.

In certain examples, the PMH provides translation services for the front end (FE) circuitry 102, L1 MEM 114 (e.g., slices), L0 MEM 112 (e.g., clusters), and/or the prefetcher circuitry 120.

In certain examples, each L1 MEM slice, L0 MEM cluster, prefetcher circuitry, and/or FE circuitry may send the PMH circuitry address translation requests. In certain examples, the L1 MEM 114 (e.g., slices), L0 MEM 112 (e.g., clusters), and/or the prefetcher circuitry 120 will collect requests locally into a Translation Request Buffer (TRB) before sending the requests to the PMH circuitry 118. For example, the respective TRBs for clusters C0-C3 shown in L0 circuitry 112 and the respective TRBs 1001-0 to 1001-3 for slices S0-S4, respectively, as shown in FIG. 10.

In certain examples, the PMH circuitry will receive these (e.g., "miss") requests into a request holding structure positioned before the STLB 1004 pipeline in the PMH (e.g., the STLBQ 1002). In certain examples, the STLBQ 1002 includes a respective queue for each slice, cluster, FE circuitry, prefetcher circuitry, etc. In certain examples, the STLBQ 1002 will arbitrate ready requests into multiple (e.g., two) STLB pipelines, e.g., where the requests will check the (e.g., large) second-level TLB (STLB 1004) for translation, and either hit or miss. In certain examples, STLB hits will fill into the first level TLBs (e.g., DTLB, ZTLB, and/or ITLB). In certain examples, a page walk queue 1006 is included, e.g., to store a miss request while a walk is performed.

In certain examples, STLB misses will arbitrate for a free page walker 1010 that will perform page walks, e.g., walking through L2 circuitry 116 (e.g., TLB therein) and/or further (e.g., system) memory. In certain examples, once a page walker is allocated, the STLBQ 1002 entry is put to sleep and does not arbitrate for the STLB pipeline until the walk completes. In certain examples, page walks will first check, in parallel, a set of page walk caches (PXEs) to find the deepest matching level of the page table. In certain examples, the page walkers will resume the walk from this deepest matching state. In certain examples, when a page walk is successfully complete, the page walker will write the translation into the STLB 1004 (and corresponding requester first level TLB) and wake up STLBQ 1002 entries that were sleeping as a result of matching the ongoing PWQ 1006 entry. In certain examples, the entry that allocated the PWQ 1006 entry will get deallocated after first level TLB fill without having to go down the STLB pipeline again. In certain examples, the STLBQ entries will arbitrate again for STLB 1004 pipeline, and if they hit in STLB, then the STLB will fill the first level TLBs.

In certain examples, in order to keep the DTLBs in sync with each other (e.g., and the ZTLBs in sync with each other), the PMH circuitry will also hold a primary copy of the DTLB and ZTLB, e.g., which will be checked for duplicates before sending fills to the L1 slices, prefetcher circuitry, and/or L0 clusters. In certain examples, the PMH circuitry will be responsible for choosing replacement ways in the first level MEM TLBs (e.g., DTLB and ZTLB, but not ITLB).

In certain examples, to accomplish this, the L0 TLBs and L1 TLBs will send the PMH circuitry sampled LRU update packets, providing a partial view of which TLB entries are actively being used by the L1s and the L0s. In certain examples, the PMH will update the L1 (or L0) LRU array based on these samples, and then choose a victim way based on this local view of TLB LRU.

Requests to PMH Circuitry

In certain examples, L0 MEM 112, L1 MEM 114, prefetching circuitry 120, and/or FE circuitry make address translation requests to PMH using dedicated networks. In certain examples, each L1 slice has its own DTLB miss interface to PMH circuitry, e.g., for a total of 4 interfaces in one example. In certain examples, e.g., to reduce wires, two of the four L0 clusters share one ZTLB miss interface to PMH circuitry.

In certain examples, prefetcher circuitry and/or FE circuitry have their own address translation and/or TLB miss interfaces to PMH circuitry 118. In certain examples, PMH circuitry 118 has an STLBQ 1002 for each of the TLB miss request interfaces, e.g., and is able to sink all requests from the various requesters. In certain examples, each requester (e.g., L1 slice, L0 cluster, prefetcher, FE) has an internal structure called TRB (translation request buffer) which is mapped 1:1 with the STLBQ and guarantees that STLBQ will not be overflown, e.g., which removes the need for a crediting mechanism between PMH circuitry and any of the requesters. In certain examples, the TRBs in each of the requester are responsible for filtering out requests to the same linear address (e.g., 4 k page boundary). In certain examples, a duplicate (e.g., 4 k) boundary request will not allocate another TRB entry and will not be sent to PMH circuitry. In certain examples, when a requester's translation request buffer is full, that requester will not send additional translation request to PMH, guaranteeing not to overflow the STLBQ.

In certain examples, once requests arrive at PMH circuitry, they are written in the STLBQ for that particular requester. In certain examples, there are a plurality of (e.g., 8) STLBQs, for example, one for each requester: one SLTBTQ per L1 slice to hold requests from that slice (e.g., so four STLBQs for four slices); one STLBQ for the L0 Clusters (e.g., one queue shared between two clusters because they also share the request network); one STLBQ for requests coming from FE (e.g., front end ITLB miss requests); and one STLBQ for requests coming from the prefetcher circuitry.

In certain examples, within an STLBQ bank, the entries are aged based on allocation order (e.g., using an AOM—Age Order Matrix). In certain examples, the only exception is that a request received with the "at_ret" attribute set is always marked older than anything else that is already valid in the STLBQ bank. In certain examples, requests from STLBQs arbitrate for one of the (e.g., 2) STLB pipelines (e.g., "pipes"), e.g., and the STLBQ banks are statically bound to one of the pipelines as described below.

STLB Requests

In certain examples, there are two STLB pipelines, e.g., where the first pipeline (e.g., Pipe0) handles (e.g., services) requests from all (e.g., 4) L1 slices and Prefetch STLBQs, and the second pipeline line (e.g., Pipeline 1) handles (e.g., services) requests from all (e.g., 4) L0 clusters and FE STLBQs. In certain examples, requests coming from MEM parcels (e.g., L1 114 slices, L0 112 clusters, prefetcher circuitry 120) are also called d-side (data) requests. In certain examples, requests coming from FE circuitry 102 are also called i-side (instruction) requests.

STLB Pipeline Arbitration

In certain examples, there is a two level arbiter per STLB pipe, e.g., which chooses one entry out of the valid and ready STLBQ entries associated with that STLB pipeline. In certain examples, in the first level, oldest ready entry is selected from each requester STLBQ bank. Then one of the banks is chosen in round robin fashion. In certain examples, for pipeline 0, one entry from each of the L1 slices and prefetcher STLBQs is selected, and then, if more than one slice/prefetcher has a ready request, one of them is selected in round robin fashion. In certain examples, the age within STLBQ entries is based on allocation time in the STLBQ. In certain examples, an age order matrix (AOM) is maintained for each of the (e.g., 8) STLBQs. In certain examples, a ready at_ret request from any bank overrides any round robin selection and is guaranteed to be chosen.

In certain examples, the STLBQ entry that has won STLB pipeline arbitration will look up STLB to determine if there is a hit or a miss in STLB. In certain examples, the STLB has one read port for each STLB pipeline. In certain examples, the STLB has two read ports, e.g., for two STLB pipelines.

In certain examples (e.g., in parallel with the STLB lookup), the request looks up its corresponding first level Primary TLB, if any. In certain examples (e.g., on pipeline 0), the primary DTLB is looked up to see if it has already been filled by another L1 slice or prefetcher request. In certain examples (e.g., on Pipeline 0), if the request is from an L0 cluster, the Primary ZTLB is looked up. In certain examples, there is no primary ITLB, e.g., where the FE box is responsible for its own TLB management.

L1 Slice LA Wakeups

In certain examples, as soon as a request on pipeline 0 wins arbitration and is scheduled into the STLB pipeline, it also broadcasts its linear address to all L1 slices such that loads or stores sleeping on that address can be speculatively woken up from ICLB/SAB and read DTLB just as it is being written in case of an STLB hit.

In certain examples, only L1 slices (e.g., and maybe prefetcher circuitry in some examples) will be sent LA wakeups, so only STLB pipeline 0 will generate the wake-ups. In certain examples, L0 clusters do not have loads that are sleeping waiting on the ZTLB fill, e.g., it would be too costly to send the linear address to the FE parcel (e.g., where FE TRB holds the linear address such that ITLB fill interface from PMH to FE can be narrower).

STLB Hit

In certain examples, an STLB lookup checks all (e.g., four page size) STLB arrays in parallel (e.g., 4 k STLB, 64 k STLB, 2M STLB, 1G STLB). In certain examples, a lookup results in an STLB tag hit if the linear address of the request matches a valid STLB entry in any of the page size STLB arrays and that entry has the same properties as the request (i-side/d-size, ASID, etc.). In certain examples, note that a lookup could hit multiple STLB page size arrays, e.g., in which case the largest page size hit is chosen. In certain examples, a fully qualified STLB hit is an STLB tag hit as well as additional qualifications and checks for access rights compliance.

In certain examples, a fully qualified STLB hit results in a fill in the first level TLBs, e.g., if the translation does not already exist in the first level TLBs (e.g., plus any other requester specific conditions). In certain examples, note that either STLB hit or PMH page walk completion can fill a first level TLB. In certain examples, however, page walk completions block the STLB pipeline of the requester that initiated the page walk (e.g., either pipeline 0 or pipeline 1), and as such it will not be possible to try to fill the same first-level TLB in the same cycle as a result of both STLB hit and page walk completion.

In certain examples, a fully qualified STLB hit always results in an STLBQ deallocation and sending of a TRB deallocation packet to the corresponding requester.

In certain examples, STLB entries are not shared between d-side and i-side requests. In certain examples, each STLB entry is tagged with an "iside" bit that is set only if the entry was filled as a result of a page walk initiated by a FE ITLB miss request (e.g., because of permission checks performed and permission bits returned by the page walker). In certain examples, only i-side requests may hit an STLB entry tagged with "iside=1" and/or only d-side requests may hit an entry tagged with "iside=0".

In certain examples, for FE requests, STLB hit also triggers an ITLB fill response on the PMH to FE interface. In certain examples, for d-side requests (e.g., MEM L0, L1, Prefetch), a ZTLB or DTLB fill packet is only generated if there was also a corresponding Primary Z/DTLB miss on Pipeline 1 or Pipeline 0, respectively. In certain examples, note that STLB a fully qualified STLB hit means both a tag hit as well as suitable permissions that qualify the STLB hit (e.g., dirty bit set for store accesses, write, user, extend page table walk (eptw), shadow stack/CET permission checks). In certain examples, any permission checks failures will force an STLB miss and will not deallocate STLBQ/TRB.

In certain examples, an STLBQ deallocation and TRB deallocation is only generated by the specific STLBQ entry going down the STLB pipeline. In certain examples, even if the STLBQ/TRB of L1 slice 0 was satisfied by a DTLB fill initiated by a miss from L1 slice 1 and the loads in slice 0 were woken up from ICLB when the speculative LA wakeup was sent by slice 1, Slice 0's STLBQ and TRB are not going to be deallocated until there is an explicit TRB deallocation packet targeting that slice and TRBID, e.g., which happens when Slice 0's STLBQ entry goes down the STLB pipeline.

In certain examples, an STLB hit completes the DTLB/ZTLB/ITLB miss's lifecycle in the PMH circuitry.

STLB Miss

In certain examples, an STLB miss may result in the following scenarios, depending on the requester.

Primary TLB hit: In certain examples, a d-side translation request traveling down STLB pipeline looks up both STLB and the Primary TLB (e.g., Primary DTLB on Pipeline 0/Primary ZTLB on Pipeline 1) in parallel In case of a STLB miss, but a DTLB hit, the request does not try to allocate a page walker, and no fill is initiated into the DTLBs (except if the request is at_ret). In certain examples, instead, as the request goes down the STLB pipe, it will broadcast TRB deallocation and slice ID to all the L1 slices and it will deallocate STLBQ entry. In certain examples, this situation can happen when two slices request the same address translation. In certain examples, the first request goes down the pipe, hits STLB, or does a walk and fills DTLBs. In certain examples, before the second request has a chance to schedule out of its STLBQ, the STLB entry is overwritten (e.g., capacity eviction) by an unrelated fill In certain examples, because the STLB and DTLB are not kept in sync, the DTLB entry could still exist. In certain examples, as the second request schedules out of STLBQ, it misses STLB, but finds the translation in the Primary DTLB—as such, there is no need to fill the DTLB again and the pass through STLB pipeline just needs to deallocate that second slice's resources. In certain examples, note that the loads or stores sleeping on the DTLB miss in the second slice are woken up when the first DTLB fill happens.

In certain examples, for i-side requests (e.g., from FE box), there is no Primary TLB. In certain examples, as such, any STLB misses will try to match or allocate an ongoing page walker.

Primary TLB miss: In certain examples, if a request misses in both STLB and the Primary TLB, it will need to involve the page walker (e.g., FSM) to walk the (e.g., multiple page) paging structures and obtain a translation. In certain examples, the request will first check the Page Walk Queue (PWQ) 1006 to see if there are any ongoing walks to the same address. In certain examples, the PWQ is buffer that holds information about the in-flight page walks. In certain examples, there can be a plurality of (e.g., up to 8) in-flight page walks at a given time. In certain examples, the STLB miss's linear address (e.g., to the smallest page granularity LA[47:12]) is checked against the linear address of all valid PWQ entries. In certain examples, the match is only performed on linear address, not on any other attributes (e.g., FE request will match a PWQ allocated by d-side request).

In certain examples, there may be a concern with not allowing two PWQ allocations for the same address, e.g., one from d-side and one from i-side. In certain examples, the PMH is not sharing STLB entries (e.g., only i-side or d-side can hit an STLB entry, but not both), and thus the PMH is to ensure fairness/forward progress (e.g., i-side could always match a d-side PWQ and sleep and by the time it wakes up another d-side could allocate PWQ with same address or vice-versa). In certain examples, however, because FE is by definition younger than data TLB (DTLB), the d-side requests will be drained if i-side cannot make forward progress. In certain examples, even in the case of nukes caused by external snoops or mispredicted branches, the pop stream needs to be restarted from FE so eventually i-side requests will stop getting any conflicts with d-side as d-side will be drained.

In certain examples, if there is a PWQ match, the request does not allocate a new entry, instead it is put to sleep in STLBQ by setting the entry's block_code=MATCH_PWQ and block_id=PWQ_ID. In certain examples, once the page walk for that PWQ_ID finishes, it will compare its ID against all entries in STLBQ sleeping on MATCH_PWQ and clear their block_code, making the STLBQ entries eligible for scheduling into the STLB pipeline again.

In certain examples, if there is no match with an ongoing walk, the request will try to allocate a new PWQ entry. In certain examples, since there are two STLB pipes, both of them can try to allocate a PWQ entry in the same cycle. In certain examples, a new PWQ entry is allocated using a FindFirst==(PST Pipeline 0) and FindLast (PST Pipeline 1) algorithm to find an invalid entry. In certain examples, if only one entry is available (FindFirst==FindLast), then only one of Pipeline 0 or Pipeline 1 is granted the allocation (e.g., in a round robin fashion). In certain examples, if one of the requests was at_ret, then it always wins PWQ allocation over the other pipeline. In certain examples, the entry selection and setting up of the new PWQ entry fields happens in PST4 and the entry is allocated in PST5 (valid=1).

In certain examples, once a PWQ entry has been allocated, the STLBQ entry that allocated it is put to sleep in STLBQ with block_code=HAS_PWQ and block_id=PWQ_ID (PST5). In certain examples, the block_code differentiation between HAS_PWQ and MATCH_PWQ is needed for the following reason: the entry that allocated PWQ will not go down the STLB pipeline again, instead the page walker will take over the STLB pipeline and complete the lifecycle of that request, whereas STLBQ entries that matched an existing walk will be woken up upon that walk's completion and go down the STLB pipeline to complete the lifecycle of the request (e.g., deallocate STLBQ and TRB entries).

In certain examples, once the page walker completes a translation (successful or not), it will take over the STLB pipeline and in the first PST stage it will send a pwq_wakeup to all STLBQ entries sleeping on MATCH_PWQ.

In certain examples, if the PWQ is full, the STLBQ entry that wanted to allocate PWQ is put to sleep with block_code=PWQ_FULL. In certain examples, whenever any page walk completes and a PWQ entry is deallocated, it will wake up (clear block_code) for all STLBQ entries sleeping on PWQ_FULL. In certain examples, any STLBQ entry sleeping on HAS_PWQ or MATCH_PWQ will also have its block_code cleared by a PWQ deallocation.

In certain examples, the PWQ entries are ordered with respect to each other in PWQ allocation order, e.g., with the exception of at_ret request which always becomes oldest over existing PWQ entries (e.g., there can only be one at_ret request in the machine, whether it be from i-side or d-side). In certain examples, in order to accomplish this, an AOM (age order matrix) is maintained for the (e.g., 8) PWQ entries.

In certain examples, upon PWQ entry allocation, the enhanced STLBQ_ID is stored with that PWQ entry (requester, slice/cluster_id, stlbq_eid), e.g., as well as information pertaining to the requester (such as privilege level, whether it is a load or a store, whether it is a physical or guest physical or linear address request, etc.) for use by the page walker FSM.

In certain examples, once a PWQ is allocated, it will start a page walk by arbitrating for the pipelined page walker FSM. In certain examples, at this point a page walk starts and it may take multiple passes through the PPM pipeline (e.g., PMH FSM pipeline) in order to complete. In certain examples, the STLB (e.g., PST) pipeline is completely decoupled from the PMH walker (e.g., PPM) pipeline.

FE STLB miss: In certain examples, a FE request that misses STLB will try to allocate a PWQ since there is no Primary ITLB. In certain examples, it will follow the same rules as above when it tries to allocate a PWQ and can be put to sleep in STLBQ with "MATCH_PWQ", "HAS_PWQ", or "PWQ_FULL". In certain examples, on a page walk completion, all entries that are sleeping on "MATCH/HAS_PWQ" are woken up, regardless of whether the PWQ entry was allocated by d-side or i-side.

Page Walk

In certain examples, once requests are in the PWQ they take turns using the pipelined page walker to walk the paging structures, check for access permissions, and/or receive a translation. In certain examples, the PMH proper includes page walker FSMs (e.g., IA FSM and EPT FSM for nested virtualization), paging caches (e.g., PDE$, PDP$, PML4$, and their EPT equivalents EPDE$, EPDP$, EPML4$; GTLB/EPTE$ and PTE$), range registers, and/or one or more control registers. In certain examples, a page walker supports a multiple page walk, for example, a 4-level page walk (e.g., such that the largest linear address supported is 48 bits).

Arbitration for Page Walker Pipeline

In certain examples, an age-order matrix (AOM) based oldest ready arbiter selects between ready PWQ entries and schedules them into the page walker pipeline. In certain examples, at_ret requests being allocated in the PWQ update the AOM to indicate that they are older than everything else that already exists in the PWQ. In certain examples, this will automatically give the at_ret request highest priority when they are arbitrating for the (e.g., PPM) page walker pipeline.

L2 Memory Requests

In certain examples, the PMH will use the L2 116 for its load requests, e.g., instead of the L1. In certain examples, this requires using the Shared Request Interface (SRI) to route requests to the L2 slice indicated by address (e.g., bits[7:6]). In certain examples, the SRI is shared between the PMH, FE, and Prefetch parcels in order to request into the L2. In certain examples, all (e.g., 4) slices have their own SRI and the PMH will pair them using a bit (e.g., bit[7]) and send up to a threshold of (e.g., 2) requests per cycle.

PMRQ Allocation

In certain examples, a pipelined page walker FSM is used, e.g., that creates a speculative load request which gets an early start into their DCU. In certain examples, then after all the checks and memory type range register (MTRR) lookups have occurred, a cancel may be triggered to kill the DCU request. In certain examples, if not canceled, the memtype is then forwarded to the request. In certain examples, there are multiple (e.g., 8) PWQ entries allowing multiple (e.g., 8) page walks to execute at the same time into the FSM pipeline. In certain examples, there are also multiple (e.g., 8) Page Miss Request Queue (PMRQ) entries that will map 1-to-1 with the PWQ.

In certain examples, the PMH page walker FSM pipeline will send out a request from one stage. In certain examples, the FSM pipeline sends with the request the address, memtype and whether it is an A or D update. In certain examples, an A update is when the accessed bit in the page table entry must be set to 1 and/or a D update is when the modified (e.g., "dirty") bit in the page table entry must be set to 1. In certain examples, part of a page table entry is whether the page as a whole has ever been accessed or ever been modified, and this is how that update occurs. In certain examples, the currently active PMRQ entries are compared for a cache line (e.g., bits [45:6]) match as the new request. In certain examples, if there is a match, the PMRQ is not written with valid and the PWQ entry is updated with the matching PMRQ ID. In certain examples, the PWQ will then wait on a Data Response for that PMRQ. In certain examples, if there is no match, the PMRQ indicated by its PWQ ID will write all its information and push its ID into the request scheduling FIFO based on a bit (e.g., bit[7]) of its address. T In certain examples, the PWQ entry will be updated with the PMRQ ID indicated by the PWQ ID and wait.

TABLE 38

PMRQ Structure

| Name | Size | Description |
|---|---|---|
| valid | 1-bit | Entry is a valid PMRQ |
| phys_addr | 44-bits | Physical address [45:2] of request |
| cacheable | 1-bit | Request is cacheable |
| read_ad | 1-bit | Request is for an AD update read |
| write_ad | 1-bit | Request is for an AD update write |
| ept_ad | 1-bit | Request is for an EPT AD update |
| set_a | 1-bit | AD update should set Accessed bit |
| set_d | 1-bit | AD update should set Dirty bit |
| reqd | 1-bit | Entry is waiting on a response |
| at_ret | 1-bit | Request is non-speculative (UC or A/D update) |
| self_snoop | 1-bit | Request should go to IDI and spawn a self-snoop |

In certain examples, reads invalidate entry when a matching Data Response is received, and/or writes invalidate entry on SRI grant as no responses will be sent.

PMRQ Request Combining

In certain examples, reducing request traffic to the L2 on the SRI is highly beneficial. In certain examples, the SRI Data Response is for a full cache line and each PWQ saves the entire line for page coalescing and PXE caching, so the PMH requests for the same line can be combined into a single L2 request. In certain examples, the PWQ will be written with the PMRQ entry it is combining with and will behave as though it made the request rather than writing its own paired PMRQ entry. In certain examples, when data is returned, all matching PWQ entries will write the same data at the same time. In certain examples, they all can then request into the PMH pipeline.

In certain examples, only load requests that match a PMRQ entry that has not yet received its Data Response can combine. In certain examples, to cover the underlap, the PWQ for the current load request will fast forward its PMRQ ID write and use it for matching incoming Data Responses.

In certain examples, if timing does not allow this, using PMRQ Valid_Nxt for the match qualification might be less critical. In certain examples, another option is the incoming Data Responses can be staged while the clearing of PMRQ valid is not. In certain examples, this is more area as all 2 incoming Data Responses will need to stage, but it should be better for timing.

In certain examples, rules for combining:

Cache line match

PMRQ Valid

Neither are AD updates

Neither are uncacheable

PMRQ L2 Request

In certain examples, the PMH will request to the L2 using the SRI that shares an interface between the PMH, FE and Prefetch parcels. In certain examples, there is a separate SRI for each L2 slice and the slice destination is determined by the request address (e.g., bits[7:6]). In certain examples, the PMH, however, will only be able to schedule up to 2 requests a cycle. In certain examples, 2 request scheduling FIFOs will be banked (e.g., based on address bit[7]), e.g., which matches the pairing of the L2 data and NACK responses. In certain examples, the oldest request from each FIFO has an opportunity to request into their matching SRI. In certain examples, an at_ret bypass request entry will be included that is determined by whether the PMRQ has one of its AD updates bits set or cacheable bit clear. In certain examples, for simplicity, an at_ret bit in PMRQ is used, even though it could be derived from the other entry bits. In certain examples, the at_ret PMRQ gets to bypass the FIFOs and is always next to schedule. In certain examples, there is an SRI Stall from each slice that if set, blocks sending a request onto that SRI. In certain examples, if the oldest in the FIFO is to an SRI that's not stalled, the granted PMRQ entry will send its information onto the appropriate SRI. In certain examples, if the SRI is stalled, the FIFO stalls until it's not, even if the other paired SRI is available and there are newer requests in the FIFO to it. In certain examples, the PMRQ entry that got granted is popped from the FIFO and then the entry waits for a response back from the SRI (e.g., sets its reqd bit). In certain examples, requests are pushed into the FIFO as the PMRQ is allocated and if a PMRQ entry receives a NACK.

PMRQ Request Scheduling FIFOs

In certain examples, there are multiple (e.g., 2) PMRQ request scheduling FIFOs that are banked by address bit[7] and (e.g., 8) entries each to match the number of PMRQ entries to accommodate if all requests are to the same (e.g., 2) slices. In certain examples, FIFO_0 is for L2 slices 0,1 and FIFO_1 is for L2 slices 2,3. In certain examples, as a PMRQ entry is allocated or a NACK is returned, the PMRQ ID and address (e.g., bit[6]) are pushed into the appropriate scheduling FIFO. In certain examples, the oldest request in the FIFO will send the request to the L2 if the paired SRI indicated by address (e.g., bit[6]) is not stalled and there is not an at_ret request ready. In certain examples, When the request is made, the ID pops from the FIFO and the granted PMRQ entry is read to provide the required information for the Request Packet.

TABLE 39

FIFO Entry Format (e.g., 8-entries × 2 requests)

| Name | Bits | Description |
|---|---|---|
| valid | 1-bit | Entry is for a pending L2 request |
| pmrq__id | 3-bits | PMRQ ID of the request |
| addr6 | 1-bit | Address bit[6] determines which paired SRI the request uses |

PMRQ At_Ret Protection

In certain examples, any PMH request that hits a strongly-ordered operation will receive a retry_at_ret indication if it is not already at_ret In certain examples, there can only ever be one at_ret page walk active at a time, so protecting the strongly-ordered requirements and allowing forward progress can be handled at a more macro level. In certain examples, if a new request is an AD Update or uncacheable, it will allocate into the PMRQ indexed by its PWQ ID and push into the at_ret bypass request entry. In certain examples, the at_ret request entry will be blocked from requesting onto the SRI if any PMRQ entries have already requested and are waiting on data. In certain examples, no new requests out of the normal request FIFOs will be allowed if there's a PMRQ entry active for an at_ret request (e.g., uncacheable or AD update). In certain examples, once there are no speculative requests outstanding, the at_ret request will be allowed to request onto the SRI. In certain examples, this will allow an at_ret request to execute all by itself in order to ensure forward progress and prevent any interruptions during an AD update.

TABLE 40

PMH Request Packet

| Name | Size | Description |
|---|---|---|
| valid | 1-bit | Indicates whether there is a packet in the interface in the current cycle |
| reqid | 5-bits | Indicates which PMRQ entry the packet belongs. Only [2:0] are relevant |
| phys__addr | 46-bits | Physical address of the request. [45:2] are used for uncacheable and [45:6] for cacheable. |
| req__size | 1-bit | The size of the request: 1 = 64-bits, 0 = 32-bits |
| reqtype | 4-bits | Request type code (see below table for definitions) |
| self__snoop | 1-bit | This request is to miss the L2, be sent to the fabric, and request a snoop to the same address be sent to the core. |

In certain examples, the current paging mode directly controls the req_size. In certain examples, PMH accesses can only be a native size (e.g., 32-bits or 64-bits).

TABLE 41

Request Type Field

| reqtype bit | Definition |
|---|---|
| 3 | 1 = Write__AD, 0 = Read |

TABLE 42

If reqtype[3] = 0, it is a read request and the table below defines what bits [2:0] are:

| reqtype bit | Definition |
|---|---|
| 2 | 1 = Cacheable, 0 = Uncacheable |
| 1 | Unused |
| 0 | 1 = Read__AD, 0 = normal read |

TABLE 43

If reqtype[3] = 1, it is a Write__AD request and the table below defines what bits [2:0] are:

| reqtype bit | Definition |
|---|---|
| 2 | 1 = EPT update, 0 = IA update |
| 1 | Set Dirty |
| 0 | Set Accessed |

In certain examples, the EPT and IA/Guest A/D bits are in different locations, so the L2 needs to know which type of access it is to set the correct ones. In certain examples, the cacheability of the A/D update will need to be saved from the read request and used for the write.

PMRQ L2 Data Response

In certain examples, the L2 can return a plurality (e.g., up to 2) Data Response packets each cycle. In certain examples, the (e.g., 4) L2 slices are paired based (e.g., on bit[7] of) the address. In certain examples, each PMRQ and PWQ entries will monitor both and be capable of grabbing data from either in any given cycle. In certain examples, the matching PMRQ entry will then clear its valid unless it is a read_ad. In certain examples, all PWQ entries that are waiting on the PMRQ ID of the data will then grab the data. In certain examples, two data write ports are required in the PWQ to save the incoming full cache line of data from either packet, and each data can be written into multiple entries at the same time. In certain examples, all the PWQ entries that wrote the data will then setup their request into the FSM pipeline for their next pass.

TABLE 44

| PMH Data Response Packet | | |
|---|---|---|
| Name | Size | Description |
| valid | 1-bit | Valid bit indicates whether there is a packet in the interface in the current cycle. |
| req_id | 5-bits | ID of PMRQ that sent the stuffed load request to the L2 MEM. |
| cacheline_bytes | 512-bits | One cache line worth of data. |
| poison | 2-bit | Indicates if the returned data is poisoned or not. |

PMRQ L2 NACK Response

In certain examples, if the L2 is not able to process a request due to the responses from the spawned internal snoops, it will send back a NACK packet. In certain examples, the PMRQ matching the NACK will then be required to request again and will push into one of the request FIFOs. In certain examples, if the NACK packet had the set_self_snoop bit set, the self-snoop bit in the PMRQ will be set, and the subsequent request will have its self-snoop bit set. In certain examples, this will then cause the L2 to miss and send the request to IDI which will send an external snoop for the line into the core.

In certain examples, like the L2 Data Response, the 2 NACK packets can be received each cycle. In certain examples, the (e.g., 4) L2 slices are paired based on (e.g., bit[7] of) the address. In certain examples, each PMRQ entry will monitor both.

TABLE 45

| PMH NACK Packet | | |
|---|---|---|
| Name | Size | Description |
| valid | 1-bit | Valid packet in the interface in the current cycle |
| pmh_id | 3-bits | PMH request ID |
| set_self_snoop | 1-bit | Indicates to set self-snoop when the request is resent |

PMRQ for AD Update

In certain examples, AD updates require special handling, e.g., because they are read, check, write as a locked process. In certain examples, they can only execute at_ret, e.g., and follow the process described herein for doing their SRI request. In certain examples, a read_ad PMRQ entry will not deallocate after receiving data like a normal request. In certain examples, the data will be sent into the PMH FSM to be checked. In certain examples, this allows the At_Ret Protections to remain in effect. In certain examples, the FSM will then make a write_ad request that switches the PMRQ entry to a write_ad and writes the ept_ad/set_a/set_d bits, but it does not write the cacheable or phys_addr fields. In certain examples, this will occur even if the checks failed. In certain examples, the write_ad will instead be told to write the AD as they were read and will not set any additional. In certain examples, this ensures the conclusion of the locked process. In certain examples, the write_ad will also go into the at_ret bypass request entry which should be able to immediately go onto the SRI since the PMH will still be blocking the SRI and the L2 will be as well. In certain examples, the requesting SRI should thus not be stalled. In certain examples, there is no response packet for a write_ad request, so the PMRQ will be immediately deallocated once its request has been granted.

Page Walk Completion

In certain examples, a walk that performs an address translation request (e.g., as opposed to a TLB invalidation) can complete with one of three end states:

- a successful translation (tlb_fill)
- retry_at_ret (e.g., walk encountered an issue and can only be completed for non-speculative requests)
  - Examples: one of the paging tables was in UC space; insufficient permissions encountered; one of the paging tables did not have accessed or dirty bits set
- fault
  - Page walker encountered a fault or assist which needs to be signaled to software (e.g., page not present fault)
  - Only at_ret requests can signal a fault TLB Fills the STLB is filled upon a successful completion of a page walk. In certain examples, the first level TLBs (e.g., ZTLB/DTLB/ITLB) can be filled by either the successful completion of a page walk or by an STLB hit.

STLB Fills

In certain examples, when a page walk completes with a successful translation, it will take the enhanced STLBQ entry id from the PWQ entry to determine which STLB pipeline to take over. In certain examples, if the PWQ entry was allocated as a result of a DTLB miss, it will take over STLB pipeline 0 and if the PWQ entry was allocated by a ZTLB miss or ITLB miss it will take over pipeline 1. In certain examples, the fill from page walker will block scheduling of STLBQ requests on that STLB pipe, and will write one of the STLB arrays based on the page size returned by the walk (e.g., 4 k, 64 k, 2M or 1G) in a pipeline stage. In certain examples, during the same pass through the pipeline it will deallocate the STLBQ entry that allocated the PWQ entry and will send a TRB deallocation signal to the requester.

In certain examples, the fill from page walker will also broadcast its PWQ entry id to all the STLBQ entries (of all the requesters) to wake up any STLBQ entry that was sleeping with block code MATCH_PWQ or PWQ_FULL. In certain examples, entries sleeping on HAS_PWQ will be kept asleep, as the PMH to STLB fill will deallocate the HAS_PWQ STLBQ entry and will send TRB deallocation to slices (and if needed DTLB fill to slices) as it passes through the PST pipeline.

In certain examples (e.g., since it is taking over the STLB pipeline), the fill from the page walker is then able to use the same pipeline stages and logic to fill the first level TLB just like an STLB hit would. In certain examples, only the first level TLB of the requester will be filled by a successful page walk completion (e.g., either DTLB or ZTLB or ITLB). In certain examples, the page walk fill into STLB/DTLB will be able to send the LA_wakeup to L1 slices when it takes over the STLB pipeline (e.g., where at the beginning of a stage there is a mux that selects between the LA of the winning STLBQ entry, and the LA of the page walk that just completed).

DTLB Fills

In certain examples, if there is an STLB hit (e.g., including passing permission checks) or page walk successful translation return, the PST pipeline will attempt to fill the DTLB as well.

In certain examples, the PMH circuitry contains a primary DTLB structure which is identical to all DTLB structures in L1 slice and prefetcher circuitry, e.g., with the exception that it does not need to store the actual Physical Address, only the DTLB tag and some attributes/permission bits. In certain examples, first, the Primary DTLB is read in the first STLB pipeline stage (PST1) to determine if the entry has already been previously filled. In certain examples, permission checks are also performed in the Primary DTLB entry. In certain examples, if there is a Primary DTLB miss in addition to an STLB hit or PMH TLB fill, a DTLB fill packet will be sent to all L1 slices as well as the Prefetcher circuitry. In certain examples, the DTLB fill packet will have either the data and attributes read from STLB (e.g., in case of an STLB hit) or the data and attributes returned by PMH at the end of a successful walk. In certain examples, to accomplish this, there will be a mux to select between STLB read-out data and PMH fill data.

In certain examples, DTLB fill is generated if all of the following are true:

- STLB tag hit or page walk wants to do a fill
- STLB did not encounter permission faults (e.g., store hitting STLB entry with W=0) or d-only misses
- Primary DTLB does not have the translation already with the correct permissions
  - A different L1 slice could have filled DTLB earlier, or is about to fill DTLB in the previous cycle.
  - If the request is at_ret, it will always do a DTLB fill but with just the at_ret_fill bit set and not the dtlb_fill bit.

In certain examples, DTLB fill packet is generated at the end of a stage, and will take one or more (e.g., 4) cycles to reach the farthest L1 slice. In certain examples, the DTLBs in all slices will be written at the same time, while the Primary DTLB will be written in a different stage.

ZTLB Fills

In certain examples, the PMH circuitry contains a primary ZTLB structure identical to the cluster ZTLBs, e.g., with the exception that the physical address does not need to be stored (to save area). In certain examples, the STLB pipeline reads the primary ZTLB tag array. In certain examples, hit/miss is determined using 3 things:

1. Tag array comparison from tag array read
2. An extra "virtual" way of tag comparison from stage writes
3. Conditions specified in L0 Load Requirements In certain examples, the primary ZTLB write can be setup as well as sending the ZTLB fill packet and TRB deallocation packet to the L0 clusters. In certain examples, the primary ZTLB is written while the ZTLBs in all clusters are written in sync in a later stage (e.g., due to the RC delay of cycles from PMH circuitry to the farthest L0 cluster).

In certain examples, L0 will stage TRB deallocation (e.g., by one cycle) after arrival in order to ensure that the corresponding ZTLB update is visible before another load misses and tries to allocate a duplicate PMH request.

L0 Load Requirements

In certain examples, the L0 uses the ZTLB to verify that loads meet L0 requirements. In certain examples, this means that the PMH has the responsibility to only fill into the ZTLB pages that meet L0 load requirements. In certain examples, only pages that meet the following requirements should be filled into the ZTLB:

- ~is_physical (this is automatically satisfied because the L0 doesn't handle physical load requests and will not look up ZTLB to send a physical ZTLB miss to PMH)
- memtype is WB, WT, or WP
- Page is user-mode readable (u bit from page table entry is 1)
- There is no range register (RR) collision with the page
- Translation was not mapped by page walker abort_page
- Disqualifications related to SPP (subpage protection)

ITLB Fills

In certain examples, PMH circuitry does not contain information about the contents of ITLB and is not responsible for managing fills. In certain examples, as such, an STLB hit by an i-side request (e.g., tag match and tag's i-side bit is set) will result in an ITLB fill response and FE TRB deallocation. In certain examples, a page walk completion for an i-side request will fill STLB and will send an ITLB fill response and FE TRB deallocation. In certain examples, there is no Primary ITLB to be looked up, so the ITLB fill could be sent to FE Box at the same time as the STLB fill. In certain examples, however, since FE requests shares an STLB pipeline with MEM L0 clusters, the ITLB fill will be generated to match the same timing as the ZTLB fill to avoid special casing/pipe stage mismatch between different requests sharing the STLB pipeline.

PMH Interface

Figure 11:
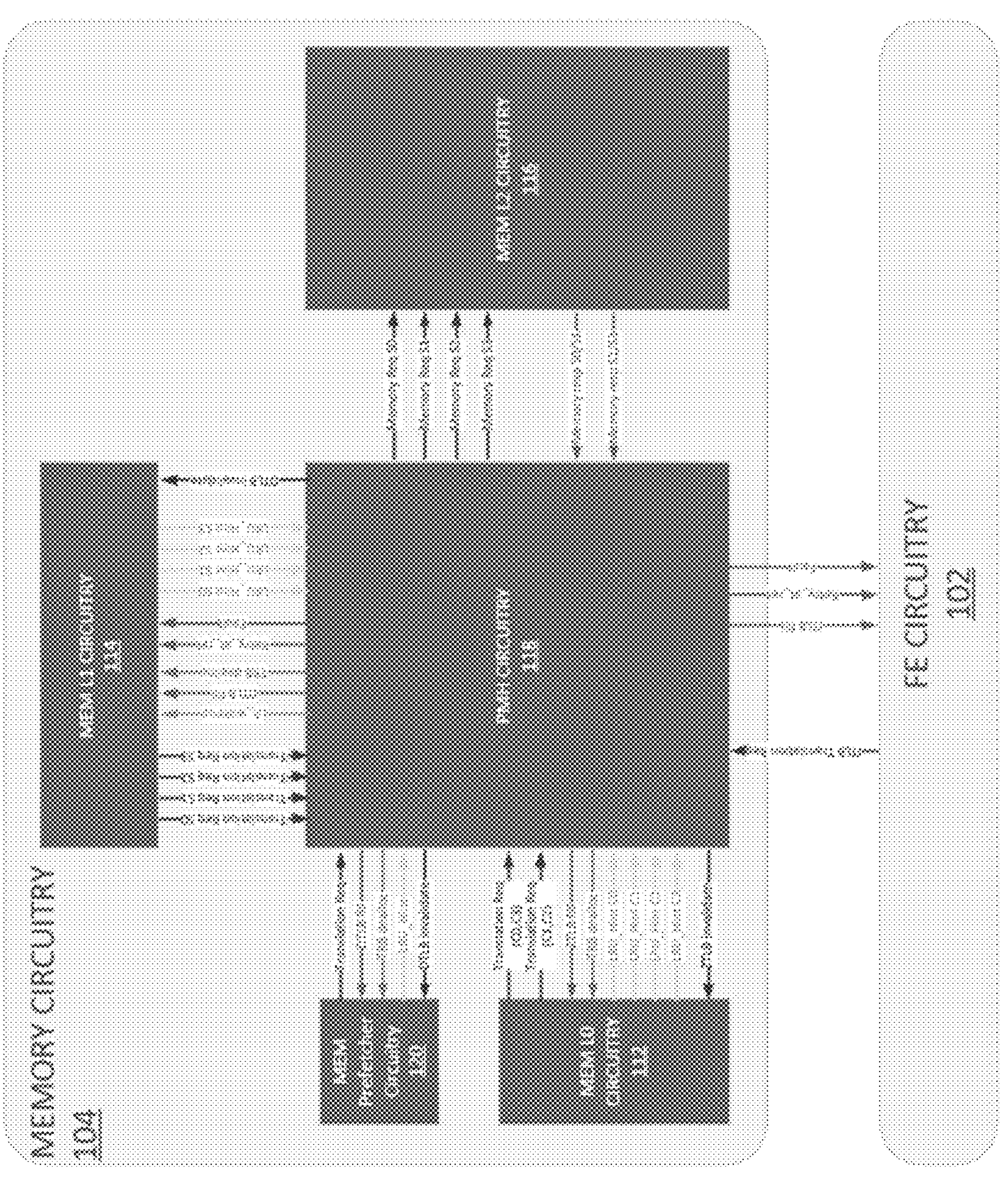
FIG. 11 illustrates interface couplings for the PMH circuitry according to examples of the disclosure.

FIG. 11 illustrates interface 1100 couplings for the PMH circuitry 118 according to examples of the disclosure.

L1 MEM Slice<—>PMH Interfaces

DTLB miss interface [e.g., FLD5]: In certain examples, each slice of L1 MEM has a respective instance of the DTLB miss interface to the PMH circuitry. In certain examples, this DLTB miss interface is used when there is a DTLB miss and the STLB/PMH is needed to perform Page Translation. In certain examples, only one request can be sent per cycle per slice.

In certain examples, DTLB misses in L1 MEM are collected in a Translation Request Buffer (TRB) (see, for example, FIG. 10), and sent to the PMH circuitry. In certain examples, the PMH circuitry maintains guaranteed storage for the translation requests in the STLBQ, therefore PMH is guaranteed to sink any translation requests sent to the PMH. In certain examples, there is 1:1 mapping between TRB entry ID and STLBQ entry ID for each slice.

The following table 46 depicts example fields of fl_tlb_miss_req_mfld5h[NUM_L1_SLICES-1:0]:

TABLE 46

Fields of the DTLB Miss –> PMH Request Packet

| Name | Size | Description |
|---|---|---|
| valid | 1-bit | Valid bit indicates whether there is a packet in the interface in the current cycle |

TABLE 46-continued

Fields of the DTLB Miss -> PMH Request Packet

| Name | Size | Description |
|---|---|---|
| trb_eid | 3-bits | Entry ID of the TRB/STLBQ allocated for this request |
| lin_addr | 36-bits | Linear Address bits to the smallest page boundary (e.g., LA[47:12]) |
| is_physical | 1-bit | µops like Load or Store Physical will set this to true |
| is_at_ret | 1-bit | Set to true when the requesting load/STA is the oldest in the machine |
| needs_write | 1-bit | This is true for stores or µops with LWSI semantics |
| is_user | 1-bit | Requesting instruction is in user mode |
| supovr | 1-bit | USED for SMAP checks or C6/core SRAM accesses. |
| other_seg_ovr | 1-bit | Seg overrides |
| guest_phys | 1-bit | EPT/VMX |
| spare | 10-bits | E.g., CET/shadow stack |
| tlb_inv | 1-bit | E.g., not a true DTLB miss but a TLB invalidation. |
| special_la | 5-bits | For TLB invalidation encoding |

DTLB LRU information [e.g., FLD4/FST4]: In certain examples, slices send periodic updates to PMH, e.g., such that DTLB LRU can be updated to reflect recently used ways in a set. In certain examples, there is one LRU packet per L1 slice per cycle:

TABLE 47 fl_dtlb_lru_upd_mfld4h[NUM_L1_SLICES-1:0]

| Name | Size | Description |
|---|---|---|
| valid | 1-bit | Valid bit indicates whether there is a packet in the interface in the current cycle |
| ps | 2-bits | DTLB page size that was hit (e.g., 4k, 64k, 2M, 1G), such that the LRU for the corresponding DTLB array can be updated |
| set | 6-bits | The DTLB set that was hit. Need to cover the largest number of sets (e.g., 4k/64k/2M DTLB) |
| way | 2-bits | The DTLB way that was hit |

In certain examples, a (e.g., 1G) DTLB is a fully associative array with multiple (e.g., 16) ways. In certain examples, in order to represent the way hit, the fl_dtlb_lru_upd_mfld4h packet will use the lower two bits of the set in conjunction with the two bits of way, e.g., 1G LRU update way={set[1:0],way[1:0]}.

In certain examples (e.g., in FLD3/FST3) multiple (e.g., 3) load pipes and multiple (e.g., 4) STA pipes total a plurality of (e.g., 7) hits in DTLB per cycle. In certain examples, a round robin arbitration amongst loads and store pipes happens (e.g., in FLD3). In certain examples, each winner from load pipeline and store pipeline LRU will be sent to a central location. In certain examples, (e.g., in FLD4), out of 2nd level round robin arbitration amongst load and store pipeline there will be one ultimate LRU winner that will be sent to PMH. In certain examples, after the DTLB LRU packet is generated (e.g., in FLD4), it will take {llslice_pmh_delay} cycles to reach PMH.

PMH←→L1 MEM Interfaces

LA_Wakeup Interface [e.g., PST1]: In certain examples, the linear address (LA) wakeup interface is used to wake up loads, STAs, and/or prefetches that are blocked waiting for the PMH. In certain examples, the linear address will be checked in all L1 slices against all TRB entries, e.g., if a match is found then all pops sleeping in ICLB or SAB on that TRB_ID will be woken up.

In certain examples, PMH circuitry can send at most one wakeup_linaddr request per cycle (broadcast to all L1 slices).

TABLE 48

Linear Address Wakeup Packet

| Name | Size | Description |
|---|---|---|
| wakeup_val | 1-bit | Valid bit indicates whether there is a packet in the interface in the current cycle. |
| wakeup_linaddr | 36-bits | Virtual address bits to the smallest page boundary, e.g., LA[47:12] |

DTLB Fill Response Interface [e.g., PST4]: In certain examples, the DLTB fill response interface includes all the fields that are to be filled into the DTLB. In certain examples, PMH keeps a primary copy of the DTLB in order to keep all of the slice DTLBs synchronized and make centralized victim selection decisions. In certain examples, PMH circuitry is responsible for checking that there are no duplicates filled in the DTLB. In certain examples, all slice DTLBs (e.g., and prefetcher DTLB) are copies of the Primary DTLB and they are identical to each other.

In certain examples, PMH circuitry can send at most one dTLB fill request per cycle (broadcast to all L1 slices and to Prefetcher circuitry).

TABLE 49

DTLB Fill Packet

| Name | Size | Description |
|---|---|---|
| dtlb_fill | 1-bit | This bit indicates that the DTLB needs to be filled with the translation in this packet |
| dtlb_page_size | 2-bits | This indicates which of the (e.g., 4 page size) DTLBs needs to be filled (e.g., 4k, 64k, 2M, 1G). This is also called effective page size |
| dtlb_fill_way | 2-bits | Indicates which way of the DTLB specified by dtlb_page_size should be filled. The set is determined from wakeup_linaddr |

TABLE 49-continued

| DTLB Fill Packet | | |
|---|---|---|
| Name | Size | Description |
| at_ret_fill | 1-bit | Indicates this DTLB fill is from the at_ret μop. Needs to write the At_Ret Bypass DTLB entry |
| phys_addr | 34-bits | Physical Address bits to the smallest page boundary (e.g., PA[45:12]) |
| global | 1-bit | Returns true if this is a global page, which is important for invalidations |
| memtype | 3-bits | Memory type: UC/USWC/Write Through/Write Protect/Write Back |
| write | 1-bit | Indicates that this page is allowed to be written (stores are allowed to use this translation) |
| user | 1-bit | Indicates that this page is allowed to be accessed by user transactions |
| dirty | 1-bit | Indicates that this page is already marked as dirty. If stores try to access this translation and dirty bit is not set, they will need to go to PMH and set this bit before using the translation |
| phys | 1-bit | Indicates this translation was for physical accesses (pages where VA == PA, used by μops like load_phys or store_phys |
| eptw | 1-bit | EPT write permission |
| pkeyw | 1-bit | Protection keys |
| pkey | 4-bits | Protection keys |
| spare | 10-bits | E.g., secure enclaves, CET/shadow stack, etc. |
| csrr | 1-bit | Indicates this range is in the Core SRAM region - the walk was done for a physeg_supovr request and only physeg_supovr μops can use this translation |
| avrr | 1-bit | AVRR/interrupt controller (e.g., Advanced Programmable Interrupt Controller (APIC)) virtualization, e.g., Indicates that this translation hit the virtual APIC range |
| *rr | 5-bits | This walk hit a special range register region - special behavior needs to happen in L1 for μops that hit this translation (e.g., AMRR). E.g., uses a list of all the range registers that uCode needs. |

In certain examples, the linear address does not need to be sent with this packet because it was sent at the beginning of the STLB pipeline as wakeup_linaddr and will be staged internally in L1 slices.

TRB deallocation and/or fault [e.g., PST3]: In certain examples, the TRB deallocation and/or fault interface indicates that PMH has finished using the resources associated with the TRB entry in an L1 slice. In certain examples, the TRB can then be deallocated and reused for another translation. In certain examples, this interface also informs L1 slices if there is a fault associated with that TRB request or if the pop that allocated it needs to be re-tried at-ret. In certain examples, only the slice indicated in this packet should deallocate its TRB entry.

TABLE 50

| TRB Deallocation and/or Fault Packet | | |
|---|---|---|
| Name | Size | Description |
| trb_dealloc | 1-bit | Indicates that the TRB entry specified in this packet can be deallocated |

TABLE 50-continued

| TRB Deallocation and/or Fault Packet | | |
|---|---|---|
| Name | Size | Description |
| trb_eid | 3-bit | The TRB entry that needs to be deallocated |
| slice_id | 2-bit | The slice in which this TRB needs to be deallocated |
| retry_at_ret | 1-bit | This request encountered an exception in PMH, and needs to retry this request non-speculatively |
| fault_valid | 1-bit | This request was non speculative and encountered a fault |

L0 MEM Cluster<—>to PMH Interfaces

L0 PMH Request Interface [e.g., ZLD4]: In certain examples, the L0 PMH request interface includes all the fields that are sent to PMH from TRB entries in each L0 cluster.

TABLE 51

| Fields of the PMH Request Packet | | | |
|---|---|---|---|
| RTL Signal | Name | Size | Description |
| zl_tlb_miss_req_val_mzld4h | — | 1-bit | Valid bit indicates whether there is a packet in the interface in the current cycle. |
| zl_tlb_miss_req_mzld4h | trb_eid | 2-bits | TRB entry of request |
| | cluster | 1-bit | Cluster ID of request |
| | lin_addr | 36-bits | Linear address bits to the smallest page boundary |
| | needs_write | 1-bit | Request is for a write operation or LWSI |

ZTLB LRU Hint Interface [e.g., ZLD3]: In certain examples, the LRU Hint is sent from L0 clusters to PMH for primary ZTLB LRU updates.

TABLE 52

| Fields of the ZTLB LRU Hint Packet | | | |
|---|---|---|---|
| RTL Signal | Name | Size | Description |
| zl__ztlb__lru__upd__val__mzld3h | — | 1-bit | Indicates that the L0 cluster had a ZTLB tag hit |
| zl__ztlb__lru__upd__mzld3h | way | 5-bits | ZTLB way of tag hit |

PMH<→L0 MEM Clusters

ZTLB Fill Response Interface [e.g., PST8]: In certain examples, this interface includes all the fields that are to be filled into the ZTLB.

TABLE 53

| Fields of the DTLB Fill Packet | | | |
|---|---|---|---|
| RTL Signal | Field Name | Size | Description |
| pmh__ztlb__fill__val__mpst8h | — | 1-bit | Valid bit indicates whether there is a packet in the interface in the current cycle. |
| pmh__ztlb__fill__mpst8h | phys__addr | 34-bits | Physical Address bits to the smallest page boundary |
| | lin__addr | 36-bits | Virtual address bits to the smallest page boundary |
| | glb | 1-bit | Returns true if this is a global page, which is important for invalidations. |
| | ztlb__page__size | 2-bits | Effective page size. Can be different from page size resulted from the page walk in some special cases (if MTRR did not overlap the page completely, then we need to break the page into smaller pages even though the page table says it is a large page. |
| | dirty | 1-bit | Dirty bit. |
| | write | 1-bit | Write permission bit. |
| | ztlb__fill__way | 5-bits | Way of ZTLB to write (or overwrite) |

TRB Deallocation [e.g., PST8]: In certain examples, the TRB deallocation interface includes the fields necessary to deallocate L0 cluster TRB entries. In certain examples, it is a single shared bus that connects to all L0 clusters.

TABLE 54

| TRB Deallocation Format | | | |
|---|---|---|---|
| RTL Signal | Field Name | Size | Description |
| pmh__trb__dealloc__val__mpst8h | — | 1-bit | Valid bit indicates whether there is a packet in the interface in the current cycle. |
| pmh__trb__dealloc__mpst8h | trb__eid | 2-bits | TRB entry to invalidate |
| | trb__clusterid | 2-bits | L0 cluster in which to invalidate TRB entry |

TLB invalidation: In certain examples (e.g., for simplicity), any TLB invalidation whether page specific or asid specific will invalidate the entire L0 TLB.

TABLE 55

| TLB Invalidation Format | | | | |
|---|---|---|---|---|
| RTL Signal | Field Name | Datatype | Size | Description |
| pmh__tlb__inval__mnnnh | — | logic | 1-bit | When set, the entire L0 TLB will be invalidated in the next cycle |

FE-to-PMH Interfaces iTLB miss interface [e.g., BP5]: In certain examples, FE circuitry has a single iTLB miss request interface to the PMH circuitry. In certain examples, this is used when there is an iTLB miss and the STLB/PMH is needed to perform Page Translation. In certain examples, only one request can be sent per cycle.

In certain examples, page misses in FE are collected in a Translation Request Buffer (TRB), and sent to the PMH circuitry. In certain examples, the PMH circuitry maintains guaranteed storage identical in size to the TRB, called STLBQ. In certain examples, PMH is guaranteed to sink any translation requests sent to the PMH as long as FE does not reuse TRB entries before the entries have received a response from PMH.

In certain examples:

Multiple (e.g., 8) entry TRB/STLBQ

TRBs and STLBQ entries are 1:1 with no explicit control flow

Each iTLB miss request to PMH is guaranteed to receive a response.

In certain examples, the TRB stores the virtual address of the iTLB miss request. In certain examples, subsequent iTLB misses are checked (e.g., CAMed) against the TRB (e.g., at 4 k page granularity), and any matches are blocked from allocation. In certain examples, any VA exists in the TRB only once. In certain examples, there are no duplicate VAs in TRB.

In certain examples, FE can have multiple TLB miss requests outstanding to PMH. In certain examples, FE can reserve an entry for at-retirement fetches or forward-progress guarantees as necessary. In certain examples (e.g., as a result of this property), there is no mechanism to cancel a request issued by FE.

In certain examples, FE scans and reads the physical address queue (PAQ) (e.g., storing physical addresses to start fetching from) (e.g., in BP5) and produces a valid packet. In certain examples, all the staging after this point belongs to MEM.

In certain examples, ASID is not required on the iTLB miss request interface. In certain examples, any change in context (e.g., MOV CR3) blocks iTLB from starting any new access and drain PMH. In certain examples, PMH cannot return a translation for an old ASID while FE starts to operate with a new ASID (e.g., around MOV CR3).

TABLE 56

| Fields of the PMH Request Packet from FE | | |
|---|---|---|
| Name | Size | Description |
| valid | 1-bit | Valid bit indicates whether there is a packet in the interface in the current cycle. |
| trb__eid | 3-bits | TRB (STLBQ) entry of the iTLB miss request |
| linaddr | 36-bits | Linear address bits to the smallest page boundary (e.g., 4k): e.g., LA[47:12] |

TABLE 56-continued

| Fields of the PMH Request Packet from FE | | |
|---|---|---|
| Name | Size | Description |
| is__at__ret | 1-bit | Set to true when the requesting load/STA is the oldest in the machine |
| is__user | 1-bit | Requesting instruction is from user space |

PMH<—>FE Interfaces iTLB Fill Response Interface [e.g., PST7]: In certain examples, MEM performs page translation services for the FE when the FE has an ITLB miss. In certain examples, this is the response interface for ITLB miss requests, after the page table walk or STLB access is completed.

In certain examples, PMH circuitry guarantees that it will send a response for every iTLB miss/TRB_eid that it receives.

In certain examples, the response can be one of the following mutually exclusive options:

valid_translation fault retry_at_ret

In certain examples, faulting page translations have special semantics to be correct in a processor architecture (e.g., x86 architecture). In certain examples, if a speculative (e.g., non-at-retire) page translation faults, that page translation is to retry when it is in a non-speculative point in the machine. In certain examples, this is required to accurately take faults, set access bits in the page table, and other reasons. In certain examples, if a fault occurs on a request that did not have the at-ret bit set on the request, MEM will respond with a retry at retirement (e.g., "retry_at_ret") signal. In certain examples, if a fault occurs when the request was at-ret, MEM will respond with a fault bit and set appropriate registers in the PMH.

In certain examples, the iTLB Fill Response interface includes all the fields that are to be filled into the iTLB. In certain examples, the PMH drives a valid packet on this interface after the table-walk or STLB access is completed.

In certain examples, there is dedicated response channel from PMH back to FE, e.g., but no early-warning or wake-up on the channel. In certain examples, the PMH drives a valid packet on the interface and asserts the valid_translation, retry_at_ret, or fault_valid bit for that cycle.

In certain examples:

The channel supports 1 PMH response (e.g., TLB write) per cycle.

PMH responses can be out of order relative to the order of requests.

FE takes care of which way to fill in the iTLB, and when to fill the iTLB after valid is received In certain examples, FE will have to filter fills in iTLB to ensure that the same translation is not filled into two different ways in the cases when PMH returns an effective page size larger than a page granularity (e.g., 4 KB).

In certain examples, FE will support native 2M and 1G iTLBs. In certain examples, the hole-bit is needed to prevent accesses to the lowest (e.g., 1M) physical address from using a large page translation for Page 0. In certain examples, accesses to physical page 0 that are above the lowest (e.g., 1M) address space are allowed to hit iTLB entries marked with "hole" bit

TABLE 57

Fields of the iTLB Fill Packet.

| Name | Size | Description |
|---|---|---|
| TRB_eid | 3-bits | The TRB entry that issued the iTLB miss request to PMH |
| valid_translation | 1-bit | Valid bit indicates whether there is a valid translation on the interface in the current cycle. (This bit will not be set if PMH responds with fault_valid or retry_at_ret) |
| retry_at_ret | 1-bit | This table-walk encountered an exception or potential fault, so retry this table-walk again when request becomes at_ret if needed |
| fault_valid | 1-bit | This table-walk has faulted (only possible if the address translation sent to PMH was for a non-speculative/atret request) |
| phys_addr | 34-bits | Physical Address bits to the smallest page boundary (e.g., PA[45:12] |
| global | 1-bit | Returns true if this is a global page, which is important for invalidations. |
| PPPE | 1-bit | Indicates this walk was done for a physeg_supovr request and only physeg_supovr μops can use this translation |
| memtype | 3-bits | Memory type |
| user | 1-bit | User/supervisor page permissions. E.g., 1 indicates that it can be accessed by user requests. 0 indicates that only supervisor accesses are allowed |
| eff_ps | 2-bits | Effective page size can be different from page size resulted from the page walk in some special cases (if MTRR did not overlap the page completely, then we need to break the page into smaller pages even though the page table says it is a large page. E.g., Encoding: 00:4K 01:64K 10:2M 11:1G |
| asid | 4-bits | Address Space ID associated with this translation. E.g., only requests with the same ASID can use this TLB entry. |

In certain examples, a FE makes multiple (e.g., 4) translation requests to PMH. In certain examples, each request has a unique TRB_eid from the other requests in flight.

In certain examples, responses from PMH can be out of order.

Request made for TRB_eid 0 receives a "retry_at_ret" response from PMH, meaning that it encountered a hiccup and PMH cannot handle it speculatively.

Request made for TRB_eid 1 receives a "fault_valid" response from PMH, implying that the request was made with "at_ret" attribute set. Additional information about the fault is stored in PMH circuitry control registers (CRs), which uCode fault handler can access.

Request made for TRB_eid 2 receives a valid translation response, which FE can store in the iTLB. The response effective page size is 2M (not shown in waveform for brevity)

Request made for TRB_eid 3 also receives a valid translation response, which turns out to be the same large page as the response sent to TRB_eid 2. FE needs to filter out this translation response and not fill it in the iTLB to avoid duplicate iTLB entries. This is possible because TRB_eid 2 and 3 were to different (e.g., 4 k) LA regions that ended up mapping on the same (e.g., 2M) physical page.

PMH<—>L2 MEM Interfaces

PMH Requests: In certain examples, the PMH can send SL parcel up to a number of (e.g., two) requests per cycle. In certain examples, the request ports are divided (e.g., into 4) based on (e.g., bits [7:6] of) the physical address. In certain examples, it is up to the PMH circuitry to place the requests onto the correct port.

In certain examples, each port will become a part of the Shared Request Interface (SRI). In certain examples, this is a single unified request interface used by the Front End, PMH, and Prefetcher. In certain examples, this is a stall based interface, so as long as a particular port is not stalled the PMH may insert 1 request per cycle into the port.

In certain examples, each SRI port will see different minimum latencies, e.g., where the distance from the PMH to SL slice0 is substantially different than the distance from the PMH to SL slice3.

In certain examples, the bit fields of the SRI are a superset of Front End, PMH, and Prefetcher so not all bit fields are used by the PMH. In certain examples, any bit fields not used should be driven to 0's.

TABLE 58

Fields of the PMH to SL Request Packet

| Name | Size | Description |
|---|---|---|
| valid | 1-bit | Valid bit indicates whether there is a packet in the interface in the current cycle |
| req_id | 5-bits | PMH request ID |
| phys_addr | 46-bits | Physical address of the line being requested. E.g., Full byte address required for UC requests. E.g., cache line [45:6] address required for cacheable requests |
| req_size | 1-bit | The size in bytes of the request (e.g., 0: 4 bytes and 1: 8 bytes) |
| req_type | 4-bits | Request type code. (Can be cacheable, uncacheable, etc.) |
| self_snoop | 1-bit | This PMH request is to miss the L2 cache, be sent to the fabric, and request a snoop to the same address to be sent to the core |

L2 MEM<—>PMH Interfaces

PMH NACK: In certain examples, e.g., when second level (SL) from L2 MEM is unable to satisfy a request from PMH, SL will send a negative acknowledgment (or not acknowledged) ("NACK") packet back to PMH. In certain examples, the NACK informs PMH that the L2 MEM (e.g., SL) circuitry is unable to satisfy PMH's request at this time. In certain examples, the PMH can then decide whether they want to re-send the request at a later time. In certain examples, the set_self_snoop bit informs PMH that the line it is requesting is being modified (and GO'd) somewhere in the FL parcel. In certain examples, PMH is then to resend the same request but with a self-snoop bit set.

TABLE 59

Fields of the PMH NACK Packet

| Name | Size | Description |
|---|---|---|
| valid | 1-bit | valid |
| req_id | 3-bits | PMH request ID |
| set_self_snoop | 1-bit | Tells PMH to set the self-snoop bit if PMH resends the request |

PMH Data line: In certain examples, L2 MEM (e.g., SL) circuitry is to respond to PMH with whole (e.g., 64B) cache lines of data depending on the request type. In certain examples (e.g., for UC stuffed loads) where less than a cache line (e.g., 64B) of data was requested, only some of the cache line (e.g., 64B) returned will be valid. In certain examples, it is up to the PMH to track how many bytes were originally requested and to only use those bytes.

In certain examples, the L2 MEM circuitry may send PMH up to a number of (e.g., 2) PMH data line responses per cycle. In certain examples, the response buses are divided into that number (e.g., 2) based on (e.g., PA bit[7] of) the physical address. In certain examples, two SL slices are paired with a single PMH data line data return bus, and there is one PMH data line return per SL slice pair. In certain examples, each data return bus may return one PMH data line per cycle.

TABLE 60

Fields of the PMH Data Line Response Packet

| Name | Size | Description |
|---|---|---|
| valid | 1-bit | valid bit indicates whether there is a packet in the interface in the current cycle |
| req_id | 3-bits | PMH request ID that sent to SL as a part of the original request |
| data | 512-bits | one cache line worth of data |
| *poison | 2-bit | indicates if the returned data is poisoned or not |

Figure 12:
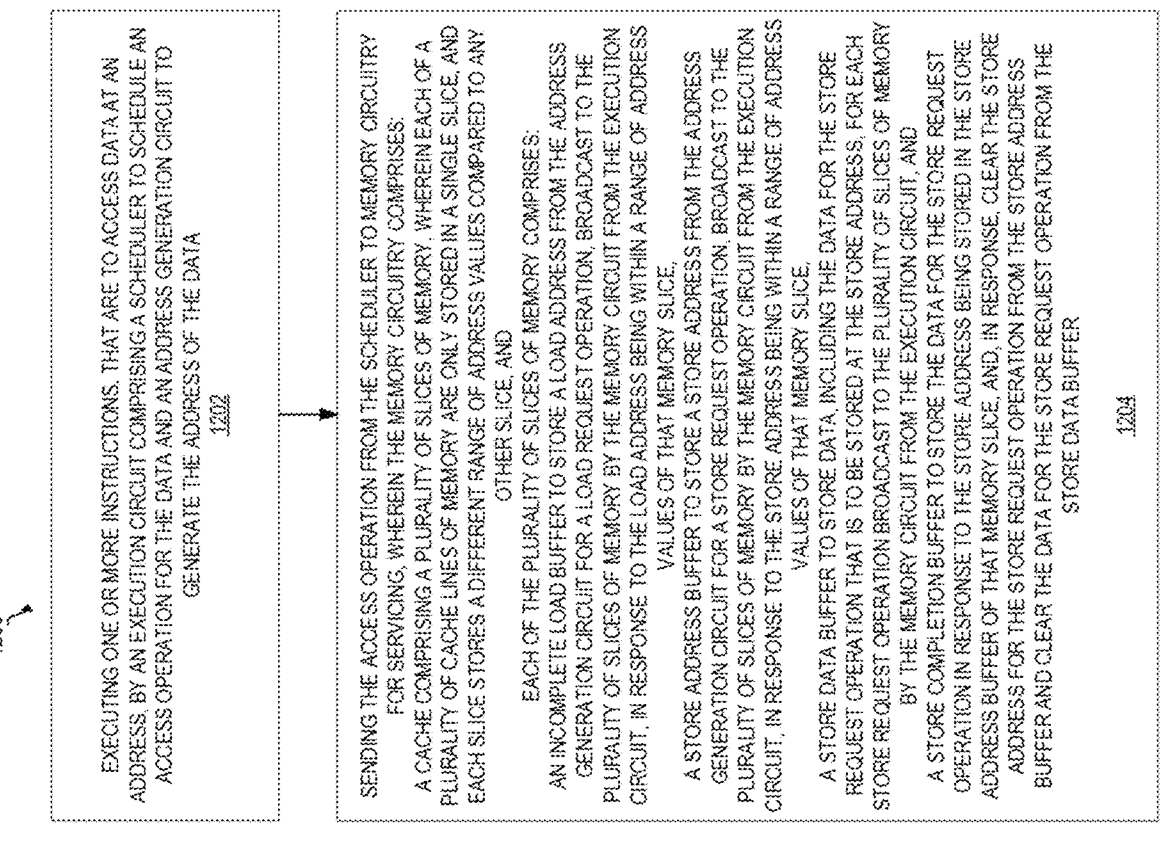
FIG. 12 is a flow diagram illustrating operations of a method for servicing a memory access operation (e.g., load or store) with memory circuitry according to examples of the disclosure.

FIG. 12 is a flow diagram illustrating operations 1200 of a method for servicing a memory access operation (e.g., load or store) with memory circuitry according to examples of the disclosure. Some or all of the operations 1200 (or other processes described herein, or variations, and/or combinations thereof) are configured under the control of a core (or other components discussed herein) as implemented herein and/or one or more computer systems (e.g., processors) configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1200 are performed by memory circuitry (e.g., memory circuitry 104) of the other figures.

The operations 1200 include, at block 1202, executing one or more instructions, that are to access data at an address, by an execution circuit comprising a scheduler to schedule an access operation for the data and an address generation circuit to generate the address of the data. The operations 1200 include, at block 1204, sending the access operation from the scheduler to memory circuitry for servicing, wherein the memory circuitry comprises: a cache comprising a plurality of slices of memory, wherein each of a plurality of cache lines of memory are only stored in a single slice, and each slice stores a different range of address values compared to any other slice, and each of the plurality of slices of memory comprises: an incomplete load buffer to store a load address from the address generation circuit for a load request operation, broadcast to the plurality of slices of memory by the memory circuit from the execution circuit, in response to the load address being within a range of address values of that memory slice, a store address buffer to store a store address from the address generation circuit for a store request operation, broadcast to the plurality of slices of memory by the memory circuit from the execution circuit, in response to the store address being within a range of address values of that memory slice, a store data buffer to store data, including the data for the store request operation that is to be stored at the store address, for each store request operation broadcast to the plurality of slices of memory by the memory circuit from the execution circuit, and a store completion buffer to store the data for the store request operation in response to the store address being stored in the store address buffer of that memory slice, and, in response, clear the store address for the store request operation from the store address buffer and clear the data for the store request operation from the store data buffer Exemplary architectures, systems, etc. that the above may be used in are detailed below. Exemplary instruction formats that may cause any of the operations herein are detailed below.

Example Computer Architectures

Detailed below are descriptions of example computer architectures. Other system designs and configurations known in the arts for laptop, desktop, and handheld personal computers, (PC)s, personal digital assistants, engineering workstations, servers, disaggregated servers, network devices, network hubs, switches, routers, embedded processors, digital signal processors (DSPs), graphics devices, video game devices, set-top circuitry, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 13:
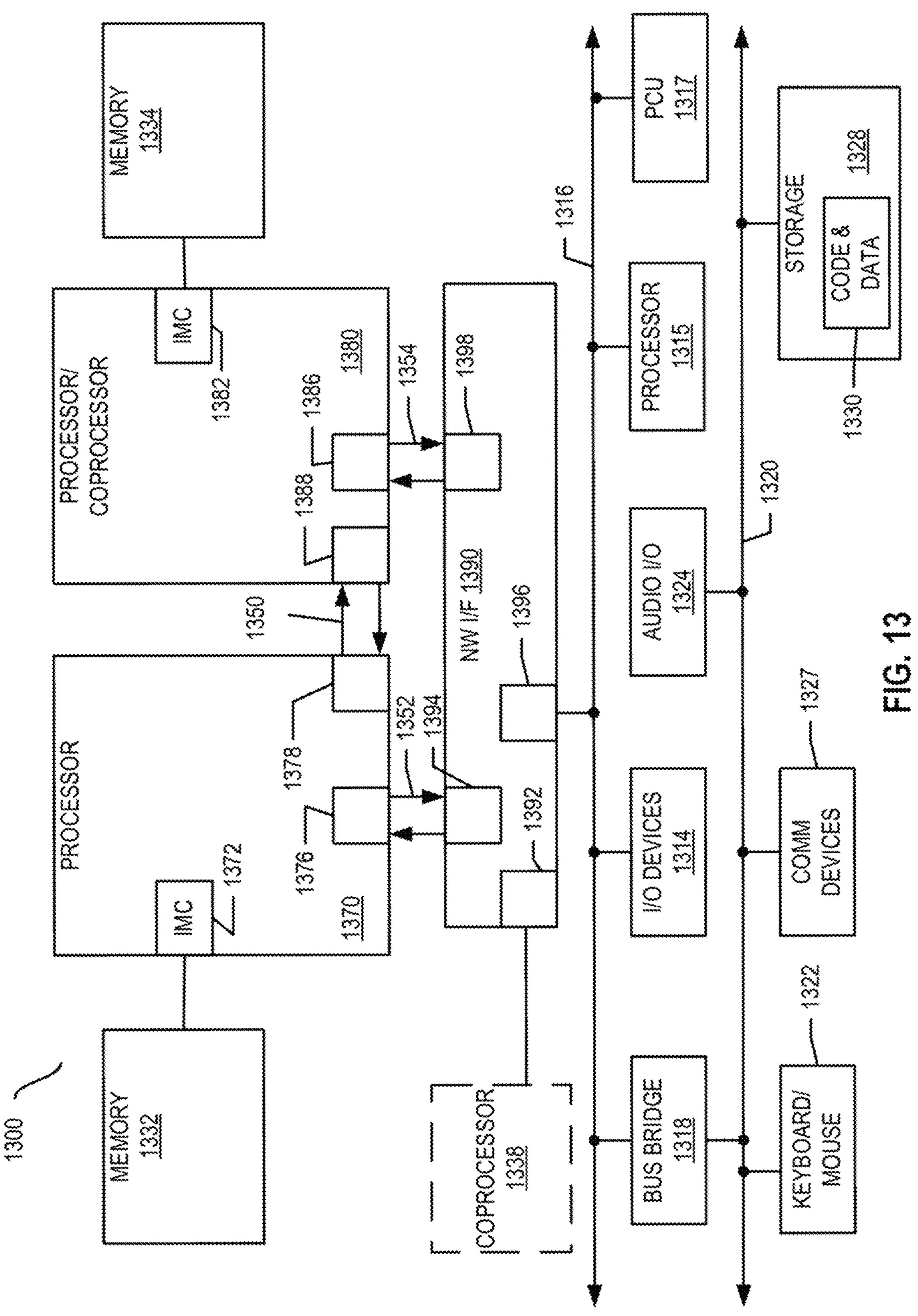
FIG. 13 illustrates an example computing system.

FIG. 13 illustrates an example computing system. Multiprocessor system 1300 is an interfaced system and includes a plurality of processors or cores including a first processor 1370 and a second processor 1380 coupled via an interface 1350 such as a point-to-point (P-P) interconnect, a fabric, and/or bus. In some examples, the first processor 1370 and the second processor 1380 are homogeneous. In some examples, first processor 1370 and the second processor 1380 are heterogenous. Though the example system 1300 is shown to have two processors, the system may have three or more processors, or may be a single processor system. In some examples, the computing system is a system on a chip (SoC).

Processors 1370 and 1380 are shown including integrated memory controller (IMC) circuitry 1372 and 1382, respectively. Processor 1370 also includes interface circuits 1376 and 1378; similarly, second processor 1380 includes interface circuits 1386 and 1388. Processors 1370, 1380 may exchange information via the interface 1350 using interface circuits 1378, 1388. IMCs 1372 and 1382 couple the processors 1370, 1380 to respective memories, namely a memory 1332 and a memory 1334, which may be portions of main memory locally attached to the respective processors.

Processors 1370, 1380 may each exchange information with a network interface (NW I/F) 1390 via individual interfaces 1352, 1354 using interface circuits 1376, 1394, 1386, 1398. The network interface 1390 (e.g., one or more of an interconnect, bus, and/or fabric, and in some examples is a chipset) may optionally exchange information with a coprocessor 1338 via an interface circuit 1392. In some examples, the coprocessor 1338 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1370, 1380 or outside of both processors, yet connected with the processors via an interface such as P-P interconnect, such that either or both processors' local cache information may be stored in the shared cache if a processor is placed into a low power mode.

Network interface 1390 may be coupled to a first interface 1316 via interface circuit 1396. In some examples, first interface 1316 may be an interface such as a Peripheral Component Interconnect (PCI) interconnect, a PCI Express interconnect or another I/O interconnect. In some examples, first interface 1316 is coupled to a power control unit (PCU) 1317, which may include circuitry, software, and/or firmware to perform power management operations with regard to the processors 1370, 1380 and/or co-processor 1338. PCU 1317 provides control information to a voltage regulator (not shown) to cause the voltage regulator to generate the appropriate regulated voltage. PCU 1317 also provides control information to control the operating voltage generated. In various examples, PCU 1317 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1317 is illustrated as being present as logic separate from the processor 1370 and/or processor 1380. In other cases, PCU 1317 may execute on a given one or more of cores (not shown) of processor 1370 or 1380. In some cases, PCU 1317 may be implemented as a microcontroller (dedicated or general-purpose) or other control logic configured to execute its own dedicated power management code, sometimes referred to as P-code. In yet other examples, power management operations to be performed by PCU 1317 may be implemented externally to a processor, such as by way of a separate power management integrated circuit (PMIC) or another component external to the processor. In yet other examples, power management operations to be performed by PCU 1317 may be implemented within BIOS or other system software.

Various I/O devices 1314 may be coupled to first interface 1316, along with a bus bridge 1318 which couples first interface 1316 to a second interface 1320. In some examples, one or more additional processor(s) 1315, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1316. In some examples, second interface 1320 may be a low pin count (LPC) interface. Various devices may be coupled to second interface 1320 including, for example, a keyboard and/or mouse 1322, communication devices 1327 and storage circuitry 1328. Storage circuitry 1328 may be one or more non-transitory machine-readable storage media as described below, such as a disk drive or other mass storage device which may include instructions/code and data 1330 and may implement the storage 'ISAB03 in some examples. Further, an audio I/O 1324 may be coupled to second interface 1320. Note that other architectures than the point-to-point architecture described above are possible. For example, instead of the point-to-point architecture, a system such as multiprocessor system 1300 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 14:
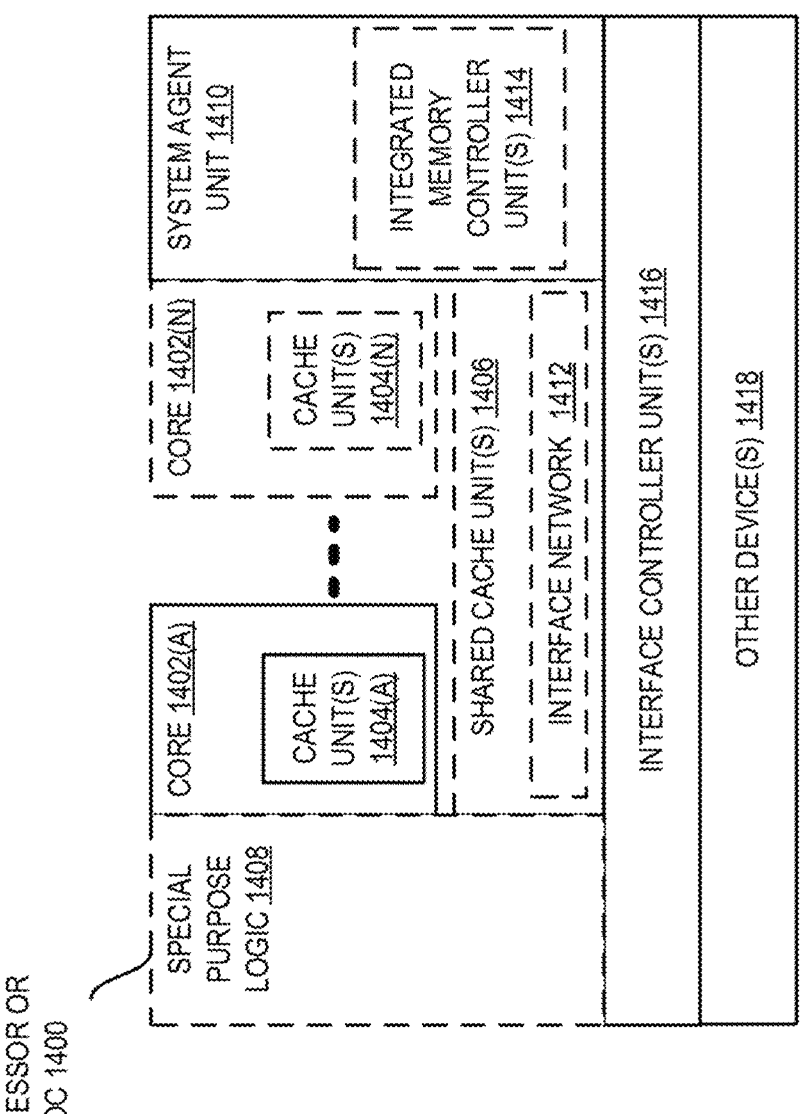
FIG. 14 illustrates a block diagram of an example processor and/or System on a Chip (SoC) that may have one or more cores and an integrated memory controller.

FIG. 14 illustrates a block diagram of an example processor and/or SoC 1400 that may have one or more cores and an integrated memory controller. The solid lined circuitry illustrate a processor 1400 with a single core 1402(A), system agent unit circuitry 1410, and a set of one or more interface controller unit(s) circuitry 1416, while the optional addition of the dashed lined circuitry illustrates an alternative processor 1400 with multiple cores 1402(A)-(N), a set of one or more integrated memory controller unit(s) circuitry 1414 in the system agent unit circuitry 1410, and special purpose logic 1408, as well as a set of one or more interface controller units circuitry 1416. Note that the processor 1400 may be one of the processors 1370 or 1380, or co-processor 1338 or 1315 of FIG. 13.

Thus, different implementations of the processor 1400 may include: 1) a CPU with the special purpose logic 1408 being integrated graphics and/or scientific (throughput) logic (which may include one or more cores, not shown), and the cores 1402(A)-(N) being one or more general purpose cores (e.g., general purpose in-order cores, general purpose out-of-order cores, or a combination of the two); 2) a coprocessor with the cores 1402(A)-(N) being a large number of special purpose cores intended primarily for graphics and/or scientific (throughput); and 3) a coprocessor with the cores 1402(A)-(N) being a large number of general purpose in-order cores. Thus, the processor 1400 may be a general-purpose processor, coprocessor, or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1404(A)-(N) within the cores 1402(A)-(N), a set of one or more shared cache unit(s) circuitry 1406, and external memory (not shown) coupled to the set of integrated memory controller unit(s) circuitry 1414. The set of one or more shared cache unit(s) circuitry 1406 may include one or more mid-level caches, such as level 2 (L2), level 3 (L3), level 4 (L4), or other levels of cache, such as a last level cache (LLC), and/or combinations thereof. While in some examples interface network circuitry 1412 (e.g., a ring interconnect) interfaces the special purpose logic 1408 (e.g., integrated graphics logic), the set of shared cache unit(s) circuitry 1406, and the system agent unit circuitry 1410, alternative examples use any number of well-known techniques for interfacing such units. In some examples, coherency is maintained between one or more of the shared cache unit(s) circuitry 1406 and cores 1402(A)-(N). In some examples, interface controller units circuitry 1416 couple the cores 1402 to one or more other devices 1418 such as one or more I/O devices, storage, one or more communication devices (e.g., wireless networking, wired networking, etc.), etc.

In some examples, one or more of the cores 1402(A)-(N) are capable of multi-threading. The system agent unit circuitry 1410 includes those components coordinating and operating cores 1402(A)-(N). The system agent unit circuitry 1410 may include, for example, power control unit (PCU) circuitry and/or display unit circuitry (not shown). The PCU may be or may include logic and components needed for regulating the power state of the cores 1402(A)-(N) and/or the special purpose logic 1408 (e.g., integrated graphics logic). The display unit circuitry is for driving one or more externally connected displays.

The cores 1402(A)-(N) may be homogenous in terms of instruction set architecture (ISA). Alternatively, the cores 1402(A)-(N) may be heterogeneous in terms of ISA; that is, a subset of the cores 1402(A)-(N) may be capable of executing an ISA, while other cores may be capable of executing only a subset of that ISA or another ISA.

Example Core Architectures—In-Order and Out-of-Order Core Block Diagram

Figure 15A:
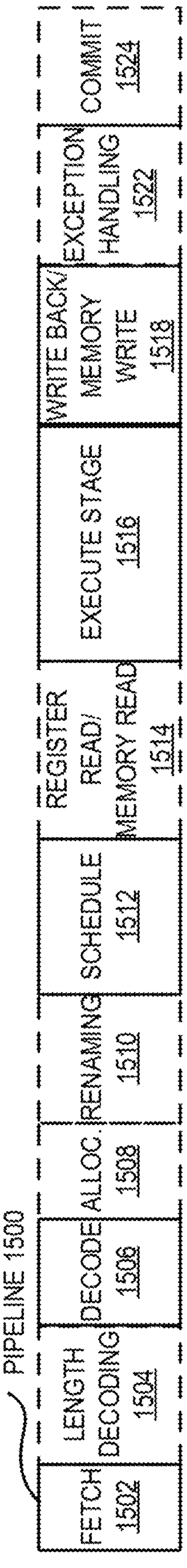
FIG. 15A is a block diagram illustrating both an example in-order pipeline and an example register renaming, out-of-order issue/execution pipeline according to examples.
Figure 15B:
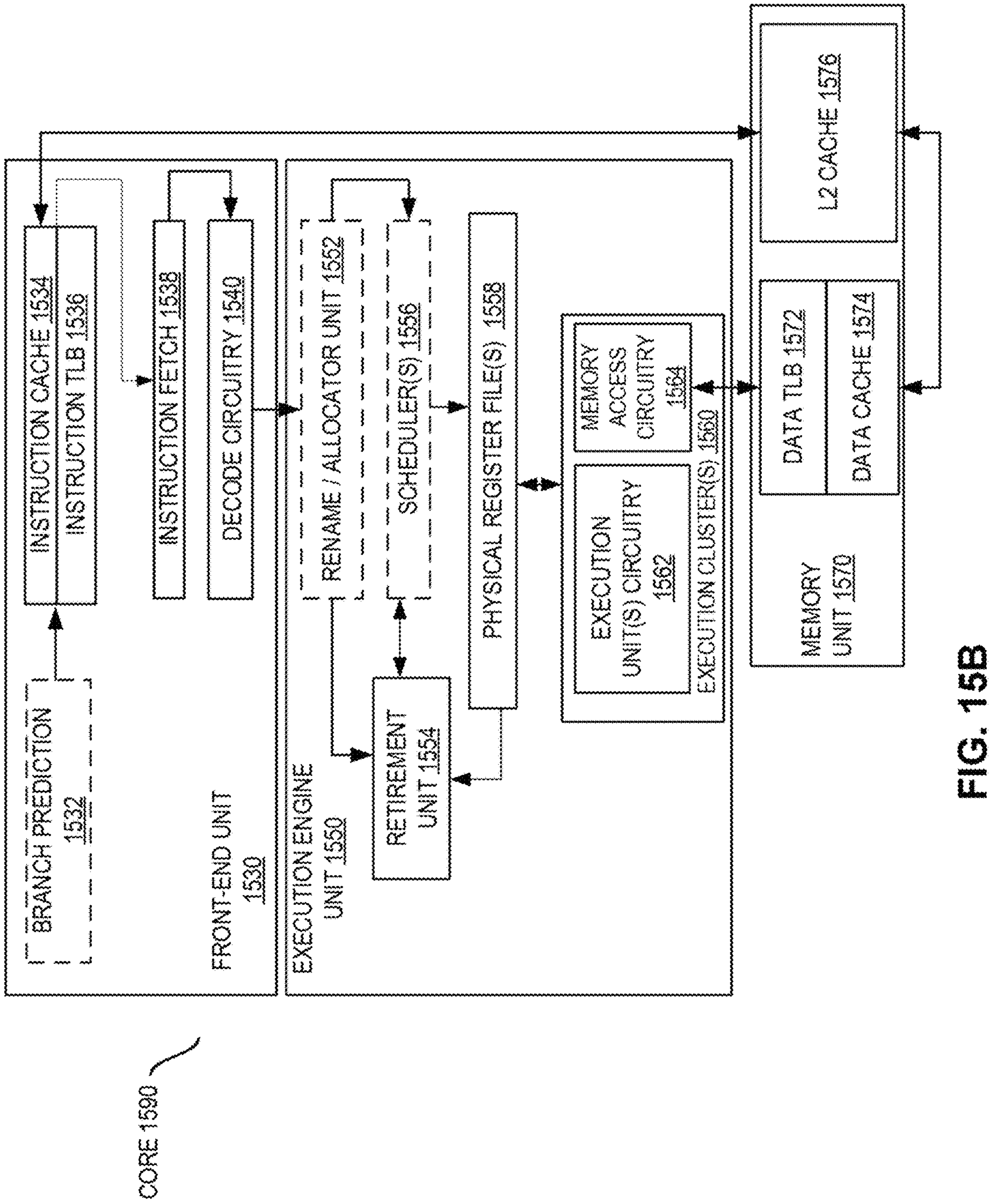
FIG. 15B is a block diagram illustrating both an example in-order architecture core and an example register renaming, out-of-order issue/execution architecture core to be included in a processor according to examples.

FIG. 15A is a block diagram illustrating both an example in-order pipeline and an example register renaming, out-of-order issue/execution pipeline according to examples. FIG. 15B is a block diagram illustrating both an example in-order architecture core and an example register renaming, out-of-order issue/execution architecture core to be included in a processor according to examples. The solid lined circuitry in FIGS. 15A-(B) illustrate the in-order pipeline and in-order core, while the optional addition of the dashed lined circuitry illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, an optional length decoding stage 1504, a decode stage 1506, an optional allocation (Alloc) stage 1508, an optional renaming stage 1510, a schedule (also known as a dispatch or issue) stage 1512, an optional register read/memory read stage 1514, an execute stage 1516, a write back/memory write stage 1518, an optional exception handling stage 1522, and an optional commit stage 1524. One or more operations can be performed in each of these processor pipeline stages. For example, during the fetch stage 1502, one or more instructions are fetched from instruction memory, and during the decode stage 1506, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1506 and the register read/memory read stage 1514 may be combined into one pipeline stage. In one example, during the execute stage 1516, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 15B may implement the pipeline 1500 as follows: 1) the instruction fetch circuitry 1538 performs the fetch and length decoding stages 1502 and 1504; 2) the decode circuitry 1540 performs the decode stage 1506; 3) the rename/allocator unit circuitry 1552 performs the allocation stage 1508 and renaming stage 1510; 4) the scheduler(s) circuitry 1556 performs the schedule stage 1512; 5) the physical register file(s) circuitry 1558 and the memory unit circuitry 1570 perform the register read/memory read stage 1514; the execution cluster(s) 1560 perform the execute stage 1516; 6) the memory unit circuitry 1570 and the physical register file(s) circuitry 1558 perform the write back/memory write stage 1518; 7) various circuitry may be involved in the exception handling stage 1522; and 8) the retirement unit circuitry 1554 and the physical register file(s) circuitry 1558 perform the commit stage 1524.

FIG. 15B shows a processor core 1590 including front-end unit circuitry 1530 coupled to execution engine unit circuitry 1550, and both are coupled to memory unit circuitry 1570. The core 1590 may be a reduced instruction set architecture computing (RISC) core, a complex instruction set architecture computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front-end unit circuitry 1530 may include branch prediction circuitry 1532 coupled to instruction cache circuitry 1534, which is coupled to an instruction translation lookaside buffer (TLB) 1536, which is coupled to instruction fetch circuitry 1538, which is coupled to decode circuitry 1540. In one example, the instruction cache circuitry 1534 is included in the memory unit circuitry 1570 rather than the front-end circuitry 1530. The decode circuitry 1540 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1540 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1540 may be implemented using various different mechanisms. Examples of suitable mechanisms include, but are not limited to, look-up tables, hardware implementations, programmable logic arrays (PLAs), microcode read only memories (ROMs), etc. In one example, the core 1590 includes a microcode ROM (not shown) or other medium that stores microcode for certain macroinstructions (e.g., in decode circuitry 1540 or otherwise within the front-end circuitry 1530). In one example, the decode circuitry 1540 includes a micro-operation (micro-op) or operation cache (not shown) to hold/cache decoded operations, micro-tags, or micro-operations generated during the decode or other stages of the processor pipeline 1500. The decode circuitry 1540 may be coupled to rename/allocator unit circuitry 1552 in the execution engine circuitry 1550.

The execution engine circuitry 1550 includes the rename/allocator unit circuitry 1552 coupled to retirement unit circuitry 1554 and a set of one or more scheduler(s) circuitry 1556. The scheduler(s) circuitry 1556 represents any number of different schedulers, including reservations stations, central instruction window, etc. In some examples, the scheduler(s) circuitry 1556 can include arithmetic logic unit (ALU) scheduler/scheduling circuitry, ALU queues, address generation unit (AGU) scheduler/scheduling circuitry, AGU queues, etc. The scheduler(s) circuitry 1556 is coupled to the physical register file(s) circuitry 1558. Each of the physical register file(s) circuitry 1558 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1558 includes vector registers unit circuitry, writemask registers unit circuitry, and scalar register unit circuitry. These register units may provide architectural vector registers, vector mask registers, general-purpose registers, etc. The physical register file(s) circuitry 1558 is coupled to the retirement unit circuitry 1554 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1554 and the physical register file(s) circuitry 1558 are coupled to the execution cluster(s) 1560. The execution cluster(s) 1560 includes a set of one or more execution unit(s) circuitry 1562 and a set of one or more memory access circuitry 1564. The execution unit(s) circuitry 1562 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1556, physical register file(s) circuitry 1558, and execution cluster(s) 1560 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1564). It should also be understood that where separate pipelines are used, one or more of these pipelines may be out-of-order issue/execution and the rest in-order.

In some examples, the execution engine unit circuitry 1550 may perform load store unit (LSU) address/data pipelining to an Advanced Microcontroller Bus (AMB) interface (not shown), and address phase and writeback, data phase load, store, and branches.

The set of memory access circuitry 1564 is coupled to the memory unit circuitry 1570, which includes data TLB circuitry 1572 coupled to data cache circuitry 1574 coupled to level 2 (L2) cache circuitry 1576. In one example, the memory access circuitry 1564 may include load unit circuitry, store address unit circuitry, and store data unit circuitry, each of which is coupled to the data TLB circuitry 1572 in the memory unit circuitry 1570. The instruction cache circuitry 1534 is further coupled to the level 2 (L2) cache circuitry 1576 in the memory unit circuitry 1570. In one example, the instruction cache 1534 and the data cache 1574 are combined into a single instruction and data cache (not shown) in L2 cache circuitry 1576, level 3 (L3) cache circuitry (not shown), and/or main memory. The L2 cache circuitry 1576 is coupled to one or more other levels of cache and eventually to a main memory.

The core 1590 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1590 includes logic to support a packed data instruction set architecture extension (e.g., AVX1, AVX2), thereby allowing the operations used by many multimedia applications to be performed using packed data.

Example Execution Unit(s) Circuitry

Figure 16:
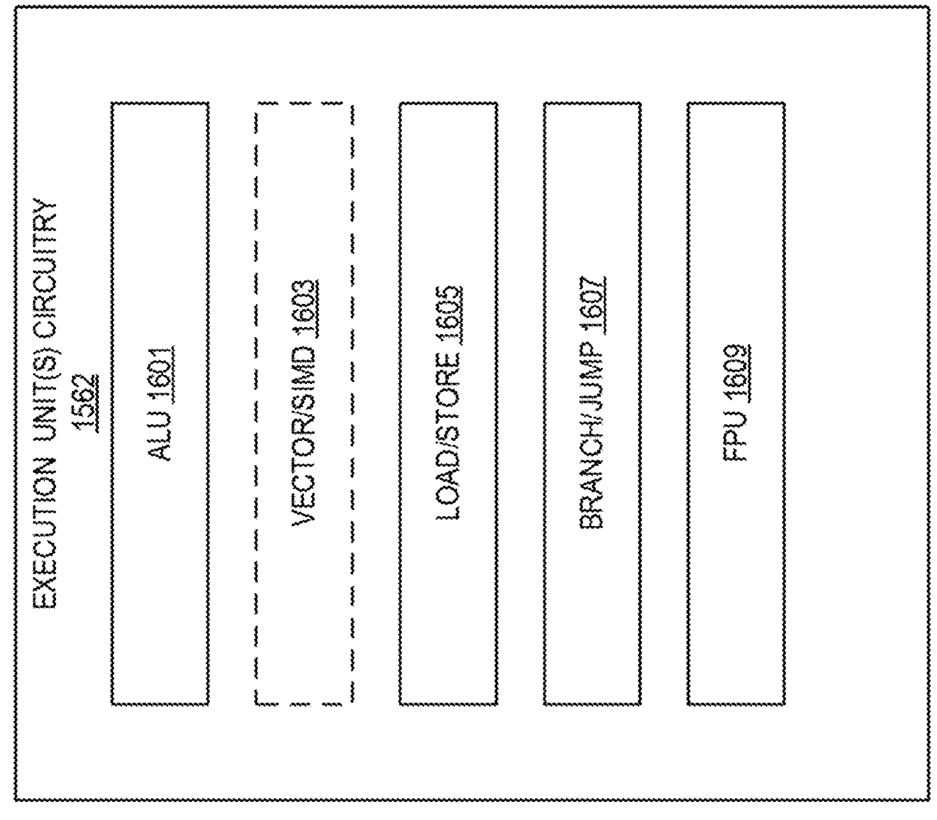
FIG. 16 illustrates examples of execution unit(s) circuitry.

FIG. 16 illustrates examples of execution unit(s) circuitry, such as execution unit(s) circuitry 1562 of FIG. 15B. As illustrated, execution unit(s) circuitry 1562 may include one or more ALU circuits 1601, optional vector/single instruction multiple data (SIMD) circuits 1603, load/store circuits 1605, branch/jump circuits 1607, and/or Floating-point unit (FPU) circuits 1609. ALU circuits 1601 perform integer arithmetic and/or Boolean operations. Vector/SIMD circuits 1603 perform vector/SIMD operations on packed data (such as SIMD/vector registers). Load/store circuits 1605 execute load and store instructions to load data from memory into registers or store from registers to memory. Load/store circuits 1605 may also generate addresses. Branch/jump circuits 1607 cause a branch or jump to a memory address depending on the instruction. FPU circuits 1609 perform floating-point arithmetic. The width of the execution unit(s) circuitry 1562 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture

Figure 17:
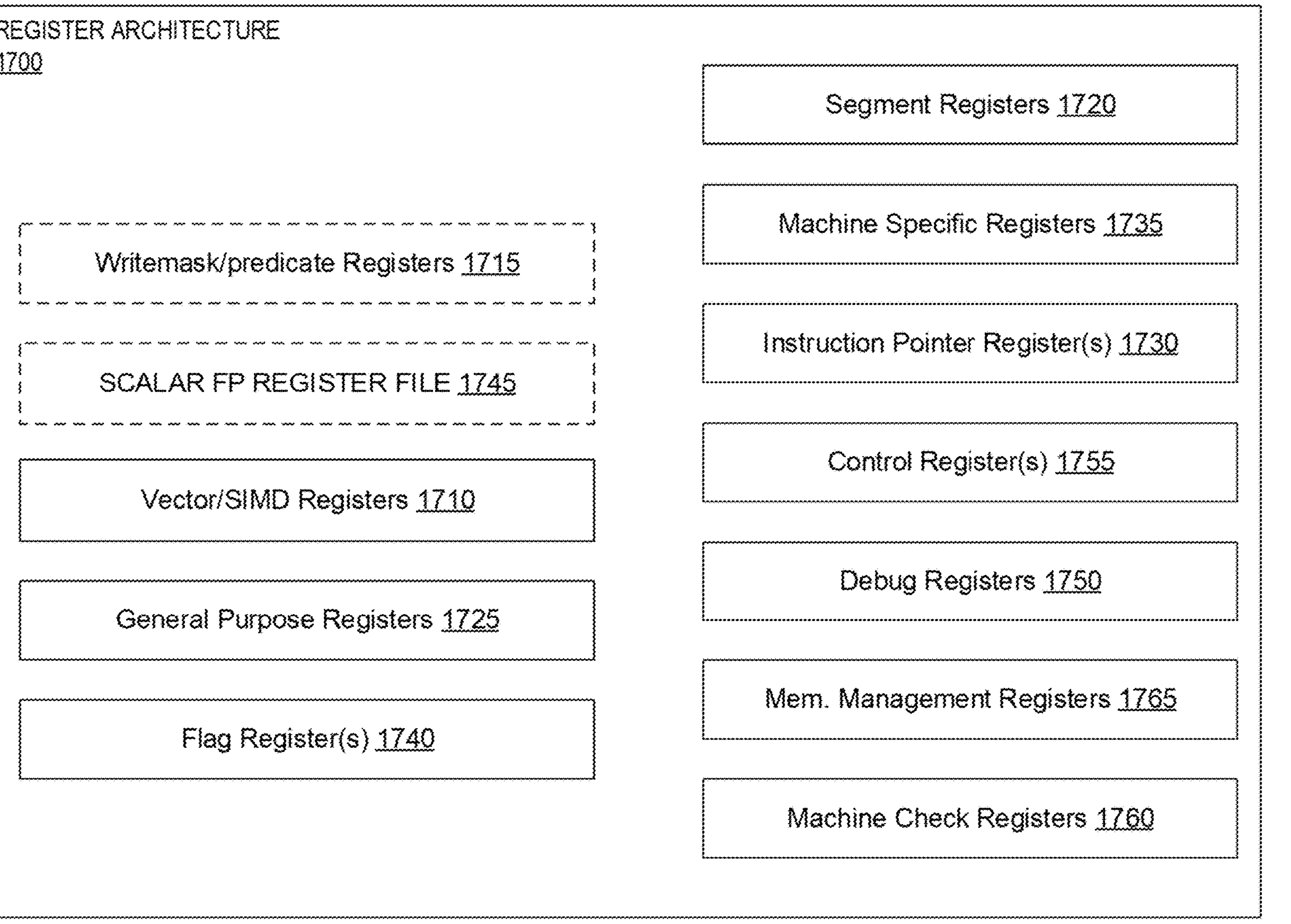
FIG. 17 is a block diagram of a register architecture according to some examples.

FIG. 17 is a block diagram of a register architecture 1700 according to some examples. As illustrated, the register architecture 1700 includes vector/SIMD registers 1710 that vary from 128-bit to 1,024 bits width. In some examples, the vector/SIMD registers 1710 are physically 512-bits and, depending upon the mapping, only some of the lower bits are used. For example, in some examples, the vector/SIMD registers 1710 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1700 includes writemask/predicate registers 1715. For example, in some examples, there are 8 writemask/predicate registers (sometimes called k0 through k7) that are each 16-bit, 32-bit, 64-bit, or 128-bit in size. Writemask/predicate registers 1715 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1715 corresponds to a data element position of the destination. In other examples, the writemask/predicate registers 1715 are scalable and includes a set number of enable bits for a given vector element (e.g., 8 enable bits per 64-bit vector element).

The register architecture 1700 includes a plurality of general-purpose registers 1725. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1700 includes scalar floating-point (FP) register file 1745 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1740 (e.g., EFLAGS, RFLAGS, etc.) store status and control information for arithmetic, compare, and system operations. For example, the one or more flag registers 1740 may store condition code information such as carry, parity, auxiliary carry, zero, sign, and overflow. In some examples, the one or more flag registers 1740 are called program status and control registers.

Segment registers 1720 contain segment points for use in accessing memory. In some examples, these registers are referenced by the names CS, DS, SS, ES, FS, and GS.

Machine specific registers (MSRs) 1735 control and report on processor performance. Most MSRs 1735 handle system-related functions and are not accessible to an application program. Machine check registers 1760 consist of control, status, and error reporting MSRs that are used to detect and report on hardware errors.

One or more instruction pointer register(s) 1730 store an instruction pointer value. Control register(s) 1755 (e.g., CR0-CR4) determine the operating mode of a processor (e.g., processor 1370, 1380, 1338, 1315, and/or 1400) and the characteristics of a currently executing task. Debug registers 1750 control and allow for the monitoring of a processor or core's debugging operations.

Memory (mem) management registers 1765 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1700 may, for example, be used in register file/memory 'ISAB08, or physical register file(s) circuitry 15 58.

Instruction Set Architectures

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats

Examples of the instruction(s) described herein may be embodied in different formats. Additionally, example systems, architectures, and pipelines are detailed below.

Examples of the instruction(s) may be executed on such systems, architectures, and pipelines, but are not limited to those detailed.

Figure 18:
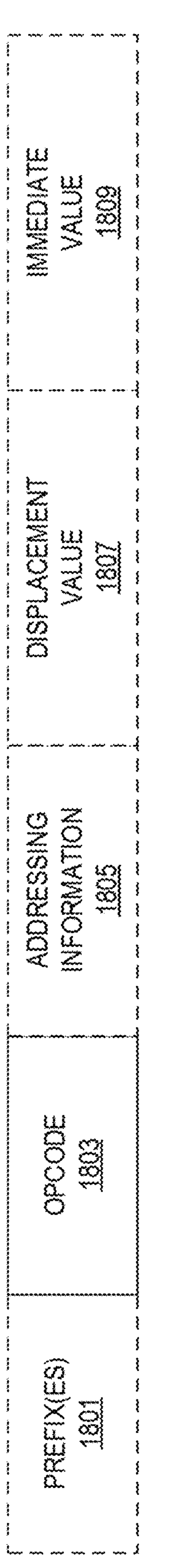
FIG. 18 illustrates examples of an instruction format.

FIG. 18 illustrates examples of an instruction format. As illustrated, an instruction may include multiple components including, but not limited to, one or more fields for: one or more prefixes 1801, an opcode 1803, addressing information 1805 (e.g., register identifiers, memory addressing information, etc.), a displacement value 1807, and/or an immediate value 1809. Note that some instructions utilize some or all the fields of the format whereas others may only use the field for the opcode 1803. In some examples, the order illustrated is the order in which these fields are to be encoded, however, it should be appreciated that in other examples these fields may be encoded in a different order, combined, etc.

The prefix(es) field(s) 1801, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1803 is used to at least partially define the operation to be performed upon a decoding of the instruction. In some examples, a primary opcode encoded in the opcode field 1803 is one, two, or three bytes in length. In other examples, a primary opcode can be a different length. An additional 3-bit opcode field is sometimes encoded in another field.

Figure 19:
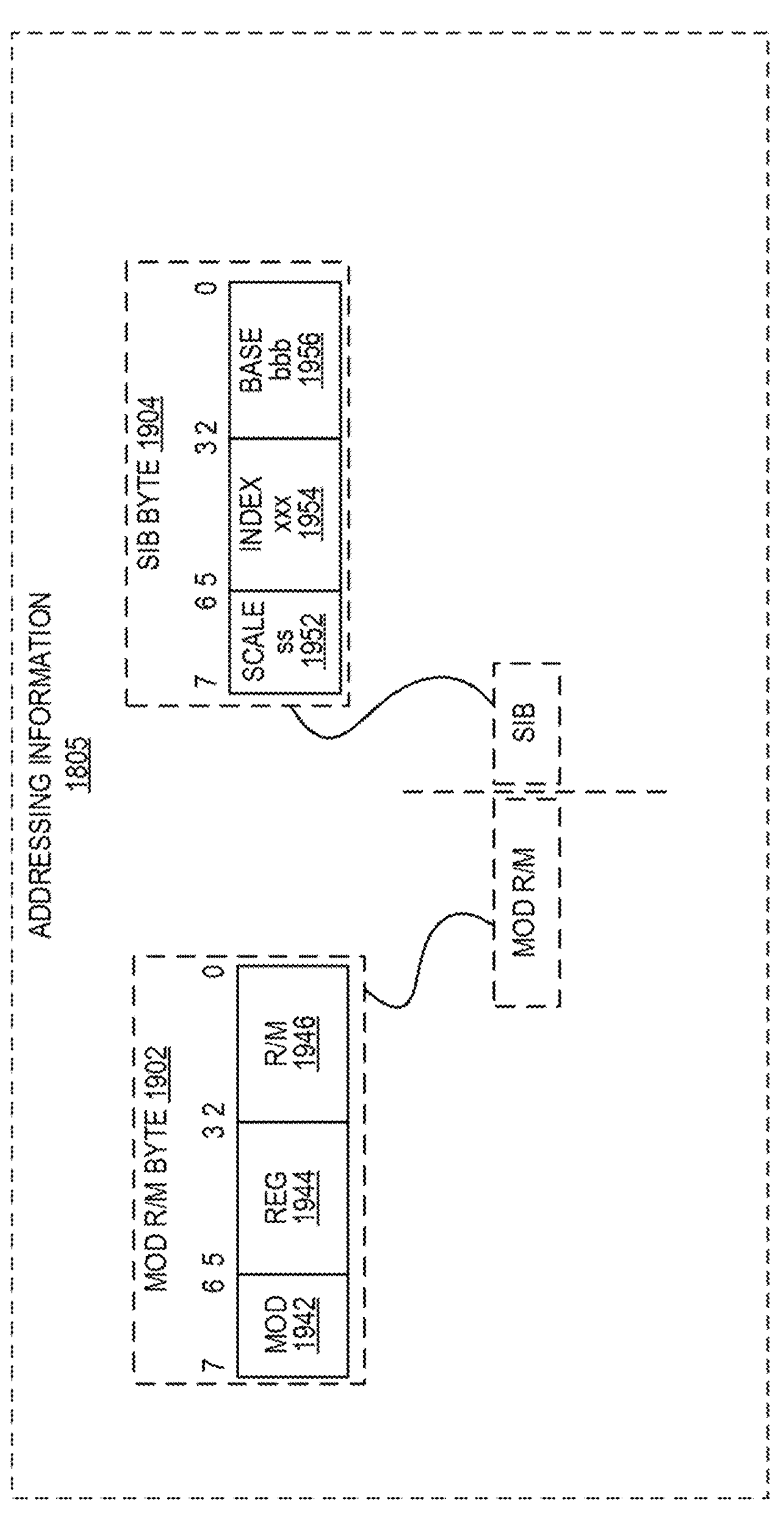
FIG. 19 illustrates examples of an addressing information field.

The addressing information field 1805 is used to address one or more operands of the instruction, such as a location in memory or one or more registers. FIG. 19 illustrates examples of the addressing information field 1805. In this illustration, an optional MOD R/M byte 1902 and an optional Scale, Index, Base (SIB) byte 1904 are shown. The MOD R/M byte 1902 and the SIB byte 1904 are used to encode up to two operands of an instruction, each of which is a direct register or effective memory address. Note that both of these fields are optional in that not all instructions include one or more of these fields. The MOD R/M byte 1902 includes a MOD field 1942, a register (reg) field 1944, and R/M field 1946.

The content of the MOD field 1942 distinguishes between memory access and non-memory access modes. In some examples, when the MOD field 1942 has a binary value of 11 (11b), a register-direct addressing mode is utilized, and otherwise a register-indirect addressing mode is used.

The register field 1944 may encode either the destination register operand or a source register operand or may encode an opcode extension and not be used to encode any instruction operand. The content of register field 1944, directly or through address generation, specifies the locations of a source or destination operand (either in a register or in memory). In some examples, the register field 1944 is supplemented with an additional bit from a prefix (e.g., prefix 1801) to allow for greater addressing.

The R/M field 1946 may be used to encode an instruction operand that references a memory address or may be used to encode either the destination register operand or a source register operand. Note the R/M field 1946 may be combined with the MOD field 1942 to dictate an addressing mode in some examples.

The SIB byte 1904 includes a scale field 1952, an index field 1954, and a base field 1956 to be used in the generation of an address. The scale field 1952 indicates a scaling factor. The index field 1954 specifies an index register to use. In some examples, the index field 1954 is supplemented with an additional bit from a prefix (e.g., prefix 1801) to allow for greater addressing. The base field 1956 specifies a base register to use. In some examples, the base field 1956 is supplemented with an additional bit from a prefix (e.g., prefix 1801) to allow for greater addressing. In practice, the content of the scale field 1952 allows for the scaling of the content of the index field 1954 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1807 provides this value. Additionally, in some examples, a displacement factor usage is encoded in the MOD field of the addressing information field 1805 that indicates a compressed displacement scheme for which a displacement value is calculated and stored in the displacement field 1807.

In some examples, the immediate value field 1809 specifies an immediate value for the instruction. An immediate value may be encoded as a 1-byte value, a 2-byte value, a 4-byte value, etc.

FIG. 20 illustrates examples of a first prefix 1801(A). In some examples, the first prefix 1801(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1801(A) may specify up to three registers using 3-bit fields depending on the format: 1) using the reg field 1944 and the R/M field 1946 of the MOD R/M byte 1902; 2) using the MOD R/M byte 1902 with the SIB byte 1904 including using the reg field 1944 and the base field 1956 and index field 1954; or 3) using the register field of an opcode.

In the first prefix 1801(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1944 and MOD R/M R/M field 1946 alone can each only address 8 registers.

In the first prefix 1801(A), bit position 2 (R) may be an extension of the MOD R/M reg field 1944 and may be used to modify the MOD R/M reg field 1944 when that field encodes a general-purpose register, a 64-bit packed data register (e.g., an SSE register), or a control or debug register. R is ignored when MOD R/M byte 1902 specifies other registers or defines an extended opcode.

Bit position 1 (X) may modify the SIB byte index field 1954.

Bit position 0 (B) may modify the base in the MOD R/M R/M field 1946 or the SIB byte base field 1956; or it may modify the opcode register field used for accessing general purpose registers (e.g., general purpose registers 1725).

FIGS. 21A-D illustrate examples of how the R, X, and B fields of the first prefix 1801(A) are used. FIG. 21A illustrates R and B from the first prefix 1801(A) being used to extend the reg field 1944 and R/M field 1946 of the MOD R/M byte 1902 when the SIB byte 19 04 is not used for memory addressing. FIG. 21B illustrates R and B from the first prefix 1801(A) being used to extend the reg field 1944 and R/M field 1946 of the MOD R/M byte 1902 when the SIB byte 19 04 is not used (register-register addressing). FIG. 21C illustrates R, X, and B from the first prefix 1801(A) being used to extend the reg field 1944 of the MOD R/M byte 1902 and the index field 1954 and base field 1956 when the SIB byte 19 04 being used for memory addressing. FIG. 21D illustrates B from the first prefix 1801(A) being used to extend the reg field 1944 of the MOD R/M byte 1902 when a register is encoded in the opcode 1803.

Figures 22A, 22B:
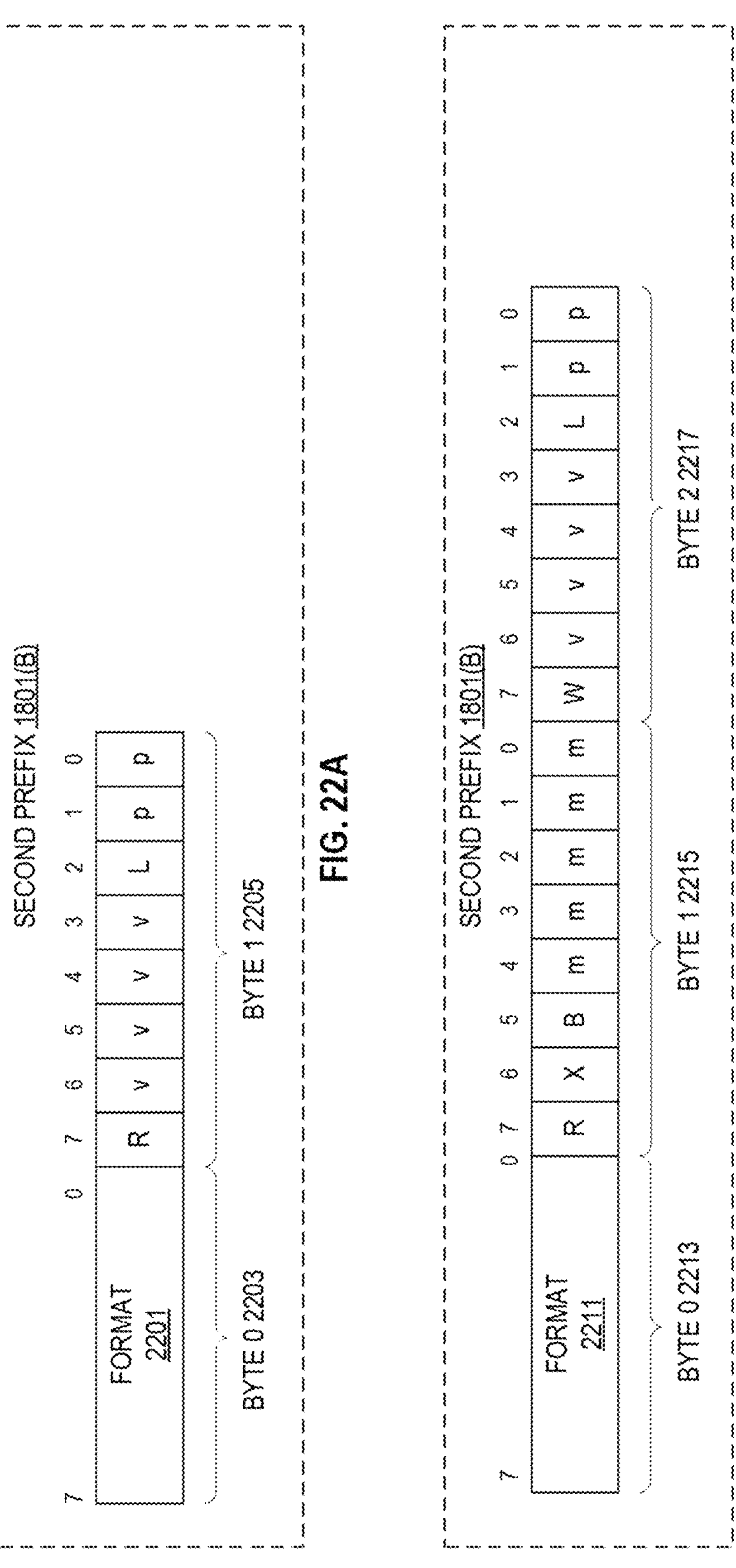
FIGS. 22A-B illustrate examples of a second prefix.

FIGS. 22A-B illustrate examples of a second prefix 1801 (B). In some examples, the second prefix 1801(B) is an example of a VEX prefix. The second prefix 1801(B) encoding allows instructions to have more than two operands, and allows SIMD vector registers (e.g., vector/SIMD registers 1710) to be longer than 64-bits (e.g., 128-bit and 256-bit). The use of the second prefix 1801(B) provides for three-operand (or more) syntax. For example, previous two-operand instructions performed operations such as A=A+B, which overwrites a source operand. The use of the second prefix 1801(B) enables operands to perform nondestructive operations such as A=B+C.

In some examples, the second prefix 1801(B) comes in two forms—a two-byte form and a three-byte form. The two-byte second prefix 1801(B) is used mainly for 128-bit, scalar, and some 256-bit instructions; while the three-byte second prefix 1801(B) provides a compact replacement of the first prefix 1801(A) and 3-byte opcode instructions.

FIG. 22A illustrates examples of a two-byte form of the second prefix 1801(B). In one example, a format field 2201 (byte 0 2203) contains the value C5H. In one example, byte 1 2205 includes an “R” value in bit[7]. This value is the complement of the “R” value of the first prefix 1801(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1946 to encode the instruction operand that references a memory address or encode either the destination register operand or a source register operand.

Instructions that use this prefix may use the MOD R/M reg field 1944 to encode either the destination register operand or a source register operand, or to be treated as an opcode extension and not used to encode any instruction operand.

For instruction syntax that support four operands, vvvv, the MOD R/M R/M field 1946 and the MOD R/M reg field 1944 encode three of the four operands. Bits[7:4] of the immediate value field 1809 are then used to encode the third source register operand.

FIG. 22B illustrates examples of a three-byte form of the second prefix 1801(B). In one example, a format field 2211 (byte 0 2213) contains the value C4H. Byte 1 2215 includes in bits[7:5] “R,” “X,” and “B” which are the complements of the same values of the first prefix 1801(A). Bits[4:0] of byte 1 2215 (shown as mmmmm) include content to encode, as need, one or more implied leading opcode bytes. For example, 00001 implies a OFH leading opcode, 00010 implies a 0F38H leading opcode, 00011 implies a 0F3AH leading opcode, etc.

Bit[7] of byte 2 2217 is used similar to W of the first prefix 1801(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1946 to encode the instruction operand that references a memory address or encode either the destination register operand or a source register operand.

Instructions that use this prefix may use the MOD R/M reg field 1944 to encode either the destination register operand or a source register operand, or to be treated as an opcode extension and not used to encode any instruction operand.

For instruction syntax that support four operands, vvvv, the MOD R/M R/M field 1946, and the MOD R/M reg field 1944 encode three of the four operands. Bits[7:4] of the immediate value field 1809 are then used to encode the third source register operand.

Figure 23:
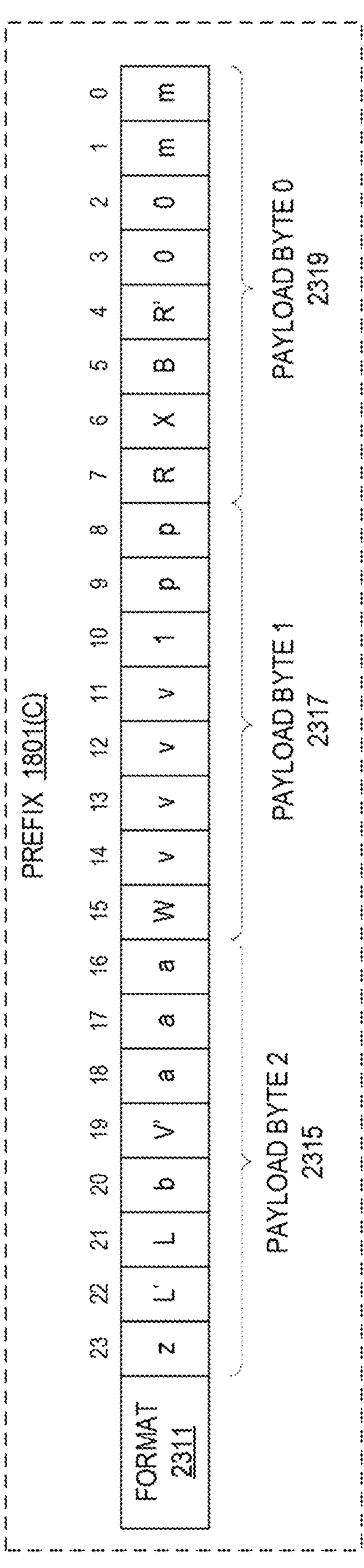
FIG. 23 illustrates examples of a third prefix.

FIG. 23 illustrates examples of a third prefix 1801(C). In some examples, the third prefix 1801(C) is an example of an EVEX prefix. The third prefix 1801(C) is a four-byte prefix.

The third prefix 1801(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 17) or predication utilize this prefix. Opmask register allow for conditional processing or selection control. Opmask instructions, whose source/destination operands are opmask registers and treat the content of an opmask register as a single value, are encoded using the second prefix 1801(B).

The third prefix 1801(C) may encode functionality that is specific to instruction classes (e.g., a packed instruction with “load+op” semantic can support embedded broadcast functionality, a floating-point instruction with rounding semantic can support static rounding functionality, a floating-point instruction with non-rounding arithmetic semantic can support “suppress all exceptions” functionality, etc.).

The first byte of the third prefix 1801(C) is a format field 2311 that has a value, in one example, of 62H. Subsequent bytes are referred to as payload bytes 2315-2319 and collectively form a 24-bit value of P[23:0] providing specific capability in the form of one or more fields (detailed herein).

In some examples, P[1:0] of payload byte 2319 are identical to the low two mm bits. P[3:2] are reserved in some examples. Bit P[4] (R') allows access to the high 16 vector register set when combined with P[7] and the MOD R/M reg field 1944. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1944 and MOD R/M R/M field 1946. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1801(A) and second prefix 1811(B) and may serve as an opcode extension bit or operand size promotion.

P[18:16] specify the index of a register in the opmask (writemask) registers (e.g., writemask/predicate registers 1715). In one example, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1801(C) are detailed in the following tables.

TABLE 61

32-Register Support in 64-bit Mode

| | 4 | 3 | [2:0] | REG. TYPE | COMMON USAGES |
|---|---|---|---|---|---|
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 62

Encoding Register Specifiers in 32-bit Mode

| | [2:0] | REG. TYPE | COMMON USAGES |
|---|---|---|---|
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 63

Opmask Register Specifier Encoding

| | [2:0] | REG. TYPE | COMMON USAGES |
|---|---|---|---|
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 24:
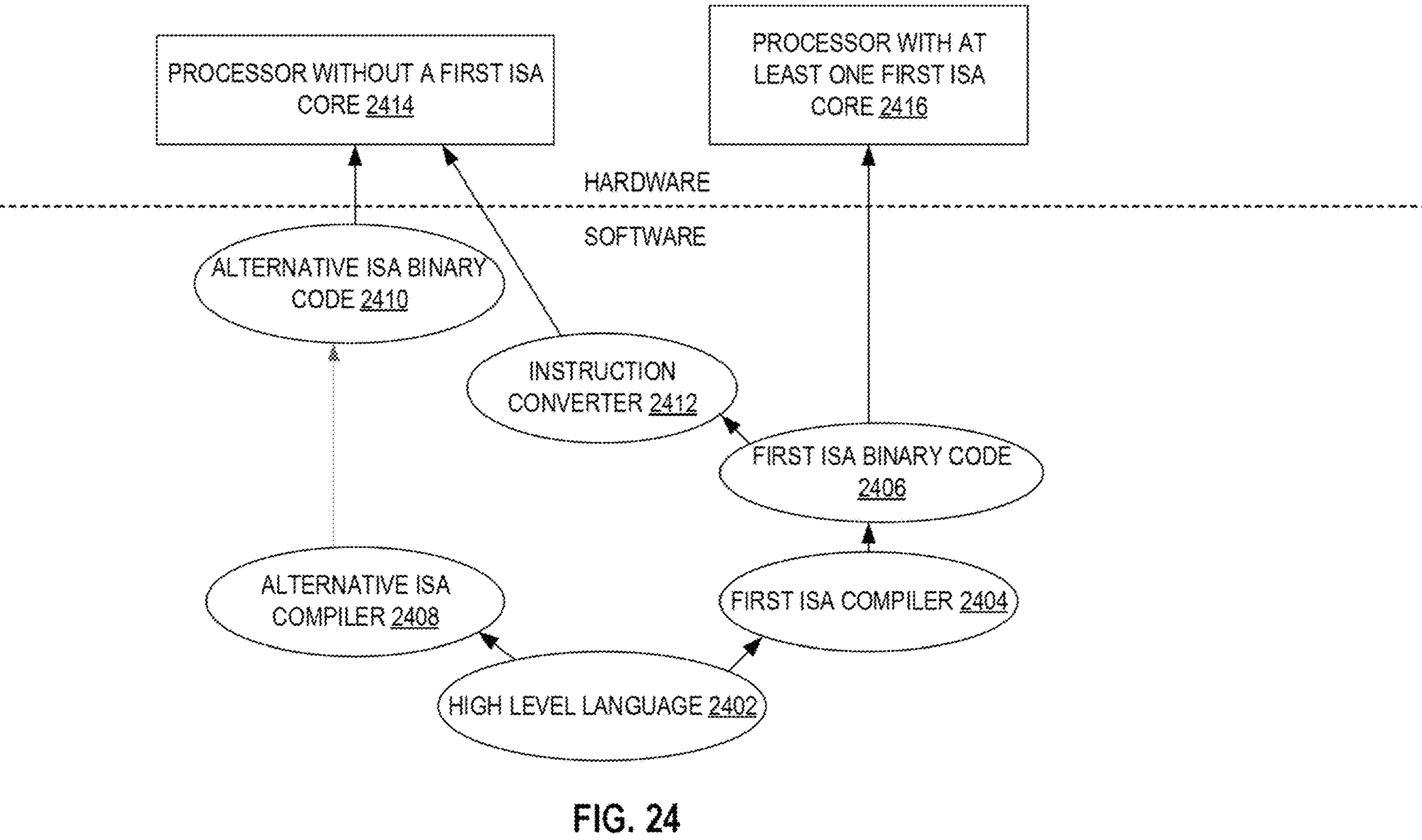
FIG. 24 is a block diagram illustrating the use of a software instruction converter to convert binary instructions in a source instruction set architecture to binary instructions in a target instruction set architecture according to examples.

FIG. 24 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 24 shows a program in a high-level language 2402 may be compiled using a first ISA compiler 2404 to generate first ISA binary code 2406 that may be natively executed by a processor with at least one first ISA core 2416. The processor with at least one first ISA core 2416 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2404 represents a compiler that is operable to generate first ISA binary code 2406 (e.g., object code) that can, with or without additional linkage processing, be executed on the processor with at least one first ISA core 2416. Similarly, FIG. 24 shows the program in the high-level language 2402 may be compiled using an alternative ISA compiler 2408 to generate alternative ISA binary code 2410 that may be natively executed by a processor without a first ISA core 2414. The instruction converter 2412 is used to convert the first ISA binary code 2406 into code that may be natively executed by the processor without a first ISA core 2414. This converted code is not necessarily to be the same as the alternative ISA binary code 2410; however, the converted code will accomplish the general operation and be made up of instructions from the alternative ISA. Thus, the instruction converter 2412 represents software, firmware, hardware, or a combination thereof that, through emulation, simulation, or any other process, allows a processor or other electronic device that does not have a first ISA processor or core to execute the first ISA binary code 2406.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e., A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Apparatus and Method for an L0 Cache/Memory Architecture

Figure 25:
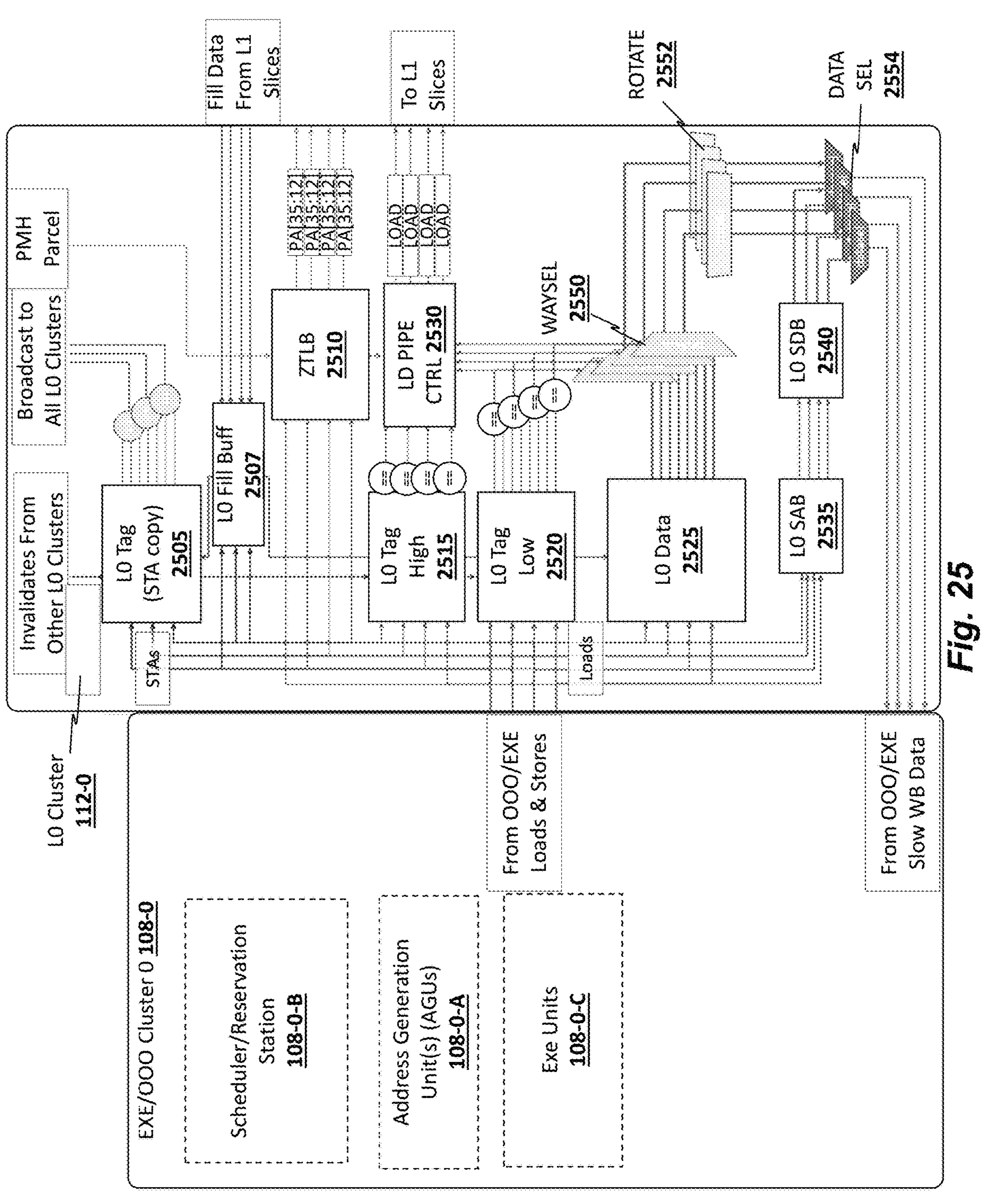
FIG. 25 illustrates details associated with a zero level cache (ZLC) cluster/L0 cluster in accordance with some implementations.

As mentioned, L0 MEM 112 is divided into clusters, where each L0 MEM cluster 112-0 is associated with a particular execution cluster 108-0. FIG. 25 illustrates one of these embodiments including an Execution/OOO cluster 108-0 including an address generation unit 108-0-A to generate memory addresses and a scheduler/reservation station 108-0-B for scheduling memory access operations to be serviced by one or more of the levels of memory described herein (e.g., L0 memory, L1 memory, L2 memory, etc). A set of execution units 108-0-C execute instructions scheduled by the scheduler 108-0-B. For simplicity, the Execution/OOO Cluster 0 108-0 is sometimes referred to as the OOO cluster 108-0.

In some embodiments, L0 MEM 112 operates in parallel with L1 MEM 114 such that L0 MEM 112 will attempt to service a load in parallel with the load being transmitted to L1 MEM 114 via aggregator 124 and crossbar 126. In certain examples, if L0 MEM 112 is successful in completing a load, it sends an "10_complete" signal to L1 MEM 114, which prevents loads from being dispatched in L1 or cancels them in-flight.

L0 MEM 112 will have a lower hit rate compared to L1 MEM 114. Thus, to avoid spurious wakeups, an L0 hit predictor may be used in EXE/OOO cluster 0 108-0 to determine when to generate a wakeup signal to the reservation station (RS) 108-0-B to schedule the dependents in L0 timing.

In various implementations, each L0 cluster 112 includes a Zero-Level Cache (ZLC), a small (relative to L1) set-associative cache that features a low access latency. The ZLC is sometimes referred to as the "L0 cache". In some implementations, the ZLC is virtually indexed and virtually tagged and includes a tag array and a data array.

In FIG. 25, for example, the tag array comprises an L0 tag high array 2515 and an L0 tag low array 2520. An L0 tag array associated with store addresses (STAs) 2505 is also illustrated. Lookups are performed via the tag array to identify cache lines stored in the L0 data cache 2525. The L0 cluster 112-0 also includes an L0 Store Address Buffer (L0 SAB) 2535 which stores a subset of addresses included in the full store address buffer. In certain examples, this contains only the portion of fields of stores needed for store to load forwarding, and only the stores from the attached OOO cluster 108-0. Store to load forwarding allows the data of recent stores buffered within a local store data buffer to be used to efficiently service loads. In particular, one implementation of the L0 cluster 112-0 includes an L0 Store Data Buffer (L0 SDB) 2540 which buffers a subset of the data from the full store data buffer. In certain embodiments, the L0 SDB contains store data only for the bottom bits of each store (e.g., the bottom 64 bits), and only for stores within the associated OOO cluster 108-0.

A Zero-Level TLB (ZTLB) 2510 comprises a fully-associative TLB used to determine whether a particular linear address maps to cacheable memory and is therefore legal for completion in the L0 cluster 112-0. The ZTLB 2510 provides a physical address translation if one is cached for the linear memory address. In some embodiments, the L0 cluster 112-0 also includes a Zero-Level Fill Buffer (L0 FB) 2507 to store fill data received from the L1 slices.

In some embodiments, each L0 cluster 112-0 also includes some components physically located in the Exe/OOO cluster 108-0, including the memory disambiguation (MD) predictor (not shown), a CEIP-indexed structure to predict whether a load may bypass unknown STAs without generating a clear. Some implementations also include an L0 load hit predictor (LHP), a CEIP-indexed structure to predict whether a load will hit the L0 (either ZLC or L0 SAB). If it predicts a hit, this will wake up the load operation's dependents (i.e., those operations which are dependent on the results of the load operation).

In some implementations, each L0 cluster 112-0 has its own set of pipelines for performing the operations described herein. The various "pipelines" are implemented using different combinations of components shown in the corresponding figures (e.g., FIG. 10, FIG. 25, FIG. 27, etc). Each component may be used in multiple pipelines.

An L0 Load Pipeline is responsible for receiving load dispatch and AGU payloads, looking up the ZLC (e.g., using L0 tag high 2515 and L0 tag low 2420 to determine if the data is available in the L0 data cache 2525), checking the L0 SAB 2535 for address overlap, and (if available) forwarding the data from the SDB 2540.

Implementations may also include one or more of the following pipelines:

An L0 Mini-MOB Pipeline which handles loads that schedule out of the mini-MOB and is responsible for reading data from a known SDB entry and writing back the data.

An L0 Store Address Pipeline receives store address payloads, updates L0 SAB, and invalidates L0 cache entries and fill buffers that match store address.

An L0 Store Data Pipeline, which receives store data payloads and updates the L0 SDB.

A ZLC Fill Pipeline which receives data from the L1 cluster 114-0 and fills it into the ZLC.

Figure 26:
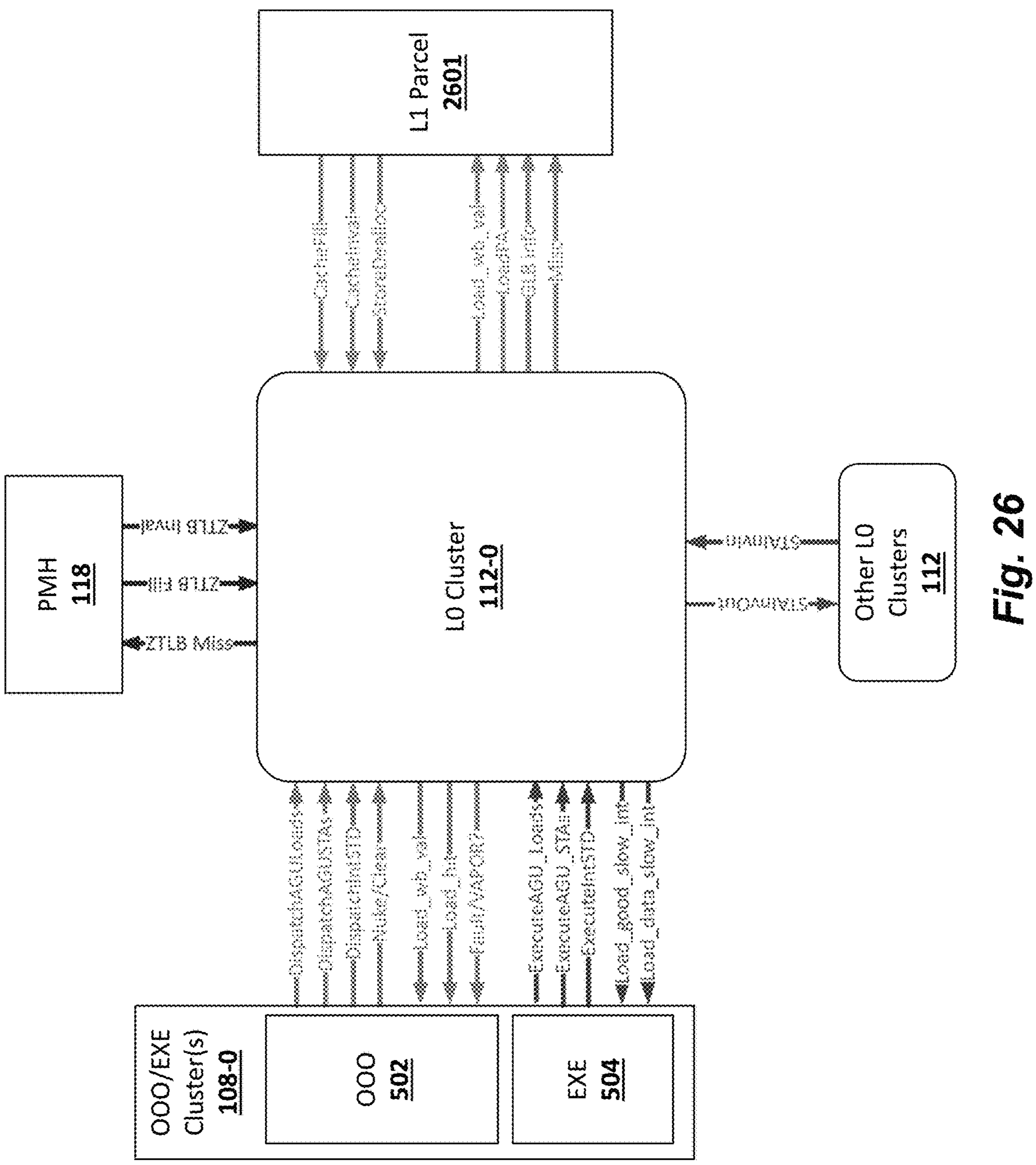
FIG. 26 illustrates signals transmitted between the L0 cluster and various other architectural components.

FIG. 26 illustrates various signals/messages described herein passed between an L0 cluster 112-0 and other processor components including the page miss handler (PMH) 118, the OOO/Exe cluster 108-0, and other L0 clusters 112. Interactions with the L1 cache are performed via L1 parcel 2601 as described herein. The L0 cluster 112-0 receives store address (STA) invalidate signals (STAInvIn) from other L0 clusters 112 and receives STA invalidate signals (STAInvOut) from the other L0 clusters 112.

The L0 cluster 112-0 receives cache fill messages, cache invalidate messages and store deallocate messages from the L1 parcel 2601 and transmits various messages to the L1 parcel including load writeback messages, load messages (LoadPA), and global load buffer (GLB). The L0 cluster 112-0 transmits ZTLB miss indications to identify ZTLB misses and receives ZTLBN fill and ZTLB invalidate operations from the page miss handler 118.

A variety of messages are passed between the Exe/OOO cluster 108-0 and L0 cluster including those related to dispatch and execution of load and store operations, as described in greater detail below.

L0 Load Hit Predictor

Figure 27:
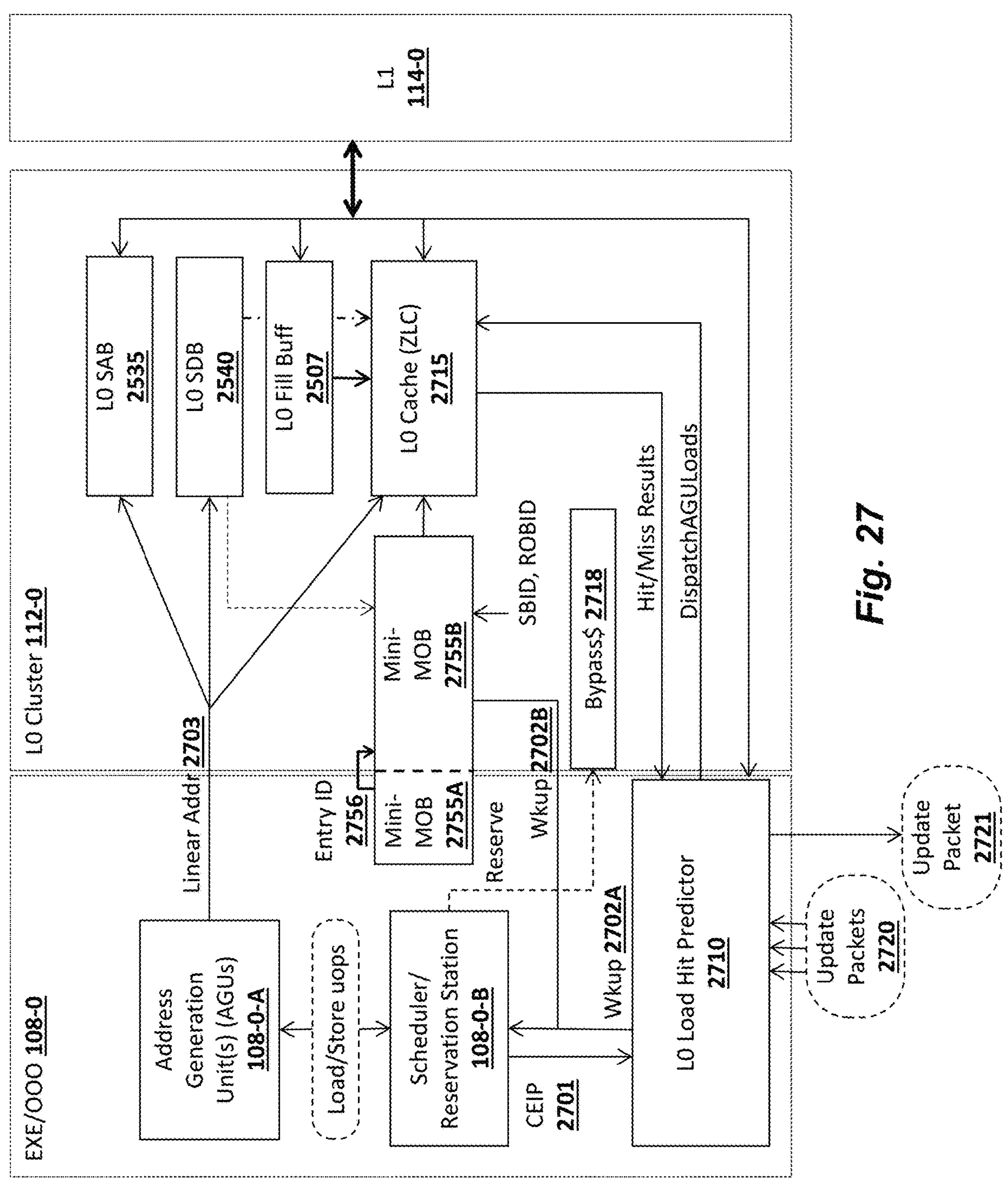
FIG. 27 illustrates details associated with the L0 cluster, including components of the L0 load pipeline.
Figure 28:
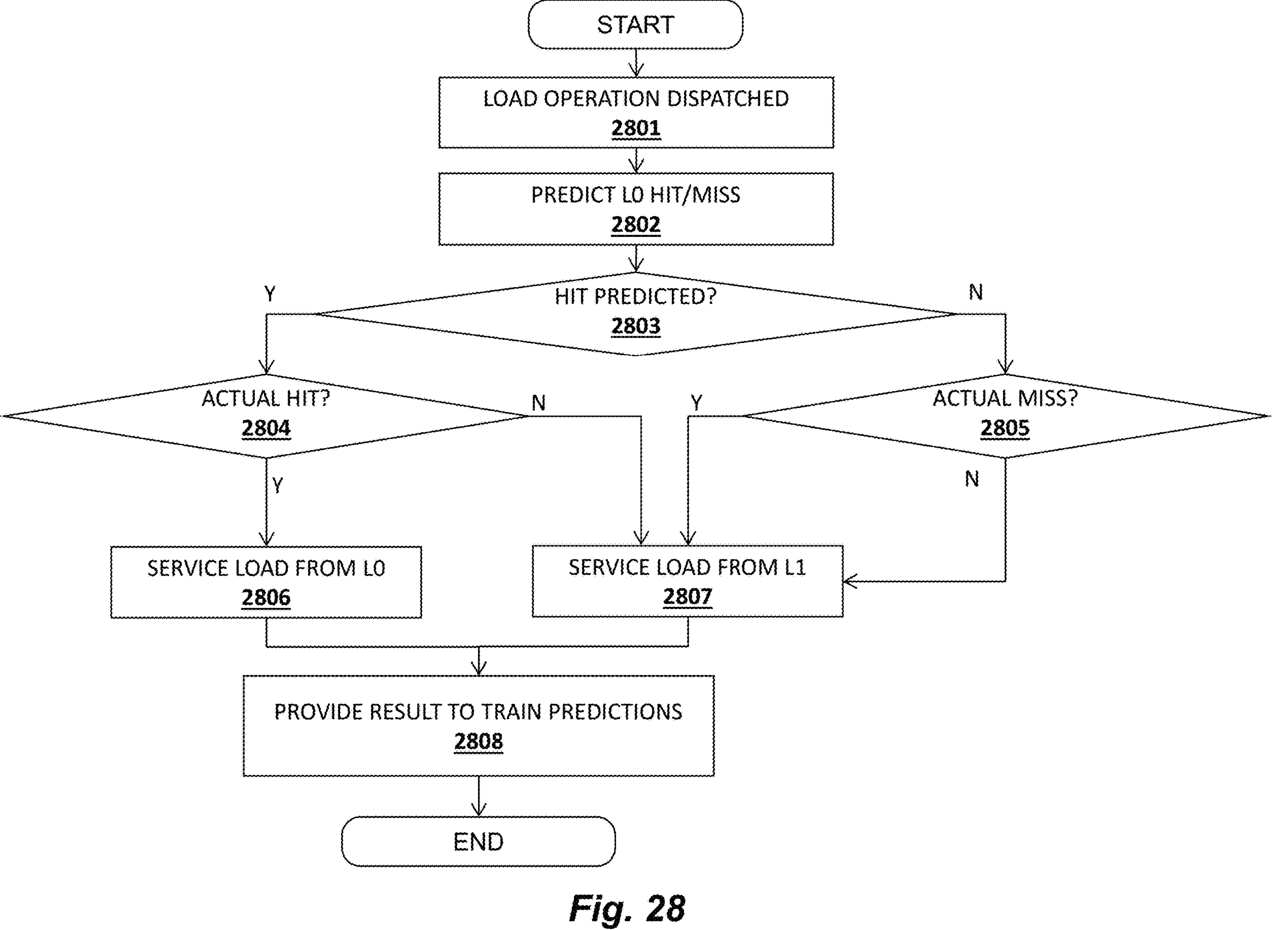
FIG. 28 illustrates one embodiment of a method for performing L0 hit predictions.

FIG. 27 illustrates additional details of one embodiment of the L0 cluster 112-0, including components used in the various pipelines. As mentioned, the L0 cluster 112-0 will have a lower hit rate compared to L1 cluster 114-0. To avoid spurious wakeups, some implementations include an L0 load hit predictor 2710 which determines when to generate a wakeup signal 2707 to the reservation station 108-0-B to schedule the dependents of a load operation in L0 timing. In some implementations, the L0 load hit predictor 2710 physically resides in OOO cluster 108-0 and is looked up in the reservation station pipeline when the load is dispatched. The result of the prediction is sent along with the DispatchAGU packet and is used in the L0 cluster 112-0 to prevent completion of the load in the L0 cache 2715 if the prediction is a miss. In addition, the load operation's dependents are not woken up and power is saved by gating the L0 cache reads, reads of the SDB 2540, and ZTLB 2510 reads if the load was predicted to be an L0 miss.

In some implementations, the prediction is also used in the L1 cluster 112-0 to decide whether to try to bypass or move the load into the main load pipe or to postpone the load scheduling until the actual L0 hit/miss results are determined.

In some implementations, the following rules are applied based on the prediction result and the actual result, as shown in the flowchart in FIG. 18.

When a load operation is dispatched at 2801, a hit/miss prediction is made at 2802, predicting whether the load will hit or miss the L0 cache. If the L0 hit prediction is a hit and the L0 actual result is a hit, determined at 2804, then the load is serviced from the L0 cache at 2806 and is prevented from completing in the L1 pipeline. The global load buffer (GLB) in the L1 slice is updated with information from the L0 completion. The L0 hit information is provided to train the L0 hit predictor at 2808 (e.g., via the OOO cluster 108-0).

If the L0 hit prediction is a hit and the L0 actual result is a miss, then the load is serviced from the L1 cache at 2807. In this case, the load_good signal to the Exe/OOO cluster 108-0 and the wb_val signal to the L1 cluster 114-0 are suppressed. The load L0 miss information is sent to OOO 502 at 2808 to train the L0 load hit predictor 2710.

If the L0 hit prediction is a miss and the L0 actual result is a hit, determined at 2805, then the load is not serviced from the L0 cache 2715 as dependents would not have been woken up (as a result of the prediction). Instead, the load is serviced from the L1 cache at 2807. The load L0 hit information is sent to OOO 502 to train the L0 hit predictor 2710 at 2808.

If the L0 hit prediction is a miss and the L0 actual result is a miss, determined at 2805, then the load is not serviced from the L0 cache 2715 but is serviced from the L1 cache at 2807. The load L0 miss information is sent to OOO 502 to train the L0 hit predictor 2710 at 2808.

As mentioned, the L0 Load Pipeline is the primary pipeline that services loads in the L0 cluster 112-0 with 3-cycle load-to-use latency on the most common memory patterns. In the L0 Load Pipeline, implemented on various components shown in FIG. 27, loads use their linear address 2703 to index and match entries in the L0 cache 2715. In one embodiment, the loads check loosenet and linear finenet against the nearest entries in the L0 store address buffer 2535 to catch common case forwards. The L0 Load Pipeline can be considered a systolic extension of the corresponding AGU 108-0-A pipeline.

In one implementation, L0 loads send updates to the L0 load hit predictor 2710. If a load was able to complete, or would have been able to complete if a wakeup had been sent, the L0 load hit predictor 2710 is updated as a hit. Otherwise, it is updated as a miss. In one implementation, each execution cluster has its own L0 load hit predictor 2710.

In some embodiments, the L0 load hit predictor 2710 determines whether to send a wakeup signal 2702A during dispatch by the RS 108-0-B. To achieve a 3-cycle load, the wakeup signal 2702A must be generated before calculating the address, so the L0 load hit predictor 2710 makes this decision based on the load's CEIP 2701. As mentioned CEIP 2701 is a 16-bit compressed (hashed) effective instruction pointer of the load.

If a load is predicted to hit, then a wakeup signal 2702A is generated, and the L0 cache 2715 will have to either write back data or cancel the load. If a load is not predicted to hit, then the load cannot write back from the L0 cache 2715, but it performs a lookup in the L0 cache 2715 and L0 store buffer 2535 anyway in order to update the L0 load hit predictor 2710. In this case it can skip data read from the L0 cache 2715 or L0 SB 2540.

In some embodiments, the L0 load hit predictor 2710 is a 1024-entry table of 3-bit saturating counters, with 256 sets and 4 ways. It is indexed by bits 7:0 of the load's CEIP 2701 and tagged with bits 11:8. A load is predicted to hit if it is present in the table and its counter is greater than or equal to 1.

The load hit predictor 2710 is read in RS03 (the third cycle) by each of the 4 load pipes in the four L0 MEM clusters 112. Updates are sent in zld3, and received and written in the following cycle. One load in each cluster sends an update packet 2720-2721, prioritized by round-robin, meaning that each load hit predictor 2710 receives four updates per cycle in total. Updates of other load pipes are dropped.

The update packets 2720-2721 includes the set/tag bits and a single bit for a load result. An update will only allocate a new entry if its load result does not match the default prediction to miss. In some implementations, PLRU replacement is used for the allocation, updated on a counter update.

Implementations with Efficient Store Forwarding

As previously mentioned, store to load forwarding can be used to improve load access time. Instead of waiting for stores to install their data in the L1 cache, L2 cache, etc, and then backfill into the L0 cache, the L0 cluster checks loads against older stores from the same strand. If a linear address match and full overlap is found, the store data is forwarded to the loads and the loads complete from the L0 cache.

In some implementations, the three components are used to perform store to load forwarding in L0 cache: "loosenet" checks, carry chain, and "finenet" checks.

Loosenet checks are small and fast partial linear address checks against all stores from the same strand as the load. The load can match multiple stores in the L0 store buffers and all of those matches can be false positives since only partial address is used.

The initial loosenet hits are first qualified with masks to select only the valid range of stores that the load is allowed to match and to disqualify matches against stores with unknown addresses that loads are allowed to pass. After loosenet hits are qualified, the carry chain selects the youngest older store that the load has partially matched in the loosenet stage.

Finally, finenet checks that the youngest older store selected has a full address match and fully overlaps the load, as well as any remaining restriction from the below list. Only then is the load allowed to forward data from the store. Because of the partial matches in loosenet stage, it is possible that a load misses the opportunity from forwarding from an older store with which it has a true match, if another younger store (but still older than the load) has a false positive match with the load.

The L0 cluster 112-0 includes an L0 store buffer (SB) that contains entries for just the stores that are logically contained within the OOO cluster 108-0 paired with this L0 cluster 112-0. In some implementations, there are 144 SB entries within this L0 cluster 112-0. In some implementations, the OOO cluster 108-0 further divides the logical window into strands, where each strand has a contiguous set of SB entries. In one implementation with 4 OOO strands, each strand will have 36 SB entries. The L0 SB includes a Store Address Buffer (L0 SAB) 2535 that holds information used for store forwarding checks, and a Store Data Buffer (L0 SDB) 2540 that holds store data to actually forward store data to loads. The L0 SAB 2535 contains fields that are required for determining whether a load overlaps a store, and whether it is eligible to forward from a store.

Table 64 illustrates an example of an SDB array entry.

TABLE 64

| Array | Fields | Bits | Description |
|---|---|---|---|
| L0_sdb | data | 64 | 64 bit store data from STD receipt. Lower 64 bits of data in case of vector STDs |
| Total per entry | | 64 | |

Table 65 illustrates one example of an L0 SAB Loosenet address entry.

TABLE 65

| Array | Fields | Bits | Description |
|---|---|---|---|
| L0_SAB_Inet_addr | Inet_addr | 12 | Bottom 12 bits of the STA AGU Address |
| | la_end | 6 | (Bottom 6 bits of address + osize) − 1 = cacheline end offset of the STA/store |
| Total per entry | | 18 | |

Table 66 illustrates one example of L0 SAB Loosenet control bits.

TABLE 66

| Array | Fields | Bits | Description |
|---|---|---|---|
| L0_sab_Inet_ctrl | laddrv | 1 | valid bit, set on STA receipt. Coded as separate array |
| | maskallzeros | 1 | Future bit: Masks is all zeroes (if set stores can be ignored for Store to load forwarding) |
| | clsplit | 1 | Store is a cacheline split. Used to disqualify storeforwarding to loads in ZL/L0. |
| | fwdable | 1 | Is the store forwardable? OPEN: Set/reset conditions. |
| | datav | 1 | Set when SDB data has been received. Used for qualifying store to load forward. Coded as separate array in RTL |
| | agu_ft | 1 | Future bit: Set if the STA had an AGU fault |
| Total per entry | | 6 | |

Table 67 illustrates one example of an L0 Finenet address.

TABLE 67

| Array | Fields | Bits | Description |
|---|---|---|---|
| L0_SAB_fnet_addr | la_fnet_addr | 45 | Linear address 56:12 from STA AGU receipt |
| Total per entry | | 45 | |

Table 68 illustrates one example of an L0 SAB ROBID array entry.

TABLE 68

| Array | Fields | Bits | Description |
|---|---|---|---|
| L0_SAB_robid | robid | 13 | ROBID + wrap bit of the store (for nuke/clear checks) |
| Total per entry | | 13 | |

The L0 Store Address Pipeline is the pipeline that receives store address (STA) uop payloads from the Exe/OOO cluster 108-0 and stores the payload into the L0 SAB 2435 from which it can be accessed by loads for store forwarding checks. The L0 store address pipeline can be considered a systolic extension of the STA execution pipeline.

Using L0 Cache Hits for Memory Disambiguation

L0 Store Address Pipeline

The L0 Store Address Pipeline is the pipeline that receives store address (STA) uop payloads from the Exe/OOO cluster 108-0 and stores the payload into the L0 SAB 2435 from which it can be accessed by loads for store forwarding checks. The L0 store address pipeline can be considered a systolic extension of the STA execution pipeline.

The L0 Store Address pipeline is responsible for checking stores against the L1 cache 114-0 and L0 fill buffer (FB) 2507, and invalidating lines that have stores to them in-flight. Address matches broadcast invalidations to other L0 clusters.

In one implementation, there are three L0 STA Pipelines, one corresponding to each STA AGU 108-0-A in an OOO cluster 108-0 (although only a single AGU is shown in FIG. 27 for simplicity). Some embodiments operate in accordance with the following operational stages:

1. AGU: The AGU stage corresponds to the actual address computation of the STA uop, and RC to transmit the result to the L0 cluster.
2. L0 SAB Write: During the write to the L0 SAB 2535, the actual store address buffer entry in L0 is written with the payload of the STA uop. This prepares the entry to be used for store-to-load forwarding checks by loads in the L0 Load pipeline.
3. ZLC Tag Read: The STA pulls out the full L0 cache 2715 linear tags corresponding to the set of the STA uop.

4. ZLC Tag Match: During tag match, the L0 cache 2715 tags for the specific set corresponding to the store will be compared against the STA's linear address to determine if the STA potentially overlaps a line in the L0 cache 2715. In some implementations, the store will check only the bits in L0 tag low 2520, i.e., bits 19:10 of the linear address. If the store is split, both L0 tag low 2520 and L0 tag high 2515 (the remaining address bits) must read a set and perform the tag match.
5. L0 FB CAM: During this stage, the STA uop will cause a CAM lookup against the entries in the L0 FB 2507. This helps guard against cases where the STA and L0 FB 2507 fill pass each other.
6. ZLC Invalidation: STA uops read the L0 cache tags 2515, 2520 on their way past to invalidate any line which potentially contains a store. This allows the ZLC 2715 to serve double-duty as a fast data cache and also as a speculative no-store-overlap check. If the L0 cache tag match check indicated a potential match against an entry in the ZLC, this stage will invalidate that entry.
7. L0 FB Invalidation: To reduce instances of the STA and L0 FB passing each other, the STA invalidates entries in the L0 FB 2507 that are CAM-matched to the STA. Entries of the L0 FB 2507 are allocated a few cycles before they have sufficient data to fill into the L0 cache, so CAMing and setting an invalidation (do not fill) bit in the L0 FB 2507 entry will provide several cycles of coverage against passing cases.
8. Pipeline Hazards: The L0 STA pipeline is deliberately hazard free. It will receive all STA uops in a cluster after they execute and they will move through this pipeline systolically. STAs will check the L0 cache tag array 2515, 2520 and FB array using bypasses to catch cases where the fill pipeline is writing tags in the same cycle as the L0 cache tag match and FB CAM.

Mini-MOB Cache Fill Implementations

Mini-MOB Allocation

Some implementations also include an L0 Mini-MOB 2755A-B, a small store-to-load forwarding scheduler, with 4 entries per load pipe. Some portions of the mini-MOB 2755A are in the Exe/OOO region and other portions of the mini-MOB 2755B are in the L0 MEM region. The L0 MEM is responsible for entry allocation, data read, and writeback. The mini-MOB also includes a Stale Data Watchdog (SDW) which disables mini-MOB allocation if deallocated SDB entries cause too many loads to nuke.

In some implementations, L0 loads that are eligible to forward (e.g., L0 TLB 2510 hits, address matches, etc) but do not yet have valid data in the L0 store data buffer (SDB) 2540 will attempt to allocate a mini-MOB entry. If no entries are available, the load does not complete in the L0 MEM 112-0.

If an entry is available, it may be allocated to schedule the forward operation. When a load allocates a mini-MOB entry, it sends the allocated entry ID to OOO to write the mini-MOB scheduler entry. It sends wb_val on the L1 interface but does not send wb_val on the OOO interface or load_good on the EXE interface.

From the perspective of the L1 cache 114-0, the load has completed and L0 has committed to writing back its data. The load is nukeable in the GLB if it passed unknowns. From the perspective of the OOO/EXE 108-0, the load's dependents are cancelled if they were woken up, and the mini-MOB will send a new wakeup in the future.

Because the load is not writing back data yet, the L0 load hit predictor 2710 predicting a hit and waking up dependents is not a requirement to allocate the mini-MOB.

Mini-MOB Write

If a load allocates an entry in the mini-MOB 2755A-B, the L0 cluster 112-0 writes the forwarding store buffer identification values (SBIDs) and the load's reorder buffer ID (ROBID) into its copy of the mini-MOB 2755B. OOO internally stages the ROBID and PRFID during the load's execution, and writes them along with the SBID sent by the L0 cache 2715 into its copy of the mini-MOB 2755A. The L0 Mini-MOB pipeline 2755B receives mini-MOB schedule indications from OOO/EXE 108-0 and writes back load data forwarded from the L0 SDB 2540.

The mini-MOB 2755 shares its wakeup interface 2702B with the L0 Load hit predictor 2710. When a load schedules, it takes priority over any load on a port of the reservation station 108-0-B that wants to wake up dependents from the L0 load hit predictor 2710. The mini-MOB load also uses resources from the L0 load pipeline, including the read port and writeback interface of the SDB 2540. The reservation station load will skip the L0 load pipeline entirely.

TABLE 69

| ZMB1 | ZMB2 | ZMB3 | ZMB4 |
|---|---|---|---|
| schedule<br>send_wakeup<br>rsv_byp_cache | minimob_read | sdb_read<br>minimob_dealloc | load_writeback<br><br>alloc_byp_cache |

TABLE 70

| STD | RS2 | RS3/IX1 | ZSD1/IX2 | ZSD2 |
|---|---|---|---|---|
| | | uop_disp | exe data | |
| | | | sdb_write_setup | sdb_data_written |
| | minimob_cam | | send_load_safe | |

| Mini-MOB Load | ZMB1 | ZMB2 | ZMB3 | ZMB4 |
|---|---|---|---|---|
| | schedule | minimob_read | sdb_read | load_writeback |
| | send_wakeup | | minimob_dealloc | |
| | rsv_byp_cache | | | alloc_byp_cache |

TABLE 70-continued

| RS Load | RS3/IX1 | ZLD1/IX2 | ZLD2 | ZLD3 |
|---|---|---|---|---|
| | ~~send_wakeup~~ | ~~agu + rc~~<br><br>~~loosenet~~ | ~~tag_read~~<br>~~data_read~~<br>~~linear_finenet~~<br>~~sdb_read~~ | ~~load_writeback~~<br>~~load_good~~ |
| Dependent Op | RS1 | | RS2 | AS3 |
| | ready/schedule | | | |

Table 69 shows an example mini-MOB pipeline and Table 70 shows an example L0 Mini-MOB load in context. In some implementations, there are 4 mini-MOB pipelines per L0 MEM cluster 112. The mini-MOB pipelines are matched 1 to 1 with L0 load pipelines, each sharing resources with its matched load pipeline.

Schedule

Every cycle, the mini-MOB 2755 selects one ready entry to dispatch into each mini-MOB pipeline. This is done in the OOO mini-MOB structure 2755A, and the scheduling entry ID 2756 is sent to the L0 cluster 112-0.

Send Wakeup

A scheduled load sends a wakeup 2702B for its dependents. This takes priority over wakeups 2702A from the L0 load hit predictor 2710 for a particular port of the AGU 108-0-A. This is done in the OOO mini-MOB structure 2755A.

Reserve Bypass Cache

The OOO 108-0 blocks loads from scheduling out of the mini-MOB 2755A-B unless there is an available entry in the bypass cache 2718. When a load schedules, it reserves an entry in the bypass cache 2718 into which to write.

Mini-MOB Read and SDB Read

On receiving a mini-MOB schedule payload with an entry ID 2756 from the OOO mini-MOB 2755A, the L0 MEM mini-MOB 2755B will read the forwarding SBID. The load reads data from the L0 SDB 2540 on a read port shared with the associated L0 load pipeline. The load also checks the SBID against the current head pointer of the SDB 2540. If the SDB entry has been deallocated during long schedule delays, then the data is no longer available and the load will write back a fault. That will indicate to OOO 108-0 that the load must be nuked and refetched.

Mini-MOB Deallocation

If the store data uop (STD) which woke up this load sends a load-safe indication, or if the entry in the mini-MOB 2755A-B was already load-safe when it scheduled, then the load deallocates its entry. If the STD does not send a load-safe indication, then this load is cancelled. It does not write back data or deallocate its mini-MOB entry.

Load Writeback

The load writes back a completion indication to OOO and sends the SDB 2540 data to the requesting execution circuitry. Nothing needs to be sent to L1 cluster 114-0, since it already considers the load complete.

Allocate Bypass Cache

If the load writes back, it allocates the entry in the bypass cache 2718 it reserved when it SBID-scheduled.

Pipeline Hazards

The SDB read port and the Exe/OOO interfaces are shared with the load pipelines. Conflicts are avoided by having any load from the AGU 108-0-A skip the L0 load pipeline.

L0 Mini-MOB

In one embodiment, the L0 Mini-MOB 2755B includes 4 entries in each of the 16 L0 load pipelines. The 4 L0 MEM entries correspond 1 to 1 with 4 entries in each associated load AGU pipeline.

In some implementations, the mini-MOB structure 2755A in OOO stores:

- a 9-bit SBID for STD pipe CAMs, in RS2 for wakeup and RS4 for load-safe operation;
- 11-bit ROBID for clears;
- 10-bit PRFID for sending wakeups; and
- a spec-ready state machine (e.g., 3 bits)

In one or more embodiments, the mini-MOB structure 2755B in the L0 cluster 112-0 stores:

- 9-bit SBID for SDB read; and
- 11-bit ROBID for clears and writeback.

Figure 29:
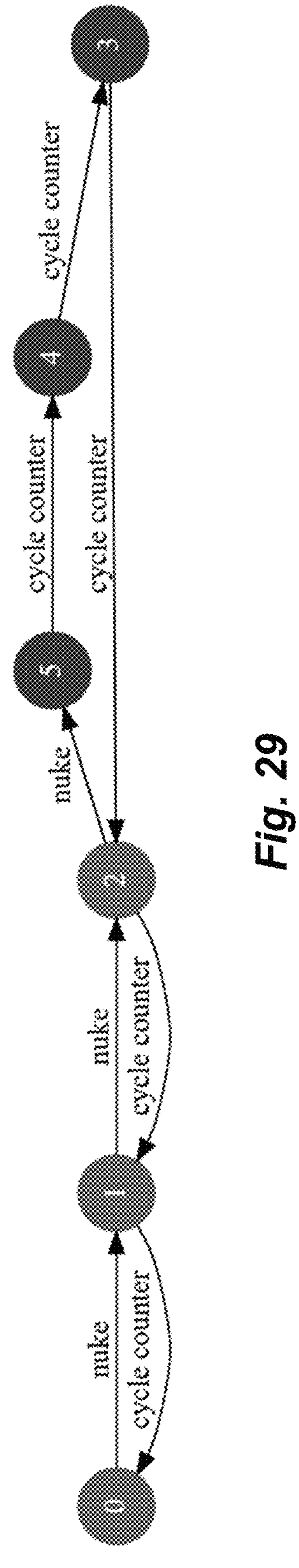
FIG. 29 illustrates one embodiment of a mini-MOB stale data watchdog (SDW)

FIG. 29 illustrates the operation of one embodiment of the mini-MOB stale data watchdog (SDW). When a STD wakes up a load in the mini-MOB 2755, there is no guarantee as to how soon the load will schedule, due to the bypass cache allocation. In rare cases, an STD might retire and deallocate its store buffer entry before the load is able to schedule and read the data. The load resolves this by nuking and re-fetching.

In order to mitigate the potential performance impact in outlier cases, the State Data Watchdog will disable the mini-MOB allocation if it detects too many of these nukes occurring.

The watchdog uses a "leaky bucket" mechanism, which consists of two counters: a 4-bit nuke counter and a 15-bit cycle counter which slowly drains the nuke counter. Whenever load nukes due to a deallocated SDB entry, the nuke counter increments. The cycle counter increments every cycle and when it hits 2,048, it resets to 0 and decrements the nuke counter.

The L0 cluster 112-0 will not attempt to allocate new mini-MOB entries if the nuke counter is above 2. To add some hysteresis, when the counter is at 2, instead of incrementing to 3 it will jump up to 5.

The watchdog has several tunable values including the nuke counter threshold (default 2), the nuke counter hysteresis setpoint (default 5), and the cycle counter threshold (default 2,048) (only allows powers of 2 between 256 and 32,768).

L0 Cache Fill Operations

L0 Cache Fill Pipeline

The ZLC fill pipeline, which includes the L0 cache 2715 and L0 fill buffers 2507, is responsible for moving the L0 fill buffers 2507 into the L0 cache 2715. The ZLC fill pipeline is also responsible for guarding against read-after-eviction hazards around filling in and victimizing lines. Lines to be filled into the L0 cache are determined at the L1 MEM 114-0 level, and L1 MEM 112-0 is responsible for managing data installation into the L0 fill buffer 2507. This pipeline effectively waits for data readiness in the fill buffer 2507 and installs it into the ZLC 2715.

Organization and Division

There is one ZLC fill pipeline per L0 MEM cluster 112-0. All clusters will operate their ZLC fill pipelines in lock-step, synchronized by the arrival of the final data packets from L1 MEM 114-0.

L0 FB Ready

The L0 FB ready stage indicates that a L0 FB 2507 must become ready to fill the cycle before the scheduler will choose it to schedule into the L0 Fill Pipeline.

L0 FB Schedule

During this cycle, a ready FB 2507 will be chosen to fill into the ZLC 2715. At most one FB 2507 can be ready at a time.

In order to simplify cases where a fill and an STA operation pass each other, fills are guaranteed to schedule when the final data payload is received. To accomplish this, each L1 slice from the L1 cache 114-0 will send fill data in a dedicated round-robin time slot, so that only one fill becomes ready per cycle.

L0 FB Control Read

The control bits will be read out of the L0 FB this cycle, in preparation for writing into the ZLC tag array.

L0 FB Data Read and ZLC Tag/Data Write

The data bits will be read out of the L0 FB this cycle, in preparation for writing into the L0 ZLC data array.

L0 ZLC Tag/Data Write Complete

This stage indicates the tag and data arrays of the ZLC have been updated and the cacheline can now be hit by loads.

Pipeline Hazards

A fill may be aborted in-flight as a result of an STA CAM match or an invalidation request from other L0 clusters or the L1 MEM. If this is the case, the fill will invalidate its cache entry instead of writing valid data.

Zero-Level Cache (ZLC)

One embodiment of the ZLC 2715 is a 8 KB cache that is designed for the fast hit determination and fast load writeback timing. The ZLC 2715 is organized into 16 sets of 8 ways, where each cacheline contains 64 bytes.

ZLC Fill Buffer

In some implementations, the ZLC 2715 is filled with cachelines using a ZLC Fill Buffer 2507 as temporary storage to marshal data together into a full cacheline before going down the L0 Fill Pipeline. There are 4 ZLC Fill Buffer entries, 1 per L1 MEM slice. The ZLC FB 2507 entries are allocated by a specific L1 MEM 114-0 slice. The L1 MEM 114-0 will transmit a cacheline to the ZLC 2715 over a period of cycles using free cycles on the conventional load writeback bus. The ZLC fill buffer 2507 captures the bytes for the cacheline, and when the full line has been received, the FB 2507 will schedule into the fill pipeline to fill into the ZLC 2715.

Each L1 slice 114-0 will only transfer one cacheline at a time into the ZLC 2715. A cacheline will be selected and transmitted from an L1 MEM 114-0 to an L0 MEM 112-0, and the ZLC fill buffer 2507 is filled into the ZLC 2715 (or dropped) before the same L1 MEM slice 114-0 will attempt to send a subsequent line to the ZLC 2715. The L1 MEM 114-0 may choose to explicitly invalidate a fill buffer 2507 before sending all of the bytes from the cacheline to the ZLC fill buffer 2507.

Apparatus and Method for Switching Page Table Types

Paging (or linear-address translation) is the process of translating linear addresses so that they can be used to access memory or I/O devices. Paging translates each linear address to a physical address and determines, for each translation, what accesses to the linear address are allowed (the address's access rights) and the type of caching used for such accesses (the address's memory type).

Figure 30A:
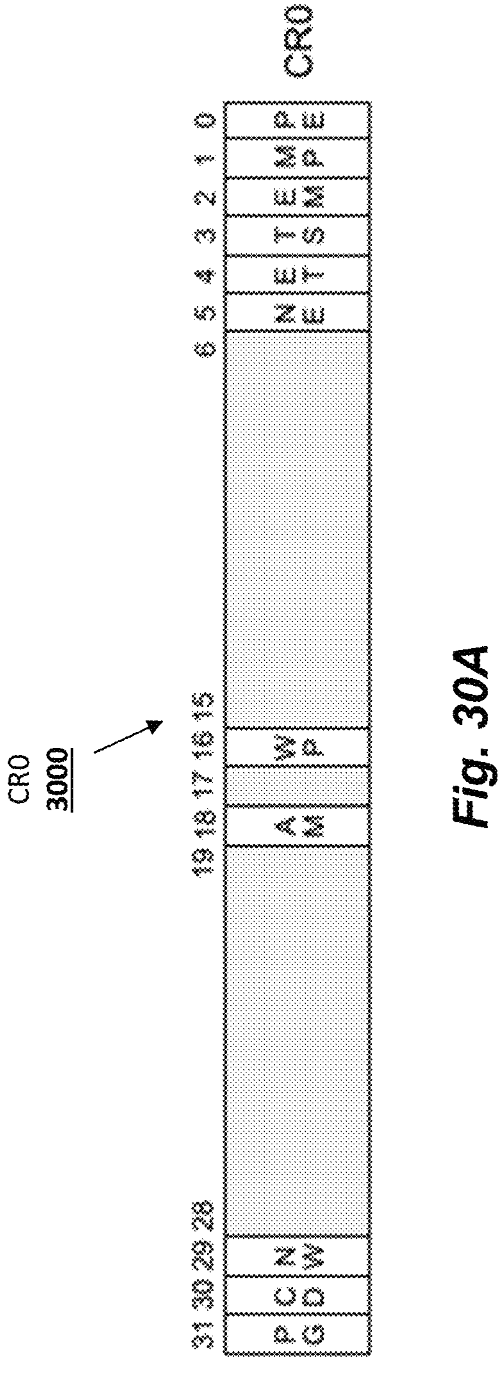
FIGS. 30A-B illustrate example control registers used in some embodiments.

In some embodiments of the invention, various control register bits are fixed to certain values, thereby reducing attack surfaces, simplifying the validation space, and reducing implementation efforts. Embodiments of the invention redefine the bits in the CR0 and CR4 control registers with a fixed set of control flags/bits, effectively removing controls from CR0 and CR4 which are no longer needed with the embodiments described herein. The CR0 register 3000 shown in FIG. 30A is used in current x86 microprocessor architectures to store flags that enable various architectural features/extensions.

In one implementation, certain bits of CR0 are fixed to 0 or 1 as shown in Table 63 below.

TABLE 64

| Bit | Field | Comments |
|---|---|---|
| 0 | PE | Always 1 |
| 1 | MP | Always 0 |
| 2 | EM | Always 0. Must be 0 for SSE |
| 3 | TS | Always 0 |
| 5 | NE | Always 1 |
| 16 | WP | Always 1 |
| 18 | AM | Always 0 |
| 29 | NW | Always 0 |
| 31 | PG | Always 1 |

In this implementation the PE (protection enable) bit is set to 1, deprecating real mode which is largely unused. The TS bit, used for lazy save/restore, is fixed at 0 as is the MP bit, which is only relevant when the TS bit is set. When the TS bit was set, lazy state was revealed by speculative side channel. The use of this bit has been removed in modern operating systems. Legacy emulation requires a replacement, described below.

The NE bit, which was set to 0 to indicate MS DOS compatibility mode, is fixed to a value of 1 as it is not used by modern operating systems.

Toggling the WP bit is considered a security risk and CET already requires this bit to be set to 1—so it is fixed to 1. Similarly, the AM bit is set to 0, as is done by modern operating systems (alignment checks disabled).

The NW bit does not affect anything except a CR0 read on recent processors. It is ignored except for consistency checks and very complicated documentation, and is therefore fixed at 0. The PG bit is fixed at 1, deprecating non-paged modes.

TABLE 65

| Bit | Field | Comments |
|---|---|---|
| 0 | VME | Always 0 |
| 1 | PVI | Always 0 |
| 2 | TSD | |
| 3 | DE | Always 1 |
| 4 | PSE | Always 0. PSE has no meaning for 4 or 5 level paging |
| 5 | PAE | Always 1 |
| 6 | MCE | |
| 7 | PGE | Always 1. SW can use INVPCID to invalidate all global pages |
| 8 | PCE | |
| 9 | OSFXSR | |

TABLE 65-continued

| Bit | Field | Comments |
|---|---|---|
| 10 | OSXMMEXCPT | |
| 11 | UMIP | Always 1. All instructions targeted by UMIP are removed. |
| 12 | LA57 | |
| 13 | VMXE | Always 1 |
| 14 | SMXE | |
| 16 | FSGSBASE | |
| 17 | PCIDE | |
| 18 | OSXSAVE | |
| 20 | SMEP | |
| 21 | SMAP | |
| 22 | PKE | |

Figure 30B:
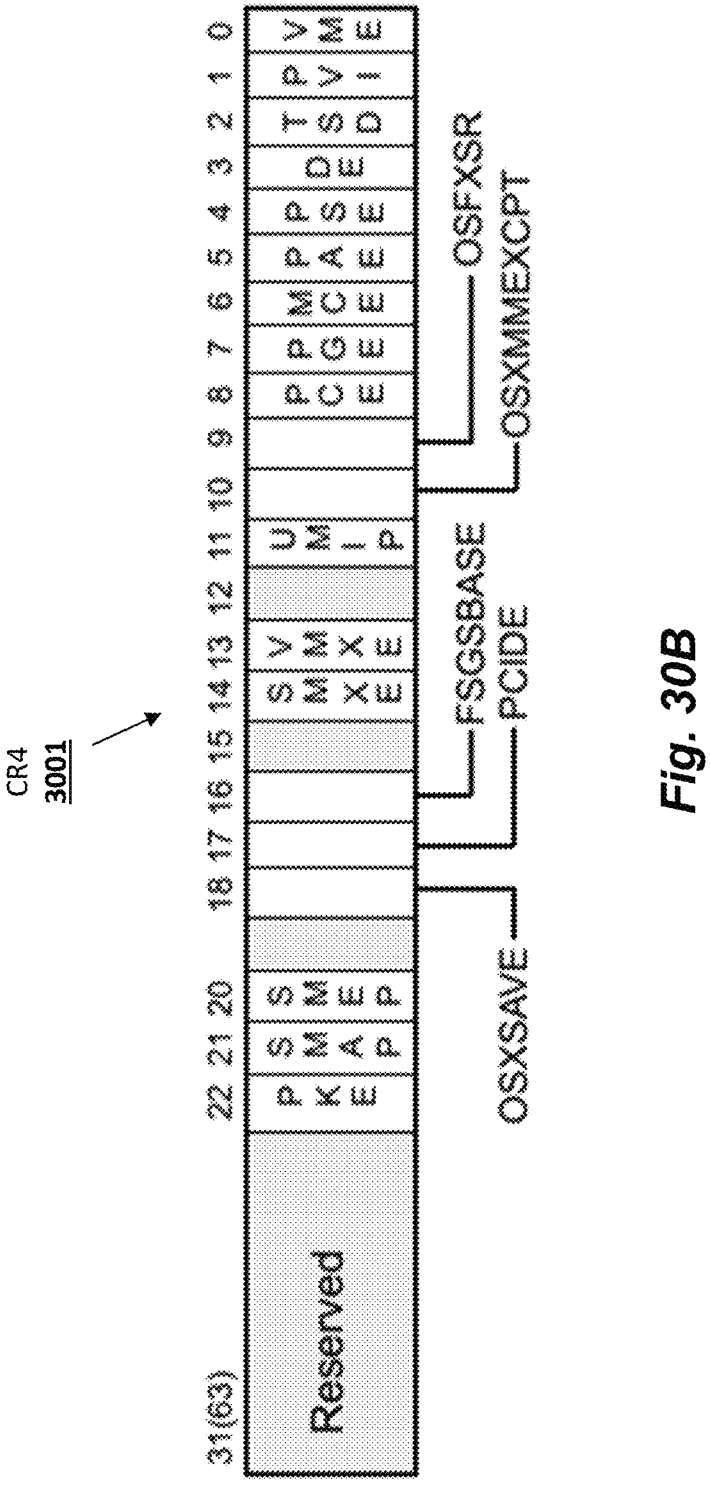

Similarly, as illustrated in FIG. 30B, embodiments of the invention redefine CR4 3001 with a fixed set of control flags/bits, effectively removing controls from CR4 which are no longer needed. Table 65 highlights those bits in CR4 which are fixed (and no longer modifiable). The VME (virtual 8086 mode extensions) bit is always set to 0 because it is not supported by 64-bit operating systems. Similarly because the PVI (protected mode virtual interrupts) bit and the DE (debugging extensions) bit have no current usages, they are permanently set to 1 and 0, respectively.

The PSE (Page Size Extensions) bit does not affect 4-level and 5-level paging as described herein, and so is set to 0 and the PAE (Physical Address Extensions) bit is always set to 1, as 32-bit physical addresses are not used in implementations described herein.

The PGE (Page Global Enable) bit inhibits flushing of frequently-used or shared pages on CR3 writes. Some operating systems use global pages and toggle the PGE bit to flush TLBs. As such, embodiments in which PGE is set to 1, as indicated above, rely on the INVPCID instruction to invalidate TLB entries associated with particular PCID values.

On at least some implementations described herein, the UMIP (User Mode Instruction Prevention) bit has no meaning, since all instructions affected by UMIP will cause #UD (undefined instruction). Forcing the UMIP bit to 1 is consistent with modern OS usage.

The VMXE (Virtual Machine Extensions Enable) bit is permanently set to 1 on some implementations. The virtual machine monitor (VMM) can enumerate "No VMX" support to guests, but does not need to disable VMX on parts that support it. In general, software can choose not to use VMLAUNCH/VMRESUME; it does not need the additional control of the VMXE bit.

Deprecating ISA features, such as the control bits described above, is desirable for reducing attack surfaces, simplifying the validation space, and reducing implementation efforts.

Figure 31:
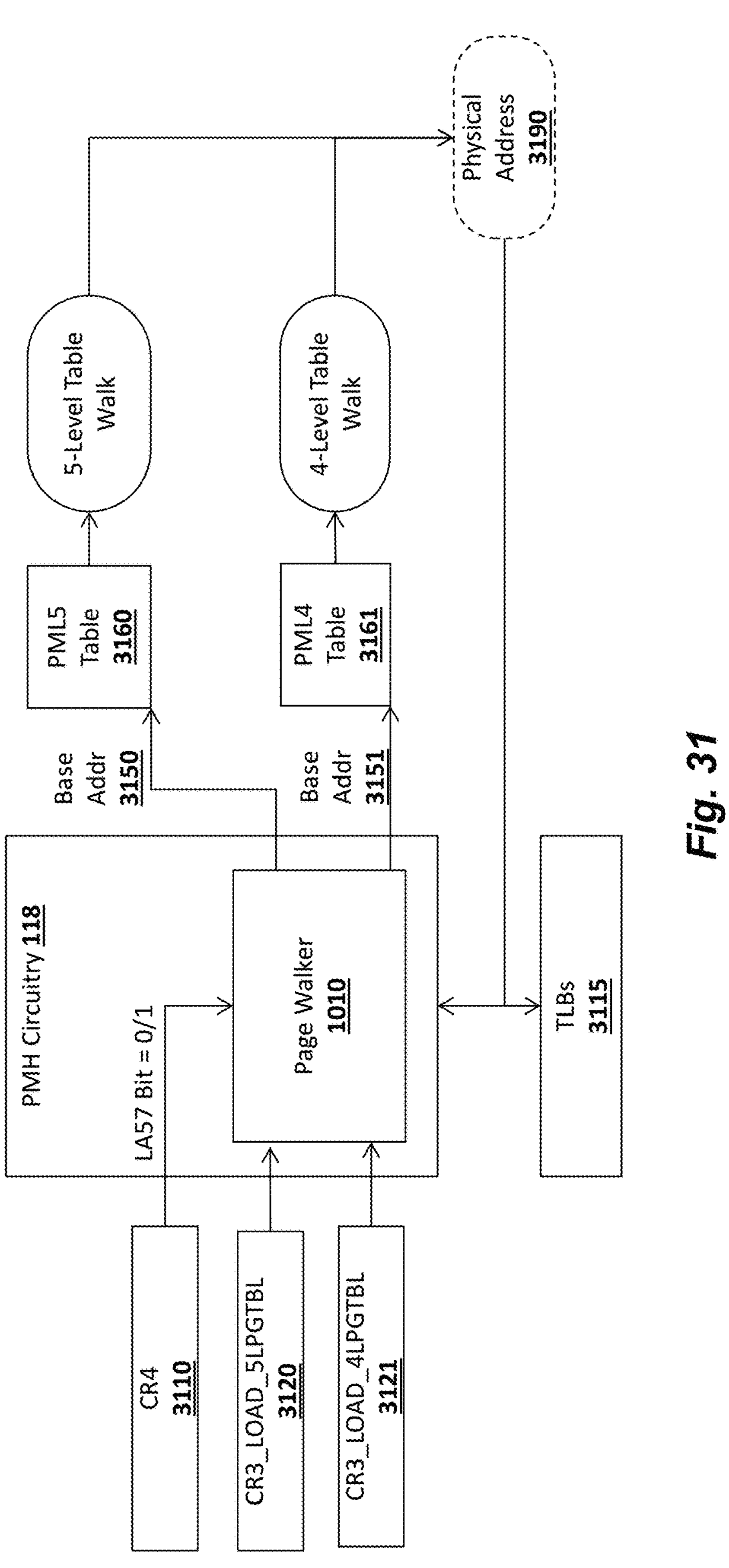
FIG. 31 illustrates an implementation with separate CR3 control registers for 4-level paging and 5-level paging.

Traditionally switching between 4L and 5L page tables required disabling paging. Some embodiments of the invention perform atomic switching to avoid intermediate states and introduce new CR3 control registers for different paging modes. As illustrated in FIG. 31, two new architectural MSRs are defined, CR3_LOAD_5LPGTBL 3120 and CR3_LOAD_4LPGTBL 3121. The CR3_LOAD_4LPGTBL register 3121 is loaded with the base address 3151 of the page map level 4 (PML4) table 3161, the first paging structure for 4-level paging and the LA57 (57-bit Linear Addresses) bit of CR4 3110 is cleared to 0.

To implement 4-level paging (e.g., in response to a miss in the TLBs 3115) the page walker 1010 reads the base address 3151 from the CR3_LOAD_4LPGTBL register 3121 and performs a 4-level table walk (assuming that LA57 of CR4 is 0). To implement 5-level paging, the page walker 1010 reads the base address 3150 from the CR3_LOAD_5LPGTBL register 3120 and performs a 5-level table walk (assuming that LA57 of CR4 is 1). In either case, the physical address 3190 resulting from the page walk may be stored in the TLBs 3115 to be available for subsequent memory access operations.

In some implementations, the use of the CR3_LOAD_4LPGTBL register 3121 with 4-level paging and the CR3_LOAD_5LPGTBL register 3121 with 5-level paging depends on the PCIDE (process context identifier enable) bit in CR4. For example, the PCIDE bit must be set to 0 for 4-level paging and 5-level paging as described herein.

FIG. 32A illustrates the fields of one embodiment of a CR3_LOAD_4LPGTBL register 3120 and FIG. 32B illustrates the fields of one embodiment of the CR3_LOAD_5LPGTBL register 3121. In both cases, bits M-1:12 (e.g., 51:12) encode the physical address of the respective PML table—where the value of M is based on the specific implementation.

Figure 33A:
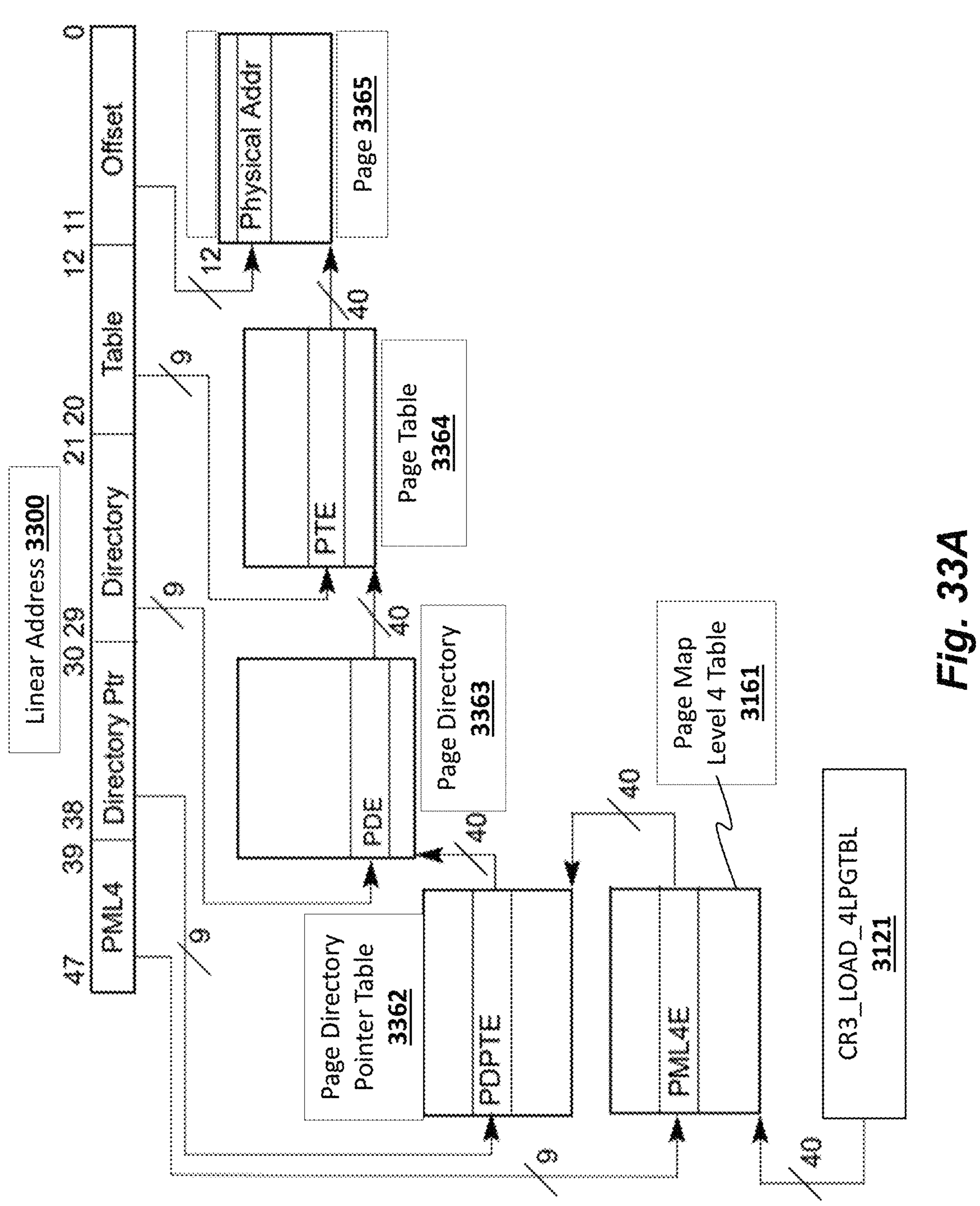
FIGS. 33A-B illustrate multiple levels of 4-level lookup structures and 5-level lookup structures.

FIG. 33A illustrates an example implementation of 4-level paging. The CR3_LOAD_4LPGTBL register 3121 stores the base address of a page map level 4 (PML4) table 3161. The page walker 1010 uses this value and bits 47:39 of the virtual/linear address 3300 to identify an entry which identifies the base of a page directory pointer table 3362 in which an entry is identified using directory pointer bits 38:30 of the virtual/linear address 3300. The entry from the PDPT 3362 points to the base of a page directory 3363 and directory bits 29:21 from the virtual/linear address 3300 identify a page directory entry (PDE) pointing to the base of a page table 3364. Table bits 20:12 identify a page table entry (PTE) which points to the base of page 3365 and a particular physical address is identified using offset bits 11:0 from the virtual/linear address 3300.

Figure 33B:
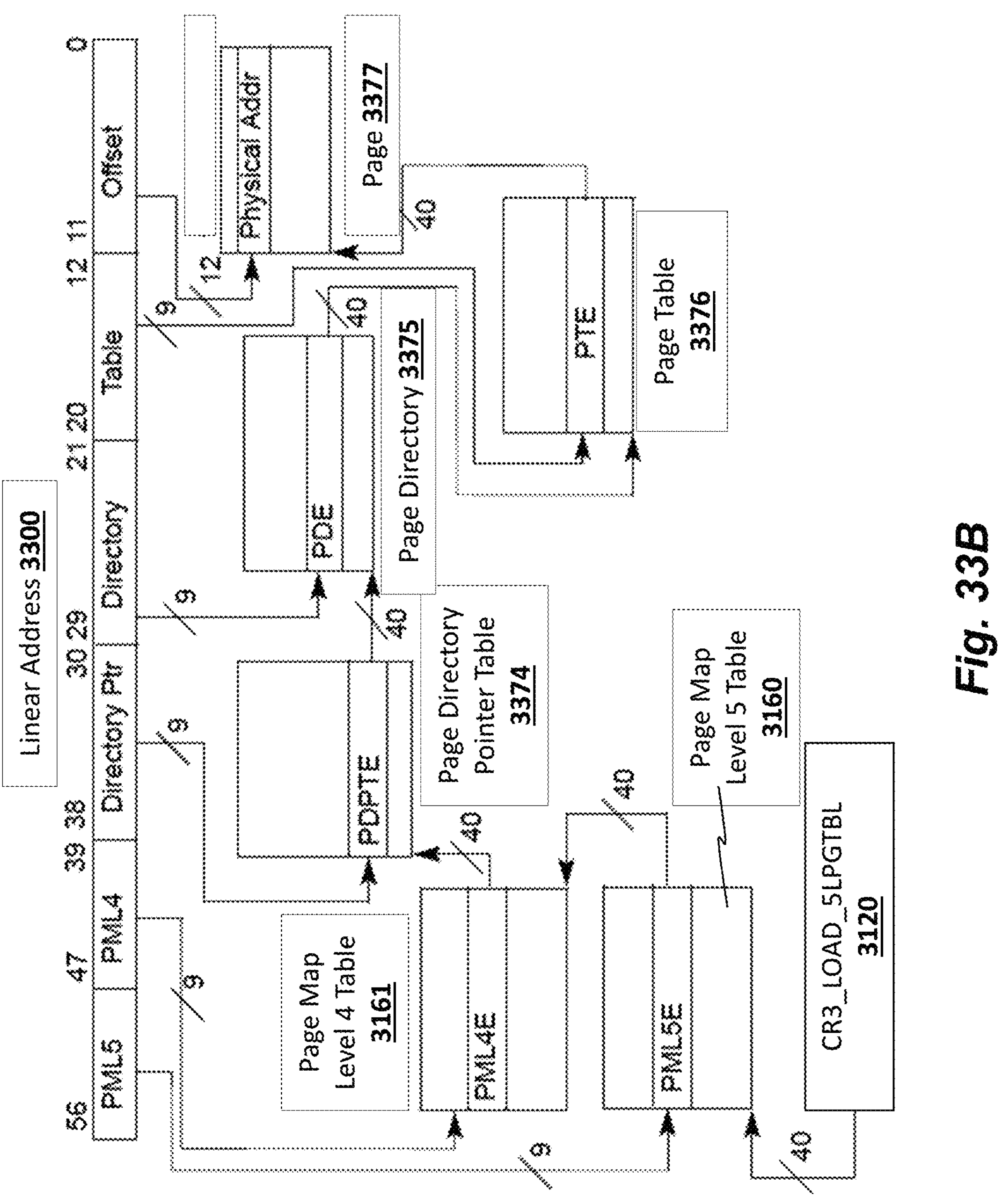

The 5-level paging implementation in FIG. 33B reads the value in control register CR3_LOAD_4LPGTBL 3120 which points to a page map level 5 (PML5) table 3160 and PML5 bits 56:48 of the virtual/linear address 3300 identify a PML5 entry pointing to the base of the PML4 table 3161. The page directory pointer table 3374, page directory 3375, page table 3376, and page 3377 containing the physical address are accessed in a similar manner as described above.

Using these embodiments of the invention, the paging translation type may be switched between 4-level and 5-level paging (or any other group of paging types) without requiring an update to the CR3 register. There is no longer a need as in existing systems to disable paging in order to make these changes.

Figure 34:
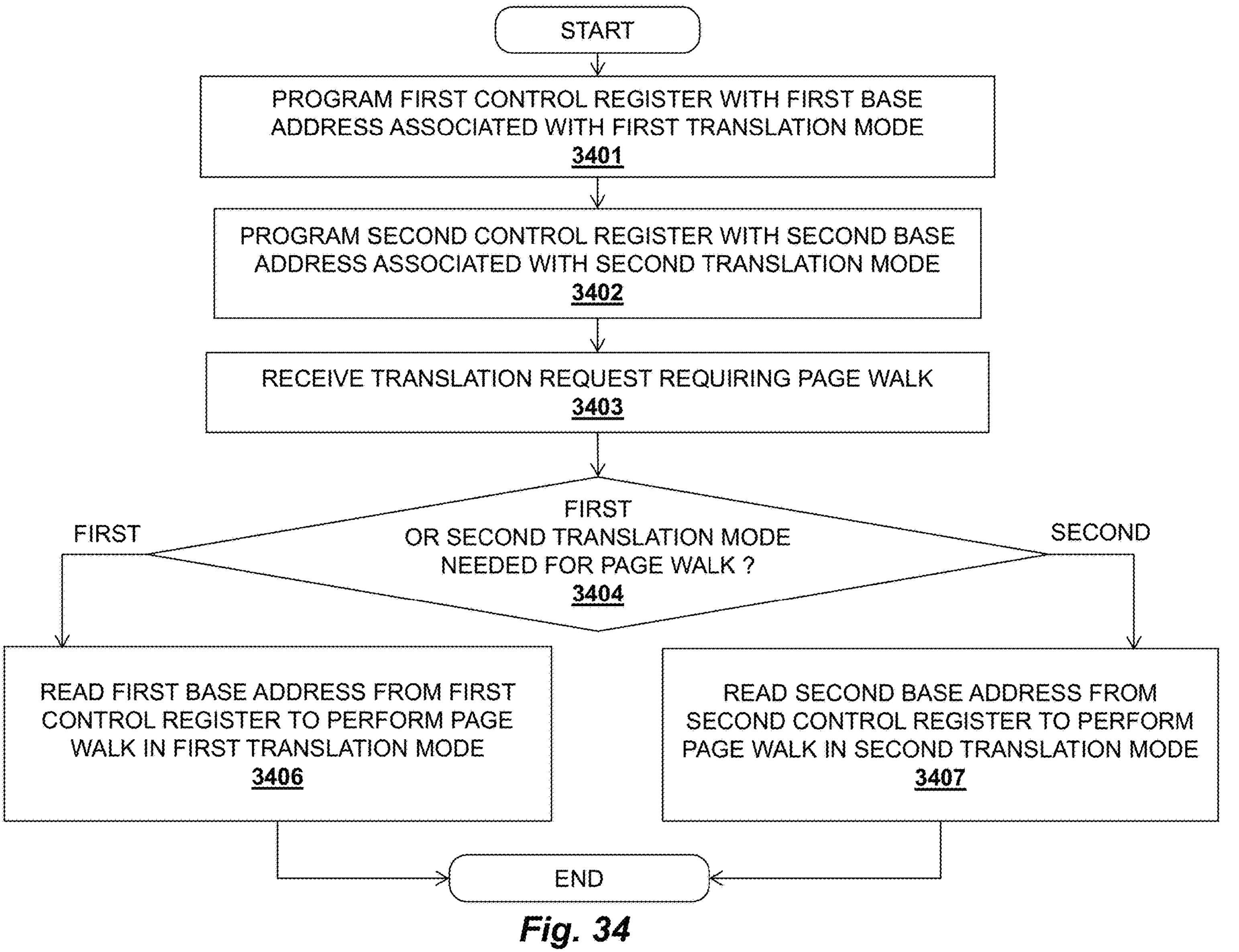
FIG. 34 illustrates a method for using different base translation tables for different types of page table walks.

A method in accordance with one embodiment is illustrated in FIG. 34. The method may be implemented within the context of the processor architectures described above, but is not limited to any particular processor architecture.

At 3401, a first control register associated with a first translation mode (e.g., CR3_LOAD_4LPGTBL) is programmed with a first base address and, at 3402, a second control register associated with a second translation mode (e.g., CR3_LOAD_5LPGTBL) is programmed with a second base address. In some embodiments, the translation mode comprises a 4-level or 5-level translation mode.

At 3403, a translation request is received which requires a page walk (e.g., due to a TLB miss). Based on the context of the request, a determination is made at 3404 as to whether the first or second translation mode is required for the page walk. If the first translation mode is needed, then at 3406, the first base address is read from the first control register and used to perform the page walk (e.g., identifying the PML4 table). If the second translation mode is needed, then at 3407, the second base address is read from the second control register and used to perform the page walk (e.g., identifying the PML5 table).

Virtualization Implementations

Embodiments of the invention include new virtualization extensions and techniques which provide a more secure and efficient virtualization environment. In particular, these embodiments add new forms of virtual machine (VM) Exits (VMExits) and execution controls, and modify several aspects of the virtual machine control structure (VMCS).

A VMCS is a data structure stored in the host physical address (HPA) space containing operational states of a corresponding guest VM and the host machine. The operational states may include states of control registers, instruction pointers, and stack pointers. Data stored in VMCS may be organized into different groups including a guest-state area, a host-state area and other fields relating to VM-execution control, VM-exit control, VM-entry control, and VM-exit information. Processor state (such as information in control registers, instruction pointer registers, and stack pointer registers of the processor) may be loaded from the guest-state area upon entering the VM and saved into the guest-state area upon exiting the VM, whereas the processor state may be loaded from the host-state area upon VM exits.

A VM exit is a forced transition from the guest execution mode to the VMM execution mode in response to detecting one of the triggering events (such as an attempt to execute a certain privileged instruction or to access a certain memory address).

In some processor implementations, the base address (referred to as the root) of the page table is stored in a control register (e.g., CR3) associated with the processor. For example, the CR3 may be used to store the physical address of a head entry in the page table. To secure the mapping between the guest virtual address space and the guest physical address space using hardware-assisted virtualization features, the processor may set, through a virtual machine monitor (VMM), write protection in enhanced page tables (EPT) (e.g., by setting the write protection flag of the pages in the page tables) on the portion of the guest physical address space used by the current context and setting a VMEXIT control flag in the VMCS. This ensures that non-root page tables in page table hierarchy are not subject to modification from any inadvertent modifications. The processor may also set the CR3 load VMEXIT control flag in VMCS. This step prevents inadvertent execution of a register instruction (e.g., mov cr3, <register>) by the guest.

Both of above steps ensure that the guest virtual to guest physical addressing mapping cannot be modified without intervention by the VMM. Both of these steps, however, trigger the VMEXIT operation and thus may impact performance.

Some implementations include a virtual machine (VM) guest control mode (indicated by a VMX_GUEST_CR3_LOAD_CONTROL_BIT in the VMCS). Under the VM guest control mode (e.g., when VMX_GUEST_CR3_LOAD_CONTROL_BIT is set), a guest operating system may request a switch between memory address mappings without triggering the VM exit operations, if the guest operating system can provide an index value and a root value that match the corresponding root value retrieved by the VMM. Without the VM guest control mode, a request by the guest operating system to switch the memory address mappings would trigger a VM exit operation. Further, the VMCS may be expanded to include a control field to store a reference (e.g., an address pointer) linked to a host physical memory page in the physical address space. In one embodiment, the host physical memory page may be aligned by a page boundary in the physical address space. The host memory page may contain an array data structure (VMX_CR3_TARGET_ARRAY, referred to as the CR3 target array). The CR3 target array may contain entries, where each entry may be identified by an index value and include a certain number of bits (e.g., 64 bits). The VMvirtual machine monitor may use an entry of the CR3 target array to store the root of a page table associated with a context (or a process) of the virtual machine. A context is a set of data used by a task (e.g., a process or a thread) saved in registers (or memory) that allow the task to resume after an interruption. The context of a VM is the set of data that allow the VM to resume from an interruption. Each time a guest operating system needs to switch the memory mapping between the guest virtual address space and the guest physical address space (e.g., due to a context switch), the guest operating system may provide both the index value and the root of the page table to the virtual machine monitor. The virtual machine monitor may retrieve the root value of the page table stored in the CR3 target array entry identified by the index value and compare the retrieved root value with the root value provided by the guest operating system. If the two root values do not match, the virtual machine monitor may trigger the VMEXIT operation with exit reason being ' control-register access exit (0x1c)' and report usual exit qualification of access to the CR3 register (as currently defined in existing architectures). Because this feature is mutually exclusive with existing VMEXIT control setting of CR3 exiting, the existing exit reason and exit qualification can be used without modifications.

Figure 35:
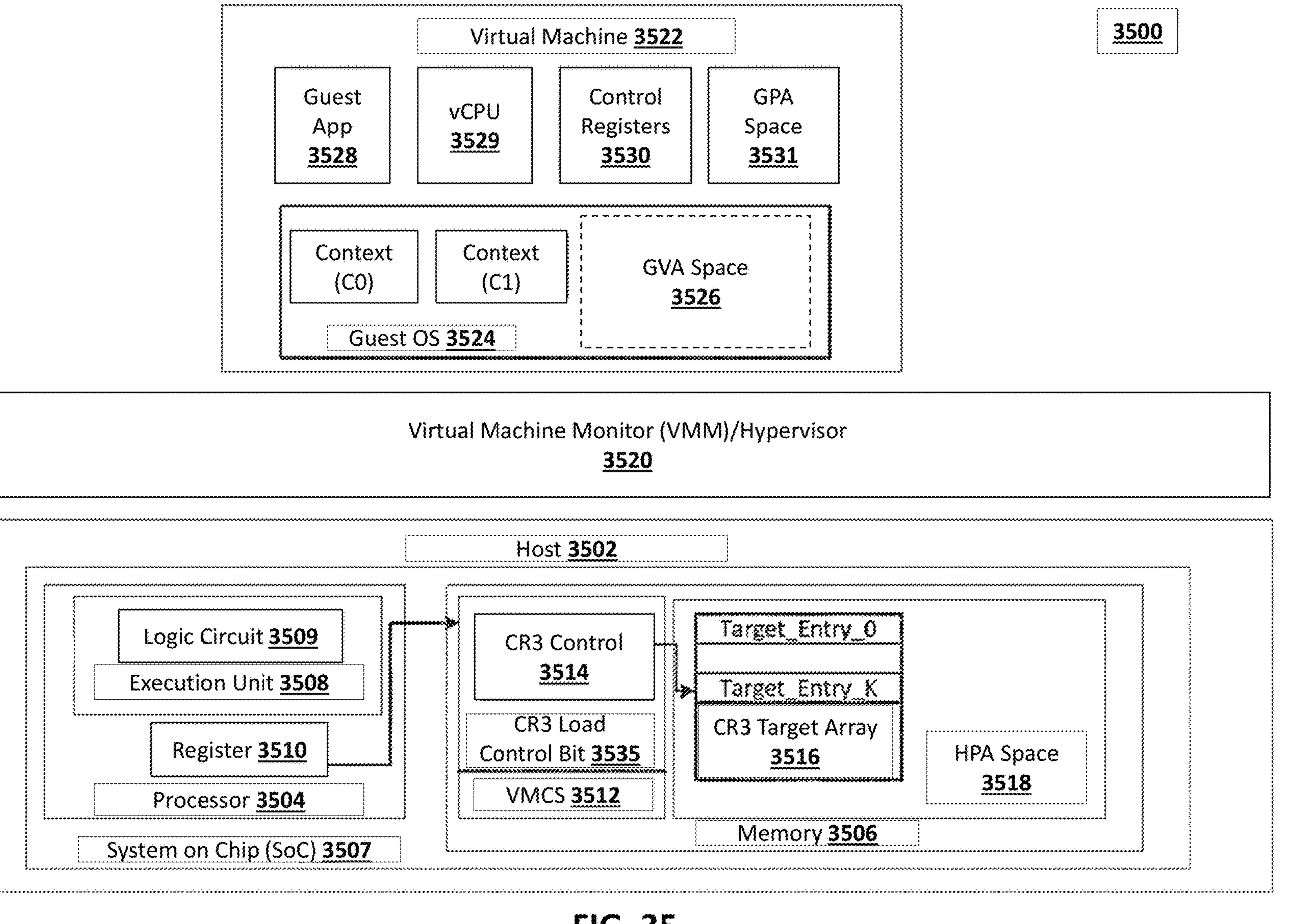
FIG. 35 illustrates a virtualization architecture in accordance with some implementations.

FIG. 35 illustrates a system 3500 for efficient switches of memory address mapping according to an embodiment of the present disclosure. A processor may change from executing a first task (a first process) to a second task (a second process). The change of tasks causes a switch of the corresponding contexts. The system 3500 may include a host 3502 such as, for example, a server computer or any suitable computing devices that support virtualization. Host 3502 may further include a processor 3504 and a memory 3506. In one embodiment, processor 3504 and memory 3506 may be implemented on a system-on-a-chip (SoC) 3507.

The processor 3504 may be a hardware processor such as a central processing unit (CPU) that includes one or more processing cores (not shown) configured to execute system software and user application software. Some implementations of a processor 3504 are described above (see, e.g., FIGS. 1-27 and associated text). The memory 3506 may be a suitable type of storage device to store instructions of software applications and the data associated with the software applications. Memory 3506 may be addressed according to memory addresses defined in a host physical address (HPA) space 3518.

Processor 3504 may further include an execution unit 3508 to execute instructions and a register 3510 to store data. In one embodiment, execution unit 3508 of processor 3504 may include a logic circuit 3509 implemented to support execution of a set of virtualization instructions (virtual-machine extension (VMX)) to provide support for one or more virtualization environments ported on host 3502, including processor-level support for virtual machines. In one embodiment, VMX may refer to hardware features corresponding to instructions to implement a VMM 3520, a host program that allows one or more execution environments (or virtual machines (VMs)) to run on the host 3502. VMM 3520 may create and support the operations of virtual machines (VMs) 3522. Alternatively, execution unit 3508 may execute VMX instructions to directly generate VMs 3522 without the need for VMM 3520.

VMs 3522 may behave like a regular computing device including a virtual CPU (vCPU) 3529. The vCPU 3529 associated with VMs 3522 may execute a respective guest operating system (guest OS) 3524. Guest applications 3528 may run within the environments of guest operating systems 3524. Guest operating systems 3528 (including a kernel) may include a number of guest-OS components (or kernel components) to provide a number of services to guest applications 3528 including memory address management.

VMs 3522 may access memory 3506 through a series of memory space mappings. Each VM 3522 may construct a guest virtual address (GVA) space 3526 that may be mapped to a corresponding guest physical address (GPA) space 3531. A control register (e.g., CR3, CR3_LOAD_5LPGTBL 3120, etc.) 3530 associated with the processor 3504 may contain the base address of the page directory that may be used to calculate a mapping between the GVA space 3526 and the corresponding GPA space 3531 for the VM 3522. In one implementation, control register 3530 can be a virtualized control register that corresponds to a physical control register associated with host processor 3504. The GPA space 3531 of the VM 3522 may be further mapped to the host physical address (HPA) space 3581 of the host system 3502. The mapping from the GPA space 3531 of a VM 3522 to the HPA space of the host may be translated via the extended page table (EPT) associated with the current VMCS running on the processor 3504. In some implementations, the GPA space 3531 and the HPA space 3518 may be the same, thus GVA space 3526 may be directly mapped to HPA space 3518.

VMs can be created and removed from host 3502 by executing appropriate VMX instructions. Execution unit 3508 of processor 3504 via logic circuit 3509 may execute VMX instructions to implement life cycles of VMM software and associated VMs. A host software application executing by execution unit 3508 on processor 3504 may enter VMX operations by executing a VMX start instruction (e.g., VMXON) to start VMM 3520. Under the VMX operations, VMM 3520 can then enter VMs 3522 by executing VM entry instructions (e.g., VMLAUNCH or VMRESUME). End users may use created VMs to run guest applications. A guest application may be associated with a first context (C0) that may be switched to a second context (C1) through a context switch process. After the use of VMs, VMM 3520 can regain control using VM exit instructions that would stop the VMs.

Thus, VMX operations are divided into root operations under which VMM runs and non-root operations under which the guest software (e.g., VMs and guest OS) runs. Therefore, there are two kinds of VMX transitions: transitions into VMX non-root operation (VM entries) from root operations and transitions from VMX non-root operation to VMX root operation (VM exits).

Processor 3504 of the host 3502 may control non-root operation and VMX transitions using virtual machine control structures (VMCSs) 3512. Some implementations described below include a new VMCS 3512. A VMCS is a data structure stored in the HPA space containing operational states of the guest VM and the host machine. The operational states may include states of control registers (e.g., CR3), instruction pointers, and stack pointers. VMM 3520 may manage access to the VMCSs using a VMCS pointer (one per virtual processor or logic processor) stored in register 3510. VMM 3520 may configure a VMCS using VMX operations (e.g., VMREAD, VMWRITE, and VMCLEAR). A VMCS includes data fields to store parameters associated with a VM context (C0, C1) for VMs supported by host 3502. Thus, VM 3522 may run under the first VM context (C0) as the active context based on a first set of parameters stored in VMCS, and then switch to the second VM context (C1) as the active context based on a second set of parameters stored in the VMCS. VMM 3520 may have access via the HPA to a number of active VMCSs stored in memory 3506 as shown in FIG. 35. At a given time, one VMCS is current and is used to specify the VM context for a currently-running VM with respect to one virtual processor.

In one embodiment, memory 3506 may include one or more VMCS regions to store active VMCSs, such as VMCS 3512. For example, each VMCS region may contain parameters associated with one VMCS that can be used to specify a VM context. In response to receiving a request for VM entry, VMM 3520 may determine a current VMCS based on the request and use the current VMCS to specify the VM context. Processor 3504 may include or be associated with a register 3510 to store the VMCS pointer to the current VMCS, such as VMCS 3512 in FIG. 35. Register 3510 may store a reference (e.g., a memory address in the HPA space 3518) to the location where the current VMCS 3512 is stored.

Parameter values stored in VMCS 3512 may be organized into different groups including a guest-state area, a host state area and other fields relating to VM-execution control, VM-exit control, VM-entry control, and VM-exit information. Processor state (such as content stored in control registers, instruction pointer registers, and stack pointer registers of the processor) may be loaded from the guest-state area upon entering the VM and saved into the guest-state area upon exiting the VM, whereas the processor state may be loaded from the host-state area upon VM exits. Thus, the VM is associated with a current VMCS.

In one embodiment, the guest-state area of a VMCS 3512 may further include fields to store processor state that is loaded from these fields on every VM entry of the corresponding VM and saved into these fields on every VM exit. These fields may store, but are not limited to, the content of control registers (e.g., CR3) that may be used to calculate a mapping from the guest virtual address (GVA) to the guest physical address (GPA) of the VM, content of instruction pointer registers (RIP), and content of stack pointer registers (RSP). These fields may optionally include a field to store a pointer to the extended page table (EPTP) that may be used to calculate a mapping from the guest physical address (GPA) space to host physical address (HPA) space of the VM. The host-state area may include similar fields to store processor state upon VM exits.

Guest operating systems (including kernels) 3524 may provide different services to guest applications 3528 and manage different processes associated with these applications 3528. Each process may be associated with a corresponding context (C0, C1 etc.) specified in the GVA space 3526. In some implementations, vCPU 3529 may execute one process associated with a current context (in an active state) while other contexts are in an idle state. One or more pages in a page table may contain the memory address mapping to translate the addresses associated with a current context in the GVA space 3526 to the GPA space 3531. The guest OS 3524 may use a base address (or root) referencing to the one or more pages in the page table used to determine the current memory address mapping. In some implementations, the guest OS 3524 may store the root in one of the CR3 control registers 3530. When guest OS 3524 switches from the current process to another process, guest OS 3524 may need to update pages in the page table used to provide the current memory address mapping. For example, guest OS 3524 may need to load, from one of the CR3 control registers, a new root for the pages in the page table to provide the memory address mapping for the newly activated process.

As discussed above, to prevent malicious memory address attack by a guest application, the guest OS 3524 may write-protect memory pages that store the guest page tables. The write-protect may be achieved by setting the write prevention bits associated with these pages. In some implementations, to ensure the security of the root stored in the CR3 control register, processor 3504 may further execute a VM exit operation (VMEXIT) prior to loading the root from the CR3 control register and execute a VM entry instruction (VMENTRY) after loading the root from the CR3 control register.

To reduce the overhead associated with executing the VMEXIT and VMENTRY associated with loading a CR3 control register, or any other control register storing a base address to a set of page tables (e.g., CR3_LOAD_5LPGTBL 3120 or CR3_LOAD_4LPGTBL 3121 described above), some implementations provide a CR3 load control mode under which the VMM 3520 may determine whether the content of the CR3 control registers can be trusted. If VMM 3520 determines that the CR3 control registers can be trusted (e.g., it has not been tampered with by the guest application), VMM 3520 may allow the guest OS 3524 load the root value associated with the pages in the page table without triggering the VM exit instruction, where the root value may reference the next memory address mapping associated with a new context.

In one embodiment, VMCS 3512 may include a CR3 load control bit (a bit flag) to indicate whether the VM guest control mode is enabled. When the CR3 load control bit is set "1", VMM 3520 enters into the VM guest control mode. VMCS 3512 may further contain one or more CR3 control fields 3514 to store a references to one or more CR3 target arrays 3516. CR3 target array 3516 may be stored in the host memory that can be referenced by a host physical address in the HPA space 3518. Since CR3 target array 3516 is stored and accessed in the HPA space 3518, it is not directly accessible by the guest OS 3524. Instead, the guest OS 3524 needs to employ VMM 3520 and/or host operating system to access the HPA space 3518. Thus, VMM 3520 may store trusted values in CR3 target array 3516. In one embodiment, VMM 3520 may store CR3 target array 3516 in a host physical memory page with the reference to the CR3 target array 3516 aligned with a page boundary. Thus, CR3 target array 3516 can be referenced according to a page number in HPA space 3518.

In one embodiment, entries of the CR3 target array 3516 may be referenced by the respective index values. Each entry, identified by a unique index value, may include a certain number of bits (e.g., 64 bits) to store flags and a CR3 root. When a guest OS 3524 creates a new GVA space (e.g., in conjunction with creating a new process), guest OS 3524 may issue a hypercall to VMM 3520 to request VMM 3520 to store the root of the page table that stores the memory address mapping between the GVA space to the GPA space. The hypercall is a software trap issued by the guest OS 3524 to VMM 3520 to request privileged operations such as, updating the page table. The root value may be stored in a CR3 control register 3530 associated with the VM 3522. Responsive receiving the hypercall including the status indicating that VMM 3520 has successfully stored the new value in the CR3 target array and returned an index value to the guest OS, the guest OS may make the mov CR3<value> instruction without triggering the VM exit operation. Prior to receiving the hypercall, the mov CR3<value> issued by the guest OS triggers the VM exit operation. Responsive to determining that the CR3 control bit is set to "1," VMM 3520 may store the received root value in an entry in the CR3 target array 3516, where the entry is identified by an index value. Responsive to storing the CR3 value in the entry (and setting the V bit to valid), VMM 3520 may return the index value to guest OS 3524. Guest OS 3524 may store the index value in a data structure private to the VM.

When the guest OS 3524 needs to switch the GVA space (by switching the CR3 control register that stores the root for the mapping between the GVA space and GPA space), guest OS 3524 may need to provide the root value stored in CR3 control register and the index value to the VMM 3520 for verification. VMM 3520 may compare the root value received from the guest OS 3524 with the root value stored in the entry identified by the received index value. If they match, VMM 3520 may allow the GVA space switch (by switching the CR3 control register) without triggering the VM exit operation, thus allowing a secure, fast switch. In one embodiment, processor 3504 may set the A bit (referred to as the access status bit) to "1" to indicate that processor 3504 has performed CR3 switch without the VM exit operation by making sure that the root value stored in the entry is matched to a root value provided by the guest OS 3524.

Additionally, when different versions of CR3 are made available for different types of paging, such as CR3_LOAD_5LPGTBL and CR3_LOAD_4LPGTBL, the VMM may verify the corresponding root values and index values as described above. In these implementations, a transition from one GVA space which uses CR3_LOAD_5LPGTBL to another GVA space which uses CR3_LOAD_4LPGTBL may be performed without disabling paging or performing a VM exit.

When guest OS 3524 deletes a GVA space (or a corresponding process), guest OS 3524 may destruct pages that store the memory address mapping between the GVA space and the GPA space. Guest OS 3524 may further make another hypercall (as defined above) to VMM 3520 to inform VMM 3520 of the destruction of the GVA space associated with an index value. VMM 3520 may remove the entry identified by the index value. In one embodiment, VMM 3520 may set the V bit to "0."

In one embodiment, the access status bit (A bit) of each entry in CR3 target array 3516 may be used to indicate the time that the entry has been in CR3 target array 3516.

Thus, the A bit is set whenever processor 3504 determines that the root value in the request matches the root value stored in CR3 target array 3516. In one embodiment, VMM 3520 may be associated with a private data structure to store an age count ("AgeCount") associated with a corresponding entry in CR3 target array 3516. VMM 3520 may periodically scan all entries in CR3 target array. If VMM 3520 determines that the A bit of an entry is set (meaning that processor 3504 recently switched to the memory address space), VMM 3520 may increment the AgeCount associated with the corresponding entry. If VMM 3520 determines that the A bit of an entry is cleared (meaning that processor 3504 recently switch off the memory address space), VMM 3520 may decrement the AgeCount associated with the corresponding entry. After each scan of the CR3 target array 3516, VMM 3520 may clear all A bits so that VMM 3520 may determine if the A bit has been set since the last scan. Thus, the access status bit may be used to implement a Least Recently Used (LRU) algorithm. In the event that all 512 entries in the CR3 target array have been used up, the LRU algorithm may select the least recently used entry to evict and make space for a new entry.

In another embodiment, an existing instruction may be modified to achieve the VM exit free guest memory address space switching. For example, certain bits (e.g., bit 52-62) of the operand of the register mov CR3 <register operand> instruction may be used to store the index value that identifies a corresponding entry in the target array. Thus, responsive to executing mov CR3 <register operand>, the processor may first determine if the CR3 load control bit stored in VMCS is set. Responsive to determining that the CR3 load control bit is not set, the processor may initiate the VM exit operation. Responsive to determining that the CR3 load control bit is set, the processor may retrieve the index value from the operand (e.g., bits 52-62), and retrieve, based on the index value, the root value stored in a corresponding entry of the target array. The retrieved target value may be compared to a root value encoded in the operand to determine whether the guest memory address mapping can be switched without initiating the VM exit operation. In one embodiment, the modified mov CR3<register operand> instruction may be executed independent of whether the VM guest control mode is set or not. In another embodiment, the modified mov CR3 <register operand> instruction may be executed only when the VM guest control mode is set.

In another embodiment, a new virtualization support instruction may be added to VMX to the VM exit free guest memory address space switching. The new virtualization instruction may include a first reference to a register for storing the index value and a second reference to the CR3 control register. The new virtualization instruction may be enabled when the CR3 load control bit is set; the new virtualization instruction may be disabled when the CR3 load control bit is not set. The guest OS may trigger the new virtualization instruction to initiate the VM exit free guest memory address space switching.

In one embodiment, for all legacy instructions that are not supported by the modes of the new architecture (e.g., virtual machine extensions (VMX)), microcode is executed to handle the common-case legacy behavior. If the legacy behavior requires complex system interaction, such as the examples provided herein, a VMEXIT is performed and the hypervisor emulates the complex behavior. Extremely infrequent cases, such as real and protected mode execution that is typically required for boot, can be interpreted by the hypervisor at an acceptable overhead.

Figure 36:
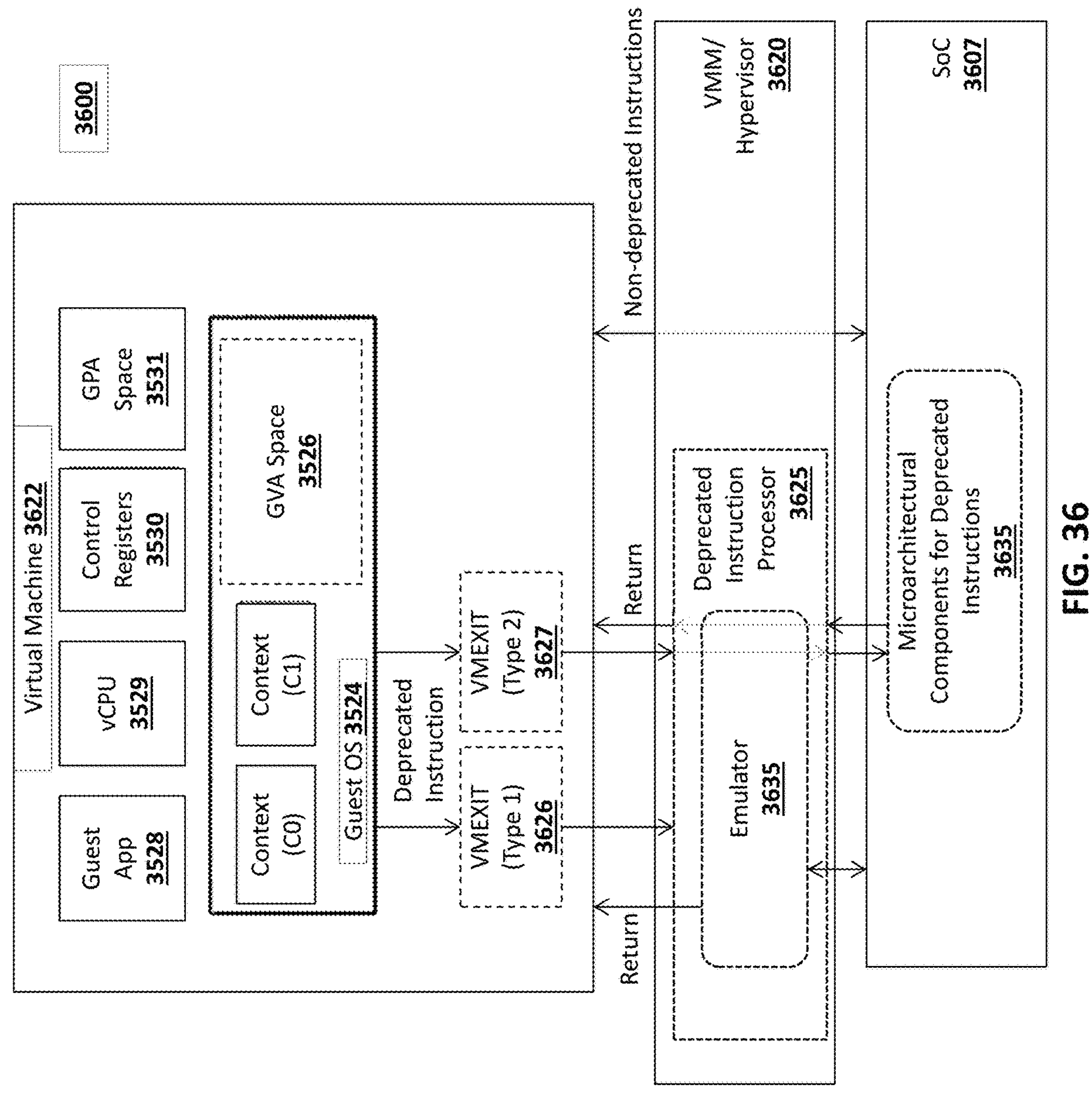
FIG. 36 illustrates a deprecated instruction processor and emulator in accordance with some embodiments.

One embodiment is illustrated in FIG. 36 in which virtualization techniques are used to emulate legacy behavior. In particular, in response to detecting legacy instruction, the virtual machine 3622 executes a VMEXIT 3626, 3627 in accordance with the following options:

Option 1: This option is implemented with no modifications to existing microarchitectures, but provides lower performance. In response to detecting a deprecated instruction or access to a deprecated state, an Invalid/Undefined Opcode exception (#UD) triggers a first type of VMEXIT 3626. A deprecated instruction processor 3625 detects the first type of VMEXIT 3626, which may require complex system interactions, and an emulator 3635 emulates the complex behavior. While this approach is limited in performance, it comes at no cost since no architectural changes are required to the SoC 3607 microarchitecture.

Option 2: In one embodiment, a second type of the VMEXIT instruction 3627 is executed for certain legacy instructions which provides additional information for instructions combined with partial hardware support for the legacy architectural state. In this embodiment, the deprecated instruction processor 3625 of the hypervisor 3620 relies on the microarchitectural components 3635 provided by the SoC 3607 to efficiently process these types of legacy instructions. In one implementation, the deprecated instruction processor 3625 executes one or more privileged instructions which access the microarchitectural components 3635 using parameters indicated by the VMEXIT 3627, and return results to the virtual machine 3622 (which may then return the results to the guest OS 3524 which updates the relevant execution context (e.g., C0, C1)). Alternatively, or in addition, the hypervisor 3620 validates the VMEXIT 3627, which is executed directly by the microarchitectural components 3625 and returns the results directly to the virtual machine 3622.

In both types of VMEXIT 3626, 3627, the deprecated instruction processor 3625 of the hypervisor 3620 emulates deprecated instructions and operations related to deprecated state and returns execution to the VM 3622. If instructions requiring these VMEXITs 3626, 3627 are infrequent, then they will not result in poor performance of the legacy VM 3622. Non-deprecated instructions and those not interacting with deprecated state will operate at native performance regardless of their frequency.

In order to reduce complexity and increase performance of the hypervisor 3620, in one embodiment, a new type of exception is delivered to the hypervisor 3620 when a legacy instruction is executed. Instead of delivering a generic "invalid opcode" exception, a more specific exception is delivered which provides the deprecated instruction processor 3625 a "fast-path" for handling legacy instructions, instead of considering all possibilities that could generate the #UD exception.

Figure 37:
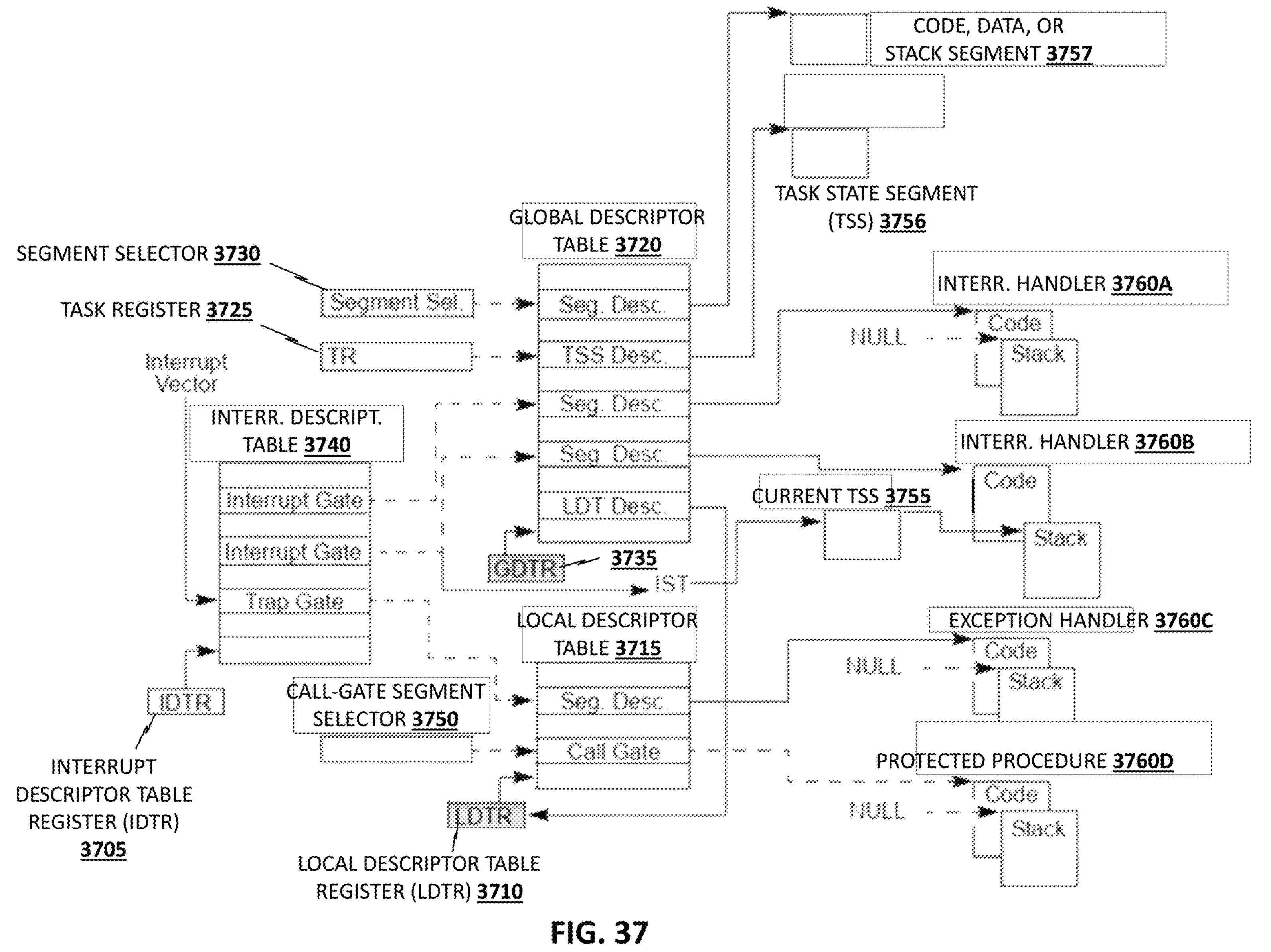
FIG. 37 illustrates a global descriptor table, local descriptor table, and associated segments which are deprecated in some embodiments.

FIG. 37 illustrates examples of this legacy state support included in one embodiment. The illustrated state includes the interrupt descriptor table register (IDTR) 3705 which stores a pointer to the interrupt descriptor table 3740, a global descriptor table (GDT) register 3735 for storing a pointer to a GDT 3720, a segment selector 3730 storing a pointer to a segment descriptor in the GDT 3720, and a task register 3725 for storing a pointer to a task state segment (TSS) entry in the GDT 3720. In addition, a local descriptor table register (LDTR) 3710 stores a pointer to a local descriptor table (LDT) 3715 and a call-gate segment selector 3750 includes a pointer to a call gate entry in the LDT 3715. The IDT 3740, GDT 3720, and LDT 3715 point to various data structures including code, data, or stack segment 3757, the Task State Segment (TSS) 3756, interrupt handlers 3760A-B, exception handlers 3760C, and protected procedures 3760D.

Based on this state, the situations where a VMEXIT would be required to support legacy behavior to perform legacy interrupt delivery and to execute the IRETQ instruction have been evaluated. One embodiment emulates these operations while relying on a small number of legacy registers only in virtualization mode. These registers may be implemented as MSRs, loaded from a fixed offset in the VMCS, or directly supported in logic. The other operations in the illustrated program code flow rely on conventional computation microoperations (e.g. loads, adds, etc) that are executed directly by the SoC microarchitecture. One implementation also tracks information related to the frequency of exits due to complex legacy behavior in event delivery and IRETQ.

Today, booting a processor (e.g., an x86 CPU) generally requires the use of real and protected modes, which make heavy use of features that are targets for deprecation, including features that increase the attack surface exposed by the ISA, require complex validation, and generally make it challenging to introduce new features while at the same time providing little value. In one embodiment of the invention, during these states (e.g., real and protected mode code executed during boot) the deprecated instruction processor 3625 in the hypervisor 3620 emulates/interprets this small number of instructions as needed (e.g., using an instruction interpreter or similar technology).

Apparatus and Method for Improved Legacy and Non-Legacy Virtualization

Figure 38:
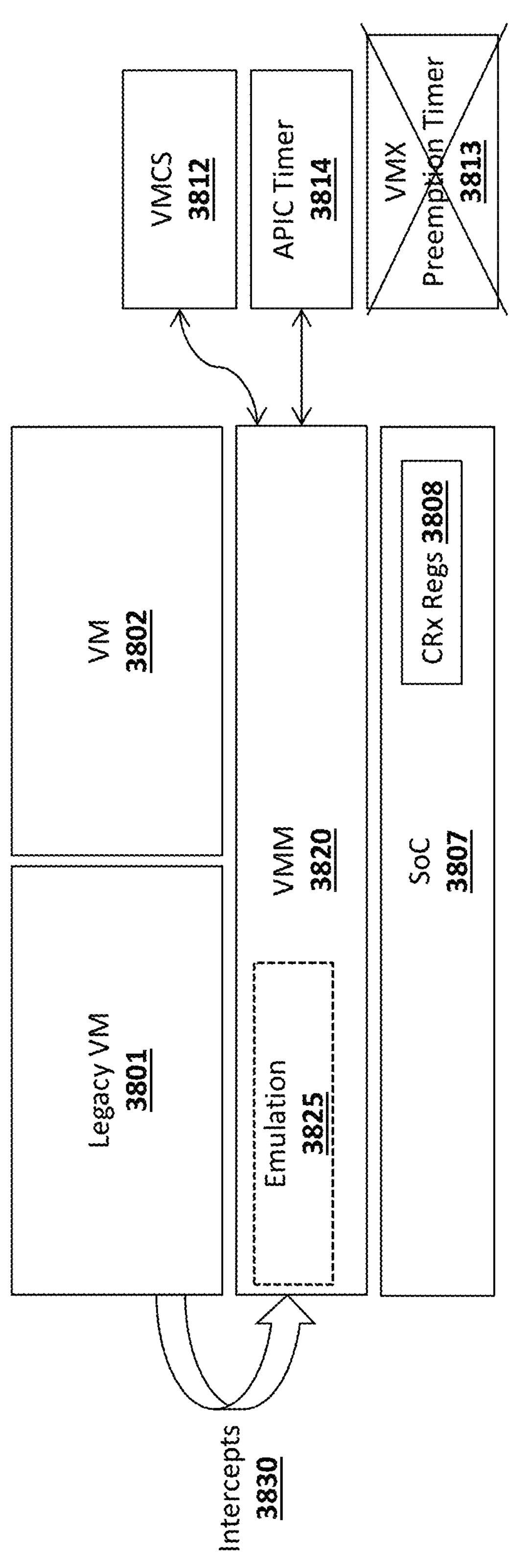
FIG. 38 illustrates one implementation of a VMM which emulates certain operations of a legacy VM, and uses a modified VMCS and APIC timer.

Embodiments of the invention provide for virtualization of legacy software at low architectural complexity. FIG. 38 illustrates an example implementation with a non-legacy VM/guest 3802 and a legacy VM/guest 3801 executed on an SoC 3807 or other processor under the control of a VMM 3820. Certain instructions executed by the legacy VM 3801 are not directly supported by SoC 3807, and are instead intercepted 3880 by the VMM 3820, which performs emulation 3825 as described herein, to emulate the SoC support for these instructions. For example, certain legacy instructions or instructions which rely on legacy data structures/registers may need to be emulated in this manner, given the architectural changes to the SoC 3807 as described herein. In these embodiments, the VMM 38220 catches #UD/#GP operations and emulates 3825 legacy behavior (e.g., *DT instructions). Note that the emulation 3825 in FIG. 38 represents any operations performed by the deprecated instruction processor 3625 in FIG. 36, including but not limited to those performed by the emulator 3635.

Some implementations described below provide a new virtual machine control structure (VMCS) 3812, as well as new forms of VMEXIT operations and execution controls. In particular, certain fields of the VMCS 3812 are removed or modified, including those used for storing guest states related to segmentation. In some implementations, for architectural state removed from the VMCS, the "guest state" fields are retained in their present locations. These guest state fields are not read/put into any architectural location on VM entry and are not consistency checked on VM entry to simplify implementation. In addition, each VMCS 3812 includes new host/guest state fields for storing new MSR states and a new execution control field for "legacy guest" exits.

As described above, many fields of CRx registers 3808 (e.g., CR0 fields, CR4 fields, etc) are fixed in implementations described herein. These implementations may rely on a combination of emulation techniques in situations where a legacy guest 3801 wants to use a "different" value of a fixed CRx register 3808 field.

The INTn instruction (software interrupt) has new semantics in some embodiments. Legacy INTn instructions (e.g., issued from legacy VM 3801) include semantics which rely on the existence of an interrupt descriptor table (IDT) 3740 as described above. Thus, emulation 3825 is performed on legacy INTn instructions to emulate the expected IDT interactions.

In one implementation, the VMX preemption timer 3813 is replaced with APIC timer 3814 virtualization. In particular, both the pin-based control to activate the VMX-preemption timer 3813 and the VM-exit control to save the VMX-preemption timer value and associated guest state VMCS 3812 field are removed. Instead, the timing functions provided by APIC timer 3814 virtualization are used.

Replacement of the VMX preemption timer 3813 simplifies validation and reduces power consumption. Additionally, the VMX preemption timer 3813 only decrements in the C0, C1, and C2 power states and not in deeper sleep states, making it difficult to test through calibration with other timers. Furthermore, the APIC timer 3814 is an already architected feature with several advantages. Various existing VMMs such as Hyper-V and Xen do not use the existing VMX preemption timer. While KVM uses the VMX preemption timer, it is able to use other timers, including the APIC timer 3814.

Some new VMEXIT cases and associated controls are required (e.g., cases operable for legacy and non-legacy VMs but with different semantics and no existing exit (e.g., INT n)). In these embodiments, the VMM emulates some code sequences (non-flat CS/DS/SS/ES, real mode, etc.) which are rare in modern production software, including certain cases where a legacy guest toggles reserved/fixed CR bits in the control registers (e.g., CR0, CR4, etc).

Figure 39:
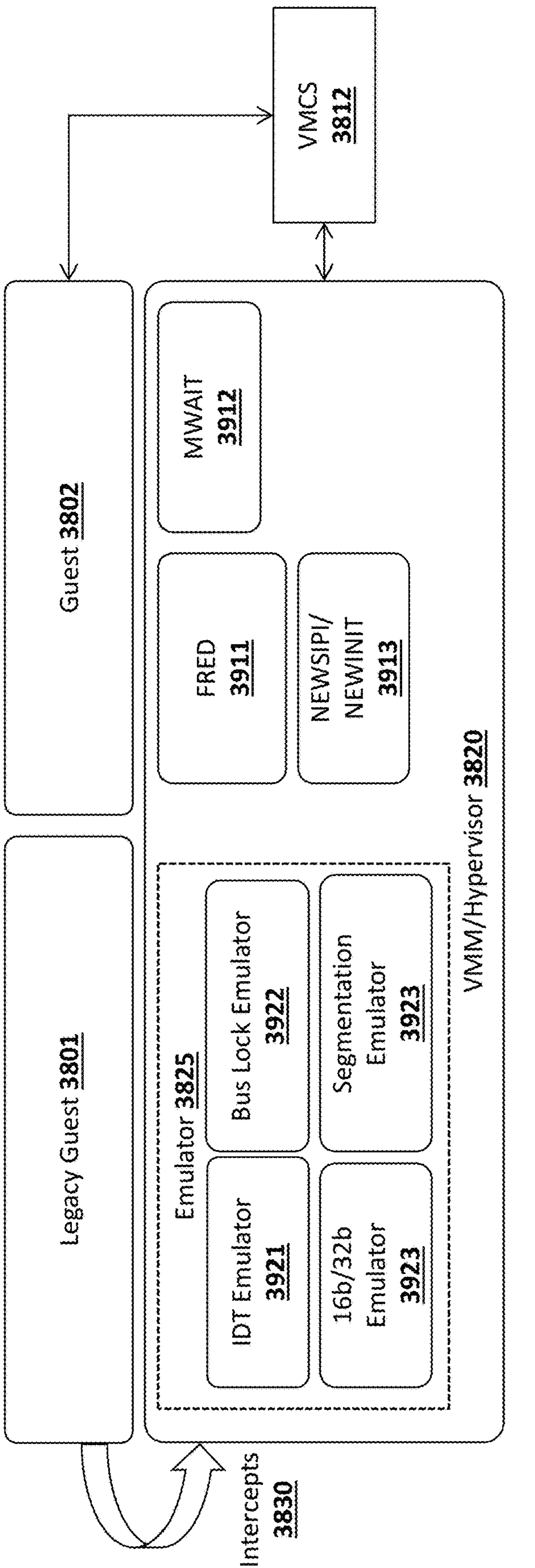
FIG. 39 illustrates an implementation of an emulator for legacy guests and components for non-legacy guests.

As illustrated in FIG. 39, the emulation 3825 provided by the VMM includes an interrupt descriptor table (IDT) emulator 3921 for emulating interactions with the IDT (which is no longer used), a bus lock emulator 3922 for emulating the system bus lock signaling used in legacy implementations, a 16b/32b emulator 3923 for emulating unsupported 16b/32b program code, and a segmentation emulator 3923 for emulating legacy transactions involving segmentation via the global descriptor table 3720 and local descriptor table 3715 (which are no longer used). In some implementations, each emulator is responsible for emulating operations for a different type of legacy instructions. For example, instructions requiring segmentation may be intercepted by the VMM and processed by the segmentation emulator 3923. Similarly, instructions which specify bus lock operations are intercepted and processed by the bus lock emulator 3922. Instructions which rely on the IDT 3740 are processed by the IDT emulator 3921 and unsupported 16b/32b instructions are processed by the 16b/32b emulator 3723.

By way of example, and not limitation, the segmentation emulator 3923 may emulate one or more of the components shown in FIG. 37, such as the segment selector 3730, task register 3725, global descriptor table register 3735, local descriptor table register 3710, call-gate segment selector 3750, global/local descriptor tables 3720, 3715, etc. In response to segmentation operations specified by an instruction of this type, the segmentation emulator 3923 emulates the operations (e.g., using an internal representation of the segmentation components and/or other program code) and returns a result expected by this type of instruction (e.g., such as the location of the code, data, or stack segment 3757).

When executing a non-legacy guest 3802, the functions previously performed by these legacy components are instead performed by Fast Return and Event Delivery (FRED) 3911 operations, new implementations of MWAIT 3912, and a new SIPI/INIT 3913 (startup inter-processor interrupt/initialization interrupt).

FRED 3911 supports new ring transitions (e.g., between privilege levels) that are simpler, faster, and more complete, with the primary goal of enhancing OS robustness and security. Legacy transitions are replaced by FRED event delivery and return instructions and kernel context is established from new MSRs which the VMM can protect. In some implementations, there is no use of legacy system data structures on transitions to ring 0 (CPLO, which is the highest privilege level) and separate return instructions are provided for returning to ring 0 and to ring 3. FRED 3911 also manages OS context on ring transitions more completely. Further details associated with FRED 3911 can be found in Co-pending Application Pub No. US20220283813A1, filed Jun. 26, 2021, and entitled Flexible Return and Event Delivery. Some of these details are provided below.

In some implementations, MWAIT 3912 provides for a monitorless version of an MWAIT operation/instruction. VMMs commonly hide MWAIT from guest operating systems because the MONITOR instruction is challenging to virtualize. Because VMMs hide MWAIT and MONITOR, guests currently use the STI instruction to set interrupt flags and the Halt (HLT) instruction for STI blocking (e.g., halting execution when the an interrupt flag is set). In some implementations of the invention, the VMM 3820 virtualizes CPUID to show support for Monitorless MWAIT but not the basic MWAIT (with Monitor support). The VMM does not need to virtualize MONITOR since it is not enumerated to the guest 3802 and can inject #UD (undefined instruction) upon detecting guest MONITOR usage. Thus, the guest 3802 no longer needs to rely on STI/HLT since it can use the Monitorless MWAIT instruction. This removes last known modern usage of STI blocking.

In some implementations, executing MWAIT with ECX [2] set is a Monitorless MWAIT. The MWAIT instruction itself may set ECX[2]. The processor will not wakeup from MWAIT with ECX[2] set due to write to monitored cacheline, although the processor may continue to spuriously wakeup for other reasons. In addition, MWAIT with ECX[2] set will still clear out a previously set MONITOR (just like other MWAIT implementations). Alternatively, or in addition, a new opcode may be used to implement Monitorless MWAIT.

In existing SIPI (Startup Inter-processor Interrupt) implementations, a boot processor receives an SIPI message and enters 16-bit mode to initialize the boot process. The NEWSIPI/INIT component 3913 directly enters paged 64-bit mode. In some implementations, NEWSIPI/INIT 3913 uses a new shared "entry_struct" to define paging modes and other state. In addition, NEWSIPI/INIT 3913 will not set up segmentation registers, aside from FS/GS base, and will only enable supervisor state.

Implementations of the new VMCS 3812 will now be described, starting with FIG. 40, which illustrates the various regions and control fields 4001-4006 of one implementation of the VMCS 3812. As described below, the VMCS 3812 includes new host/guest state fields for storing new MSR states and a new execution control field for "legacy guest" exits.

The guest state area 4001 stores VM state values on VM exits. This state is then loaded from the guest state area 4001 on corresponding VM entries. The host state area 4002 stores processor state values and loads these processor state values on VM exits (e.g., to execute privileged/VMM instructions).

VM execution control fields 4003 control processor behavior in VMX non-root operation, determining the instructions and events which cause VM exits. VM exit control fields 4004 control the behavior of the virtualized environment on VM exits and VM entry control fields 4005 control behavior on VM entries. VM exit information fields receive information on VM exits and describe the cause and the nature of VM exits. On some processors, these fields are read-only.

FIGS. 41A-B illustrate fields in the guest state area 4001 and indicates changes between prior implementations and the new implementations described herein. As used here and in subsequent slides, the term "Deprecated" means the fields are unused by the non-emulated components of the architecture (e.g., guest 3802) but still exist in the VMCS 3812, so that they can be used by the VMM 3820 for storing guest state and guest emulation data.

In the illustrated implementation, the segments CS, SS, DS, ES, FS, GS, LDTR, and TR, the system descriptor table registers LDTR and TR, and the GDTR and IDTR are no longer used except for the FS base (8B) and GS base (8B), removing native support for segmentation. Thus, any legacy guest 3801 instructions related to these components are intercepted 3830 by the VMM 3820 and emulated by the segment emulator 3926. The MSRs IA32_SYSENTER_CS, IA32_SYSENTER_ESP, and IA32_SYSENTER_EIP used for system calls are deprecated and replaced with the Fast Return and Event Delivery (FRED) techniques described herein. In addition, the MSR IA32_INTERRUPT_ SSP_TABLE_ADDR is deprecated because IST is no longer used.

As indicated in FIG. 41B, because the VMX Preemption timer is no longer used, its value is deprecated. As discussed above the VMX preemption timer is replaced with the APIC timer. In addition, the new field IA32_COMPAT_SELECTOR is included in the guest state area 4001 to be used for segment emulation by the segment emulator 3923.

As illustrated in FIG. 42, the host state area 4002 is updated in a similar manner to the guest state area 4001. In addition, CR0 and CR4 bits are fixed as previously described.

FIGS. 43A-C illustrate VM execution control fields 4003 modified by embodiments of the invention including, by way of example and not limitation, fields related to pin-based controls, the VMX preemption timer, and the descriptor table.

FIG. 44 illustrates VM exit control fields 4005 modified by embodiments of the invention including deprecation of the host address space size field and the VMX preemption timer field.

FIG. 45 illustrates VM entity control fields 4005 modified by embodiments of the invention including deprecation of the VM entry interrupt information.

FIG. 46 illustrates a listing of operations for new VM exits and execution controls related to the removal of segmentation. For example, with segmentation removed, new VM exits are required for instructions which reference portions of the segmentation architecture, including IRET, PUSH seg, POP seg (FS/GS for Intel64), MOV to/from seg, L*S (SS, FS, GS for Intel64), SWAPGS, VERR/VERW, ARPL, LAR, LSL, INT n, SYS(RETIENTERI EXIT), SYSCALL, and Far calls/jumps/returns. Similarly, new VM exits are defined for STI, PUSHF, as well as CLI and POPF because of semantic differences in the privilege levels.

Because these instructions rely on deprecated architectural features, such as segmentation, which are no longer natively available, implementations of the VMM 3820 intercept 3830 and redirect these instructions to the emulator 3825. Instructions which rely on the legacy segmentation architecture, for example, are processed by the segment emulator 3923 which emulates and generates results in accordance with this architecture.

Similarly, any instructions which rely on the existence of the IDTR 3705 are intercepted 3830 by the VMM 3820 and processed by the IDT emulator 3921, which emulates and generates results in accordance with the IDTR 3705. In the same manner, instructions requiring 16b/32b support and bus lock support are intercepted 3830 and processed by the 16b/32b emulator and bus lock emulator 3922, respectively, which emulate these functions and generate results.

FIG. 47 illustrates required values for existing control settings in accordance with some implementations. It also provides the reason for the new required values.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Figure 48:
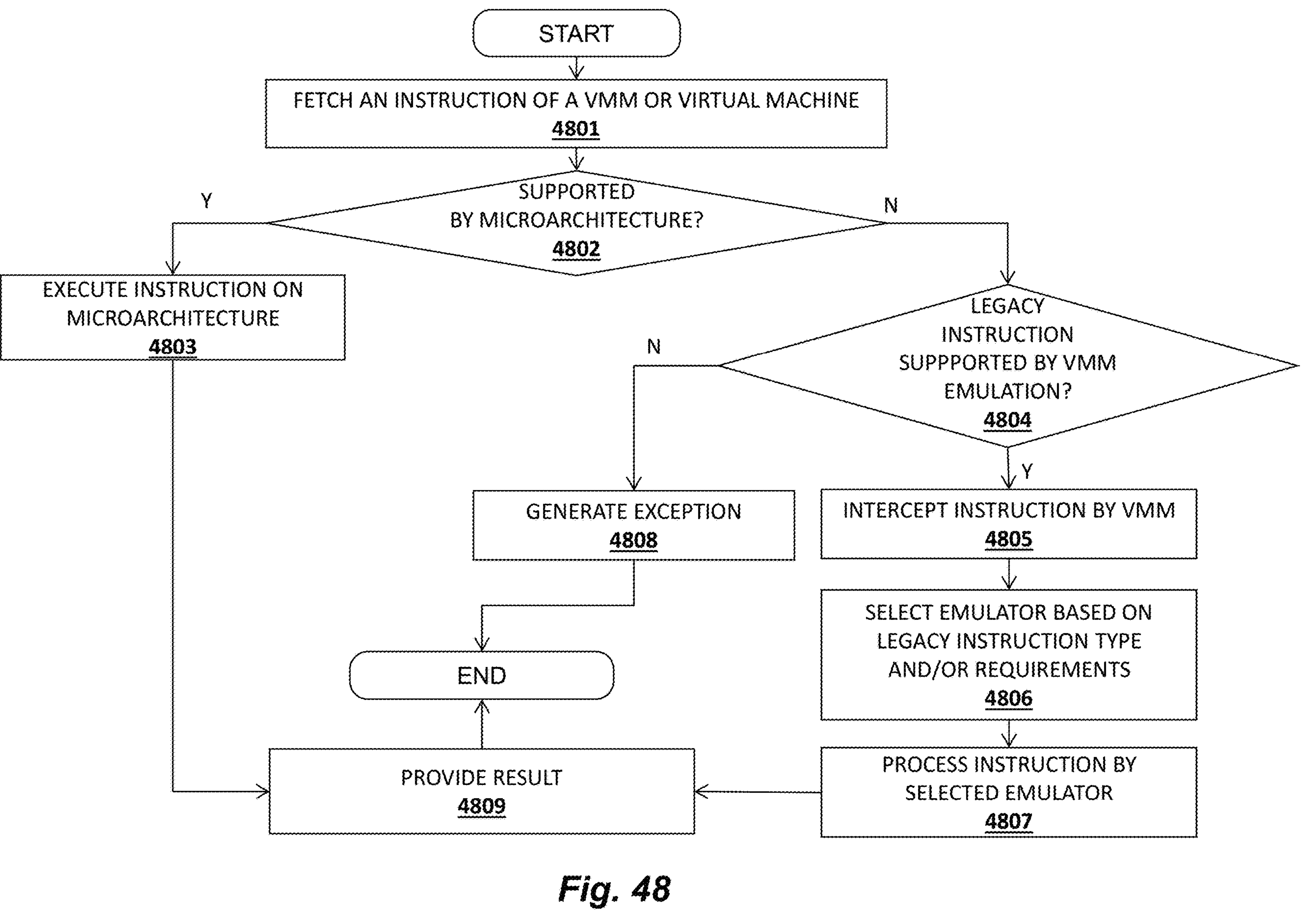
FIG. 48 illustrates a method in accordance with some implementations.

A method in accordance with one implementation is illustrated in FIG. 48. The method may be performed on the various architectures described herein, but is not limited to any particular architecture.

At 4801, an instruction of a VMM or virtual machine is fetched. If the instruction is natively supported by the microarchitecture, determined at 4802, then the instruction is executed on the microarchitecture at 4803 and the result is provided at 4809 (e.g., stored in a result register, etc).

If the instruction is not supported and if it not a legacy instruction supported by VMM emulation, determined at 4804, then an exception is generated at 4808 (e.g., an undefined instruction exception). If the instruction is supported by VMM emulation, then the instruction is intercepted by the VMM at 4805 and an emulator is selected at 4806 based on the instruction type and/or instruction requirements. In some implementations, an exception is generated first and then the VMM determines whether it is an instruction capable of being emulated.

The instruction is processed by the selected emulator at 4807 and the emulated result is provided at 4809. For example, a legacy instruction requiring segmentation may be processed by a segmentation emulator and a legacy instruction requiring an interrupt descriptor table may be processed by an IDT emulator (as described above).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

EXAMPLES

The following are example implementations of different embodiments of the invention.

Example 1. A processor comprising: instruction processing circuitry to process instructions in accordance with a microarchitecture, the instruction processing circuitry comprising: instruction fetch circuitry to fetch the instructions; a decoder to decode the instructions; and execution circuitry to execute the instructions based on the microarchitecture; wherein the microarchitecture including hardware support for a virtual execution environment including a virtual machine monitor (VMM) and a first type of virtual machine, wherein both the VMM and the first type of virtual machine are implemented by instructions directly supported by the microarchitecture; and wherein the VMM is to support a second type of virtual machine, the second type of virtual machine including legacy instructions not fully supported by the microarchitecture, the VMM comprising a plurality of emulators, each emulator configured to emulate execution of a different type of the legacy instructions.

Example 2. The processor of example 1 wherein the instruction processing circuitry is to notify the VMM responsive to detecting a legacy instruction of a particular type, the VMM to intercept the legacy instruction and select a particular emulator of the plurality of emulators configured to emulate execution of instructions of the particular type.

Example 3. The processor of example 2 wherein instructions of the particular type include a first legacy instruction type comprising instructions which rely on legacy segmentation.

Example 4. The processor of example 3 wherein the plurality of emulators include a segmentation emulator to emulate the legacy segmentation in response to an instruction of the first legacy instruction type.

Example 5. The processor of example 4 wherein to emulate the legacy segmentation, the segmentation emulator is to maintain an internal representation of one or more components associated with the legacy segmentation.

Example 6. The processor of example 5 wherein the one or more components associated with the legacy segmentation includes one or more of: a segment selector register, a task register, a global descriptor table register, a local descriptor table register, a call-gate segment selector register, one or more global descriptor tables, and one or more local descriptor tables.

Example 7. The processor of example 5 wherein the segmentation emulator is to process the instruction in accordance with the internal representation and return a result expected by the instruction.

Example 8. The processor of example 3 wherein instructions of the particular type include a second legacy instruction type comprising instructions which rely on a legacy interrupt descriptor table (IDT).

Example 9. The processor of example 8 wherein the plurality of emulators include an IDT emulator to emulate the legacy IDT in response to an instruction of the second legacy instruction type.

Example 10. The processor of example 8 wherein instructions of the particular type include a third legacy instruction type comprising instructions which rely on a legacy bus lock operation.

Example 11. The processor of example 10 wherein the plurality of emulators include a bus lock emulator to emulate the legacy bus lock operation in response to an instruction of the third legacy instruction type.

Example 12. The processor of example 10 wherein instructions of the particular type include a fourth legacy instruction type comprising instructions which rely on legacy 16-bit or 32-bit instruction support.

Example 13. The processor of example 12 wherein the plurality of emulators include a 16b/32b emulator to emulate 16-bit support or 32-bit support in response to an instruction of the fourth legacy instruction type.

Example 14. The processor of example 2 wherein the VMM is to manage access to a virtual machine control structure (VMCS), the VMCS to store data related to a virtual machine of the second type.

Example 15. The processor of example 14 wherein the data related to the virtual machine of the second type does not include certain legacy data related to segmentation, bus lock operations, or interrupt descriptor tables.

Example 16. The processor of example 15 wherein one or more of the plurality of emulators are to emulate access to the legacy data in the VMCS.

Example 17. A method comprising: fetching instructions by instruction fetch circuitry; decoding the instructions by a decoder; and executing the instructions by execution circuitry in accordance with a microarchitecture including hardware support for a virtual execution environment including a virtual machine monitor (VMM) and a first type of virtual machine, executing a first plurality of the instructions directly supported by the microarchitecture to implement both the VMM and the first type of virtual machine, wherein the VMM is to support a second type of virtual machine, the second type of virtual machine including a second plurality of the instructions comprising legacy instructions not fully supported by the microarchitecture, wherein the first plurality of instructions include instruction to implement a plurality of emulators of the VMM, each emulator configured to emulate execution of a different type of the legacy instructions.

Example 18. The method of example 17 further comprising: generating a notification to the VMM responsive to detecting a legacy instruction of a particular type, the VMM to intercept the legacy instruction and select a particular emulator of the plurality of emulators configured to emulate execution of instructions of the particular type.

Example 19. The method of example 18 wherein instructions of the particular type include a first legacy instruction type comprising instructions which rely on legacy segmentation.

Example 20. The method of example 19 wherein the plurality of emulators include a segmentation emulator to emulate the legacy segmentation in response to an instruction of the first legacy instruction type.

Example 21. The method of example 20 wherein to emulate the legacy segmentation, the segmentation emulator is to maintain an internal representation of one or more components associated with the legacy segmentation.

Example 22. The method of example 21 wherein the one or more components associated with the legacy segmentation includes one or more of: a segment selector register, a task register, a global descriptor table register, a local descriptor table register, a call-gate segment selector register, one or more global descriptor tables, and one or more local descriptor tables.

Example 23. The method of example 21 wherein the segmentation emulator is to process the instruction in accordance with the internal representation and return a result expected by the instruction.

Example 24. The method of example 19 wherein instructions of the particular type include a second legacy instruction type comprising instructions which rely on a legacy interrupt descriptor table (IDT).

Example 25. The method of example 24 wherein the plurality of emulators include an IDT emulator to emulate the legacy IDT in response to an instruction of the second legacy instruction type.

Example 26. The method of example 24 wherein instructions of the particular type include a third legacy instruction type comprising instructions which rely on a legacy bus lock operation.

Example 27. The method of example 26 wherein the plurality of emulators include a bus lock emulator to emulate the legacy bus lock operation in response to an instruction of the third legacy instruction type.

Example 28. The method of example 26 wherein instructions of the particular type include a fourth legacy instruction type comprising instructions which rely on legacy 16-bit or 32-bit instruction support.

Example 29. The method of example 28 wherein the plurality of emulators include a 16b/32b emulator to emulate 16-bit support or 32-bit support in response to an instruction of the fourth legacy instruction type.

Example 30. The method of example 18 wherein the VMM is to manage access to a virtual machine control structure (VMCS), the VMCS to store data related to a virtual machine of the second type.

Example 31. The method of example 30 wherein the data related to the virtual machine of the second type does not include certain legacy data related to segmentation, bus lock operations, or interrupt descriptor tables.

Example 32. The method of example 31 wherein one or more of the plurality of emulators are to emulate access to the legacy data in the VMCS.

Example 33. A machine-readable medium having program code stored thereon which, when executed by a machine, causes the machine to perform the operations of: fetching instructions by instruction fetch circuitry; decoding the instructions by a decoder; and executing the instructions by execution circuitry in accordance with a microarchitecture including hardware support for a virtual execution environment including a virtual machine monitor (VMM) and a first type of virtual machine, executing a first plurality of the instructions directly supported by the microarchitecture to implement both the VMM and the first type of virtual machine, wherein the VMM is to support a second type of virtual machine, the second type of virtual machine including a second plurality of the instructions comprising legacy instructions not fully supported by the microarchitecture, wherein the first plurality of instructions include instruction to implement a plurality of emulators of the VMM, each emulator configured to emulate execution of a different type of the legacy instructions.

Example 34. The method of example 33 further comprising: generating a notification to the VMM responsive to detecting a legacy instruction of a particular type, the VMM to intercept the legacy instruction and select a particular emulator of the plurality of emulators configured to emulate execution of instructions of the particular type.

Example 35. The method of example 34 wherein instructions of the particular type include a first legacy instruction type comprising instructions which rely on legacy segmentation.

Example 36. The method of example 35 wherein the plurality of emulators include a segmentation emulator to emulate the legacy segmentation in response to an instruction of the first legacy instruction type.

Example 37. The method of example 36 wherein to emulate the legacy segmentation, the segmentation emulator is to maintain an internal representation of one or more components associated with the legacy segmentation.

Example 38. The method of example 37 wherein the one or more components associated with the legacy segmentation includes one or more of: a segment selector register, a task register, a global descriptor table register, a local descriptor table register, a call-gate segment selector register, one or more global descriptor tables, and one or more local descriptor tables.

Example 39. The method of example 37 wherein the segmentation emulator is to process the instruction in accordance with the internal representation and return a result expected by the instruction.

Example 40. The method of example 35 wherein instructions of the particular type include a second legacy instruction type comprising instructions which rely on a legacy interrupt descriptor table (IDT).

Example 41. The method of example 40 wherein the plurality of emulators include an IDT emulator to emulate the legacy IDT in response to an instruction of the second legacy instruction type.

Example 42. The method of example 40 wherein instructions of the particular type include a third legacy instruction type comprising instructions which rely on a legacy bus lock operation.

Example 43. The method of example 42 wherein the plurality of emulators include a bus lock emulator to emulate the legacy bus lock operation in response to an instruction of the third legacy instruction type.

Example 44. The method of example 42 wherein instructions of the particular type include a fourth legacy instruction type comprising instructions which rely on legacy 16-bit or 32-bit instruction support.

Example 45. The method of example 44 wherein the plurality of emulators include a 16b/32b emulator to emulate 16-bit support or 32-bit support in response to an instruction of the fourth legacy instruction type.

Example 46. The method of example 34 wherein the VMM is to manage access to a virtual machine control structure (VMCS), the VMCS to store data related to a virtual machine of the second type.

Example 47. The method of example 46 wherein the data related to the virtual machine of the second type does not include certain legacy data related to segmentation, bus lock operations, or interrupt descriptor tables.

Example 48. The method of example 47 wherein one or more of the plurality of emulators are to emulate access to the legacy data in the VMCS.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:

instruction processing circuitry to process instructions in accordance with a microarchitecture, the instruction processing circuitry comprising:

instruction fetch circuitry to fetch the instructions;

a decoder to decode the instructions; and execution circuitry to execute the instructions based on the microarchitecture;

wherein the microarchitecture including hardware support for a virtual execution environment including a virtual machine monitor (VMM) and a first type of virtual machine, wherein both the VMM and the first type of virtual machine are implemented by instructions directly supported by the microarchitecture; and wherein the VMM is to support a second type of virtual machine, the second type of virtual machine including one or more legacy instructions, upon a determination of a first legacy instruction of the one or more legacy instructions being supported by the VMM, the first legacy instruction is intercepted by the VMM to emulate support of the first legacy instruction by the microarchitecture, the VMM comprising a plurality of emulators, each emulator configured to emulate execution of a different type of the legacy instructions.

2. The processor of claim 1 wherein the instruction processing circuitry is to notify the VMM responsive to detecting a legacy instruction of a particular type, the VMM to intercept the legacy instruction and select a particular emulator of the plurality of emulators configured to emulate execution of the legacy instruction of the particular type.

3. The processor of claim 2 wherein instructions of the particular type include a first legacy instruction type comprising instructions which rely on legacy segmentation.

4. The processor of claim 3 wherein the plurality of emulators include a segmentation emulator to emulate the legacy segmentation in response to an instruction of the first legacy instruction type.

5. The processor of claim 1 wherein to emulate legacy segmentation, a segmentation emulator of the plurality of emulators is to maintain an architecture state corresponding to one or more components associated with the legacy segmentation.

6. The processor of claim 5 wherein the one or more components associated with the legacy segmentation includes one or more of: a segment selector register, a task register, a global descriptor table register, a local descriptor table register, a call-gate segment selector register, one or more global descriptor tables, and one or more local descriptor tables.

7. The processor of claim 5 wherein the segmentation emulator is to process the first legacy instruction in accordance with the architecture state and return a result expected by the first legacy instruction.

8. The processor of claim 3 wherein the instructions of the particular type include a second legacy instruction type comprising instructions which rely on a legacy interrupt descriptor table (IDT).

9. The processor of claim 8 wherein the plurality of emulators include an IDT emulator to emulate the legacy IDT in response to an instruction of the second legacy instruction type.

10. The processor of claim 8 wherein the instructions of the particular type include a third legacy instruction type comprising instructions which rely on a legacy bus lock operation.

11. The processor of claim 10 wherein the plurality of emulators include a bus lock emulator to emulate the legacy bus lock operation in response to an instruction of the third legacy instruction type.

12. The processor of claim 10 wherein the instructions of the particular type include a fourth legacy instruction type comprising instructions which rely on legacy 16-bit or 32-bit instruction support.

13. The processor of claim 12 wherein the plurality of emulators include a 16b/32b emulator to emulate 16-bit support or 32-bit support in response to an instruction of the fourth legacy instruction type.

14. The processor of claim 1 wherein the VMM is to manage access to a virtual machine control structure (VMCS), the VMCS to store data related to a virtual machine of the second type.

15. The processor of claim 14 wherein the data related to the virtual machine of the second type does not include certain legacy data related to segmentation, bus lock operations, or interrupt descriptor tables.

16. The processor of claim 15 wherein one or more of the plurality of emulators are to emulate access to the legacy data in the VMCS.

17. A method comprising:

fetching instructions by instruction fetch circuitry;

decoding the instructions by a decoder; and executing the instructions by execution circuitry in accordance with a microarchitecture including hardware support for a virtual execution environment including a virtual machine monitor (VMM) and a first type of virtual machine, executing a first plurality of the instructions directly supported by the microarchitecture to implement both the VMM and the first type of virtual machine, wherein the VMM is to support a second type of virtual machine, the second type of virtual machine including a second plurality of the instructions comprising one or more legacy instructions, upon a determination of a first legacy instruction of the one or more legacy instructions being supported by the VMM, intercepting the first legacy instruction by the VMM to emulate support of the first legacy instruction by the microarchitecture, wherein the first plurality of the instructions include instruction to implement a plurality of emulators of the VMM, each emulator configured to emulate execution of a different type of the legacy instructions.

18. The method of claim 17 further comprising:

generating a notification to the VMM responsive to detecting a legacy instruction of a particular type, the VMM to intercept the legacy instruction and select a particular emulator of the plurality of emulators configured to emulate execution of the legacy instruction of the particular type.

19. The method of claim 18 wherein instructions of the particular type include a first legacy instruction type comprising instructions which rely on legacy segmentation.

20. The method of claim 19 wherein the plurality of emulators include a segmentation emulator to emulate the legacy segmentation in response to an instruction of the first legacy instruction type.

21. The method of claim 17 wherein to emulate legacy segmentation, a segmentation emulator of the plurality of emulators is to maintain an architecture state corresponding to one or more components associated with the legacy segmentation.

22. The method of claim 21 wherein the one or more components associated with the legacy segmentation includes one or more of: a segment selector register, a task register, a global descriptor table register, a local descriptor table register, a call-gate segment selector register, one or more global descriptor tables, and one or more local descriptor tables.

23. The method of claim 21 wherein the segmentation emulator is to process the instruction in accordance with the architecture state and return a result expected by the first legacy instruction.

24. The method of claim 19 wherein the instructions of the particular type include a second legacy instruction type comprising instructions which rely on a legacy interrupt descriptor table (IDT).

25. The method of claim 24 wherein the plurality of emulators include an IDT emulator to emulate the legacy IDT in response to an instruction of the second legacy instruction type.

26. The method of claim 24 wherein the instructions of the particular type include a third legacy instruction type comprising instructions which rely on a legacy bus lock operation.

27. The method of claim 26 wherein the plurality of emulators include a bus lock emulator to emulate the legacy bus lock operation in response to an instruction of the third legacy instruction type.

28. The method of claim 26 wherein the instructions of the particular type include a fourth legacy instruction type comprising instructions which rely on legacy 16-bit or 32-bit instruction support.

29. The method of claim 28 wherein the plurality of emulators include a 16b/32b emulator to emulate 16-bit support or 32-bit support in response to an instruction of the fourth legacy instruction type.

30. The method of claim 17 wherein the VMM is to manage access to a virtual machine control structure (VMCS), the VMCS to store data related to a virtual machine of the second type.

31. The method of claim 30 wherein the data related to the virtual machine of the second type does not include certain legacy data related to segmentation, bus lock operations, or interrupt descriptor tables.

32. The method of claim 31 wherein one or more of the plurality of emulators are to emulate access to the legacy data in the VMCS.

33. A non-transitory machine-readable medium having program code stored thereon which, when executed by a machine, causes the machine to perform:

fetching instructions by instruction fetch circuitry;

decoding the instructions by a decoder; and executing the instructions by execution circuitry in accordance with a microarchitecture including hardware support for a virtual execution environment including a virtual machine monitor (VMM) and a first type of virtual machine, executing a first plurality of the instructions directly supported by the microarchitecture to implement both the VMM and the first type of virtual machine, wherein the VMM is to support a second type of virtual machine, the second type of virtual machine including a second plurality of the instructions comprising one or more legacy instructions, upon a determination of a first legacy instruction of the one or more legacy instructions being supported by the VMM, intercepting the first legacy instruction by the VMM to emulate support of the first legacy instruction by the microarchitecture, wherein the first plurality of the instructions include instruction to implement a plurality of emulators of the VMM, each emulator configured to emulate execution of a different type of the legacy instructions.

34. The non-transitory machine-readable medium of claim 33 further comprising:

generating a notification to the VMM responsive to detecting a legacy instruction of a particular type, the VMM to intercept the legacy instruction and select a particular emulator of the plurality of emulators configured to emulate execution of the legacy instruction of the particular type.

35. The non-transitory machine-readable medium of claim 34 wherein instructions of the particular type include a first legacy instruction type comprising instructions which rely on legacy segmentation.

36. The non-transitory machine-readable medium of claim 35 wherein the plurality of emulators include a segmentation emulator to emulate the legacy segmentation in response to an instruction of the first legacy instruction type.

37. The non-transitory machine-readable medium of claim 33 wherein to emulate legacy segmentation, a segmentation emulator of the plurality of emulators is to maintain an architecture state corresponding to one or more components associated with the legacy segmentation.

38. The non-transitory machine-readable medium of claim 37 wherein the one or more components associated with the legacy segmentation includes one or more of: a segment selector register, a task register, a global descriptor table register, a local descriptor table register, a call-gate segment selector register, one or more global descriptor tables, and one or more local descriptor tables.

39. The non-transitory machine-readable medium of claim 37 wherein the segmentation emulator is to process the instruction in accordance with the architecture state and return a result expected by the first legacy instruction.

40. The non-transitory machine-readable medium of claim 35 wherein the instructions of the particular type include a second legacy instruction type comprising instructions which rely on a legacy interrupt descriptor table (IDT).

41. The non-transitory machine-readable medium of claim 40 wherein the plurality of emulators include an IDT emulator to emulate the legacy IDT in response to an instruction of the second legacy instruction type.

42. The non-transitory machine-readable medium of claim 40 wherein the instructions of the particular type include a third legacy instruction type comprising instructions which rely on a legacy bus lock operation.

43. The non-transitory machine-readable medium of claim 42 wherein the plurality of emulators include a bus lock emulator to emulate the legacy bus lock operation in response to an instruction of the third legacy instruction type.

44. The non-transitory machine-readable medium of claim 42 wherein the instructions of the particular type include a fourth legacy instruction type comprising instructions which rely on legacy 16-bit or 32-bit instruction support.

45. The non-transitory machine-readable medium of claim 44 wherein the plurality of emulators include a 16b/32b emulator to emulate 16-bit support or 32-bit support in response to an instruction of the fourth legacy instruction type.

46. The non-transitory machine-readable medium of claim 33 wherein the VMM is to manage access to a virtual machine control structure (VMCS), the VMCS to store data related to a virtual machine of the second type.

47. The non-transitory machine-readable medium of claim 46 wherein the data related to the virtual machine of the second type does not include certain legacy data related to segmentation, bus lock operations, or interrupt descriptor tables.

48. The non-transitory machine-readable medium of claim 47 wherein one or more of the plurality of emulators are to emulate access to the legacy data in the VMCS.

* * * * *